(12) United States Patent
Shapley et al.

(10) Patent No.: US 10,769,724 B1
(45) Date of Patent: *Sep. 8, 2020

(54) VEHICLE LOAN GENERATION SYSTEM: MULTIPLE VEHICLE LOAN OFFER GENERATION

(71) Applicant: STATE FARM MUTUAL AUTOMOBILE INSURANCE COMPANY, Bloomington, IL (US)

(72) Inventors: Adam T. Shapley, Bloomington, IL (US); Richard G. Sopek, Bloomington, IL (US); Jennifer A. Keegan, Bloomington, IL (US); Gregory S. Spencer, Hudson, IL (US); Melinda A. Walker, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 128 days.

This patent is subject to a terminal disclaimer.

(21) Appl. No.: 16/170,292

(22) Filed: Oct. 25, 2018

Related U.S. Application Data

(63) Continuation of application No. 14/485,200, filed on Sep. 12, 2014, now Pat. No. 10,163,156.
(Continued)

(51) Int. Cl.
   *G06Q 30/00* (2012.01)
   *G06Q 40/02* (2012.01)
(52) U.S. Cl.
   CPC ................... *G06Q 40/025* (2013.01)
(58) Field of Classification Search
   CPC ...................................................... G06Q 40/02
   (Continued)

(56) References Cited

U.S. PATENT DOCUMENTS

| 4,736,294 A | 4/1988 | Gill et al. |
| 5,611,052 A | 3/1997 | Dykstra et al. |

(Continued)

OTHER PUBLICATIONS

Lending Tree Announces Several New Clients of the Lend-X Automated Decision Engine Technology, *PR Newswire*, Jun. 25, 2001.

(Continued)

*Primary Examiner* — John H. Holly
(74) *Attorney, Agent, or Firm* — Marshall, Gerstein & Borun LLP

(57) ABSTRACT

The system and method allows a vehicle loan organization to generate multiple, customized vehicle loan offers to an applicant for different types of vehicles in an automated fashion. The system and method calculates an acquisition score to better determine the riskiness of offering a vehicle loan to a potential applicant. Additionally, the system and method automates underwriting decisions by automatically approving, denying, or referring vehicle loan applications. For vehicle loan applications that are referred for manual underwriting, the system determines the appropriate credit analyst to use based on the application's complexity, the analyst's expertise, and the analyst's availability. Further, the system uses credit data to calculate a maximum term, amount, and LTV ratio for potential vehicle loans. Also, the system considers the applicant's collateral before approving a vehicle loan. For qualified, approved applicants, the system generates multiple, customized vehicle loan offers for the applicant.

18 Claims, 82 Drawing Sheets

Related U.S. Application Data

(60) Provisional application No. 61/877,883, filed on Sep. 13, 2013.

(58) Field of Classification Search
USPC .......... 705/38, 1.1, 35, 28, 14, 53, 37, 36 R, 705/7.36, 14.53; 701/1, 117, 36; 340/426.19
See application file for complete search history.

(56) References Cited

U.S. PATENT DOCUMENTS

| | | | |
|---|---|---|---|
| 5,940,812 A * | 8/1999 | Tengel | G06Q 40/04 705/38 |
| 6,105,007 A | 8/2000 | Norris | |
| 7,346,568 B1 | 3/2008 | Cadoux | |
| 7,630,932 B2 | 12/2009 | Danaher et al. | |
| 8,015,107 B2 | 9/2011 | Kornegay et al. | |
| 8,554,665 B1 | 10/2013 | Zettner et al. | |
| 8,660,943 B1 | 2/2014 | Chirehdast | |
| 2002/0023051 A1 | 2/2002 | Kunzle et al. | |
| 2002/0077964 A1 | 6/2002 | Brody et al. | |
| 2002/0116328 A1 | 8/2002 | Bird et al. | |
| 2002/0198822 A1 | 12/2002 | Munoz et al. | |
| 2003/0033242 A1 | 2/2003 | Lynch et al. | |
| 2003/0216926 A1 | 11/2003 | Scotto et al. | |
| 2006/0106774 A1 | 5/2006 | Cohen et al. | |
| 2007/0130042 A1 | 6/2007 | Dryden | |
| 2007/0143195 A1 | 6/2007 | Bell et al. | |
| 2007/0255649 A1 * | 11/2007 | Vagim, III | B82Y 15/00 705/38 |
| 2008/0033869 A1 | 2/2008 | Steele et al. | |
| 2008/0154791 A1 | 6/2008 | Bannister et al. | |
| 2009/0216591 A1 | 8/2009 | Buerger et al. | |
| 2011/0125626 A1 | 5/2011 | Shalen et al. | |
| 2012/0284173 A1 | 11/2012 | Monjanel et al. | |
| 2014/0081751 A1 | 3/2014 | Hogan et al. | |
| 2014/0195412 A1 | 7/2014 | Metz et al. | |
| 2014/0258093 A1 | 9/2014 | Gardiner et al. | |
| 2014/0279398 A1 | 9/2014 | Stewart et al. | |

OTHER PUBLICATIONS

Moyer, Liz: Barnett's New Software to Speed up Auto Loan Underwriting Series: 17, American Banker, Feb. 4, 1997.
Office Action in U.S. Appl. No. 14/485,183 dated Dec. 9, 2014.
Office Action in U.S. Appl. No. 14/485,189 dated Dec. 23, 2014.
Office Action in U.S. Appl. No. 14/485,200 dated Apr. 7, 2015.
Office Action in U.S. Appl. No. 14/485,200 dated Dec. 11, 2014.
Office Action in U.S. Appl. No. 14/485,216 dated Dec. 17, 2014.
Office Action in U.S. Appl. No. 14/485,216 dated Jun. 3, 2015.
Robin Williams & Steve Cummings, Jargon an Informal Dictionary of Computer Terms 128 (1993).
The Center for Education in Mathematics and Computing, chapter 1.8, downloaded from the Internet at <http://cscircles.cemc.uwaterloo.ca/18-efficiency/>.
U.S. Appl. No. 14/485,189, Final Office Action, dated Jul. 8, 2015.
U.S. Appl. No. 14/485,216, Final Office Action, dated Dec. 21, 2016.
U.S. Appl. No. 14/485,216, Nonfinal Office Action, dated Jun. 27, 2016.
U.S. Appl. No. 14/485,200, Nonfinal Office Action, dated Jan. 12, 2017.
U.S. Appl. No. 14/485,200, Final Office Action, dated Dec. 17, 2015.
U.S. Appl. No. 14/485,200, Nonfinal Office Action, dated Jul. 31, 2015.

* cited by examiner

200

ACQUISITION SCORING MODEL 210

AUTOMATED UNDERWRITING MODEL 220

CREDIT LIMIT ASSIGNMENT MODEL 230

PREQUALIFICATION MODEL 240

MULTIPLE OFFERS MODEL 250

SKILL BASED ROUTING MODEL 260

*FIG. 2*

| | Variable Description | Trade Line Type | Variable Type |
|---|---|---|---|
| | | Category | |
| 520 | Number of inquiries within 12 months | Overall | Inquiries |
| 521 | Number of trades currently delinquent or severely derogatory | Overall | Delinquency |
| 522 | Age of oldest Installment trade | Installment | Vintage |
| 523 | Highest revolving credit amount | Revolving | Credit Amount |
| 524 | Number of open revolving trades balance-active within 6 months and balance to credit ratio > 75% | Revolving | Utilization |
| 525 | Aggregate balance for open finance trades | Finance | Balance |
| 526 | Keycoded - Aggregate balance amount for open trades | Overall | Balance |
| 527 | Number of Auto loans opened within 24 months | Auto Loan | Trades |
| 528 | Age of most recent Bankcard trade | Bankcard | Vintage |
| 529 | Highest Non-deferred Student loan balance | Student Loan | Balance |
| 530 | Individual balance to credit ratio for open Bankcard trades | Bankcard | Utilization |

*FIG. 5A*

550 

| Keycoded - Aggregate balance amount for open trades |
|---|
| 0 = No qualifying trades |
| 1 = Aggregate balance amount is $0 |
| 2 = Aggregate balance amount is $1-$9,999 |
| 3 = Aggregate balance amount is $10,000-$24,999 |
| 4 = Aggregate balance amount is $25,000-$49,999 |
| 5 = Aggregate balance amount is $50,000-$74,999 |
| 6 = Aggregate balance amount is $75,000-$99,999 |
| 7 = Aggregate balance amount is $100,000-$149,999 |
| 8 = Aggregate balance amount is $150,000-$199,999 |
| 9 = Aggregate balance amount is > = $200,000 |

| | Description | Contribution |
|---|---|---|
| 610 → | Intercept | – |
| 520 → | Number of Inquiries within 12 months | A% |
| 521 → | Number of trades currently delinquent or severely derogatory | B% |
| 522 → | Age of oldest Installment trade | C% |
| 523 → | Highest revolving credit amount | D% |
| 524 → | Number of open revolving trades balance-active within 6 months and balance to credit ratio > 75% | E% |
| 525 → | Aggregate balance for open finance trades | F% |
| 526 → | Keycoded^ - Aggregate balance amount for open trades | G% |
| 527 → | Number of Auto loans opened within 24 months | H% |
| 528 → | Age of most recent Bankcard trade | I% |
| 529 → | Highest Non-deferred Student loan balance | J% |
| 530 → | Individual balance to credit ratio for open Bankcard trades | K% |

| Sl. No. | Type | Rule Description |
|---|---|---|
| 1 | Process | Primary or secondary applicant (if any) do not have zero score (in case it is a frozen file situation) |
| 2 | Process | No Duplicate VIN's exist |
| 3 | Process | SFB is not the lienholder on the trade-in vehicle (if trade-in exists) |
| 4 | Process | This is not a related application (meaning more than 2 applicants) |
| 5 | Process | Total application income is < 20,000 per month |
| 6 | Process | Primary or secondary applicant (if any) occupation type is not HMKR (homemaker) or NEMP (not employed), AND income is listed for that applicant |
| 7 | Policy | Primary and secondary (if any) Age >=18 |
| 8 | Policy | No review flags exist for primary or secondary, if any |
| 9 | Policy | No more than two Duplicate App's exist |
| 10 | Policy | Primary or secondary applicant (if any) SF relationship is not "A" (none) |
| 11 | Policy | Minimum Loan Amount and maximum Term guidelines have been met |
| 12 | Policy | Loan Amount >= 5000 and <= 40,000 |
| 13 | Policy | No Fraud flag exists for primary or secondary, if any |

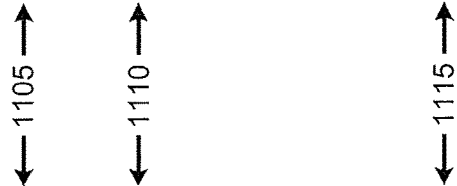

1105　　1110　　1115

| Sl. No. | Type | Rule Description |
|---|---|---|
| 14 | Policy | Primary or secondary applicant (if any) do not have zero score (in case it is a frozen file situation) |
| 15 | Policy | Payment amount >= 100.00 |
| 16 | Business | No public records exist for primary or secondary, if any |
| 17 | Business | No bankruptcy flags exist for primary or secondary, if any |
| 18 | Business | Total application income is < 20,000 per month |
| 19 | Business | Primary and secondary (if any) reside in same state |
| 20 | Business | Debt to Income ratio <= 50% (for cosigner situation, this applies to primary only) |
| 21 | Business | Primary or secondary Oldest trade on credit bureau >= 48 months |
| 22 | Business | Worst credit rating on credit bureau is not 17 - 19, M7 - M9, R7 - R9 for primary or secondary, if any |
| 23 | Business | Revolving balances for either Primary or Secondary (if any) <=20,000 OR; Primary and Secondary both score >=740, AND revolving balances for either <= 25,000 |
| 24 | Business | Primary or secondary (if any) occupation type is SELF and score is >760 |

| Product | Policy Guidelines |
|---|---|
| All Products | Minimum Permissible is 12 months |
| Auto | Maximum Permissible Term for a model year less than 2006 is 48 months |
| | Maximum Permissible Term is 84 months |
| | Maximum Permissible Term for model years 2008-10 is 72 months |
| | Maximum Permissible Term for model years 2006-07 is 60 months |
| RVs / Boats | Maximum Permissible Term is 240 months |
| | Maximum Permissible Term is 72 months |
| Others | Maximum Permissible Term for model years 2006-10 is 60 months |

1605 → Product
1610 → Policy Guidelines

| VECHICLE LOANS LOAN TO VALUE CUTOFF TABLE | | | | | |
|---|---|---|---|---|---|
| Product | Condition | Purchase Type | FICO Risk Segment | Low Collateral | High Collateral |
| Auto | Used | Dealer Purchase | High Risk | 105% | 85% |
| Auto | Used | Dealer Purchase | Medium Risk | 120% | 110% |
| Auto | Used | Dealer Purchase | Low Risk | 150% | 150% |
| Auto | Used | Refi | High Risk | 125% | 115% |
| Auto | Used | Refi | Medium Risk | 160% | 150% |
| Auto | Used | Refi | Low Risk | 180% | 180% |
| Auto | New | Dealer Purchase | High Risk | 125% | 125% |
| Auto | New | Dealer Purchase | Medium Risk | 165% | 165% |
| Auto | New | Dealer Purchase | Low Risk | 180% | 180% |
| Auto | New | Refi | High Risk | 140% | 140% |
| Auto | New | Refi | Medium Risk | 165% | 165% |
| Auto | New | Refi | Low Risk | 180% | 180% |
| RVs/Boats | n/a | n/a | High Risk | 100% | 90% |
| RVs/Boats | n/a | n/a | Medium Risk | 130% | 110% |
| RVs/Boats | n/a | n/a | Low Risk | 180% | 170% |
| Other | n/a | n/a | High Risk | 140% | 130% |
| Other | n/a | n/a | Medium Risk | 150% | 140% |
| Other | n/a | n/a | Low Risk | 180% | 170% |

| VECHICLE LOANS LOAN TO VALUE AVERAGE COLLATERAL VALUE TABLE | | | | | |
|---|---|---|---|---|---|
| Product | Condition | Purchase Type | FICO Risk Segment | Low Collateral | High Collateral |
| Auto | Used | Refi | High Risk | $10,267 | $22,225 |
| Auto | Used | Refi | Medium Risk | $10,694 | $22,684 |
| Auto | Used | Refi | Low Risk | $11,225 | $23,072 |
| Other | n/a | n/a | n/a | $6,321 | $12,688 |

| VECHICLE LOANS LOAN TO VALUE AVERAGE CHARGE-OFF AMOUNT TABLE | | | | | |
|---|---|---|---|---|---|
| Product | Condition | Purchase Type | FICO Risk Segment | Low Collateral | High Collateral |
| Auto | Used | Refi | High Risk | $17,671 | $17,353 |
| Auto | Used | Refi | Medium Risk | $8,190 | $14,825 |
| Auto | Used | Refi | Low Risk | $7,010 | $14,073 |
| Other | n/a | n/a | n/a | $4,401 | $10,526 |

| Sl. No. | Topic Name | TransUnion Code Translation |
|---|---|---|
| 1 | DECEASED | Reject for deceased indication |
| 2 | SSNCHECK | Reject for missing or invalid database SSN (ENSOCSECNUM) |
| 3 | USSTATE | Reject for states outside of the US |
| 4 | STATE | Reject for Rhode Island, Massachusetts |
| 5 | APOFPO | Reject for APO (military) addresses |
| 6 | MAUALAKA | Reject for AKA allow for married name changes |
| 7 | POBRR | Reject for Post Office Box or Rural Route addresses |
| 8 | GENERAL | Reject for general delivery |
| 9 | REMDISP | Reject for derogatory remarks and dispute codes |
| 10 | PUBREC1 | Reject for Bankruptcy Public Records |
| 11 | COLLECT1 | Reject for 3 or more collection items with current balances greater than $100 |
| 12 | HISTMOP1 | Reject for any occurrence of 90 days delinquent (MOP 04) or greater |
| 13 | HISTMOP2 | Reject for any occurrence of 60 days delinquent (MOP 03) in 24 months |
| 14 | CURRMOP1 | Reject for more than one trade with a current manner of payment 30 days delinquent (MOP 02) |
| 15 | FEWQUAL1 | Reject for less than 5 trades on file |
| 16 | OTHERTR1 | Reject for 9 or more Open Bankcards on file |
| 17 | BURDEN1 | Reject for aggregate current balance / credit limit for trades with account type "R" greater than 60%. [Account type R-Revolving or Option] |
| 18 | RECENT | Reject if File since date is less than 48 months AND the oldest trade on file has been opened less than 48 months |
| 19 | MANYINQ1 | Count State Farm Auto inquiries w/in the last 3 months. Utilize codes B7020054 and B0003625. |
| 20 | PROMINQ1 | Reject for presence of State Farm Bank Account Solicitation Promotional Inquiry code B1XQH002 within 3 month (Account Management Promotional Inquiries are allowed) AND presence of State Farm Auto inquiry w/in the last 3 months. |
| 21 | FEWQUAL2 | Flag a record that is Ever 30+DPD in the last 12 months on any installment or mortgage lone. |
| 22 | SCRCUT | Reject if FICA <= 680 |
| 23 | SCRCUT2 | Reject if Shticks<= 1682 |

FIG. 27A

| Sl. No. | Fatal Criteria |
|---|---|
| 1 | Collection account over $1,000 |
| 2 | Account that has been charged off or settled for less than the full balance owed |
| 3 | Tax or Mechanics line for over $1,000 |
| 4 | Judgment over $1,000 |
| 5 | Repossession |
| 6 | Foreclosure |
| 7 | Bankruptcy |

| Segment | Value | % Accounts |
|---|---|---|
| Low Collateral | <= $25,000 | 54.7% |
| High Collateral | $25,000 - $50,000 | 44.1% |
| Premium Collateral | > $50,000 | 1.2% |

| Decile | Probability Range | Average Collateral Value |
|---|---|---|
| 1 | > 73.7% | $21,400 |
| 2 | 71.2% - 73.7% | $22,200 |
| 3 | 69.2% - 71.2% | $22,700 |
| 4 | 67.6% - 69.2% | $23,400 |
| 5 | 65.9% - 67.6% | $23,500 |
| 6 | 64.6% - 65.9% | $23,700 |
| 7 | 63.1% - 64.6% | $24,300 |
| 8 | 61.8% - 63.1% | $24,600 |
| 9 | 60.3% - 61.8% | $24,900 |
| 10 | <= 60.3% | $25,000 |

| Decile | Probability Range | Average Collateral Value |
|---|---|---|
| 1 | > 71.4% | $33,100 |
| 2 | 64.6% - 71.4% | $30,100 |
| 3 | 58.8% - 64.6% | $28,800 |
| 4 | 54.5% - 58.8% | $28,300 |
| 5 | 50.9% - 54.4% | $27,700 |
| 6 | 48.0% - 50.9% | $27,000 |
| 7 | 45.7% - 48.0% | $26,800 |
| 8 | 43.6% - 45.7% | $26,100 |
| 9 | 41.9% - 43.6% | $26,000 |
| 10 | <= 41.9% | $25,500 |

| Description | Contribution |
|---|---|
| Intercept | |
| ^Keycoded - Monthly Payment for Oldest Open Auto Trade | A% |
| Income Estimator Score | B% |
| Highest Auto loan balance | C% |
| Number of Closed Installment trades | D% |
| Highest Installment Credit Amount | E% |
| Highest Non-Retail Credit Amount | F% |

| Description | Contribution |
|---|---|
| Intercept | |
| ^Keycoded - Monthly Payment for Oldest Open Auto Trade | A% |
| Income Insight Score | B% |
| Highest Auto Loan Balance | C% |
| Number of Closed Installment Trades | D% |
| Highest Installment Credit Amount | E% |
| Highest Non-Retail Credit Amount | F% |

| Description | Contribution |
|---|---|
| Intercept | |
| ^Keycoded - Monthly Payment for Oldest Open Auto Trade | A% |
| Income Estimator Score | B% |
| Highest Auto Loan Balance | C% |
| Number of Closed Installment Trades | D% |
| Highest Installment Credit Amount | E% |
| Highest Non-Retail Credit Amount | F% |

| KEYCODED - MONTHLY PAYMENT FOR OLDEST OPEN AUTO TRADE |
|---|
| 0 = NO AUTO-LOAN TRADES |
| 1 = OPEN WITH MONTHLY PAYMENT AMT LT $200 |
| 2 = OPEN WITH MONTHLY PAYMENT AMT $200-$249 |
| 3 = OPEN WITH MONTHLY PAYMENT AMT $250-$299 |
| 4 = OPEN WITH MONTHLY PAYMENT AMT $300-$349 |
| 5 = OPEN WITH MONTHLY PAYMENT AMT $350-$399 |
| 6 = OPEN WITH MONTHLY PAYMENT AMT $400-$449 |
| 7 = OPEN WITH MONTHLY PAYMENT AMT $450-$499 |
| 8 = OPEN WITH MONTHLY PAYMENT AMT $500-$599 |
| 9 = OPEN WITH MONTHLY PAYMENT AMT >= $600 |
| A = OPEN WITH NO MONTHLY AVAILABLE |
| B = CLOSED ACCOUNT |

*FIG. 31D*

Model Inputs 3400

Social Security Number (xxx-xx-xxxx): 000-00-0116 — 3420

Purchase Type: Dealer Purchase

State: Illinois — 3425

Collateral Value (in $): 2000

Occupation: Employed

Vehicle Make: Toyota

Monthly Net Income: 2200

Vehicle Model Year: 2013

Pre-Loan Debt (Monthly in $): 800

Vehicle Mileage: 0

Clear — 3430

Submit Information>> — 3435

Close — 3440

| Product | Purchase Type | Maximum Permissible LTV |
|---|---|---|
| Auto | Dealer Purchase | 150% |
| Auto | Refinance, Lease Buyout, Secured, Private Sale | 160% |
| RVs / Boats | All Purchase Types | 115% |
| Others | All Purchase Types | 100% |

3710

| Product | Policy: Maximum Permissible DTI |
|---|---|
| All Products | 50% |

| Product | Additional Policy Guidelines |
|---|---|
| Auto | A loan term greater than 72 months and less than or equal to 84 months is permissible only when the total loan amount is greater than or equal to $15,000 |
| RVs / Boats | A term greater than 72 months and less than or equal to 120 months is permissible only when the total loan amount is greater than or equal to $25,000 |
| | A term greater than 120 months and less than or equal to 180 months is permissible only when the total loan amount is greater than or equal to $40,000 |
| | A term greater than 180 months and less than or equal to 240 months is permissible only when the total loan amount is greater than or equal to $60,000 |

*FIG. 38*

| Product | Additional Policy Guidelines* |
|---|---|
| Auto | If FICO < 680, then the maximum permissible Term for model years<br>- 2008-13 → 60 months<br>- 2006-07 → 48 months<br>- Older than 2006 → 36 months |
| | If 640 <= FICO < 680 then the maximum permissible Term for model years<br>- 2006-13 → 73 months<br>- Older than 2006 → Not eligible for a Loan |
| RVs / Boats | If FICO < 640, then the maximum permissible Term for model years<br>- 2011-13 → 72 months<br>- 2008-10 → 60 months<br>- Older than 2006   Not eligible for a Loan |
| | If 640 <= FICO < 680 then the maximum permissible Term for model years<br>- 2011-13 → 60 months<br>- Older than 2006 → 36 months |
| Others | If 640 <= FICO < 680 then the maximum permissible Term for model years<br>- 2011-13 → 60 months<br>- 2008-10 → 48 months<br>- Older than 2008 → 36 months |

The Loan Parameters selected are as below:

5010

| Loan Details | | |
|---|---|---|
| Monthly Payment Amount ($) | - | 298 |
| APR (%) | - | 4.24 |
| Loan Term (Months) | - | 84 |
| Loan Amount ($) | - | 21626 |
| Collateral Value ($) | - | 20000 |

This offer is based on an Input of $2200 and Collateral Valuation of $20000.

*FIG. 50*

B2 LOAN COMPLEXITY LIMITS — 5530

➢ Loan complexity limits: Complexity (based on loan complexity model) limits for each analyst, depending on the authority levels & training needs ➢ Desired impact: Ensures loans are routed to lower authority levels, even when higher authority analyst is available

| Analyst Authority Level | Loan complexity | | |
|---|---|---|---|
| | Simple | Regular | Complex |
| $ 35 K | 50% | 30% | 20% |
| $ 50 K | 30% | 50% | 20% |
| $ 75 K | 20% | 30% | 50% |

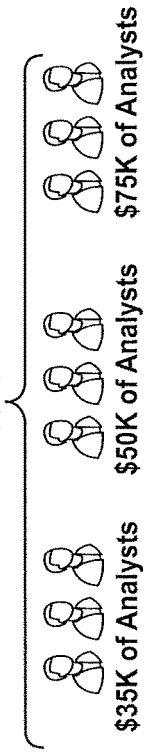

B3 Fair allocation limits — 5540

⋀⋀ Fair allocation limits: Dynamically calculated limit on number of loans handled by each analyst; Calculated for every Authority Level based on Expected processing time and number of analysts in the authority pool ⋀ Desired impact: Ensures that loan allocation is in line with skill-weighted analyst capacity

5900

| | $35K of Analysts | $50K of Analysts | $75K of Analysts |
|---|---|---|---|
| 5921 — Average processing time (min) | 10 | 3.75 | 2.5 |
| 5922 — Weight [W]-Average time / Average time for $75 K Analyst | 4 | 1.5 | 1 |
| 5923 — #Analyst [A] in each pool (%total) | 8(20%) | 12(30%) | 20(50%) |
| 5924 — # of Analysts (weighted to $75k) [-A / W] | 2 | 8 | 20 |
| 5925 — % Analyst Distribution (weighted) | 6.7% | 26.7% | 66.6% |

Calculations — 5920

| | | | |
|---|---|---|---|
| Application #30 | 2 (30°6.7%) | 8 (30°26.7%) | 20 (30°66.6%) |
| Application #300 | 20 (300°6.7%) | 80 (300°26.7%) | 200 (300°66.6%) |
| Application #900 | 60 (900°6.7%) | 240 (900°26.7%) | 600 (900°66.6%) |

Fair allocation limits — 5930

*FIG. 59*

VEHICLE LOAN GENERATION SYSTEM: MULTIPLE VEHICLE LOAN OFFER GENERATION

RELATED APPLICATIONS

This application is a continuation of U.S. application Ser. No. 14/485,200 filed on Sep. 12, 2014, entitled "VEHICLE LOAN GENERATION SYSTEM: PREQUALIFIED VEHICLE LOAN OFFER GENERATION", and which claims benefit to the filing date of U.S. Provisional Patent Application 61/877,883, filed Sep. 13, 2013, the contents of each of which are expressly incorporated herein by reference.

FIELD OF TECHNOLOGY

The present disclosure generally relates to a system and a method for generating vehicle loans and, more particularly, to a system that can gather and analyze data to generate multiple, customized vehicle loan offers for an applicant.

BACKGROUND

Organizations providing vehicle loans gather and analyze various types of data before offering vehicle loans. The gathered and analyzed data assists the organization in choosing which applicants to offer loans, and what loans to offer the chosen applicants. However, this process can be challenging for an organization because of the numerous tasks and risks associated with offering vehicle loans to applicants. The risk of an applicant defaulting on a credit loan depends on the applicant. Thus, organizations need to avoid risky applicants. Also, the conditions of the loan, such as amount and length, alter the riskiness of the loan for the organization. Further, the conditions of the loan, such as the amount, length, and interest rate, must be desirable to the applicant. As a result, offering desirable loans to applicants who will not default is a challenge for organizations providing vehicle loans.

SUMMARY OF THE INVENTION

A computer implemented method for generating prequalification vehicle loan offers for one or more applicants including receiving one or more vehicle loan applications including vehicle loan information from one or more applicants, requesting credit data associated with the applicants from one or more credit bureaus, receiving the credit data associated with the applicants from the credit bureaus, the credit data including a set of attributes for each applicant, identifying, by one or more computer processors, potential customers for prequalification from the one or more applicants, applying, by the one or more computer processors, a front end criteria to the identified potential customers to exclude one or more identified potential customers, selecting, by the one or more processors, an applicant from the remaining one or more identified potential customers, determining, by the one or more computer processors, an estimated vehicle collateral value for a vehicle for the selected applicant based on the set of attributes and/or vehicle loan information for the selected applicant, determining, by the one or more computer processors, a maximum prequalified vehicle loan amount for a vehicle loan for the vehicle for the selected applicant based on the set of attributes and/or vehicle loan information for the selected applicant, generating, by the one or more computer processors, a customized prequalification offer for the selected applicant by including the estimated vehicle collateral value and the maximum prequalified vehicle loan amount, and sending the prequalification offer to the selected applicant.

In another embodiment, a computer system for generating prequalification vehicle loan offers for one or more applicants including one or more computer processors and a program memory storing executable instructions that when executed by the one or more computer processors cause the computer system to receive one or more vehicle loan applications including vehicle loan information from one or more applicants, request credit data associated with the applicants from one or more credit bureaus, receive the credit data associated with the applicants from the credit bureaus, the credit data including a set of attributes for each applicant, identify, by the one or more computer processors, potential customers for prequalification from the one or more applicants, apply, with the one or more computer processors, a front end criteria to the identified potential customers to exclude one or more identified potential customers, select an applicant from the remaining one or more identified potential customers, determine, with the one or more computer processors, an estimated vehicle collateral value for a vehicle for the selected applicant based on the set of attributes and/or vehicle loan information for the selected applicant, determine, with the one or more computer processors, a maximum prequalified vehicle loan amount for a vehicle loan for the vehicle for the selected applicant based on the set of attributes and/or vehicle loan information for the selected applicant, generate, with the one or more computer processors, a customized prequalification offer for the selected applicant by including the estimated vehicle collateral value and the maximum prequalified vehicle loan amount, and send the prequalification offer to the selected applicant.

In yet another embodiment, a non-transitory computer-readable storage medium including computer-readable instructions to be executed on one or more processors of a system for generating prequalification vehicle loan offers for one or more applicants, the instructions when executed causing the one or more processors to receive one or more vehicle loan applications including vehicle loan information from one or more applicants, request credit data associated with the applicants from one or more credit bureaus, receive the credit data associated with the applicants from the credit bureaus, the credit data including a set of attributes for each applicant, identify, by the one or more computer processors, potential customers for prequalification from the one or more applicants, apply, with the one or more computer processors, a front end criteria to the identified potential customers to exclude one or more identified potential customers, select an applicant from the remaining one or more identified potential customers, determine, with the one or more computer processors, an estimated vehicle collateral value for a vehicle for the selected applicant based on the set of attributes and/or vehicle loan information for the selected applicant, determine, with the one or more computer processors, a maximum prequalified vehicle loan amount for a vehicle loan for the vehicle for the selected applicant based on the set of attributes and/or vehicle loan information for the selected applicant, generate, with the one or more computer processors, a customized prequalification offer for the selected applicant by including the estimated vehicle collateral value and the maximum prequalified vehicle loan amount, and send the prequalification offer to the selected applicant.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

FIG. 2 is a diagram of an example of a vehicle loan generation system, according to one embodiment.

FIG. 5A is a diagram of an example of an acquisition scoring model inputs table, according to one embodiment.

FIG. 5B is a diagram of an example of a keycoding table, according to one embodiment.

FIG. 6 is a diagram of an example of an acquisition scoring model contribution table, according to one embodiment.

FIG. 11 is a diagram of an example of an automated underwriting model business rules table, according to one embodiment.

FIG. 16 is a diagram of an example of the policy guidelines for the term determination model, according to one embodiment.

FIG. 18A is a diagram of an example of a vehicle loans LTV cut off table, according to one embodiment.

FIG. 18B is a diagram of an example of a vehicle loans LTV average collateral value table, according to one embodiment.

FIG. 18C is a diagram of an example of a vehicle loans LTV average charge off amount table, according to one embodiment.

FIG. 27A is an example diagram of front end criteria used for prequalification, according to one embodiment.

FIG. 27B is a diagram of fatal criteria used for prequalification, according to one embodiment.

FIG. 30A is a diagram of a collateral segmentation table, according to one embodiment.

FIG. 30C is a diagram of a low collateral estimator table, according to one embodiment.

FIG. 30D is a diagram of a high collateral estimator table, according to one embodiment.

FIG. 31A is a diagram of a premium collateral probability estimator, according to one embodiment.

FIG. 31B is a diagram of a high collateral probability estimator, according to one embodiment.

FIG. 31C is a diagram of a low collateral probability estimator, according to one embodiment.

FIG. 31D is a diagram of a key coded estimator variable table, according to one embodiment.

FIG. 34 is a diagram of a snapshot of a multiple offers model inputs interface, according to one embodiment.

FIG. 37 is a diagram of policy guidelines tables, according to one embodiment.

FIG. 38 is a diagram of a maximum term policy guidelines table, according to one embodiment.

FIG. 40 is a diagram of a pricing constraints table, according to one embodiment.

FIG. 50 is a screenshot of a selected vehicle loan offer, according to one embodiment.

FIG. 57 is a diagram of a loan complexity table, according to one embodiment.

FIG. 59 is a diagram of a fair allocation limits environment, according to one embodiment.

DETAILED DESCRIPTION OF THE DRAWINGS

Figure 1:
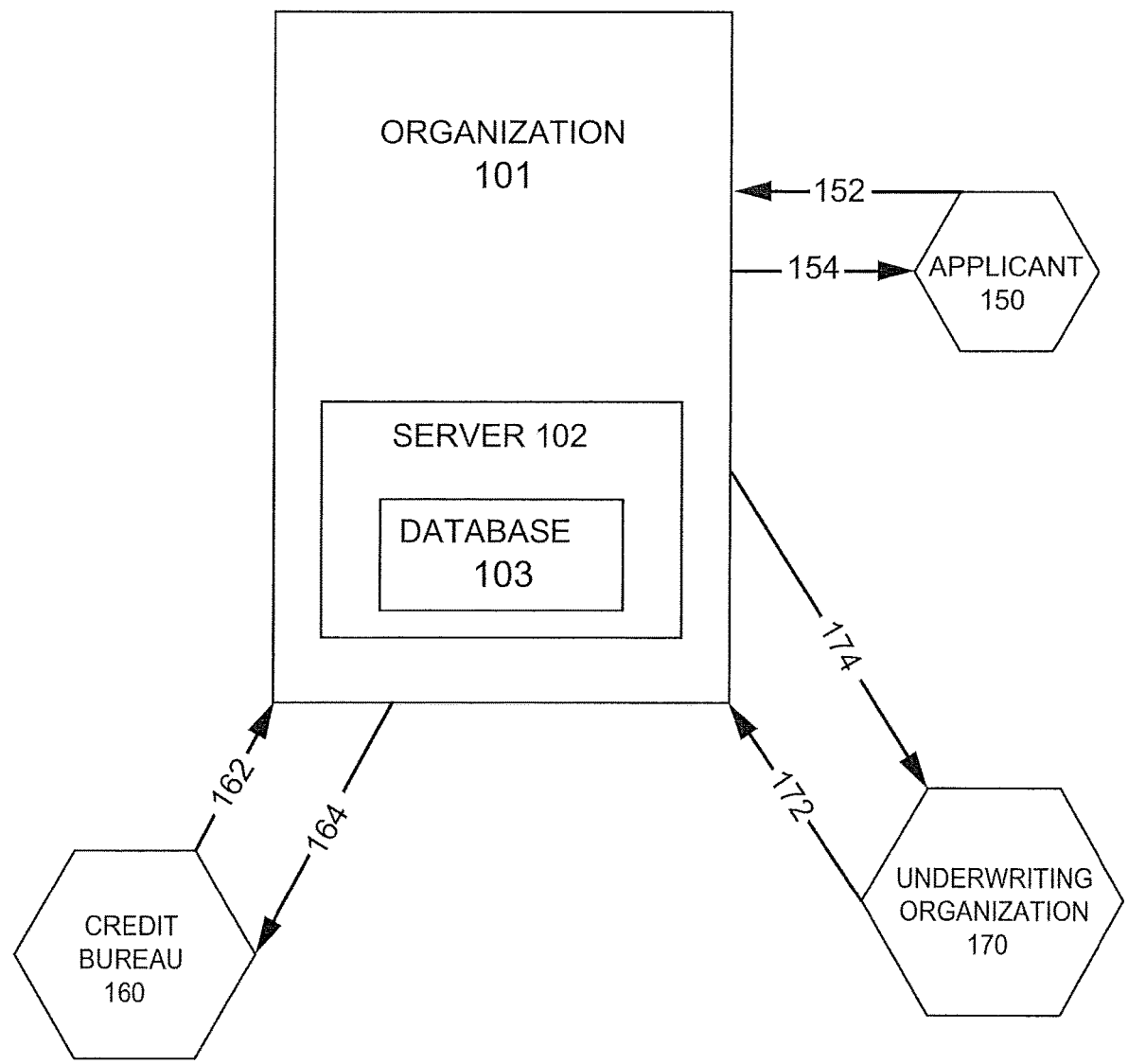
FIG. 1 is a diagram of an example of an organization generating vehicle loans for a customer, according to one embodiment.

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

In today's environment, vehicle loan organizations, such as lenders providing vehicle loans, seek to achieve current and future financial goals and objectives by improving their vehicle loan products, services and processes. Lenders can improve their processes by automating various decisions, determinations, and calculations. Lenders can further improve their processes by reducing the risk they assume when offering vehicle loans. Also, lenders can improve their services by generating multiple vehicle loan offers for a potential applicant. Furthermore, customized vehicle loan offers for an applicant would improve vehicle loan products provided by lenders to the applicant. This in turn would increase the chances of the applicant choosing the lender's product, as opposed to that of a competitor.

Lenders strive to reduce the risk of default when offering vehicle loans. This risk varies based on an applicant's credit worthiness. Additionally, metrics such as the loan term, amount, and loan to value (LTV) ratio can also affect the risk of default. Processes aimed at better determining an applicant's credit worthiness and appropriate maximum loan terms (i.e., loan length), amounts, and LTV ratios reduce the risk taken by lenders.

Vehicle loan processes can also be enhanced by automation. Thus, the automatic determination of credit worthiness, maximum loan terms, amounts, and LTV ratios improve processes by reducing risk and increasing efficiency. Moreover, underwriting decisions can be further automated by relying on an applicant's calculated credit worthiness. Thus, processes are improved by increased automation of underwriting decisions and metrics calculations.

The metrics calculations also drive improvements to vehicle loan products and services. For example, multiple vehicle loan offers can be generated to comply with the maximum loan terms, amounts, and LTV ratios calculated. By providing multiple vehicle loan offers to an applicant, an applicant has the flexibility to choose the vehicle loan product that best suits him, thereby improving the likelihood of the applicant selecting the organization's vehicle loan products.

Additionally, a lender can boost their prospects with the applicant by customizing the multiple vehicle loan offers. Currently, a tool or method implementing these improvements for vehicle loan products, services, and processes does not exist. The vehicle loan generation system addresses this issue.

Vehicle Loan Generation System Overview

FIG. 1 is a diagram of a vehicle loan generation environment 100, according to an embodiment. In the displayed embodiment, vehicle loan generation environment 100 includes an organization 101 which engages with applicant 150. For environment 100, organization 101 gathers and receives data from applicant 150. The organization 101 provides vehicle loan products and/or services to applicant 150. Also, organization 101 may generate one or more vehicle loans for applicant 150. Alternatively, organization 101 may choose to not offer a vehicle loan to applicant 150 due to a high risk of default.

The organization 101 may include one or more people, such as employees, partners, members, owners, directors, officers, shareholders, or other constituents of an organization 101. The organization 101 may be a legal entity, such as a partnership, corporation, sole proprietorship, or a limited liability company. In some cases, the organization 101 is a business. Also, the organization 101 may include one or more departments, divisions, entities, sectors, units, businesses, etc. In some embodiments, the organization 101 is a vehicle financing company. The products and services of the organization 101 may include providing vehicle loans to an applicant 150. The loans may be for a variety of vehicles, such as automobiles, cars, trucks, recreational vehicles, boats, motorcycles, scooters, and/or other vehicles. The organization 101 may provide multiple vehicle offers to an applicant 150 for a single vehicle. Furthermore, applicant 150 may request vehicle loan offers for multiple vehicles from organization 101.

In FIG. 1, the organization 101 includes a server 102. The server 102 may be used to implement the vehicle loan generation system for the organization 101. The vehicle loan generation system may receive, format, organize, store, process, update, modify, and/or analyze data about one or more applicants 150. The vehicle loan generation system may then be used by organization 101 to determine whether or not to make vehicle loan offers to applicant 150. Additionally, the vehicle loan generation system may be used to generate multiple offers for organization 101 to an applicant 150 for a vehicle. Further, organization 101 may use the vehicle loan generation system to provide applicant 150 vehicle loans for one or more vehicles.

In the displayed embodiment in FIG. 1, the server 102 is located at the organization 101. Alternatively, the server 102 may be remotely located, that is, the server 102 is not located at the organization 101. The server 102 may be hosted by an entity other than organization 101. The server 102 may include more than one server. In this case, the multiple servers 102 may work together to provide a platform that supports the vehicle loan generation system for the organization 101.

Figure 3:
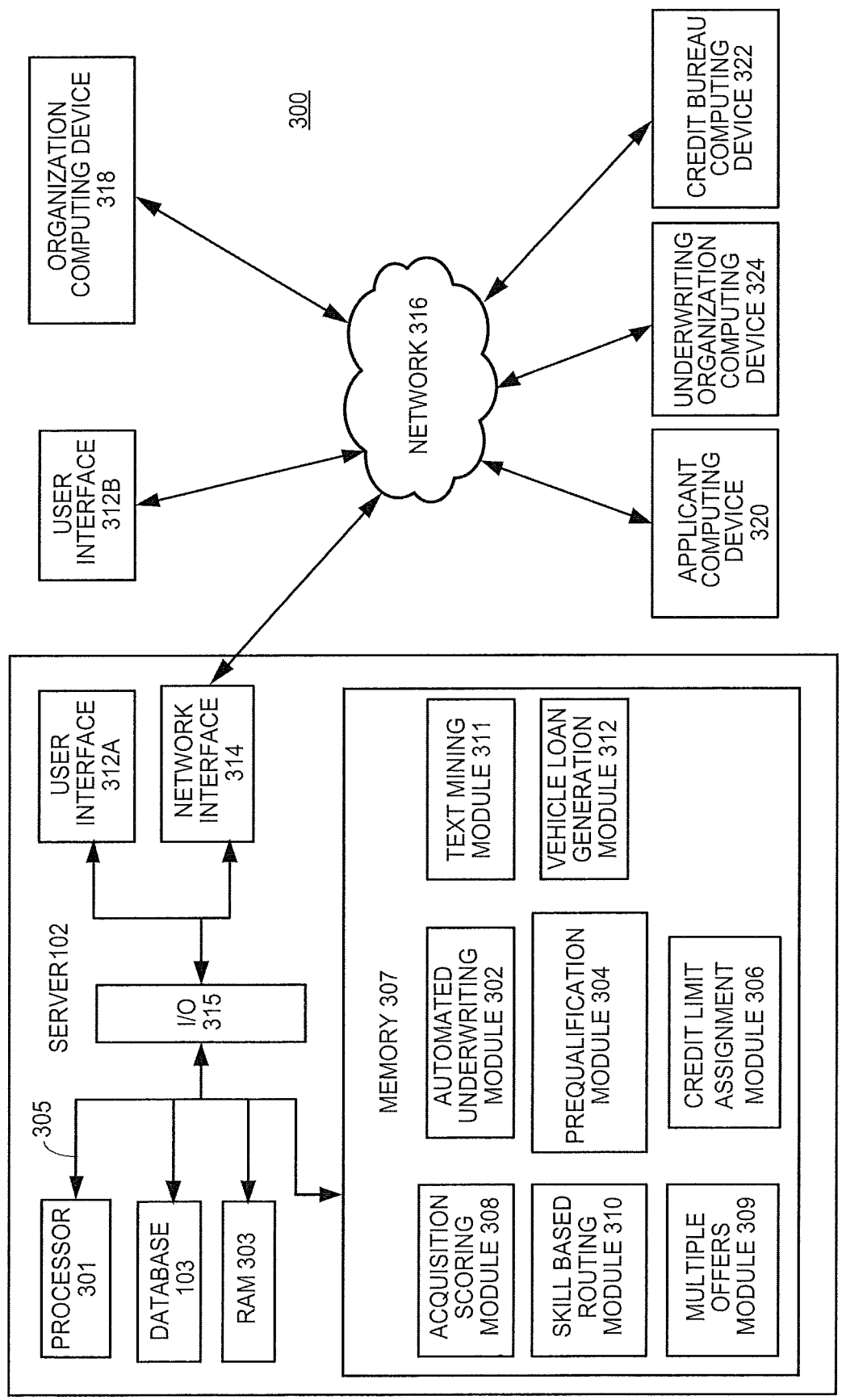
FIG. 3 is a block diagram of an example of a vehicle loan generation system implementation, according to one embodiment.

The server 102 may include a database 103. Database 103 may be used to store data received from one or more applicants 150. In FIG. 1, the database 103 is located on the server 102. However, the database 103 could be remotely located, i.e., the database 103 is not located on the server 102. Additionally, the database 103 may be located on one or more servers 102. FIG. 3 contains more details about the server 102 and database 103.

In FIG. 1, applicants 150 may engage the organization 101 by requesting a vehicle loan. Alternatively, the organization 101 may contact the applicant 150 to inquire about the applicant's vehicle financing needs. Additionally, applicant 150 may already be a customer of organization 101 by already having a vehicle loan with organization 101. In this case, applicant 150 may be in the market for another vehicle loan for a different vehicle. Alternatively, applicant 150 may choose to engage organization 101 to refinance his vehicle. When organization 101 engages with applicant 150, organization 101 may request (154) data from applicant 150. In response, applicant 150 may send data (152) to organization 101.

The data exchange (152, 154) between the organization 101 and applicant 150 may enhance the vehicle loan process for both organization 101 and applicant 150. Specifically, organization 101 can determine whether applicant 150 is too risky for a vehicle loan. Additionally, organization 101 can assess maximum amounts, time periods, interest rates, and/or other vehicle loan terms that are appropriate for applicant 150. Furthermore, organization 101 can use the exchanged data to better customize vehicle loan offers for applicant 150.

Applicants 150 may be one or more persons, a legal entity, business, and/or organization. In some instances, the applicants are an employee or agent of a legal entity, business, and/or organization. For example, the applicant 150 could be a person, John Doe, looking for a vehicle loan for his automobile. Alternatively, the applicant 150 could be a married couple, John Doe and Jane Doe, looking for a vehicle loan for their recreational vehicle. In another embodiment, the applicant 150 could be a company, such as a rental car company, looking for a vehicle loan for an automobile.

FIG. 1 also shows the organization 101 communicating with credit bureau 160. Organization 101 may request credit bureau 160 to provide credit data (164). In some embodiments, the requested credit data (164) is about applicant 150. Credit bureau 160 may oblige the request from organization 101 and send some or all of the requested data (162).

Additionally, FIG. 1 shows organization 101 communicating with underwriting organization 170. Organization 101 may send a request (174) to underwriting organization 170 to analyze a vehicle loan application from applicant 150 and determine if the underwriting organization 170 will underwrite the loan. The underwriting organization 170 may respond (172) to the request from organization 101. The response (172) from underwriting organization 170 may be that it will underwrite the vehicle loan for applicant 150. Alternatively, the response (172) may be to decline underwriting the vehicle loan for applicant 150. Alternatively, the response (172) may be to approve the applicant 150 for underwriting by a different underwriting organization.

In some embodiments, the organization 101 may communicate with more, fewer, and/or different entities than those displayed in FIG. 1. In some embodiments, the organization 101 may exchange more, less, and/or different communications, data, requests, and/or responses than those shown in FIG. 1. FIG. 3 provides additional details about the data exchange between organization 101 and other entities, such as applicant 150, credit bureau 160, and underwriting organization 170.

FIG. 2 is a diagram of an example vehicle loan generation system 200. The system 200 may be provided and/or used by the organization 101 to generate vehicle loans for an applicant 150, in some embodiments. The vehicle loan generation system 200 has several models, such as the acquisition scoring model 210, the automated underwriting model 220, the credit limit assignment model 230, the prequalification model 240, the multiple offers model 250, and the skill based routing model 260. Some or all of the models may work together to generate vehicle loans for an applicant 150. In some embodiments, the vehicle loan generation system 200 includes fewer, more, and/or different models than those displayed in FIG. 2. The vehicle loan generation system 200 can also be used to generate loans for various vehicles, including automobiles, cars, trucks, recreational vehicles, boats, motorcycles, scooters, and/or other vehicles.

The acquisition scoring model 210 is used by the vehicle loan generation system 200 to calculate an acquisition score for an applicant 150. The acquisition score is meant to evaluate the credit worthiness of the applicant 150. The acquisition score is calculated based on various types of credit data, some or all of which are associated with the applicant 150. By doing this, the acquisition scoring model 210 provides the vehicle loan generation system with an enhanced measure of an applicant's credit worthiness. In one embodiment, the acquisition scoring model 210 relies on a set of model variables to determine the acquisition score of an applicant 150. This reduces the risk assumed by the organization 101 for the vehicle loans generated by the system 200.

The automated underwriting model 220 relies on the acquisition score generated by acquisition scoring model 210 to further automate underwriting. The automated underwriting model 220 determines if the vehicle loan applicant is automatically denied, automatically approved, or referred for manual underwriting. The automated underwriting model 220 makes this determination by using applicant credit data, such as a FICO score, in conjunction with the aforementioned acquisition score. In one embodiment, the automated underwriting model 220 uses a FICO custom dual matrix to make this determination. The matrix includes regions for automatically approving, automatically declining, or referring an applicant based on their acquisition score and their FICO score. The automated underwriting model 220 may also rely on additional bureau attributes to make automatic approve or decline determinations. The vehicle loan generation system 200 is enhanced by the automated underwriting model 220 because manual underwriting is reduced, which may be a timely process. This reduction improves turnaround time of the vehicle application.

The credit limit assignment model 230 calculates the maximum term, amounts, and loan to value (LTV) ratios that are appropriate for an applicant 150. The credit limit assignment model 230 uses a term determination model, a loan to value (LTV) cut off determination model, and a payment capacity model to determine these metrics. The credit limit assignment model makes these determinations based on vehicle information, loan performance information, and various credit data, including credit data associated with the applicant 150. These determinations are used by other models of the vehicle loan generation system to generate loans that are less risky for the organization 101.

The prequalification model 240 evaluates whether an applicant is qualified to receive a vehicle loan based on the value of his collateral and his payment capacity. The prequalification model 240 relies on a collateral estimation model and a payment capacity estimator to make these determinations. Additionally, the prequalification model 240 also uses the maximum term, amounts, and LTV ratios determined by the credit limit assignment model 230, along with vehicle information, loan performance information, and credit data. Evaluation of whether an applicant is qualified to receive a loan based on the aforementioned data further reduces the risk assumed by the organization when offering a vehicle loan to applicant 150.

The multiple offers model 250 generates multiple offers for an applicant 150. Additionally, the multiple offers model 250 customizes offers for an applicant 150. When generating multiple offers, the multiple offers model 250 relies on previously calculated metrics, such as maximum term, amounts, and LTV ratios. Based on these previously calculated values, additional credit data, and various business rules, the multiple offers model 250 generates multiple offers for an applicant 150. The vehicle loan offers will differ with regards to the term, the monthly payments, the loan amount, and/or the interest rate. By generating multiple offers for the vehicle loan generation system 200, an applicant 150 is able to choose the vehicle loan offer that best suits him.

The skill based routing model 260 is called upon when the automated underwriting model 220 determines that a vehicle loan application requires manual underwriting. The skill based routing model attempts to improve the assignment of referred vehicle loan applications to credit analysts. Skill based routing model 260 uses a loan complexity model and a loan allocation engine to accomplish this goal. The loan complexity model categorizes vehicle loans into complexity groups based on the expected loan processing time. Meanwhile, the loan allocation engine assigns applications to credit analysts based on the analyst's expertise, availability, and the determined loan complexity. By improving the assignment of the referred applications, the skill based routing model 260 empowers the vehicle loan generation system 200 to turn around vehicle loan applications that require manual underwriting faster. In some embodiments, the credit analysts are part of the organization, 101. In other embodiments, the credit analysts are part of a different underwriting organization 170.

Vehicle Loan Generation System Implementation

FIG. 3 is a block diagram of a vehicle loan generation system implementation 300, according to one embodiment. The system 300 may be implemented by server 102 in communication over network 316 with other devices. Server 102 may communicate over network 316 with applicant computing device 320. Additionally, the server 102 may be accessed over the network 316 by user-interface 312B and organization computing device 318. Furthermore, the server 102 may communicate over the network 316 with an underwriting organization computing device 324 and/or a credit bureau computing device 322. In some embodiments, fewer or more devices communicate with server 102 over network 316, while in other embodiments, different devices communicate with server 102 over network 316.

As mentioned earlier in FIG. 1, server 102 may be, for example, a computer, a server, a plurality of networked computing devices having a logical appearance of a single computing device, a plurality of cloud computing devices, etc. Accordingly, for ease of discussion only and not for limitation purposes, the server 102 is referred to herein using the singular tense, although in some embodiments the server 102 may include more than one physical computing device.

The server 102 may include a memory 307, a processor 301 (may be called a controller, a microcontroller, or a microprocessor), a random-access memory (RAM) 303, and an input/output (I/O) circuit 315, all of which may be interconnected via an address/data bus 305. The memory 307 may comprise one or more tangible, non-transitory computer-readable storage media or devices, and may be configured to store computer-readable instructions that, when executed by the processor 301, cause the server 102 to implement the vehicle loan generation system 300.

Memory 307 may store computer-readable instructions and organize them into modules that can be executed to implement the vehicle loan generation system 300. In the displayed embodiment, memory 307 stores vehicle loan generation module 312, text mining module 311, automated underwriting module 302, prequalification module 304, credit limit assignment module 306, acquisition scoring module 308, multiple offers module 309, and skill based routing module 310. In some embodiments, the memory 307 may store different modules than those displayed, while in other embodiments, the memory 307 may store fewer or more modules than those displayed. In some embodiments, the executable computer-readable instructions may not be organized as modules. In some embodiments, instructions may be organized as routines, subroutines, or other blocks of instructions.

Vehicle loan generation module 312 includes instructions executed by processor 301 to generate loans for applicant 150. The vehicle loan generation module 312 may first call the acquisition scoring module 308. The acquisition scoring module 308 includes instructions executed by processor 301 to generate an acquisition score for an applicant 150. The acquisition scoring module 308 may request credit data about applicant 150 in order to generate the acquisition score. The requested data may be retrieved from database 103. Alternatively, the requested credit data may be retrieved over network 316 from credit bureau computing device 322. Once the credit data for the applicant 150 is received, acquisition scoring module 308 uses the retrieved credit data to generate the acquisition score. The acquisition score may then be stored in the database 103 for the applicant 150.

Next, vehicle loan generation module 312 calls automated underwriting module 302. Automated underwriting module 302 includes instructions executed by processor 301 to automate the underwriting decision process. Specifically, the automated underwriting module will determine whether the vehicle loan application from applicant 150 should be automatically approved, automatically denied, or referred for manual underwriting. Automated underwriting module 302 may access database 103 to retrieve credit data about applicant 150 and the acquisition score generated by acquisition scoring module 308 for applicant 150. The retrieved credit data and acquisition score enable the automated underwriting module 302 to then determine if applicant 150 should be automatically approved, denied, or referred for manual underwriting.

After this, vehicle loan generation module 312 may call credit limit assignment module 306. Credit limit assignment module 306 includes instructions executed by processor 301 to determine a maximum amount, maximum term, a maximum loan to value (LTV) ratio, and a maximum monthly payment for vehicle loans for applicant 150. The credit limit assignment module 306 uses various types of credit data to make this determination. Similar to the acquisition scoring module 308, this credit data may be retrieved from database 103 and/or credit bureau computing device 322 via network 316. With this data, the credit limit assignment module 306 determines the maximum amount, term, and LTV for vehicle loans for applicant 150.

After this, the vehicle loan generation module 312 may call multiple offers module 309. Multiple offers module 309 includes instructions executed by processor 301 to generate multiple offers that comply with the maximum term, maximum amount, and maximum LTV ratio determined by credit limit assignment module 306. Additionally, multiple offers module 309 customizes the multiple offers for applicant 150. Multiple offers module 309, similar to previous modules, may retrieve stored data from database 103. Alternatively, multiple offers module 309 may retrieve data from credit bureau computing device 322 via network 316.

The vehicle loan generation module 312 can also call prequalification module 304. Prequalification module 304 includes instructions executed by processor 301 to determine if applicant 150 is qualified to receive a vehicle loan based on his collateral. Similar to the credit limit assignment module 306, the prequalification module 304 may retrieve credit data from database 103 or a credit bureau computing device 322 via network 316. The retrieved credit data may be used by prequalification module 304 to determine if applicant 150 qualifies for a vehicle loan, based on the value of his collateral. Additionally, prequalification module 304 may also rely on the maximum term, amount, and LTV ratio determined by the credit limit assignment module 306 to make a prequalification determination.

If the automated underwriting module 302 determines that manual underwriting is needed, vehicle loan generation module 312 may call skill based routing module 310. Skill based routing module 310 includes instructions executed by processor 301 to determine which credit analyst to use for manual underwriting. Skill based routing module 310 makes this determination based on loan processing time, analyst expertise, and analyst availability. Similar to the previous modules, the skill based routing module 310 may retrieve data from database 103 and/or credit bureau computing device 322 via a network 316. The skill based routing module 310 may also communicate data via a network 316 to an underwriting organization computing device 324.

Text mining module 311 may be called by any one of the aforementioned modules to mine the text of retrieved data for entry into the database 103. The mined text may also be used by one or more of the aforementioned modules to assist with module execution. For example, vehicle loan generation module 312 may call text mining module 311 to mine a retrieved credit data file about applicant 150 for specific inputs (e.g. FICO score). The mined text (FICO score value) may then be stored at database 103 and used by vehicle loan generation module 312 to generate vehicle loans for an applicant 150.

The server 102 may be operatively connected to send and receive communications, data, requests, and/or responses over the network 316 via I/O circuit 315 and network interface 314. The server 102 may connect to the network 316 at the network interface 314 via a wired or wireless connection, or other suitable communications technology. The network 316 may be one or more private or public networks. The network 316 may be a proprietary network, a secure public internet, a virtual private network or some other type of network, such as dedicated access lines, plain ordinary telephone lines, satellite links, combinations of these, etc. Where the network 316 comprises the Internet, data communications may take place over the network 316 via an Internet communication protocol, for example.

The server 102 may receive applicant data from one or more applicant computing devices 320 via the network 316. The server 102 may also request data from one or more applicant computing devices 320 via the network 316. Alternatively, the applicant computing device 320 may provide applicant data to organization computing device 318 over the network 316. Also, the organization computing device 318 may request data from the applicant computing device 320 over the network 316. The applicant computing device 320 may be a computer, laptop, mobile phone, PDA, tablet, or other computing device that can access the network 316.

The server 102 may receive data from one or more organization computing devices 318. The server 102 may receive applicant data from one or more organization computing devices 318. Also, the organization computing device 318 may request and receive data from the server 102 via the network 316. Organization computing device 318 may be a computer, laptop, mobile phone, PDA, tablet, or other computing device that can access network 316. In some embodiments, the organization computing device 318 is a computing device that belongs to the organization 101 or an agent of the organization 101.

The server 102 may receive credit bureau data from one or more credit bureau computing devices 322 via the network 316. The server 102 may also request data from one or more credit bureau computing devices 322 via the network 316. The credit bureau data transmitted may be for applicant 150. The credit bureau computing device 322 may be a computer, laptop, mobile phone, PDA, tablet, or other computing device that can access the network 316.

The server 102 may receive underwriting data from one or more underwriting organization computing devices 324 via the network 316. The server 102 may also request data from one or more underwriting organization computing devices 324 via the network 316. The underwriting data transmitted may be for a vehicle loan application for applicant 150. The underwriting organization computing device 324 may be a computer, laptop, mobile phone, PDA, tablet, or other computing device that can access the network 316.

In some embodiments, an agent of the organization 101 may receive applicant data directly from an applicant via a phone call, face-to-face meeting, or other method. The agent of the organization 101 may then transmit the applicant data to the server 102 over the network 316 via their organization computing device 318. Organization computing device 318 may also permit an agent of the organization 101 to access, modify, update, report, and/or perform some other action on data stored at the database 103 in server 102. Alternatively, an agent of the organization 101 may send, access, modify, update, receive, report, and/or perform some other action on the data stored at the server 102 via the user interfaces 312A or 312B.

The user interfaces 312A and 312B may be used by applicant 150 or an agent of the organization 101 to provide data to the server 102. The user interface 312A may be integral to the server 102. Alternatively, the user interface may not be integral to the server 102, such as user interface 312B. For example, user interface 312B may be a remote user-interface at a remote computing device, such as a webpage or client application.

The database 103 may be configured or adapted to store data related to vehicle loan generation system 300. The database 103 may be used to store various data, including personal data and/or credit data about the applicant 150, vehicle information, loan performance data, vehicle loan data, credit bureau data, organizational vehicle loan data, organizational vehicle loan research data, underwriting data, and/or other data relevant to the vehicle loan generation system 300. As mentioned earlier in FIG. 1, the database 103 may be located at server 102. Alternatively, the database 103 may be located remotely from server 102. Furthermore, parts of the database 103 may be located at the server 102 while other parts of the database 103 may be located remotely from server 102.

Although only one processor 301 is shown, the server 102 may include multiple processors 301. Additionally, although the I/O circuit 315 is shown as a single block, the I/O circuit 315 may include a number of different types of I/O circuits. Similarly, the memory of the server 102 may include multiple RAMs 303 and multiple program memories 307. Further, while the instructions and modules are discussed as being stored in memory 307, the instructions and modules may additionally or alternatively be stored in the RAM 303 or other local memory (not shown).

The RAM(s) 303 and program memories 307 may be implemented as semiconductor memories, magnetically readable memories, chemically or biologically readable memories, and/or optically readable memories, or may utilize any suitable memory technology.

Acquisition Scoring Model

The vehicle loan generation system 200 uses the acquisition scoring model 210 to determine an acquisition score for applicant 150. The acquisition score evaluates the credit worthiness of the applicant 150 based on various types of credit data. The acquisition score helps reduce the risk of vehicle loans generated by system 200 for the organization 101.

Figure 4:
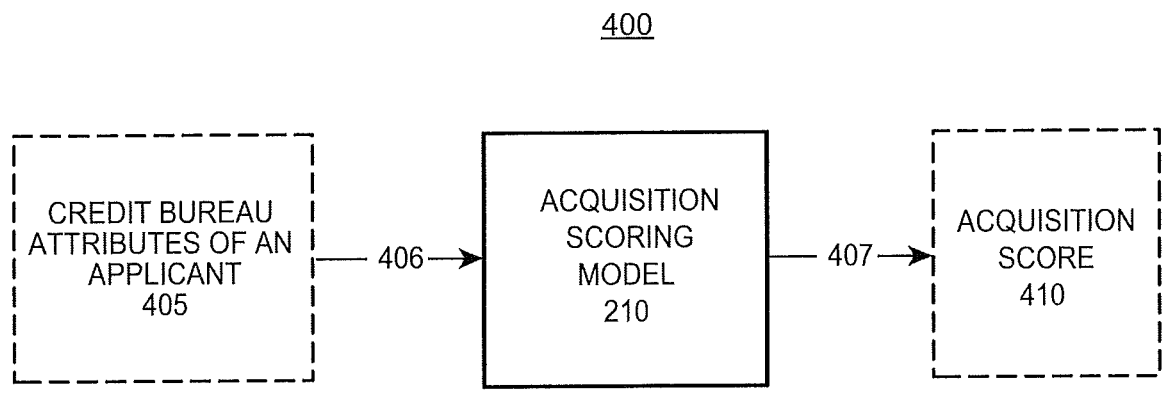
FIG. 4 is a diagram of an example of an acquisition scoring model environment, according to one embodiment.

FIG. 4 is a block diagram of an acquisition scoring model environment 400. The environment 400 includes the acquisition scoring model 210, inputs 406, and outputs 407. The acquisition scoring model 210 receives credit bureau attributes of an applicant 405 as an input 406. Additionally, the acquisition scoring model 210 sends an acquisition score 410 as an output 407. The acquisition scoring model 210 determines the output 407 based on the received inputs 406. The subsequent figures explain how acquisition scoring model 210 determines outputs 407. Outputs 407 may be used by one or more different models. In one embodiment, the acquisition score 410 is used by the automated underwriting model 220 to determine if an application should be approved or denied.

In some embodiments, acquisition scoring model 210 may rely on more, less, and/or different inputs than those displayed in FIG. 4. For example, acquisition scoring model 210 may rely on applicant application data, loan performance data, internal bureau data, and/or other data to determine outputs 407. Acquisition scoring model 210 may include more, less, and/or different outputs than those displayed in FIG. 4. Acquisition scoring model 210 may also rely on one or more business rules to determine outputs 407.

FIG. 5A includes an embodiment of acquisition scoring model inputs table 500. The table 500 includes variable description column 505, trade line type column 510, and variable type column 515. The table 500 also includes eleven rows of variables numbered 520 through 530. In the displayed embodiment, the trade line type column 510 includes trade line types overall, installment, revolving, finance, auto loan, bankcard, and student loan. In some embodiments, more, less, and/or different trade line types exist. In the displayed embodiment, the variable type column 515 displays variable types inquiries, delinquency, vintage, credit amount, utilization, balance, and trades. In other embodiments, more, less, and/or different variable types exist.

The acquisition scoring model inputs table 500 may include more, less, and/or different columns (505, 510, and 515) than those displayed. Also, the acquisition scoring model inputs table 500 may have more, less, and/or different category columns (510, 515) than those displayed. Acquisition scoring model table 500 may also contain more, less, and/or different variables than those described in the displayed embodiment (520 through 530). In FIG. 5A, the variables 520 through 530 are credit bureau attributes of the applicant 405 (see FIG. 4). However, the source of the variable inputs could be applicant application data, loan performance data, internal bureau data, credit bureau data, third-party data, and/or other data.

Variable 526 describes a key-coded aggregate balance amount for open trades as it relates to an applicant 150. FIG. 5B includes keycoding table 550 for variable 526. In some embodiments, variable 526 may have more, less, and/or different key codes than those displayed in FIG. 5B. Additionally, variable 526 may have more, less, and/or different balance amounts key coded than those displayed in FIG. 5B. Alternatively, variable 526 may not be key-coded. Also, in FIG. 5A, acquisition scoring model inputs table 500 may include more, less, and/or different key coded variables than those displayed.

FIG. 6 displays an acquisition scoring model contribution table 600. The table 600 includes variable description column 505 and contribution column 605. The table 600 also shows variables 520 through 530 along with the intercept variable 610. The intercept variable 610 allows an offset to be included in the acquisition score, if necessary. The values in the contribution column 605 represent the numerical weights to assign to a variable when calculating an acquisition score. While the displayed embodiment shows different values assigned to each variable (e.g., "A %", "B %", etc.), in some embodiments, the values in the contribution column 605 may be equal for two or more variables displayed in FIG. 6 (e.g., variables 520 and 521 both have a value of "A %" in column 605). Also, in some embodiments, the table 600 may include more, less, and/or different variables than those displayed in FIG. 6 (520 through 530). As a result, there may be more, less, and/or different values in contribution column 605 than the values displayed in FIG. 6.

The table 600 was determined by conducting statistical analysis on various data, including credit bureau data, loan performance information, application information, underwriting information, and/or other information related to vehicle loans. In this embodiment, the data analyzed was collected over a four year period. However, in other embodiments, the collected data may span a longer, shorter, and/or different amount of time. The various statistical methods used may include data preparation, target definition, data partitioning, variable classing, binning, variable reduction, logistic regression, trending, validation, rank ordering, comparison, and/or other statistical methods. The acquisition score determined by model 220 may be a more reliable indicator of the credit worthiness of an applicant than other scores. These scores may include a FICO score, and/or other custom scores generated to estimate an applicant's credit worthiness.

The acquisition score model 220 may rely on more, less, and/or different methods to determine an acquisition score. This may include decision trees, business rules, and/or statistical methods. Additionally, different equations, different factors, different weights, and/or other different methods than those displayed in the aforementioned figures may be used to determine an acquisition score.

Automated Underwriting Model

The vehicle loan generation system 200 also includes automated underwriting model 220. The automated underwriting model 220 further automates the underwriting process by automatically approving or declining some applications, and referring the remaining applications for manual underwriting. This model reduces the risk an organization 101 assumes by automatically declining certain high-risk applications. Additionally, the model 220 reduces the amount of applications requiring manual underwriting by automatically approving or declining some applications. The reduction in manual underwriting reduces the turnaround time of some applications. Also, the automatic approval of applications by model 220 improves the chances of organization 101 to generate loan business with those applicants by reducing their turnaround time. Furthermore, automatic approval of applications may increase the number of potential loan customers for organization 101.

Figure 7:
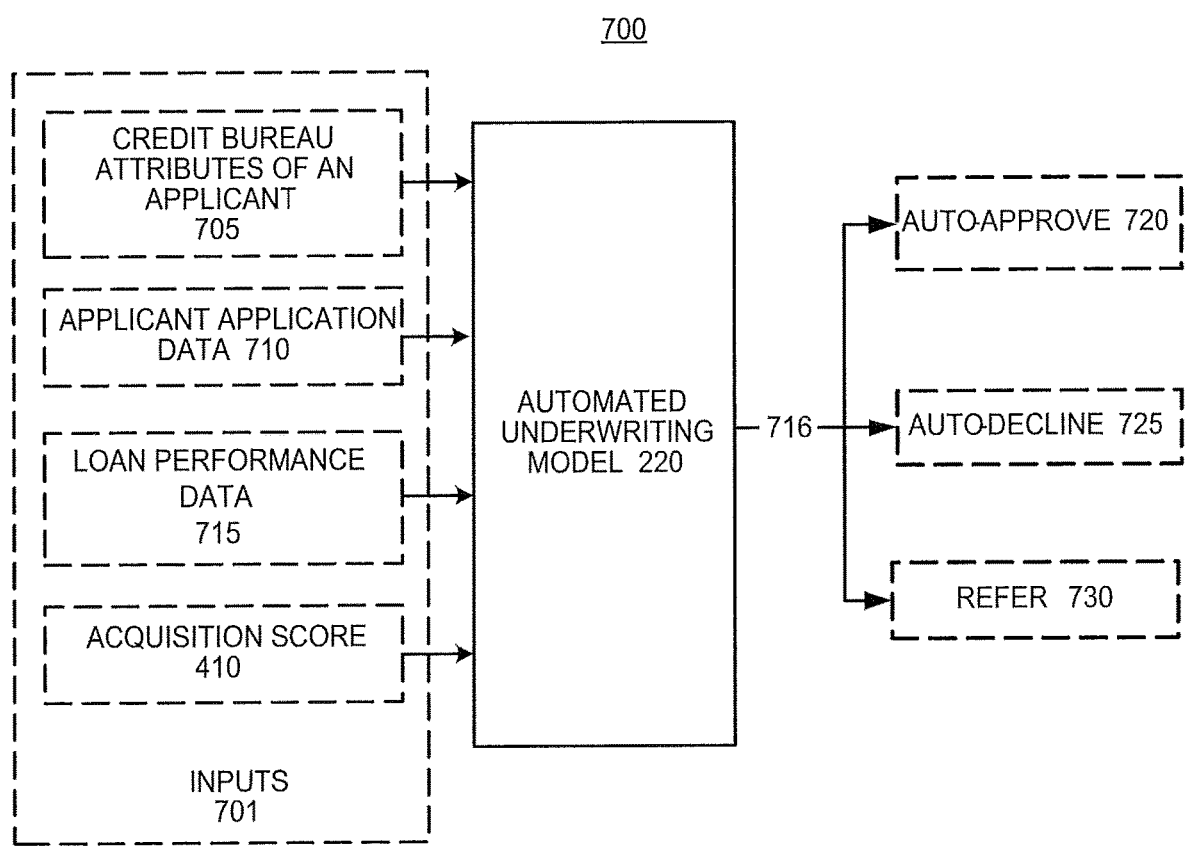
FIG. 7 is a diagram of an example of an automated underwriting model environment, according to one embodiment.

FIG. 7 is a block diagram of an automated underwriting environment 700. The automated underwriting environment 700 includes the automated underwriting model 220. The automated underwriting model 220 receives inputs 701, and uses inputs 701 to generate an output 716. The inputs 701 may include credit bureau attributes of an applicant 705, applicant application data 710, loan performance data 715, and an acquisition score 410 for an applicant 150. The output 716 may contain an auto-approve decision 720, an auto-decline decision 725, or a refer decision 730.

The credit bureau attributes of an applicant 705 may or may not be different from the credit bureau attributes of an applicant 405 received by acquisition score model 210 in FIG. 4. In some embodiments, the attributes 705 may include a FICO score and/or a bankruptcy score. Additionally, applicant application data 710 and loan performance data 715 may or may not be the same as applicant application data and loan performance data used by the acquisition scoring model 210. The loan performance data 715 may be stored by the organization 101. Alternatively, the loan performance data 715 may be obtained by the organization 101 from a third party. The applicant application data 710 may be obtained by the organization 101 and/or a third party. Also, in some embodiments, more, less, and/or different inputs 701 may be used by the automated underwriting model 220 than those displayed in FIG. 7.

The automated underwriting model 220 uses inputs 701 to determine an output 716. In the displayed embodiment, the output 716 could be an auto-approve decision 720, an auto-decline decision 725, or a refer decision 730. If an application is automatically approved 720, the credit limit assignment model is then invoked because the underwriting process is complete. Alternatively, if the application is automatically declined 725 (also referred to as automatically denied), no other models need to be called. However, if the application requires manual underwriting, a refer decision 730 occurs. The skill based routing model 260 is then used to improve the manual underwriting process. If after manual underwriting the application is approved, the credit limit assignment model 230 is then needed because the underwriting process is complete. Alternatively, if after manual underwriting, the application is denied, no other models need to be called. While the displayed embodiment includes three possible decisions (auto-approve 720, auto-decline 725, refer 730), other embodiments may include more, less, and/or different decisions than those displayed. Also, other embodiments may include more, less, and/or different outputs 716 than those shown in FIG. 7.

In some cases, the automated underwriting model 220 relies on a dual matrix along with inputs 701 to determine output 716. In other cases, model 220 may use underwriting rules along with inputs 701 to generate output 716. Alternatively, model 220 may use decision trees, statistical methods, and/or other methods for determining output 716 based on inputs 701. Further, the model 220 may use a combination of the aforementioned methods to determine output 716 based on inputs 701.

Automated Underwriting Model Dual Matrix

Figure 8:
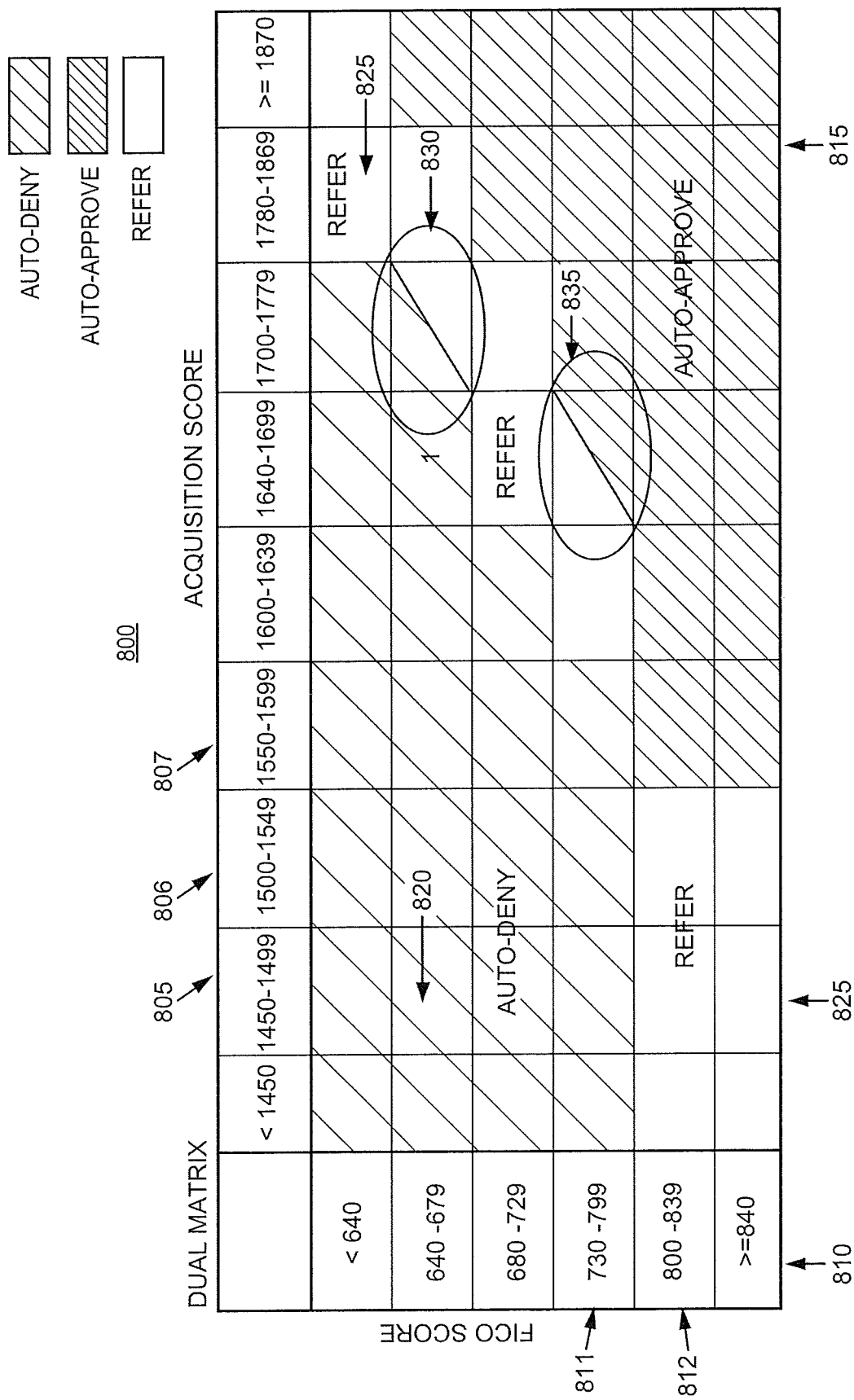
FIG. 8 is a diagram of an example of an automated underwriting dual matrix, according to one embodiment.

FIG. 8 displays an automated underwriting dual matrix 800. The dual matrix 800 includes a horizontal axis 805 and a vertical axis 810. Dual matrix 800 also includes an auto-approve region 815, an auto-deny region 820, and a refer region 825. Further, dual matrix 800 includes split region 830 and split region 835. Split region 830 includes an auto-deny portion and a refer portion. Split region 835, on the other hand, has an auto-approve portion and a refer portion. The dual matrix 800 allows the automated underwriting model 220 to determine if an application requires manual underwriting. Further, dual matrix 800 enables the model 220 to automatically approve or deny applications that don't require manual underwriting.

For the dual matrix 800 in FIG. 8, the horizontal axis 805 is for an acquisition score while the vertical axis 810 is for a FICO score. Horizontal axis 805 includes multiple columns of different acquisition scores. Each column delineates a range of acquisition scores. For example, column 806 delineates a range of acquisition scores from 1500 to 1549 while column 807 is for acquisition scores from 1550 through 1599. Similarly, vertical axis 810 includes multiple rows of different FICO scores. Each row corresponds to a range of FICO scores. For example, row 811 is for a range of FICO scores from 730 through 799, while row 812 covers FICO scores from 800 through 839.

Dual matrix 800 may have different axes than those displayed in FIG. 8. For example, acquisition scores may be plotted on the vertical axis 810 while the FICO scores are plotted on the horizontal axis 805. Alternatively, the horizontal axis 805 and vertical axis 810 may have different categories than those displayed in FIG. 8. The horizontal axis 805 may have more, less, and/or different columns than those displayed. The vertical axis 810 may have more, less, and/or different rows than those displayed.

In the displayed embodiment, the ranges of the columns are unequal. For example the range of an acquisition score column for scores between 1700 and 1779 is larger than the range of the column for acquisition scores between 1600 and 1639, as displayed in FIG. 8. Unlike the displayed embodiment, the ranges of each column may be equal for most and/or all columns. Additionally, unlike the displayed embodiment, the ranges for each row may also be equal for most and/or all rows.

Dual matrix table 800 includes auto-approve region 815. If an applicant has an acquisition score and a FICO score that map to a row and column within the auto-approve region 815, then the application is automatically approved by the automated underwriting model 220. In this case, model 220 sends an output 716 (FIG. 7) indicating an auto-approve decision 720 (FIG. 7). The credit limit assignment model 230 would then be called upon to further process the application.

Also, the dual matrix table 800 has an auto-deny region 820. In this case, if an applicant has an acquisition score and a FICO score that map to a row and column within the auto-deny region 820, the application is automatically denied by model 220. Here, model 220 generates an output 716 (FIG. 7) indicating an auto-deny decision 725 (FIG. 7). No other models are needed because the underwriting process, along with any subsequent processing, of this application is complete.

Further, the dual matrix table 800 also contains a refer region 825. For this region, if an applicant has an acquisition score and a FICO score that map to a row and column within the refer region 825, the application is referred for manual underwriting by model 220. In this scenario, the model 220 sends an output 716 (FIG. 7) dictating a refer decision 730 (FIG. 7). The skill based routing model 260 is called to process the referred applications for manual underwriting.

Additionally, the dual matrix table 800 displays a split region 830. In the split region 830, part of the region results in an auto-deny decision 725 (FIG. 7) while the remaining part of the region results in a refer decision 730 (FIG. 7). For split region 830, if an applicant has an acquisition score and FICO score that map to a row and a column within the split region 830, the application may be automatically denied or referred for manual underwriting by model 220.

In some cases, an underwriting rule is applied to the applicant's application to determine if it should be automatically denied or referred. If the application is automatically denied, the model 220 generates an output 716 (FIG. 7) indicating an auto-deny decision 725 (FIG. 7). No other models are needed because the underwriting process, along with any subsequent processing, of this application is complete. Alternatively, if the application is referred for manual underwriting, the model 220 sends an output 716 (FIG. 7) dictating a refer decision 730 (FIG. 7). The skill based routing model 260 is called to process the referred applications for manual underwriting.

Also, the dual matrix 800 shows a split region 835. For split region 835, part of the region results in an auto-approve decision 720 (FIG. 7), whereas the remaining part of the region results in a refer decision 730 (FIG. 7). For split region 835, if an applicant has an acquisition score and FICO score that map to a row and a column within the split region 835, the applicant's application may be automatically approved or referred for manual underwriting by the automated underwriting model 220.

Figure 10:
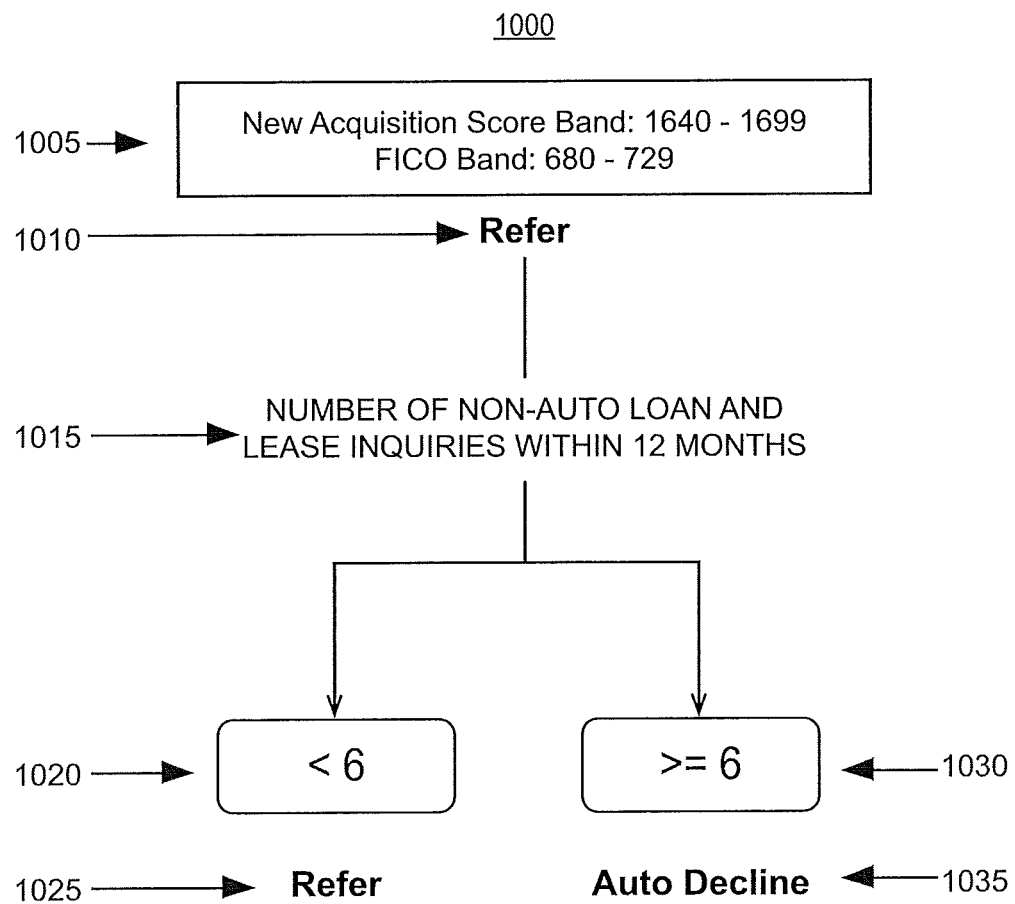
FIG. 10 is a diagram of an example of a dual matrix split region decision tree, according to one embodiment.

For region 835, an underwriting rule may be applied to the applicant's application to determine if the application should be automatically approved or referred. If the application is automatically approved, the model 220 creates an output 716 (FIG. 7) indicating an auto-approve decision 720 (FIG. 7). The credit limit assignment model 230 would then be called upon to further process the application. On the other hand, if the application is referred for manual underwriting, the model 220 sends an output 716 (FIG. 7) dictating a refer decision 730 (FIG. 7). The skill based routing model 260 is called to process the referred applications for manual underwriting. FIG. 10 contains an example of how an underwriting rule can be used to resolve a split region 830 or 835.

For the dual matrix 800 and FIG. 8, the regions 815, 820, 825, 830, and 835 are predetermined. The regions are predetermined to reduce the risk taken by organization 101 when granting loans to applicants. Thus, the auto-approve region 815 spans acquisition scores and FICO scores that suggest a lower likelihood of default. Alternatively, the auto-deny region 820 covers acquisition scores and FICO scores that may be a higher risk of default. The refer region 825 and split regions 830 and 835 cover acquisition scores and FICO scores that neither suggest a high nor low risk of default. Consequently, further analysis, such as manual underwriting and/or underwriting rules, may be needed to approve or deny the applicants.

As was discussed in the acquisition scoring model 210, various types of data, including credit bureau data, loan performance information, application information, underwriting information, and/or other information related to vehicle loans was analyzed over a time period to generate models. For model 220, all received applications over an 18 month period were analyzed to determine the dual matrix 800 and its regions 815, 820, 825, 830, and 835. However, applications over a different time period, such as 12 months, 24 months, or 36 months, could have been collected and analyzed. The statistical methods used on this data may include data analysis, historical data, trending, regression analysis, rank ordering, and/or other methods of data analysis. In other embodiments, the regions may be adjusted. For example, if the organization determines it is taking on too many risky loans, the auto-deny region 820 may be increased. Further, the auto-approve region may be decreased. Alternatively, if the collected data that was analyzed is updated, the updated data may warrant a revision to the model 220, the matrix 800, and its regions 815, 820, 825, 830, and 835.

Dual matrix 800 may have more, less, and/or different regions than those displayed in FIG. 8. The regions 815, 820, 825, 830, and 835 may span more, less, and/or different acquisition scores than those displayed in FIG. 8. The regions 815, 820, 825, 830, and 835 may overlap more, less, and/or different groups of acquisition scores (i.e. acquisition score columns) than those shown. Additionally, the regions 815, 820, 825, 830, and 835 may cover more, less, and/or different FICO scores than those seen in FIG. 8. The regions 815, 820, 825, 830, and 835 may overlap more, less, and/or different groups of FICO scores (i.e. FICO score rows) than those shown. Further, the regions 815, 820, 825, 830, and 835 may be mapped onto a matrix with criteria that is different from the acquisition score, the FICO score, or both. Also, the regions 815, 820, 825, 830, and 835 may be mapped onto a matrix where axes 805 and 810 are swapped, i.e. vertical axis 810 shows acquisition scores while horizontal axis 805 displays FICO scores.

Split regions 830 and 835 are shown in FIG. 8 as having two possible outputs. For example, split region 830 could have a refer decision 730 or an auto-deny decision 725 while split region 835 may have a refer decision 730 or an auto-approve decision 720 (FIG. 7). However, split regions 830 and 835 could have more, less, and/or different possible outputs than those displayed in FIG. 8. For example, a split region could lead to any of three decisions, such as an auto-approve decision 720, an auto-deny decision 725, or a refer decision 730 (FIG. 7).

In the displayed embodiment of FIG. 8, dual matrix 800 can lead to an output 716 of three different decisions, an auto-deny decision 725, an auto-approve decision 720, and a refer decision 730 (FIG. 7). However, in other embodiments, the dual matrix 800 can lead to more, less, and/or different decisions and/or outputs than those shown in FIG. 8. Also, depending on the decision made, the skill based underwriting model 260 and/or the credit limit assignment model 230 may be called. However, in other embodiments, more, less, and/or different models are called depending on the decision and/or output that is generated.

Figure 9A:
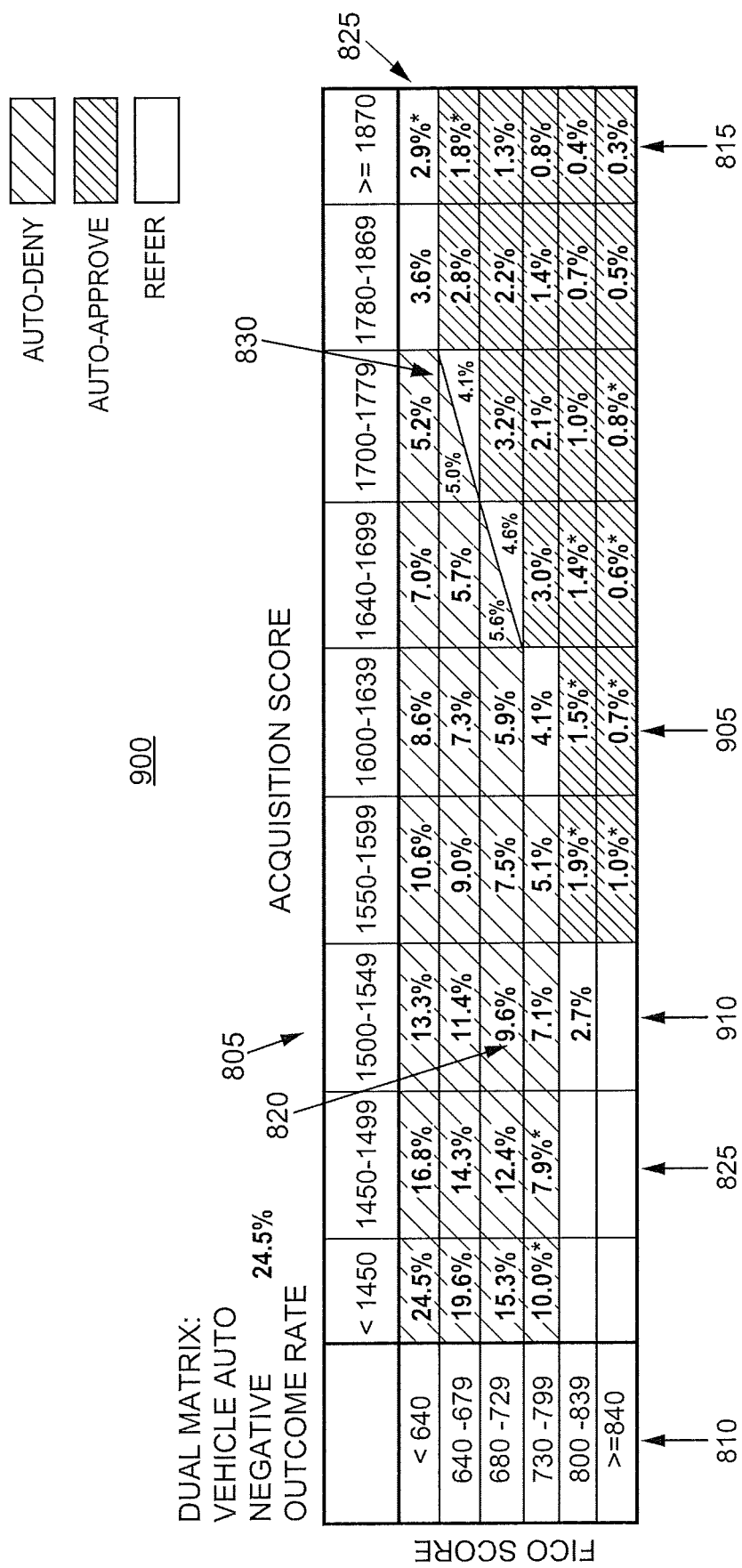
FIG. 9A is a diagram of an example of an automobile negative outcome dual matrix, according to one embodiment.

FIG. 9A displays an automobile negative outcome dual matrix 900. The automobile dual matrix 900 includes percentage figure box 905 and blank box 910. The dual matrix 900 also includes horizontal axis 805, vertical axis 810, auto-approve region 815, auto-deny region 820, refer region 825, and split region 830.

The percentage figure in percentage figure box 905 in the matrix 900 represents the percentage of applications where a negative outcome occurs for applicants that receive vehicle loans that have the acquisition score and FICO score that correspond to the scores for box 905. A negative outcome may be a default by the applicant 150 on a vehicle loan. Blank box 910 does not contain a percentage figure because no applications from applicants with a FICO score and acquisition score that correspond with the scores of blank box 910 exist. While a percentage figure is displayed in FIG. 9, a different data item could be used, such as a number, letter, symbol, and/or other data identifier. For example, a grading system with numbers or letters could be used to categorize the riskiness of granting certain applicants an auto loan. Box 905 would then display the corresponding grade as opposed to a percentage figure. Blank box 910 would remain blank.

Although FIG. 9A displays a negative outcome rate of dual matrix 900, other types of data could be reflected in a dual matrix 900. For example, instead of a negative outcome rate, a positive outcome rate may be displayed. Additionally, the displayed data may be associated with events different from a loan default. For example, the displayed data may be associated with approved loan applications, denied loan applications, preferred loan applications, manually approved loan applications, manually denied loan applications, credit limit amounts, collateral amounts, vehicle loans closed, vehicle loans that are not closed, new customers, existing customers, lost customers, and/or other business and/or loan performance data. The displayed data may be a percentage, number, fraction, letter, picture, and/or other data identifier.

The automotive negative outcome dual matrix 900 displayed in FIG. 9A provides insight on how regions 815, 820, 825, and 830 were determined. Specifically, applications that had a lower likelihood of a negative outcome generally fell within the auto-approve region 815. Applications in region 815 generally had a negative outcome percentage of 3.0% or less, as shown in FIG. 9A. Alternatively, applications with a higher likelihood of a negative outcome were covered by the auto-deny region 820. Applications in region 820 generally had a negative outcome percentage of 5.1% or higher. Additionally, applications in the refer region 825 and/or the split region 830 generally had negative outcome percentages in between 3.0% and 5.1%. Thus, the auto-approve region 815 generally applies to lower risk applications while the auto-deny region 820 generally applies to high-risk applications. Meanwhile, the refer region 825 and split region 830 generally applies to applications that are neither high nor low risk.

For split region 830, applications with the corresponding acquisition score (1700 through 1779) and FICO score (640 through 679) may exhibit different tendencies based on other data. For example, in the displayed embodiment of FIG. 9A and FIG. 10, an underwriting rule may be applied to applications falling within split region 830 to determine if they should be automatically denied or referred. By using an underwriting rule to analyze additional data about the applications, higher risk applications are identified and automatically denied while lower risk applications are referred. Specifically, the applications that were automatically denied exhibited a 5.0% negative outcome percentage, while applications that were referred only exhibited a 4.1% negative outcome percentage. Thus, examining additional data about these applications allowed higher risk applications to be removed from consideration while the remaining applications were referred for manual underwriting.

Figure 9B:
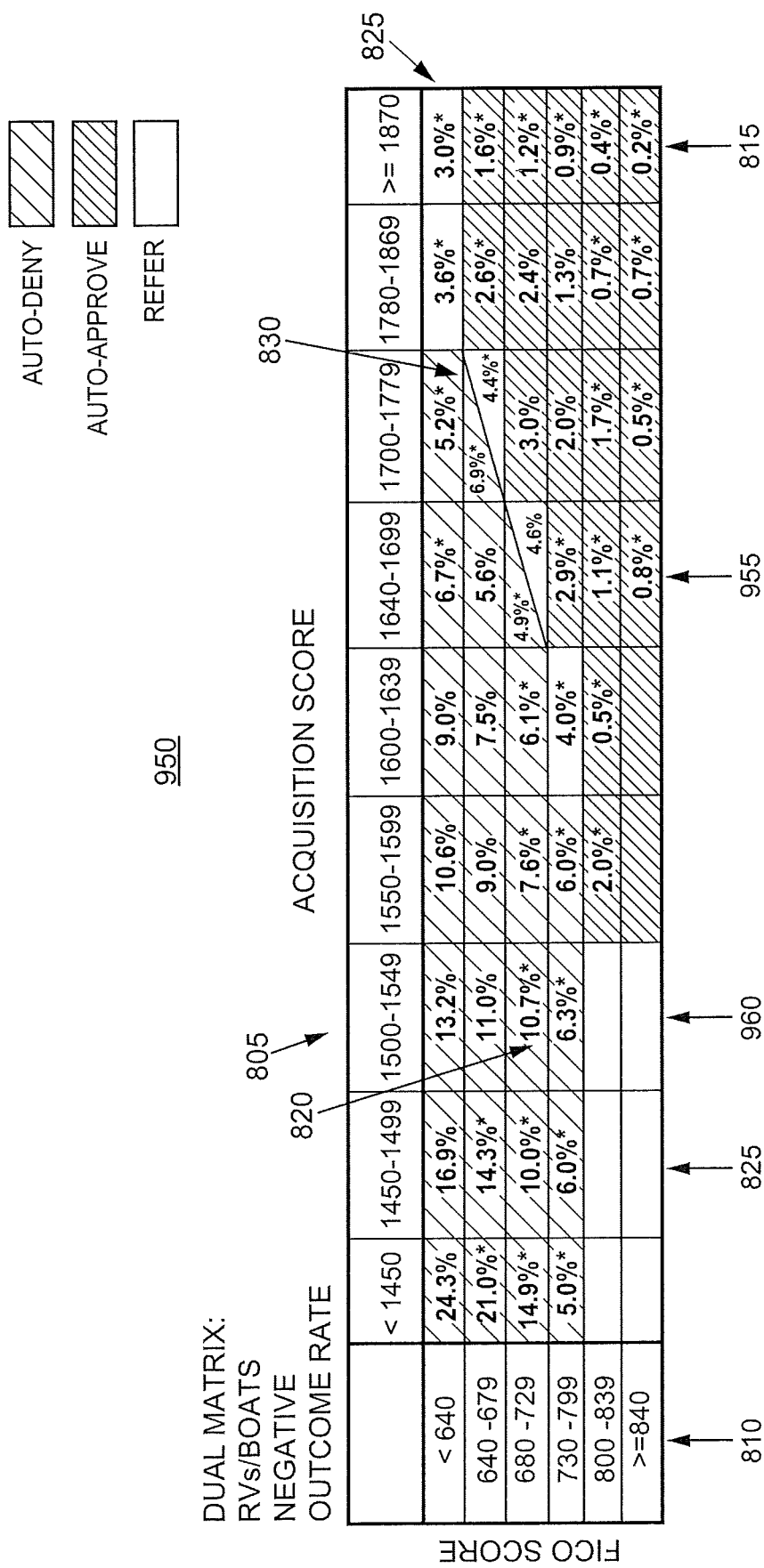
FIG. 9B is a diagram of an example of a recreational vehicle and boats negative outcome dual matrix, according to one embodiment.

FIG. 9B shows a recreational vehicle and boats negative outcome dual matrix 950. Similar to the automobile negative outcome dual matrix 900, dual matrix 950 includes a percentage figure box 955, a blank box 960, a horizontal axis 805 for acquisition scores, a vertical axis 810 for FICO scores, an auto-approve region 815, an auto-deny region 820, a refer region 825, and a split region 830. Similar to matrix 900, the auto-approve region generally spans applications exhibiting a negative outcome rate of 3% or lower, the auto-deny region 820 covers applications with a negative outcome rate of 5.0% or higher, and the refer region 825 and split region 830 cover the remaining applications. Further, the split region 830 is further divided to identify high-risk applications that should be denied and the remaining applications that should be referred.

Although FIG. 9B shows a negative outcome dual matrix 950 for recreational vehicles and boats, a dual matrix can be generated for a variety of different types of products. The products could include vehicles, recreational vehicles, automobiles, boats, motorcycles, trucks, scooters, and/or other vehicle loan products. Additionally, the dual matrix could be for different categories of applications, such as new vehicles, used vehicles, vehicles of a certain brand, vehicles of a certain model, vehicles from a certain manufacturer, vehicles from certain regions, vehicles from certain time periods, vehicles of a certain price, vehicles of a certain size, vehicles of a certain type (luxury vehicles, sport-utility vehicles, sports cars, sedans, and/or convertibles), and/or other categories. The pool of applicants available for the dual matrix may also be modified. For example, instead of showing all applicants, the matrix 950 may show data for only new applicants, repeat applicants, current customer applicants, target customers, potentially new customers, and/or other categories of applicants and customers.

FIG. 10 is a diagram of a dual matrix split region decision tree 1000. The decision tree 1000 includes box identifier 1005, region identifier 1010, underwriting rule 1015, underwriting rule criteria 1020, underwriting rule criteria 1030, split region tree decision 1025, and split region tree decision 1035. In some embodiments, the dual matrix split region decision tree 1000 includes more, less, and/or different items than those displayed in FIG. 10. In some embodiments, the dual matrix split region decision tree 1000 includes the same parts used in a different order than the order displayed in FIG. 10.

Decision tree 1000 includes box identifier 1005. The box identifier indicates the acquisition score band and FICO score band that are applicable for the corresponding split region. In the displayed embodiment, the acquisition score band is 1640 through 1699, while the FICO score band is 680 through 729. In other embodiments, the acquisition score band is more, less, and/or different than the band displayed. Additionally, the FICO score band may be more, less, and/or different than the band displayed. Further, the box identifier 1005 may include criteria that is different from the acquisition score and/or the FICO score. This would occur if the dual matrix contains axes that rely on criteria different from the acquisition score and/or the FICO score.

Decision tree 1000 also contains a region identifier 1010. In the displayed embodiment, the region identifier 1010 shows the region to be the refer region. However, the region identified could be a different region than that displayed in FIG. 10.

Decision tree 1000 relies on underwriting rule 1015 to further identify applications that should be automatically approved and/or automatically denied. In FIG. 10, the underwriting rule used for the applicant is the "number of non-auto loan and lease inquiries within 12 months" by the applicant. However, different underwriting rules may be used to identify applications that should be automatically approved and/or automatically denied. Further, the decision tree 1000 may use multiple underwriting rules to identify applications that can automatically be approved or denied.

Decision tree 1000 also uses underwriting rule criteria 1020 and 1030 to resolve split regions. In the displayed embodiment of FIG. 10, underwriting rule criteria 1020 specifies that the number of non-auto loan and lease inquiries within 12 months for an applicant is less than six, whereas criteria 1030 specifies that number to be greater than or equal to six. If the applicant has fewer than six non-auto loan and lease inquiries over the last 12 months, the applicant satisfies criteria 1020, which then causes split region tree decision 1025 to occur. In this case, the applicant's application is referred for manual underwriting 1025. Alternatively, if the applicant has six or more non-auto loan lease inquiries over the past 12 months, then criteria 1030 are satisfied. This causes the split tree region decision 1035 to occur. As a result, applicant's application is automatically denied 1035.

Although the displayed embodiment contains two underwriting rule criteria 1020 and 1030, more, less, and/or different criteria can be used with the underwriting rule to resolve a split region. Further, satisfaction of the underwriting rule criteria 1020 and 1030 leads directly to decisions 1025 and 1035. However, in some embodiments, satisfaction of one or more criteria may cause the evaluation of one or more additional underwriting rules before leading to a decision 1025 or 1035. Also, the decisions 1025 and 1035 that are caused by criteria 1020 and 1030 being satisfied may be different than those displayed in FIG. 10. For example, decision 1025 could be an auto-approve decision. Further, while the displayed embodiment shows two criteria 1020 and 1030 along with two decisions 1025 and 1035, more criteria and decisions may be possible than just those displayed. For example, a split region may have three sets of criteria to make three different decisions, such as an auto-approve decision, a refer decision, and an auto decline decision. Additionally, more than three sets of criteria and three decisions are possible.

FIG. 11 displays the automated underwriting model business rules table 1100. Table 1100 shows various business rules that can be applied to help determine whether an applicant should be automatically approved, automatically denied, or referred for manual underwriting. The table includes a business rule number 1105, a business rule type 1110, and the business rule description 1115 for each business rule in the table 1100. In the displayed embodiment, the business rule types 1110 include process, policy, and business. However, model 220 may include more, less, and/or different business rule types than those shown. Also, model 220 may have more, less, and/or different business rules than those displayed in table 1100.

Business rules may be used by the automated underwriting model 220 to resolve split regions in a dual matrix, as shown in FIG. 10. Additionally, model 220 may rely on business rules to filter applications before using the dual matrix. For example, if one or more of a set of business rules are not satisfied, an application may be automatically denied, automatically approved, or referred for manual underwriting before ever using a dual matrix. Alternatively, if one or more of a set of business rules are satisfied, an application may be automatically approved, automatically denied, or referred for manual underwriting before ever using a dual matrix.

Although not displayed, in some embodiments, the automated underwriting model 220 also uses a bankruptcy score filter to further determine whether an applicant should be automatically denied for vehicle loan application underwriting. In one embodiment, the bankruptcy score uses a scale from 1 to 800, with a higher score indicating higher credit worthiness of an applicant. In some embodiments, the model 220 automatically denies vehicle loan underwriting for applicants with a bankruptcy score below 600. However, bankruptcy score filters using different bankruptcy score scales, cutoffs, and/or underwriting decisions are also possible.

By including a bankruptcy score filter into model 220, an organization can further remove risky applicants from a pool of potential vehicle loan applicants. For example, if a vehicle loan applicant had an acquisition score of 1723, a FICO score of 823, and a bankruptcy score of 500, a model 220 incorporating the aforementioned bankruptcy score filter would automatically deny the vehicle applicant (bankruptcy score of 500 is less than 600), whereas a model without the bankruptcy score filter would automatically approve the applicant (based on the dual matrix of FIG. 8). Thus, a model 220 with a bankruptcy score filter reduces the risk incurred by an organization that generates vehicle loans for potential applicants.

Automated Underwriting Model Examples

In one example, John Doe (applicant 150) submits an application requesting vehicle loan financing. An acquisition score is assigned to John Doe based on his application by acquisition scoring model 210. Automated underwriting model 220 is then called to determine if John Doe should be automatically approved, automatically denied, or referred for manual underwriting. In this example, John Doe has been assigned an acquisition score of 1723 and has a FICO score of 823. Using dual matrix 900, the appropriate column for John Doe's acquisition score of 1723 is the column with the range of 1700 through 1779 on the acquisition score horizontal axis 805. The appropriate row has a range of 800 through 839 on the FICO score vertical axis 810. The corresponding box indicates a negative outcome rate of 1%. Also, the corresponding box falls within the auto-approve region 815. As a result, automated underwriting model 220 generates an output 716 to automatically approve 720 John Doe's application. As a result, credit limit assignment model 230 is then called upon to further process John Doe's application.

In another example, John Doe has an acquisition score of 1723 and a FICO score of 623. Based on dual matrix 900, the appropriate column for John Doe's acquisition score of 1723 remains the column with the range of 1700 to 1779 on the acquisition score horizontal axis 805. The appropriate row, however, now has a range of FICO scores less than 640 on the vertical axis 810. The corresponding box indicates a negative outcome rate of 5.2%. Further, the corresponding box falls within the auto-deny region 820. Consequently, automated underwriting model 220 generates an output 716 to automatically deny 725 John Doe's application. No other models are called upon because the underwriting process is complete and no other processing is needed for John Doe's application.

In yet another example, John Doe has an acquisition score of 1673 and a FICO score of 693. According to dual matrix 900, the appropriate column for John Doe's acquisition score of 1673 is the column with the range of 1640 through 1699 on the acquisition score horizontal axis 805. The appropriate row has a range of 680 through 729 on the FICO score vertical axis 810. The corresponding box is a split region 830. To resolve the split region 830, a dual matrix split region decision tree 1000 can be used. The decision tree 1000 uses box identifier 1005 and region identifier 1010 to locate and determine that John Doe's application is in the split region 830. The decision tree 1000 then relies on underwriting rule 1015 to resolve the split region 830. In one case, John Doe has had five non-auto loan and lease inquiries within 12 months. As a result, criteria 1020 is satisfied which leads to decision 1025, which is refer. Consequently, model 220 produces output 716 with a refer decision 730. This in turn causes skill based routing model 260 to be called upon to further process John Doe's application for manual underwriting.

In another case, John Doe has had 10 non-auto loan and lease inquiries within 12 months. This in turn satisfies criteria 1030, which then causes decision 1035, which is an auto decline decision. As a result, model 220 generates output 716 with an auto-deny decision 725. No other models are called upon because the underwriting process is complete and no other processing is needed for John Doe's application.

In one more example, John Doe has an acquisition score of 1785 and a FICO score of 600. Based on dual matrix 900, the appropriate column for John Doe's acquisition score of 1785 is the column with the range of 1780 through 1869 on the acquisition score horizontal axis 805. The appropriate row has the range of FICO scores less than 640 on the FICO score vertical axis 810. The corresponding box displays a negative outcome rate of 3.6%. Additionally, the corresponding box falls within the refer region 825. Because of this, the automated underwriting model 220 creates an output 716 with the refer decision 730. This causes skill based routing model 260 to be called to further process John Doe's application for manual underwriting.

In another example, John Doe is 17 years old and has a FICO score of 800 and has been assigned an acquisition score of 1800. In the automated underwriting model business rules table 1100, rule number seven (1105) is a policy rule (1110) with a description (1115) that states primary and secondary (if any) age is greater than or equal to 18. In other words, this business rule fails if none of the applicants are 18 years of age or older. Because John Doe is 17 years old, this business rule is not satisfied. As a result, John Doe's application is automatically denied and dual matrix 900 is not needed. The automated underwriting model 220 generates an output 716 with an auto-deny decision 725. No other models are called upon because the underwriting process is complete and no other processing is needed for John Doe's application.

Credit Limit Assignment Model

The vehicle loan generation system 200 also includes the credit limit assignment model 230. The purpose of the credit limit assignment model 230 is to determine limits on potential loans for an applicant 150. These limits include the maximum term (length) of the loan, the maximum loan to value (LTV) ratio, and the maximum monthly payment capacity of the applicant 150. The goals of these limits include meeting the needs of the applicant 150 and reducing the risk taken by organization 101. These objectives are often in tension because the applicant 150 may want a larger amount lent for a longer period of time than what the organization 101 deems worthy, based on the value of the collateral and applicant's credit worthiness. Credit limit assignment model 230 attempts to strike the appropriate balance between the applicant's and organization's needs.

Figure 12:
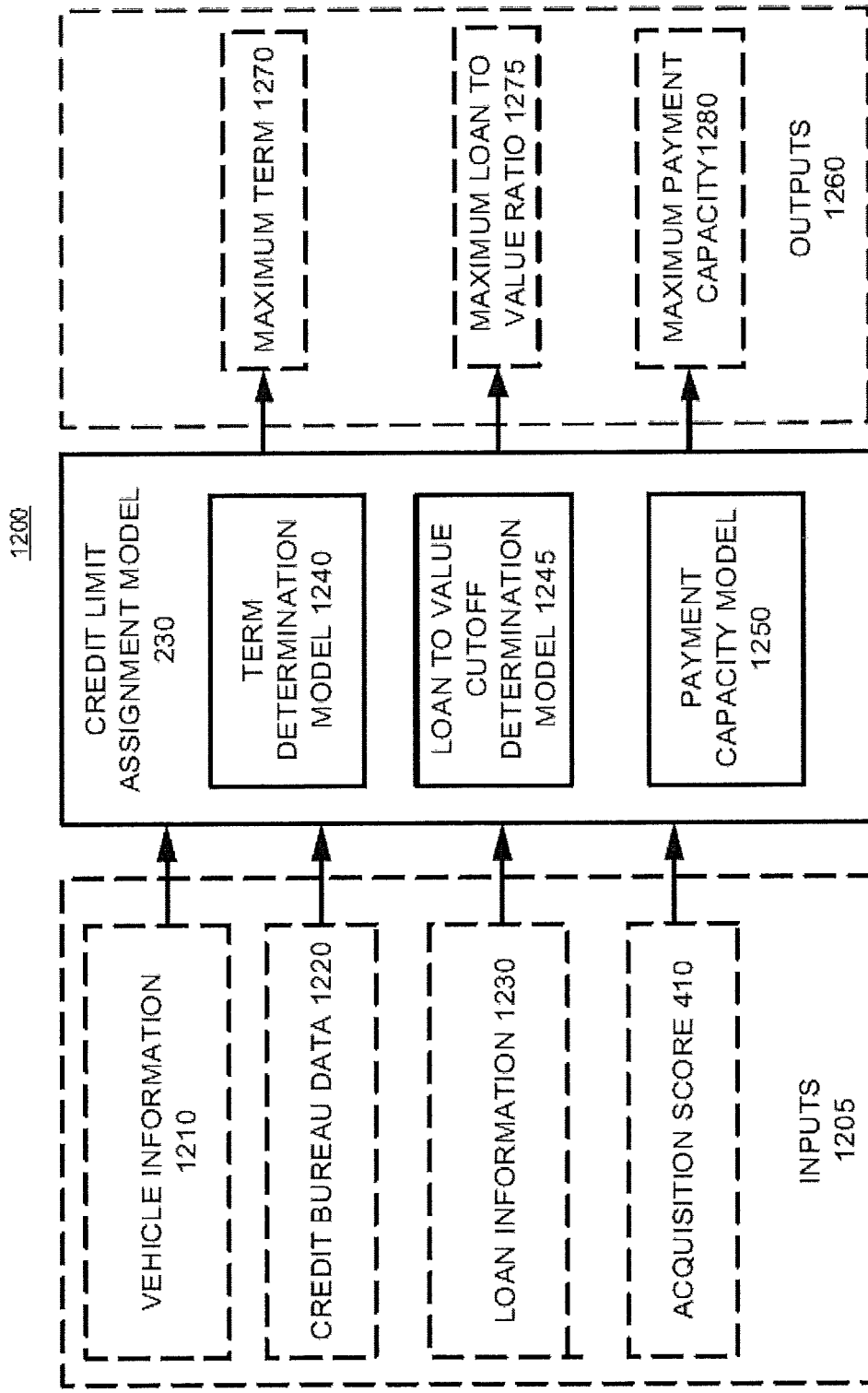
FIG. 12 is a diagram of an example of a credit limit assignment model environment, according to one embodiment.

FIG. 12 is a block diagram of a credit limit assignment model environment 1200. In environment 1200, credit limit assignment model 230 receives inputs 1205 and generates outputs 1260. Credit limit assignment model 230 includes the models term determination model 1240, loan to value (LTV) cut off determination model 1245, and payment capacity model 1250. These models process inputs 1205 to generate outputs 1260. The inputs 1205 received by credit limit assignment model 230 includes vehicle information 1210, credit bureau data 1220, loan information 1230, and acquisition score 410. The outputs 1260 generated by credit limit assignment model 230 include the maximum term 1270, the maximum LTV ratio 1275, and maximum payment capacity 1280.

The vehicle information 1210 received by model 230 may include the vehicle mileage, whether the vehicle is new or used, purchase price, condition, manufacture, brand, model, performance specifications (engine power, fuel efficiency, security features, etc.), and/or other information about the vehicle. The vehicle information 1210 may be about the collateral and/or the financed vehicle. The credit bureau data 1220 may be attributes regarding the applicant 150. The bureau data 1220 may be the same as, different from, more than or less than the credit bureau attributes 705 (FIG. 7) and/or attributes 405 (FIG. 4) for applicant 150. The credit bureau data 1220 may include the FICO score for the applicant 150. Loan information 1230 may be information regarding the applicant 150. Loan information 1230 may be the same as, more than, less than, or different from the loan performance data 715 (FIG. 7) and/or loan performance data used by the acquisition scoring model 210. While the displayed embodiment shows acquisition score 410 as an input, in other embodiments, other custom scores indicating credit worthiness of the applicant 150 may be used. The inputs 1205 may have more, less, and/or different inputs than those displayed in FIG. 12.

The term determination model 1240 processes inputs 1205 to determine the maximum term 1270. The maximum term 1270 states the maximum length allowed for offered loans to an applicant 150. The maximum term may be expressed in months, years, or other applicable units of time. The LTV cut off determination model 1245 generates a maximum LTV ratio 1275. The ratio 1275 is a limit on the ratio between the amount of the loan divided by the value of the financed vehicle and/or collateral. Generated loans for a vehicle may not have an LTV ratio that exceeds the ratio 1275. Payment capacity model 1250 outputs the maximum payment capacity 1280. The maximum payment capacity 1280 estimates the maximum monthly payment that can be required of applicant 150. Alternatively, maximum payment capacity 1280 could be calculated for a yearly payment. The maximum payment capacity 1280 caps the monthly payment from an applicant 150 for a generated vehicle loan.

Alternatively, the model 1250 may output a post loan debt to income (DTI) cut off for applicant 150. DTI is a percentage equal to the applicant's debt obligations (such as a monthly payment for debt) divided by the applicant's income (such as monthly income). The post loan DTI cut off is the maximum DTI percentage the applicant may have after receiving the loan. Outputs 1260 may have more, less, and/or different outputs than those displayed in FIG. 12. Also, credit limit assignment model 230 may include more, less, and/or different models than those displayed.

Term Determination Model

Figure 13A:
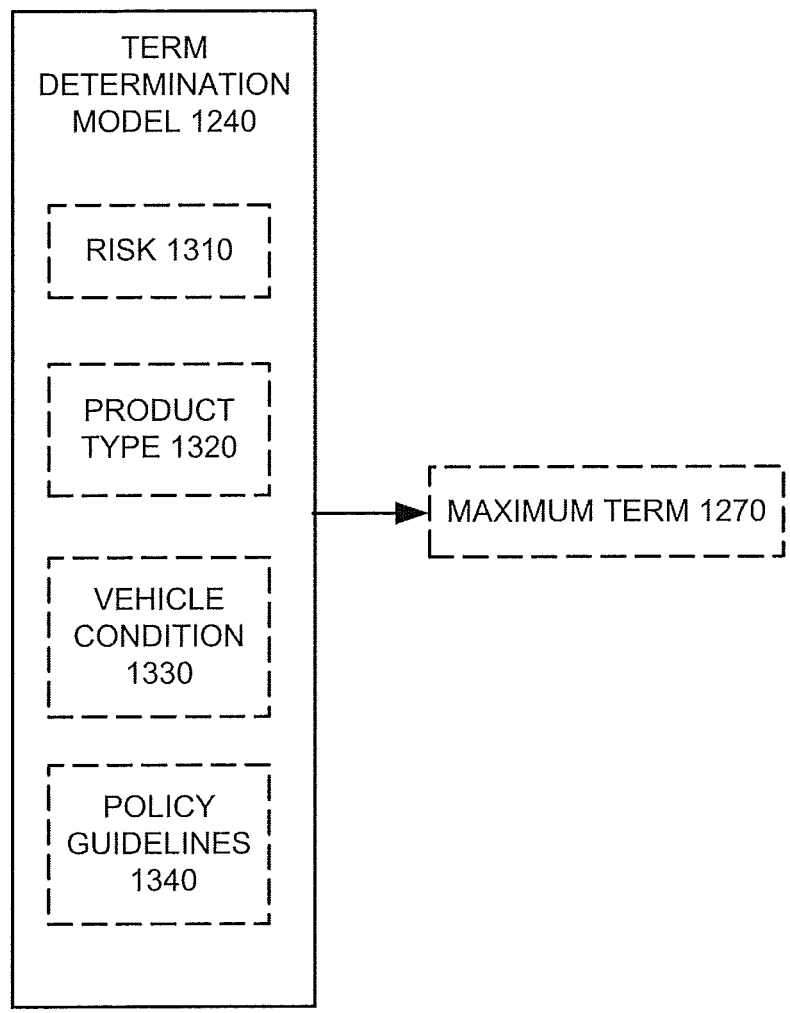
FIG. 13A is a diagram of an example of a term determination model environment, according to one embodiment.

FIG. 13A is a block diagram of the term determination model environment 1300. The environment includes term determination model 1240. The model 1240 generates the maximum term output 1270. When generating this output, the model 1240 considers several factors. These factors include risk 1310, product type 1320, vehicle condition 1330, and/or policy guidelines 1340. Although the FIG. 13A only shows the above factors mentioned, the model 1240 may consider more, less, and/or different factors than those displayed. Also, the model 1240 may output different and/or more outputs than those displayed.

Figure 13B:
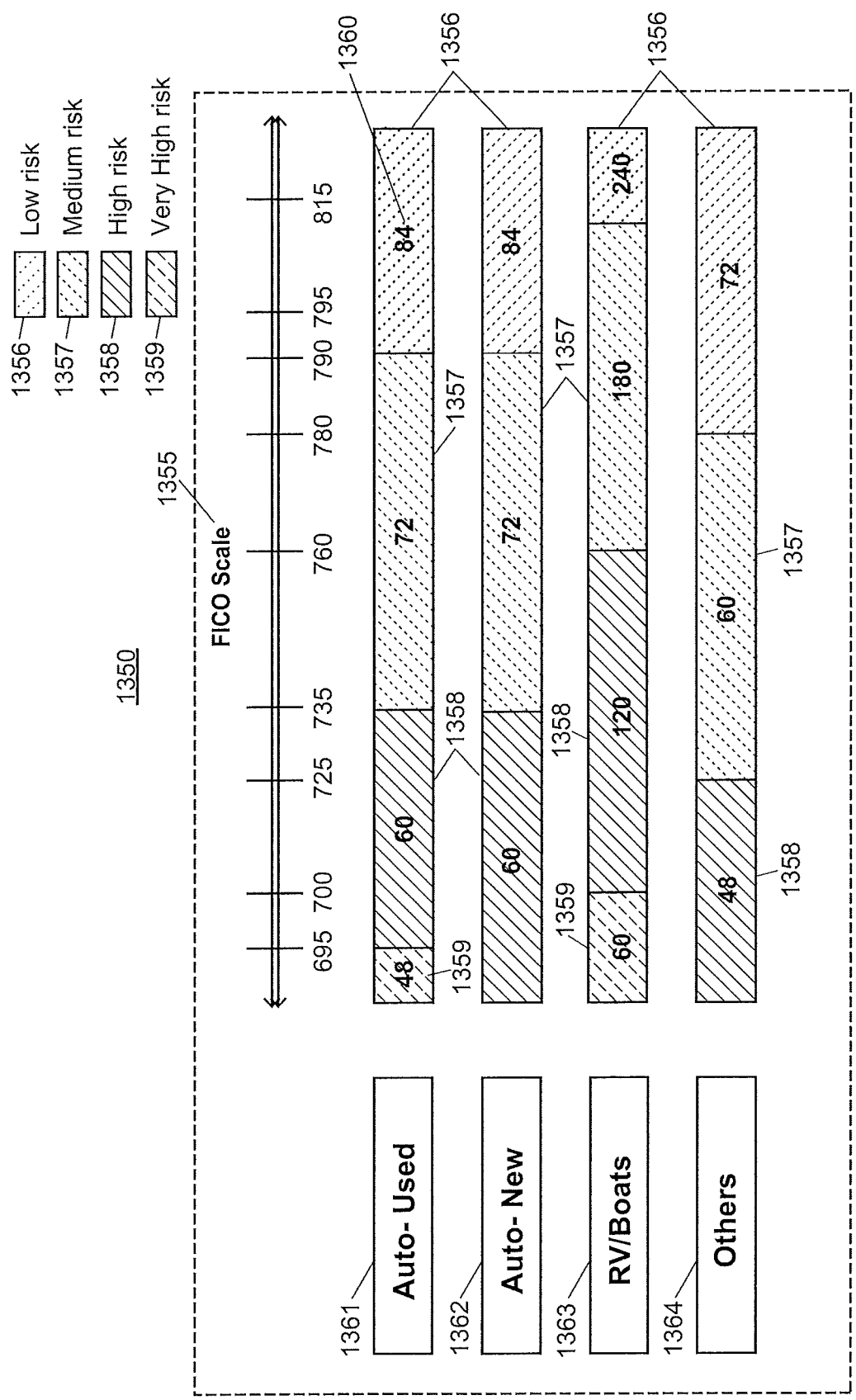
FIG. 13B is a diagram of an example of a vehicle maximum term chart, according to one embodiment.

FIG. 13B shows the vehicle maximum term chart 1350. The chart 1350 can be used to determine the maximum term associated with an applicant with a particular FICO score getting a loan for a type of vehicle. The chart 1350 includes FICO scale 1355, used automobile row 1361, new automobile row 1362, recreational vehicles and boats row 1363, and other products row 1364. Each row includes multiple risk segments, including low risk segments 1356, medium risk segment 1357, and high risk segment 1358. Some of the rows, such as used automobile row 1361 and recreational vehicles and boats row 1363, also include a very high risk segment 1359. All segments (1356, 1357, 1358, and 1359) include a maximum term value 1360.

FICO scale 1355 displays various FICO scores, including scores below 695 all the way through scores above 815. Additionally, FICO scale 1355 shows specific FICO scores, such as FICO score 695, 760, 815, etc., to indicate boundaries for various risk segments (1356, 1357, 1358, 1359). For example, FICO score 700 is shown because for recreational vehicle and boat products 1363, the very high risk segment 1359 is for FICO scores below 700. Additionally, the high risk segment 1358 for the product 1363 is for FICO scores between 700 and 760. Thus, FICO score 700 is displayed on FICO scale 1355. In some embodiments, more, less, and/or different scores are displayed on the scale 1355. Also, a criteria different from FICO scores may be used and/or displayed on scale 1355.

Rows 1361, 1362, 1363, and 1364 permit vehicle type to be factored in when determining risk segments for various FICO scores along with the associated maximum terms. In some embodiments, more, less, and/or different vehicle types than those shown in FIG. 13B are used. In other embodiments, a different criteria for vehicle type is used for the rows 1361 through 1364.

In FIG. 13B, risk segments 1356, 1357, 1358, and 1359 span a range of FICO scores along scale 1355 for a specific product shown in rows 1361 through 1364. For example, the medium risk segment 1357 associated with used automobiles 1361 covers applicants with FICO scores between 735 and 790. In some embodiments, the chart 1350 includes more, less, and/or different risk segments than those displayed in FIG. 13B. For example, the chart could include a very low risk segment (not displayed in FIG. 13B). In some embodiments, the risk segments 1356, 1357, 1358, and 1359 may span smaller, larger, and/or different ranges of FICO scores than those displayed. Alternatively, the risk segments 1356, 1357, 1358, and 1359 may be associated with criteria different from FICO scores and/or vehicle product types.

Each risk segment includes a maximum term value 1360 associated with that risk segment. Although the terms 1360 are displayed in months, other applicable units of time (for example, years) may be used to indicate the maximum term allowed for a vehicle loan for the associated risk segment.

Figure 14A:
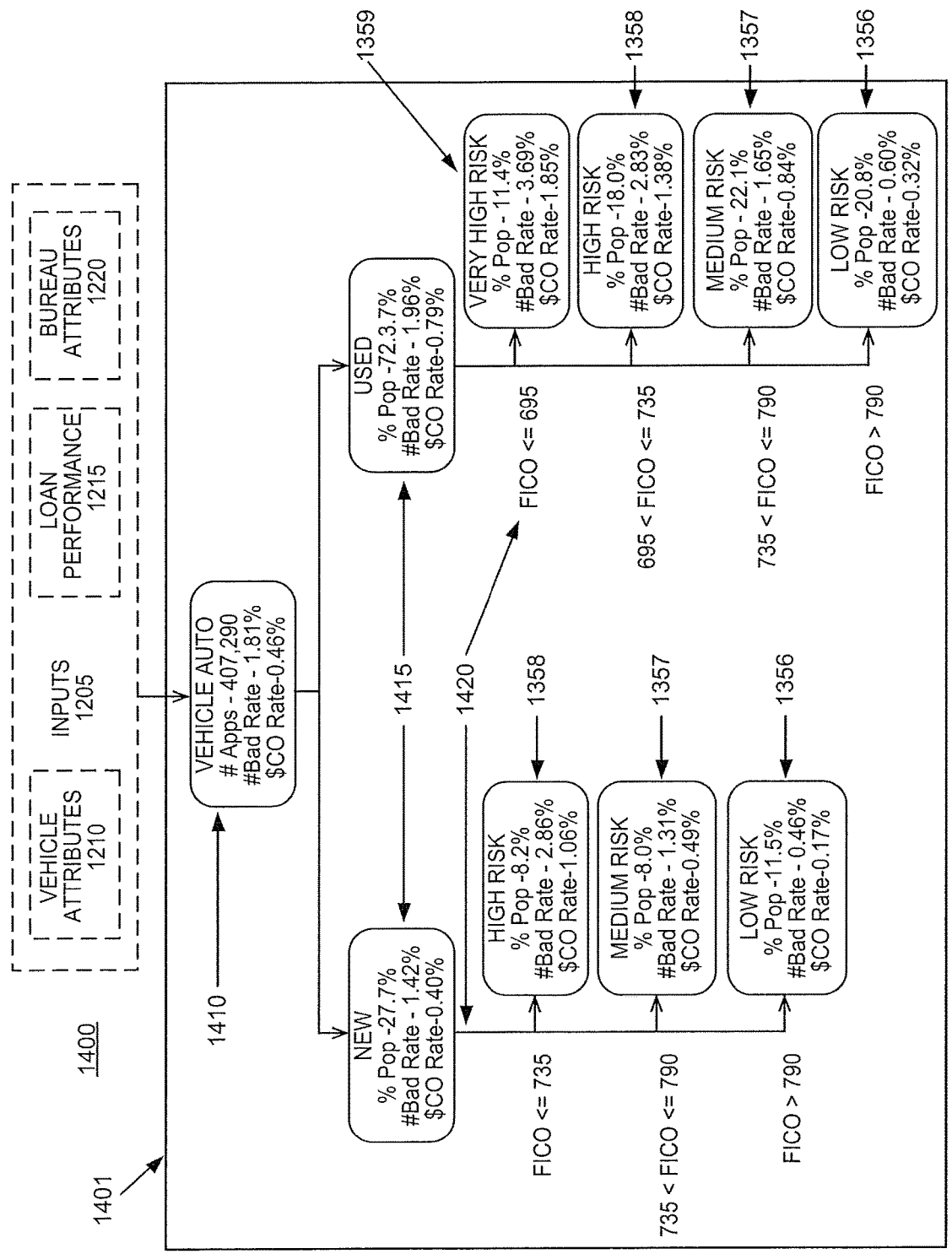
FIG. 14A is a diagram of an example of an automobile risk segmentation environment for the term determination model, according to one embodiment.
Figure 14B:
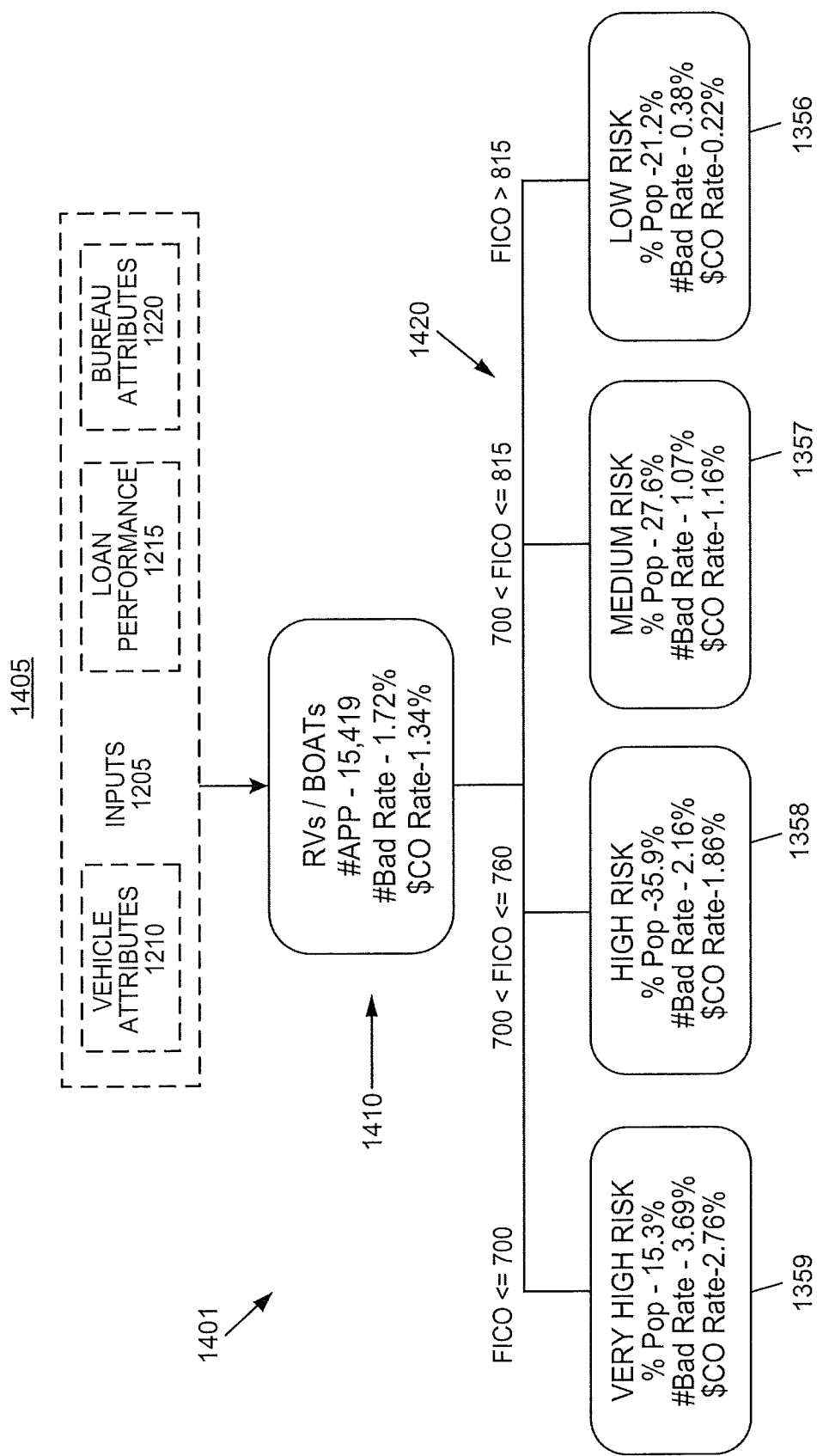
FIG. 14B is a diagram of an example of a recreational vehicle and boat risk segmentation environment for the term determination model, according to one embodiment.
Figure 14C:
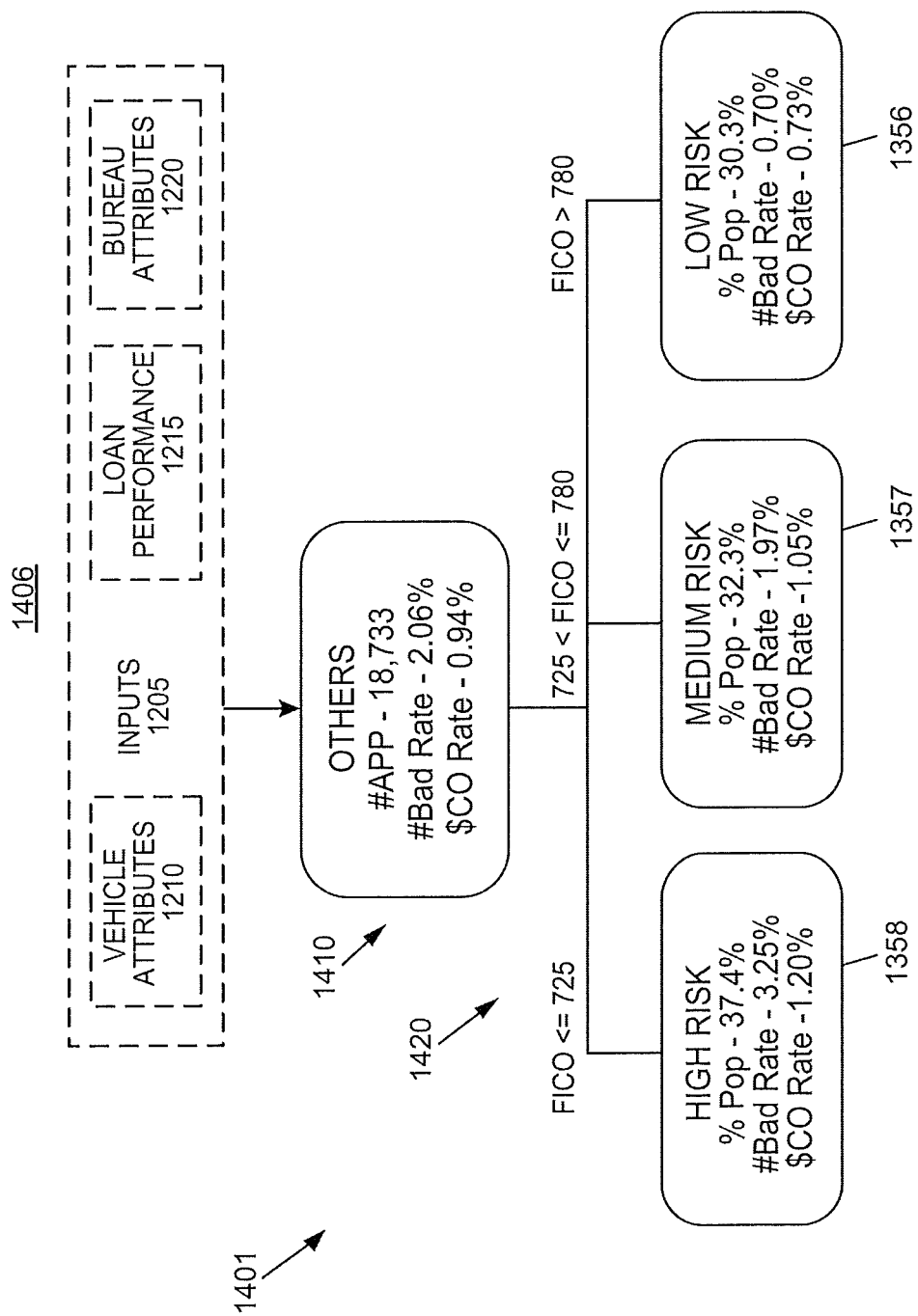
FIG. 14C is a diagram of an example of an "other product" risk segmentation environment for the term determination model, according to one embodiment.

Risk segmentation is further explained in FIGS. 14A through 14C while term determination is further explained in FIG. 15.

Risk Segmentation

Figure 19A:
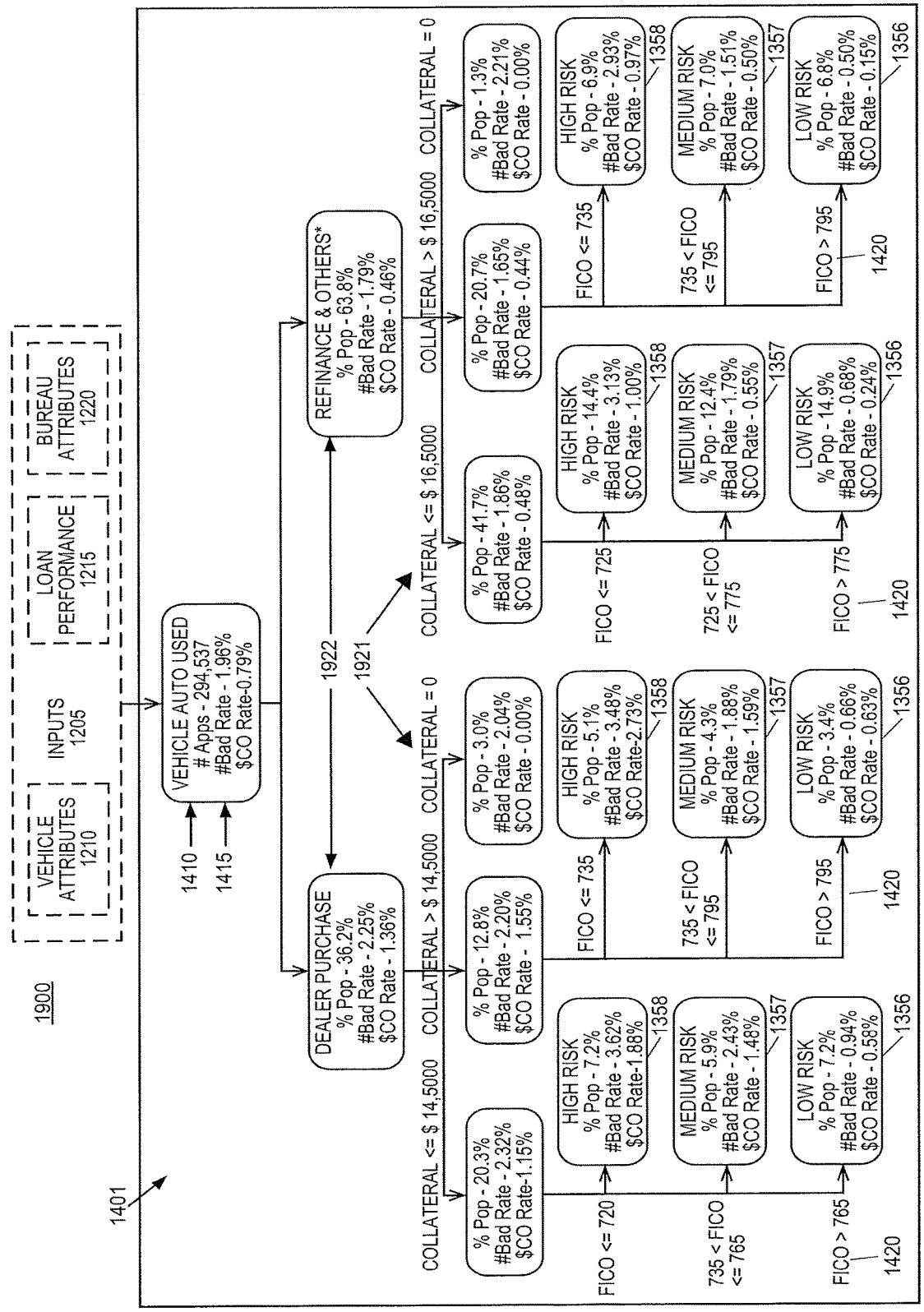
FIG. 19A is a diagram of an example of a used car risk segmentation environment for the LTV cut off model, according to one embodiment.
Figure 19B:
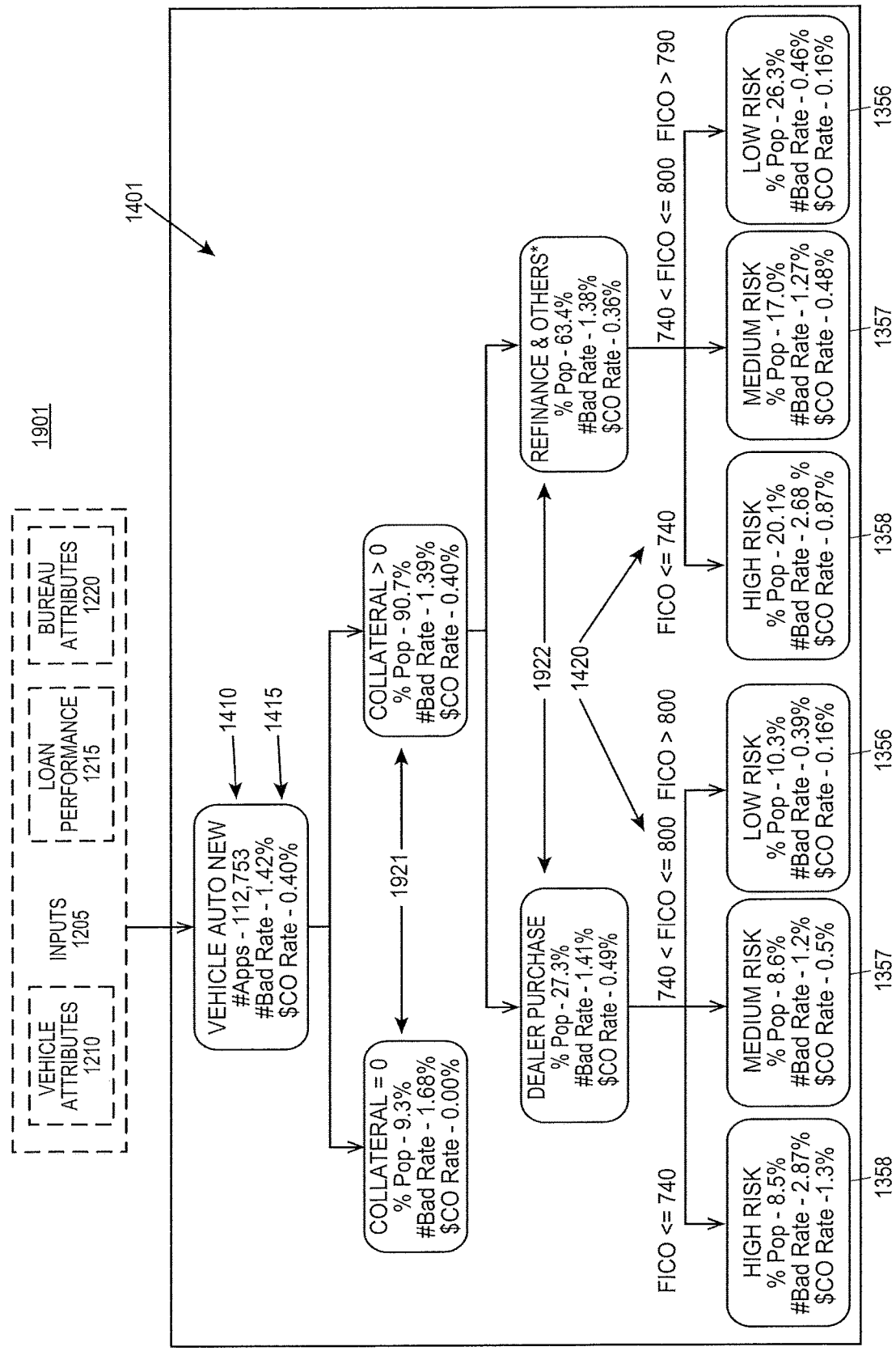
FIG. 19B is a diagram of an example of a new car risk segmentation environment for the LTV cut off model, according to one embodiment.
Figure 19C:
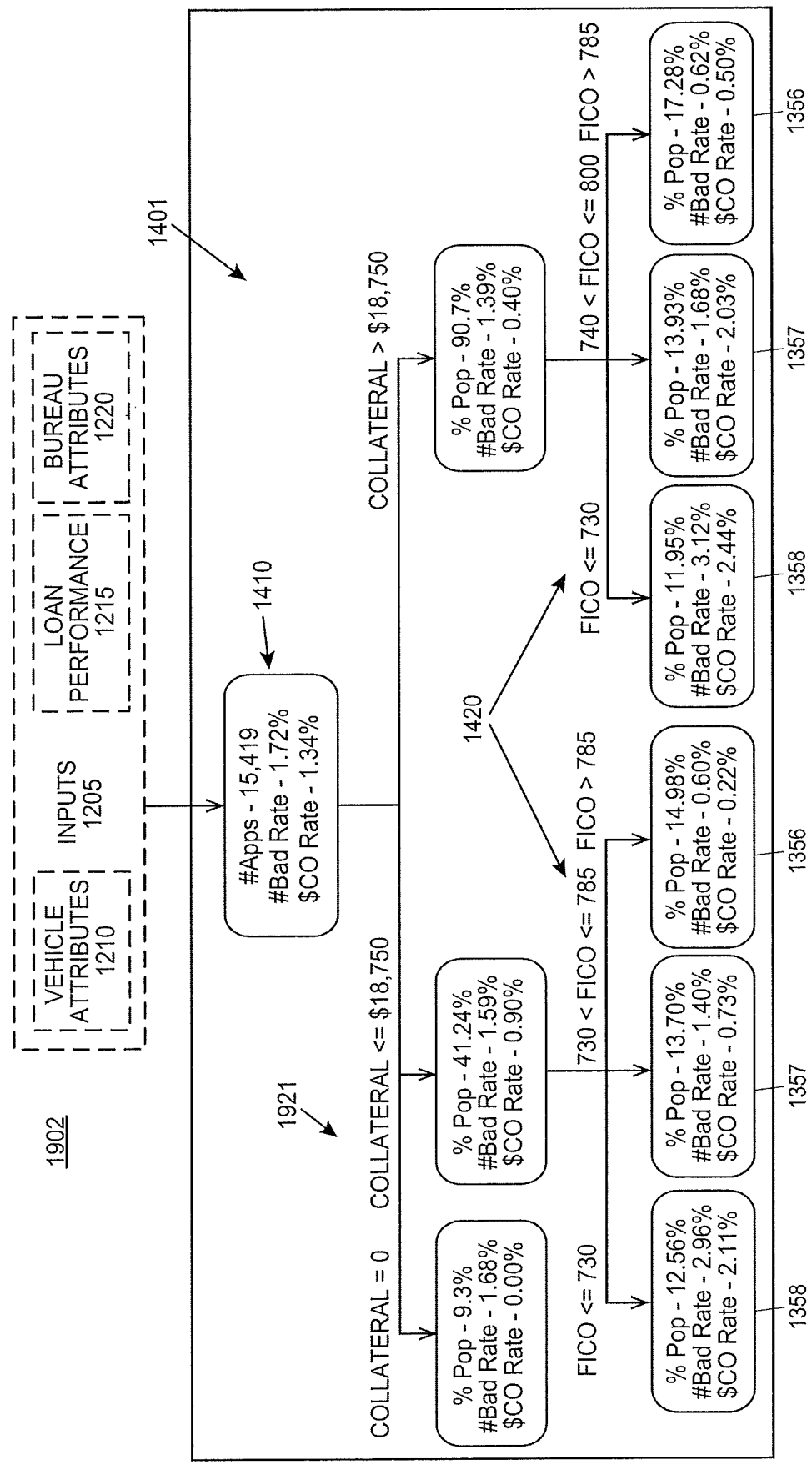
FIG. 19C is a diagram of an example of a recreational vehicle and boat risk segmentation environment for the LTV cut off model, according to one embodiment.
Figure 19D:
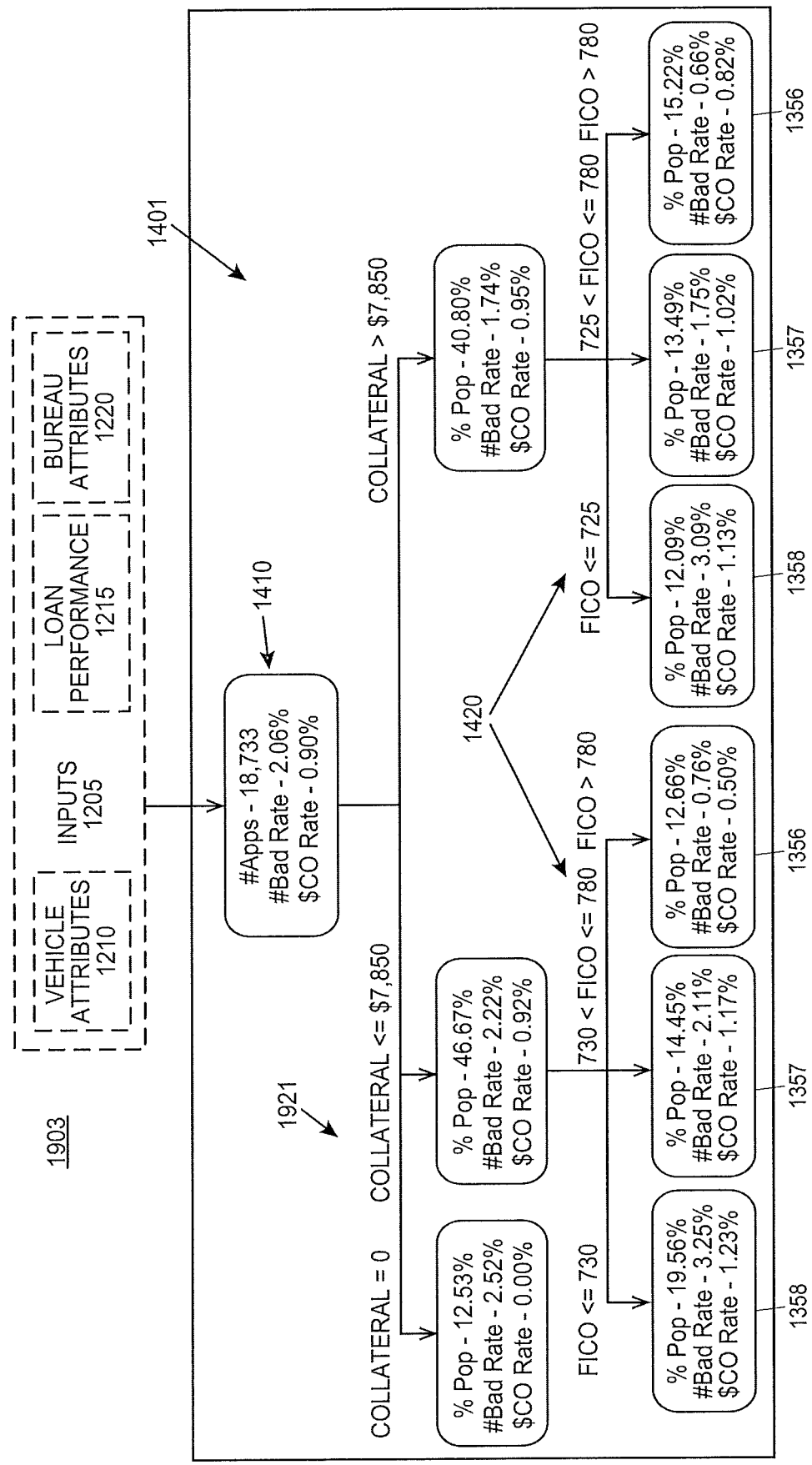
FIG. 19D is a diagram of an example of an "other products" risk segmentation environment for the LTV cut off model, according to one embodiment.

FIG. 14A is an example of an automobile risk segmentation environment 1400 for the term determination model 1240. FIG. 14B is an example of a recreational vehicle and boat risk segmentation environment 1405 for model 1240. FIG. 14C is an example of an "other product" risk segmentation environment 1406 for model 1240. FIG. 19A is an example of a used car risk segmentation environment 1900 for the loan to value (LTV) cut off model 1245. FIG. 19B is an example of a new car risk segmentation environment 1901 for the model 1245. FIG. 19C is an example of a recreational vehicle and boat risk segmentation environment 1902 for the model 1245. FIG. 19D is an example of an "other products" risk segmentation environment 1903 for the model 1245.

Environments 1400, 1405, 1406, 1900, 1901, 1902, and 1903 include a decision tree 1401 and inputs 1205. The received inputs 1205 by decision tree 1401 include vehicle attributes 1210, loan performance 1215, and bureau attributes 1220. The decision tree 1401 includes a product type decision 1410, a vehicle condition decision 1415 (only for FIGS. 14A, 19A, and 19B), and a FICO score decision 1420. Decision tree 1410 also shows low risk segments 1356, medium risk segments 1357, high risk segments 1358, and a very high risk segment 1359. For FIGS. 14A, 19A, and 19B, the product type decision 1410 is a car. For FIGS. 14B and 19C, the product type decision 1410 is a recreational vehicle or a boat. For FIGS. 14C and 19D, the product type decision 1410 is an "other product". For FIGS. 19A-19D, decision tree 1401 also includes collateral value decision 1921. Additionally, for FIGS. 19A and 19B, decision tree 1401 includes purchase type decision 1922.

In some embodiments, more, less, and/or different risk segments are shown than those displayed. For example, a decision tree 1410 may include a very low risk segment. Also, more, less, and/or different criteria are used than the criteria displayed (1410, 1415, 1420, 1921, 1922). For example, a decision tree 1410 may not factor in vehicle condition decision 1415 (see FIGS. 14B, 14C, 19C, and 19D). Alternatively, a decision tree 1410 may also consider the purchase type (dealer purchase vs. refinancing, see FIGS. 19A and 19B). Additionally, a decision tree 1410 may consider collateral value (see FIGS. 19A-19D). Further, each decision may consider more, less, and/or different decisions than those displayed. For example, FICO score decision 1420 may include more, less, and/or different ranges of FICO scores than those shown. Additionally, vehicle condition decision 1415 may include more, less, and/or different vehicle conditions than those shown. For example, the vehicle conditions could be new, 1-5 years old, and over 5 years old. Collateral value decision 1921 may include more, less, and/or different collateral values than those shown. Also, purchase type decision 1922 may include more, less, and/or different purchase types than those displayed. The decision tree 1401 may receive more, less, and/or different inputs 1205 than those displayed.

As has been mentioned earlier, the vehicle loan generation system 200 attempts to achieve two goals. First the system 200 seeks to reduce the risk assumed by organization 101 when loans are generated. Second, the system 200 attempts to increase the amount of vehicle loan business generated for organization 101. These two goals are often in tension, as potential customers (applicants) often want loans that are riskier than what the organization 101 wants to provide.

Thus, the organization 101 typically must balance the increased vehicle loan business generated and the additional risk assumed by the organization 101. Risk segmentation environments 1400, 1405, and 1406 for term determination model 1240 aim to achieve this balance by setting different maximum terms for different vehicle loans and different applicants based on the risk the vehicle loan and the applicant pose for the organization 101. Meanwhile, environments 1900, 1901, 1902, and 1903 for the LTV cut off model 1245 seek to accomplish this balance by setting various LTV cutoffs for different vehicle loans and different applicants based on the risk associated with the vehicle loan and the applicant for the organization 101.

In order to determine how to create risk segments to achieve these goals, previously funded vehicle loan applications over a time period were analyzed. In the displayed embodiment of FIGS. 14A-15C and 19A-20C, the time period is 18 months. The applications were analyzed to determine various statistics about the performance of the loans. The statistics include total number of applications funded (# Apps), percentage of applications (% Pop), negative outcome rate (# Bad Rate), charge off amount (CO), and charge off rate ($CO Rate), all of which are displayed in FIGS. 14A-15C and 19A-20C. Additionally, other loan performance statistics can be determined, including collateral values, terms, amounts leant, etc.

For the statistics displayed in FIGS. 14A-14C and 19A-9D, the percentage of applications (% Pop) variable is a percentage equal to the number of applications for that specific category divided by the total number of applications funded (# Apps). The negative outcome rate (# Bad Rate) for a specific category is a percentage equal to the number of applications with a negative outcome divided by the applications for that specific category (total number of applications (# Apps) multiplied by percentage of applications (% Pop)). In this case, a negative outcome is a loan default by applicant 150 for FIGS. 14A-15C and 19A-20C. Charge off amount (CO) is the amount of money outstanding on the loan that goes unpaid when the loan defaults. The charge-off rate ($CO Rate or $ charge-off rate) for a specific category is a percentage equal to the charge off amount for that specific category divided by the total amount funded for the applications for that specific category.

Risk segments were determined based on the applicant's FICO score for FIGS. 14A-15C and 19A-20C. The applications were divided into risk segments such that each risk segment had a significant percentage of applications (% Pop) and the negative outcome rate and charge-off rate increased when comparing a lower risk segment to a higher risk segment. Although FICO scores are used in the displayed embodiments, other criteria could have been used for determining risk segments.

For example, in FIG. 14A for a used vehicle, the negative outcome rate and charge-off rate increases for each increase in risk. In other words, the negative outcome and charge-off rates for low risk segment 1356 (0.60% and 0.32%, respectively) are less than those rates for medium risk segment 1357 (1.65% and 0.84%, respectively), which are less than those rates for high risk segment 1358 (2.83% and 1.38%, respectively), which are also less than those rates for very high risk segment 1359 (3.69% and 1.85%, respectively). Similarly, for FIGS. 14B, 14C, and 19A-19D, the negative outcome and charge off rates also increase for each risk segment increase. Further, each risk segment has a significant percentage of applications for FIGS. 14A-14C and 19A-19D.

Once risk segments are determined, the maximum terms and appropriate LTV cut offs for each risk segment can then be decided. The subsequent FIGS. 15A-15C describe how these maximum terms are calculated for new cars. FIGS. 19A-19D explain how LTV cut offs are determined for used car loans. Also, the above risk segmentation methods disclosed may be applicable to subsequent risk segmentation displayed and subsequent figures for other parts of the vehicle loan generation system 200.

Term Determination

Figure 15A:
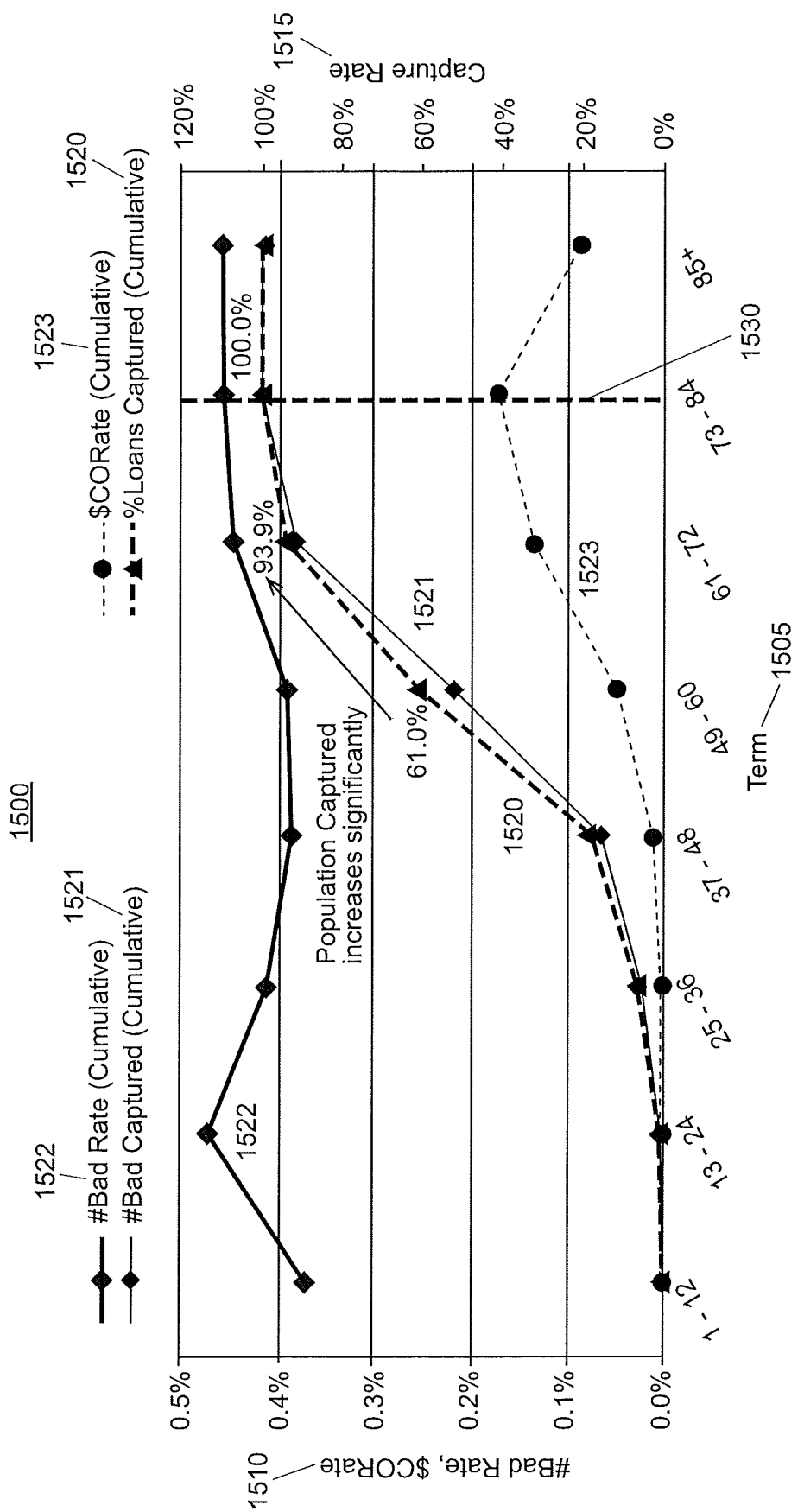
FIG. 15A is a diagram of an example of a new car low risk segment graph for the term determination model, according to one embodiment.
Figure 15B:
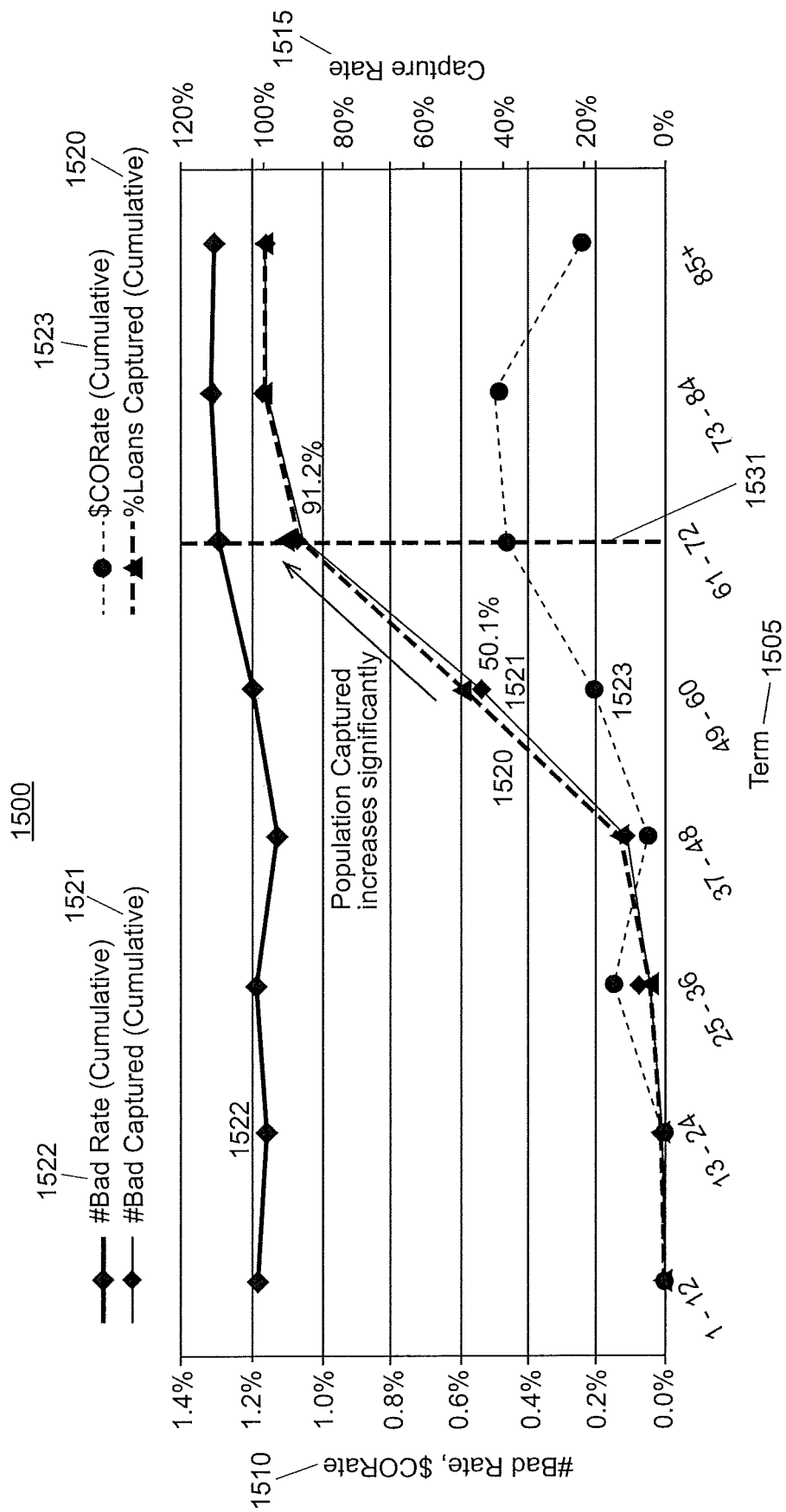
FIG. 15B is a diagram of an example of a new car medium risk segment graph for the term determination model, according to one embodiment.
Figure 15C:
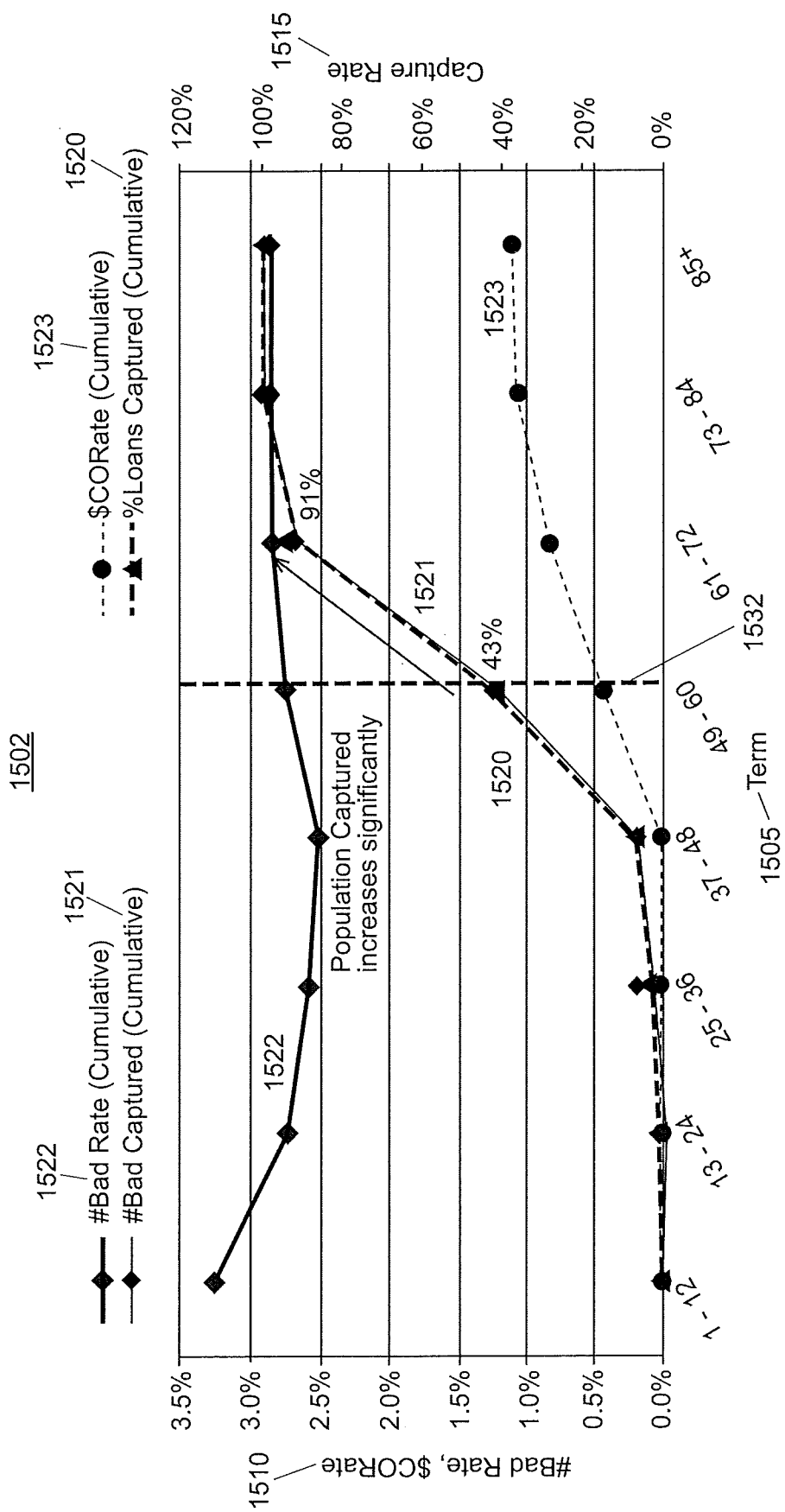
FIG. 15C is a diagram of an example of a new car high risk segment graph for the term determination model, according to one embodiment.

FIG. 15A displays a new car low risk segment graph 1500. FIG. 15B shows a new car medium risk segment graph 1501, while FIG. 15C provides a new car high risk segment graph 1502. The graphs 1500, 1501, and 1502 from FIGS. 15A, 15B, and 15C, respectively, include a term horizontal axis 1505, a negative outcome and charge-off rates vertical axis 1510, and a capture rate vertical axis 1515. Also, graphs 1500, 1501, and 1502 plot a cumulative percentage of loans captured line 1520 (% Loans Captured), a cumulative percentage negative outcome captured line 1521 (% Bad Captured), a cumulative negative outcome rate line 1522 (# Bad Rate), and a cumulative charge-off rate line 1523 ($CO Rate). Graph 1500 includes a maximum term line 1530. Also, graph 1501 has a maximum term line 1531, while graph 1502 contains a maximum term line 1532.

In some embodiments, the graphs 1500, 1501, and 1502 include more, less, and/or different axes and lines than those displayed. In some embodiments, the axes displayed contain groupings and/or divisions more, less, and/or different than those displayed. For example, axis 1505 may be grouped for every 6, 18 or 24 months, as opposed to the displayed 12 months. Additionally, axis 1510 may have divisions of every 0.25%, instead of the displayed 0.5%, as seen in FIG. 15C. Further, axis 1515 may show divisions of 10%, as opposed to the displayed divisions of 20%. Also, the axes may be displayed in different units than those displayed. For example, axis 1505 may be displayed in years, as opposed to months.

When determining appropriate maximum terms for each risk segment, the organization 101 may set terms to generate additional vehicle loan business while reducing risk. As a result, the organization 101 may adopt a general strategy to set larger maximum terms for lower risk segments and smaller maximum terms for higher risk segments. By setting a large maximum term for a low risk segment, the organization 101 improves its chances to secure vehicle loan business from the lowest risk applicants by providing them flexibility with their loan term. As the risk of the applicant increases, the organization 101 may reduce the maximum term. By doing so, the loan term options available to riskier applicants reduce. As a result, the riskier applicant is less likely to take a vehicle loan with the organization 101. This helps limit the risk absorbed by the organization 101. FIGS. 15A-15C provide examples of how this strategy is pursued by an organization 101 via the term determination model 1240. In other embodiments, other strategies may be adopted by an organization to improve vehicle loan generation while reducing risk.

FIG. 15A displays the new car low risk segment graph 1500. The maximum term line 1530 specifies a maximum term of 84 months. According to line 1520, nearly 100% of the vehicle loan applicants in the low risk segment 1356 for new cars could receive a loan due to the high maximum term of 84 months. As a result, the organization 101 improves their chances to attract applicants within the low risk segment 1356. Additionally, because the negative outcome rate 1522 and charge-off rate 1523 at the maximum term of 84 months is relatively low (0.46%, 0.17%, respectively), the organization 101 effectively limits the amount of risk it absorbs. However, the organization 101 could further limit the risk it absorbs by reducing the maximum term. For example, the maximum term could drop from 84 months to 72 months, which would slightly reduce the negative outcome rate to 0.45% (see line 1522) and the charge-off rate to 0.14% (see line 1523). However, this would potentially reduce vehicle loan business, as seen by the loans captured dropping to 93.9% (see the cumulative percentage of loans captured line 1520).

FIG. 15B shows the new car medium risk segment graph 1501. The maximum term line 1531 specifies a maximum term of 72 months. According to line 1520, nearly 91% of the vehicle loan applicants in the medium risk segment 1357 for new cars could receive a loan due to the high maximum term of 72 months. Furthermore, over 95% of the applicants in the medium risk segment have a loan term within 12 months of the maximum term 72 months, as specified by the maximum term line 1531. As a result, the organization 101 has a very good chance of attracting applicants within the medium risk segment. Additionally, the organization 101 limits its risk exposure by reducing the term from 84 months to 72 months. This can be seen by the lower negative outcome rate at 72 months (1.31%) versus 84 months (roughly 1.32%) on line 1522. This can also be seen by the lower charge off rate at 72 months (0.49%) versus 84 months (roughly 0.50%) on line 1523. While the displayed embodiment shows a maximum term line 1531 of 72 months for graph 1501, the organization could specify a lower maximum term to further reduce the risk absorbed. For example, a maximum term of 60 months would significantly reduce both the negative outcome rate (roughly 1.20%, see line 1522) and the charge-off rate (roughly 0.24%, see line 1523). Alternatively, maximum term line 1531 could be increased to recruit additional applicants, as seen by cumulative percentage of loans captured line 1520. Specifically, increasing the term line 1531 from 72 months to 84 months would increase the percentage of loans captured to nearly 100%.

FIG. 15C includes the new car high risk segment graph 1502. For this graph, the maximum term line 1532 designates a maximum term of 60 months. Consequently, the organization 101 greatly limits its risk exposure. Specifically, the charge-off rate at 60 months is only 0.49% as opposed to roughly 0.80% at 72 months (see line 1523). Also, the negative outcome rate at 60 months is 2.86%, as opposed to roughly 2.9% at 72 months (see line 1522). Additionally, line 1520 shows that only 43% of loans are captured within this segment and a maximum term of 60 months, as opposed to 91% for a maximum term of 72 months. This further reduces the amount of high risk segment applicants that receive loans from the organization. However, as mentioned with FIGS. 15A and 15B, if the organization 101 chooses a more aggressive strategy to generate additional vehicle loan business, the organization could increase the maximum term from 60 months to 72 months to more than double the potential vehicle loan applicants within this segment (43% to 91%), albeit at a greater risk to the organization 101.

While FIGS. 15A-15C demonstrate for new car vehicle loans how a strategy to generate additional loan business while reducing risk can affect the maximum terms for different risk segments, similar results and strategic decisions can also be seen when analyzing collected data for other products. This includes used cars, recreational vehicles, boats, and/or other products. This may also include dealer purchase vehicles, refinanced vehicles, and/or other vehicles.

Also, results similar to those displayed in FIGS. 15A-15C may be seen for risk segments different than those displayed. For example, a very high risk segment 1359, and/or a very low risk segment, may also have associated vehicle loan data that can be charted into a graph. The graph data may also provide insight as to the effects of different maximum terms on the amount of business generated (via loans captured) and/or the amount of risk absorbed by the organization (via negative outcome rates and charge-off rates).

Furthermore, as discussed earlier, the risk segmentation and data analysis displayed in FIGS. 14A-15C are based on data collected regarding vehicle loans that were funded over an 18 month period. In some embodiments, new data may be collected and analyzed to update the risk segmentation and term determination from model 1240. As a result, the term determination model 1240 can be adjusted for various reasons including updated data requiring new risk segmentation and term determination, altered tolerance for risk by an organization 101, modified requirements for vehicle loan generation by an organization 101, and/or other reasons.

Policy Guidelines for Term Determination

FIG. 16 displays policy guidelines 1340 for term determination model 1240. The term determination model 1240 outputs a maximum term 1270 that complies with policy guidelines 1340. In some cases, the term determination model 1240 adjusts the maximum term value 1360 from chart 1350 for the outputted maximum term 1270 to comply with policy guidelines 1340. The policy guidelines 1340 displayed include a product category 1605 and a policy guidelines description 1610. Product category 1605 includes automobiles, recreational vehicles and boats, other products, and all products. In some embodiments, more, less, and/or different product categories are included in the policy guidelines 1340. For example, the product category 1605 could also include motorcycles. In other embodiments, the policy guidelines 1340 include more, less, and/or different categories than those displayed. For example, the policy guidelines 1340 may also include a category for the age of the financed vehicle. Also, in some embodiments, more, less, and/or different policy guidelines 1340 for term determination model 1240 exist.

Term Determination Examples

In one example, John Doe (applicant 150) submits an application to obtain a vehicle loan for a used automobile. Upon receiving the application, organization 101 requests credit data from credit bureau 160 regarding John Doe. Organization 101 receives the credit data about John Doe from credit bureau 160 and analyzes it to determine John Doe's FICO score. In this example, John Doe has a FICO score of 775. The FICO score for John Doe is then stored in database 103 located at server 102.

After determining during underwriting that John Doe's application is approved, the vehicle loan generation system 200 then calls the credit limit assignment model 230. The credit limit assignment model relies on term determination model 1240 to calculate a maximum term for John Doe. Term determination model 1240 assigns a maximum term in accordance with chart 1350. John Doe's loan application for a used car corresponds with row 1361. His FICO score of 775 places him in the medium risk segment 1357 of row 1361. The maximum term value 1360 listed for this risk segment 1357 is 72 months. Chart 1350 incorporates the factors risk 1310, product type 1320, and vehicle condition 1330 when determining the maximum term. In this example, the maximum term of 72 months does not violate any of the policy guidelines 1340. Thus, term determination model 1240 outputs maximum term 1270 as 72 months.

In another example, John Doe's vehicle loan application is for a used car with the model year of 2004. John Doe's FICO score remained 775. Similar to the aforementioned example, the credit limit assignment model 230 relies on term determination model 1240 to calculate a maximum term. Once again, based on chart 1350, John Doe's FICO score of 775 places his vehicle loan application for a used car from 2004 in medium risk segment 1357 of row 1361, which has a maximum term value 1360 of 72 months. However, maximum term value 1360 of 72 months for a used car from 2004 violates policy guidelines 1340. Specifically, policy guidelines 1340 dictate that used cars from 2006-07 or earlier are limited to a maximum term of 60 months. As a result, term determination model 1240 outputs a maximum term 1270 of only 60 months (as opposed to 72 months). Consequently, the maximum term 1270 is in accordance with both chart 1350 and policy guidelines 1340.

In yet another example, John Doe's FICO score is 680 and his vehicle loan application is for a boat. After approving John Doe's application during the underwriting process, the credit limit assignment model 230 uses the term determination model 1240 to calculate a maximum term 1270 in accordance with chart 1350. John Doe's vehicle loan application for a boat places him in row 1363 of the chart 1350. His FICO score of 680 intersects with the very high risk segment 1359 of row 1363. The associated maximum term value 1360 for this very high risk segment 1359 is 60 months. In this example, the maximum term of 60 months does not violate any of the policy guidelines 1340. Thus, term determination model 1240 outputs maximum term 1270 as 60 months.

Loan to Value (LTV) Cut Off Model

Figure 17:
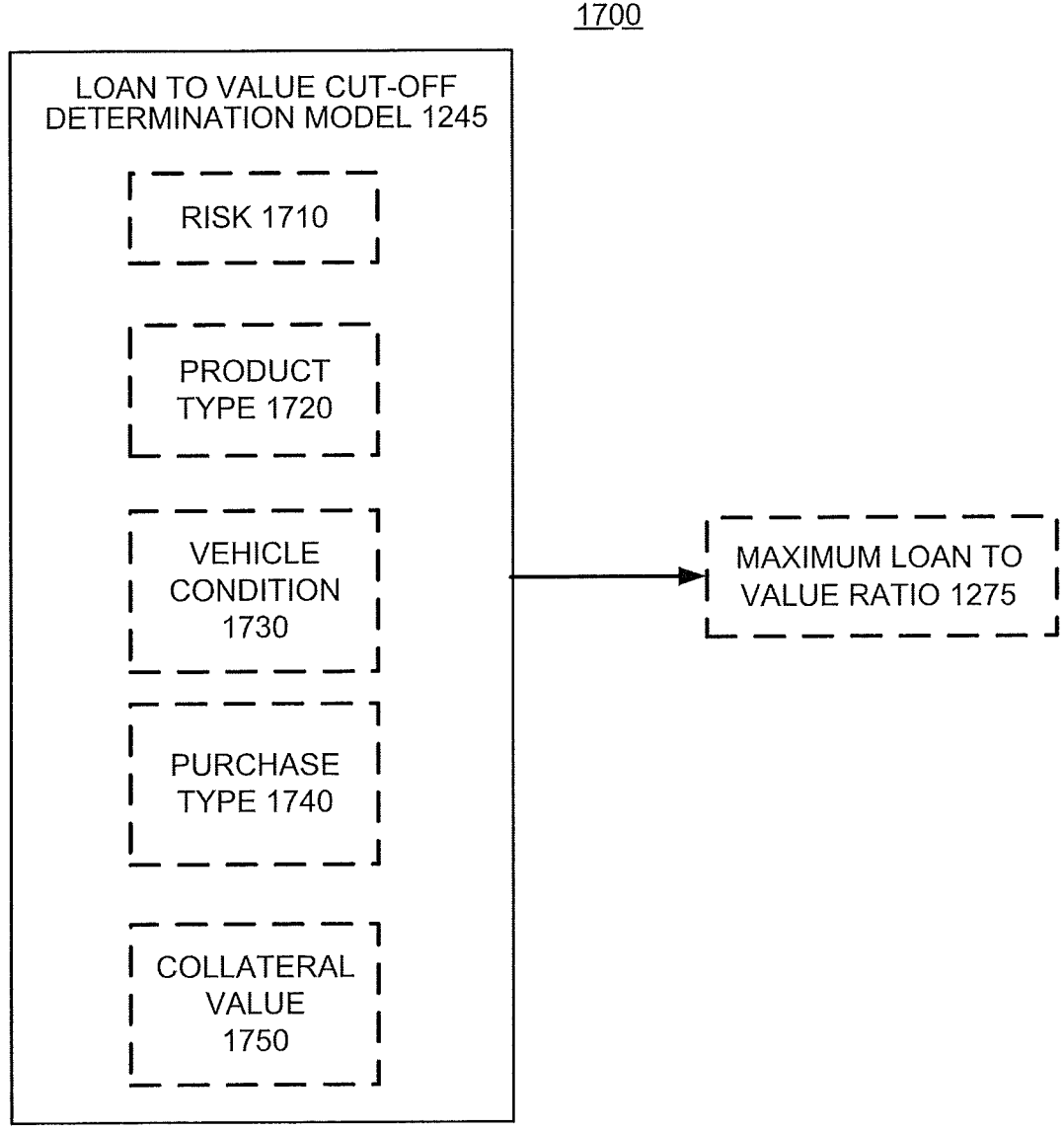
FIG. 17 is a diagram of an example of a loan to value (LTV) cut off determination model environment, according to one embodiment.

FIG. 17 is a block diagram of the loan to value (LTV) cut off determination model environment 1700. The environment includes LTV cut off determination model 1245. Model 1245 generates the maximum LTV ratio 1275. When generating this output, the model 1245 consider several factors. These factors include risk 1710, product type 1720, vehicle condition 1730, purchase type 1740, and collateral value 1750. However, the model 1245 could consider more, less, and/or different factors than those displayed. Also, the model 1245 may output different and/or more outputs than those displayed.

FIG. 18A displays vehicle loans LTV cut off table 1800. Table 1800 can be used to determine the maximum LTV cut off associated with an applicant with a particular FICO score getting a loan for a type of vehicle with a particular collateral value. Vehicle information, along with the type of purchase, may also be needed to determine the LTV cut off based on table 1800. Table 1800 considers various factors by including columns for product type, vehicle condition, purchase type, FICO risk segment, and high or low collateral values. The corresponding LTV cut offs for each row are shown in the low and high collateral columns. In some embodiments, the table may include more, less, and/or different criteria (columns) than those displayed. In some embodiments, the table 1800 may include more, less, and/or different rows than those displayed. For example, the table may include LTV cut off ratios for motorcycle vehicle loans. Alternatively, the table 1800 may include LTV cut off rows for used recreational vehicles and new recreational vehicles.

FIG. 18B shows vehicle loans LTV average collateral value table 1810. FIG. 18C displays the vehicle loans LTV average charge off amount table 1820. Table 1810 displays the average collateral values for vehicles based on the product type, vehicle condition, purchase type, the FICO risk segment of the applicants, and collateral value, as evidenced by the columns of the table. The corresponding average collateral values for each row are shown in the low collateral and high collateral columns. Similarly, table 1820 displays the average charge off amounts for a vehicle loan based on the product type, vehicle condition, purchase type, the FICO risk segment of the applicants, and collateral value, as can be seen by the columns of the table. Also, the corresponding average charge-off amounts for each row are shown in the low and high collateral columns. In some embodiments, the tables 1810 and 1820 may include more, less, and/or different criteria (columns) than those displayed. In some embodiments, the tables 1810 and 1820 may include more, less, and/or different rows than those displayed. For example, the tables 1810 and 1820 may include average collateral values and average charge-off amounts, respectively, for motorcycle vehicle loans. Alternatively, the tables 1810 and 1820 may include average collateral values and average charge-off amounts, respectively, for both used boats and new boats.

Table 1810 shows that for a given row, a substantial difference exists between the average collateral values for high collateral applications versus low collateral applications. For example, a vehicle loan application to refinance a used car from an applicant with a low risk FICO score has an average collateral value $11,225 for a low collateral application. However, a high collateral application for this row has an average collateral value of $23,072, more than double the average collateral value for a low collateral application.

Table 1820 shows that in general, the average charge-off amount for each row is substantially higher for a high collateral application than for a low collateral application. For example, a vehicle loan application to refinance a used car from an applicant with a low risk FICO score has an average charge-off amount of $7010 for a low collateral application. However, a high collateral application for this row has an average charge-off amount of $14,073, more than double the average charge-off amount for a low collateral application. This is true despite the charge-off rates for high collateral applications and low collateral applications being similar. Because the charge-off rates for high and low collateral applications for a row are similar, the substantial jump in the average charge-off amount between low collateral and high collateral applications can be attributed to the large difference in collateral value between low collateral and high collateral applications.

LTV Cut Off Determination

Figure 20A:
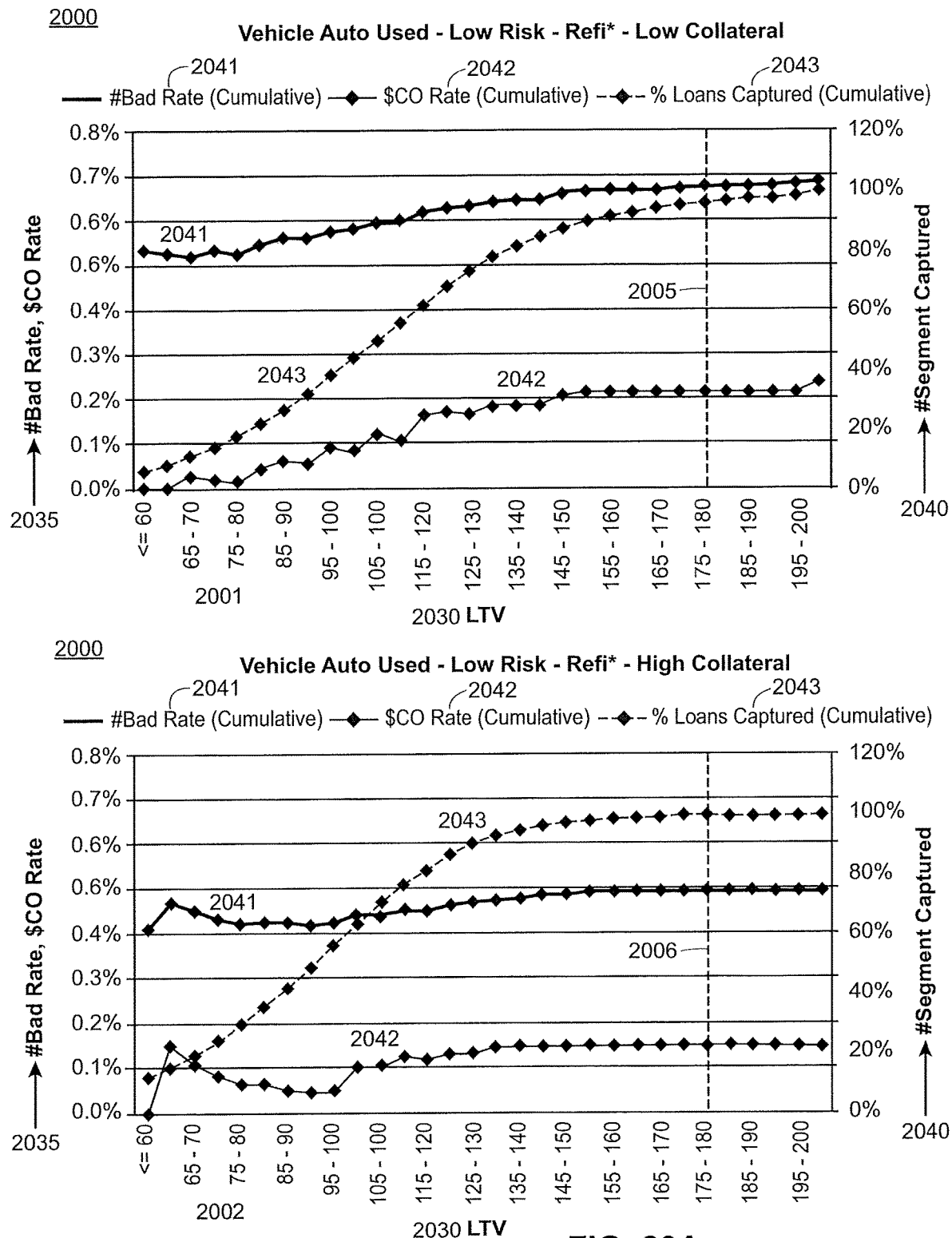
FIG. 20A is a diagram of an example of a used car, low risk segment graph environment for the LTV cut off model, according to one embodiment.
Figure 20A:
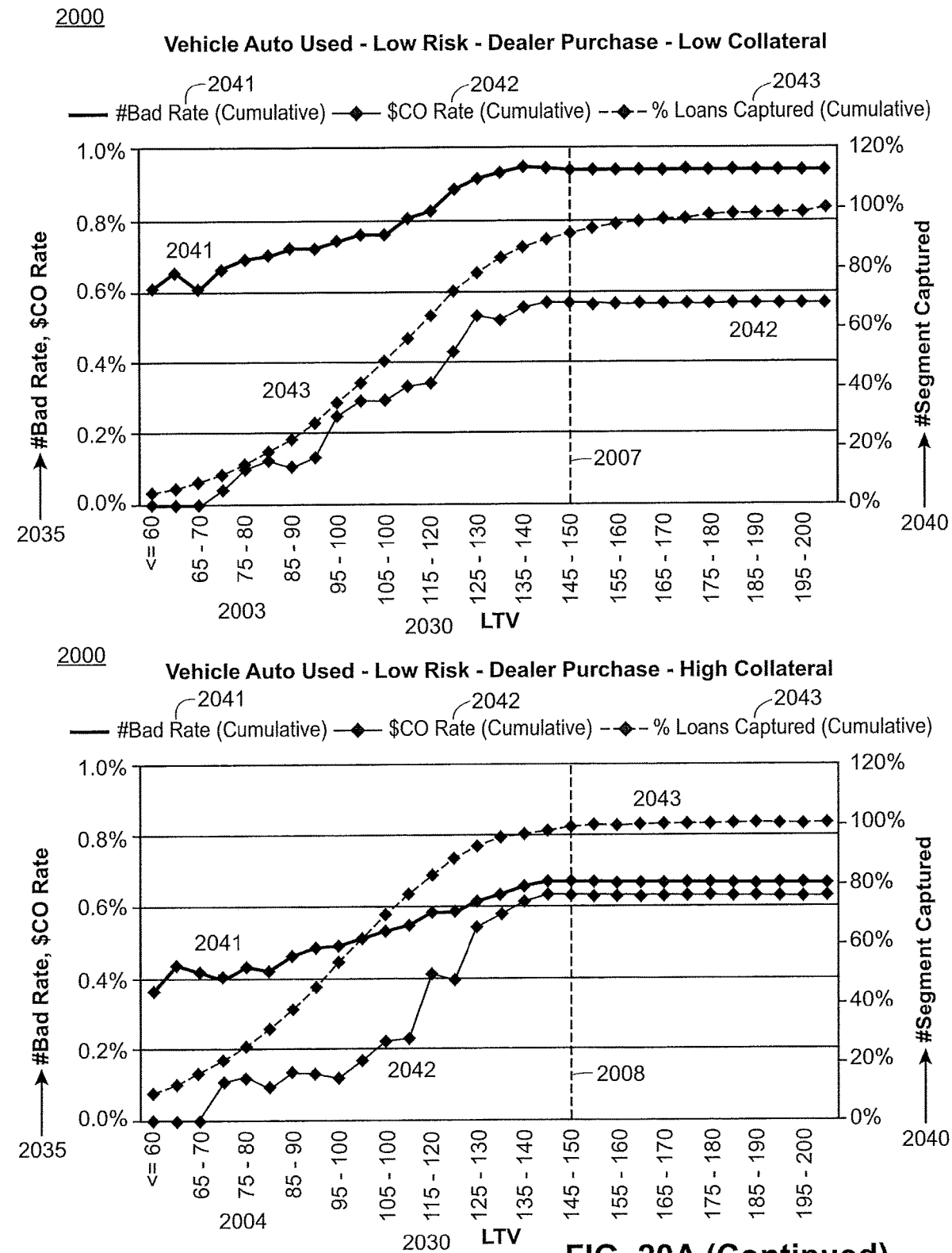
Figure 20B:
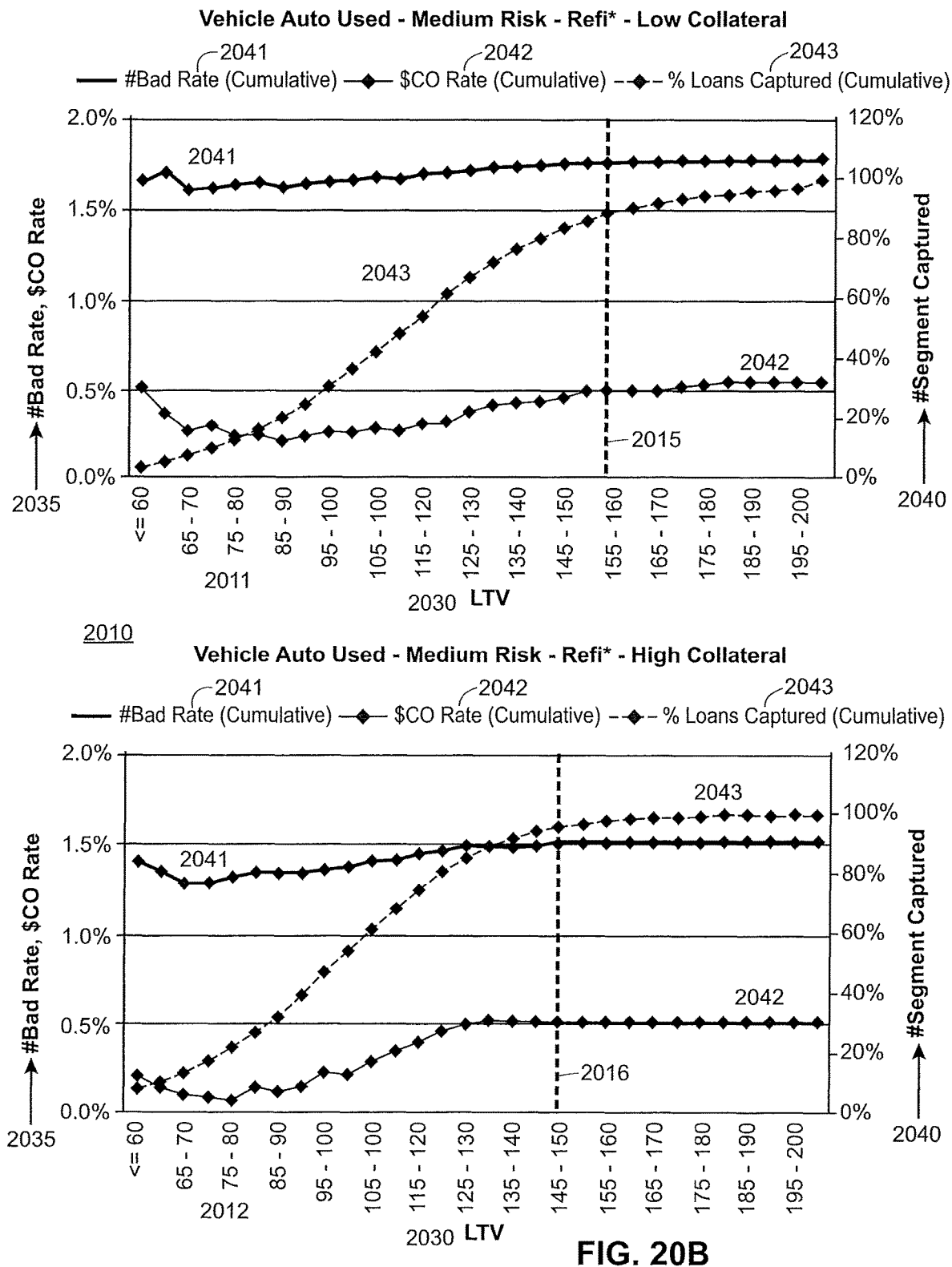
FIG. 20B is a diagram of an example of a used car, medium risk segment graph environment for the LTV cut off model, according to one embodiment.
Figure 20B:
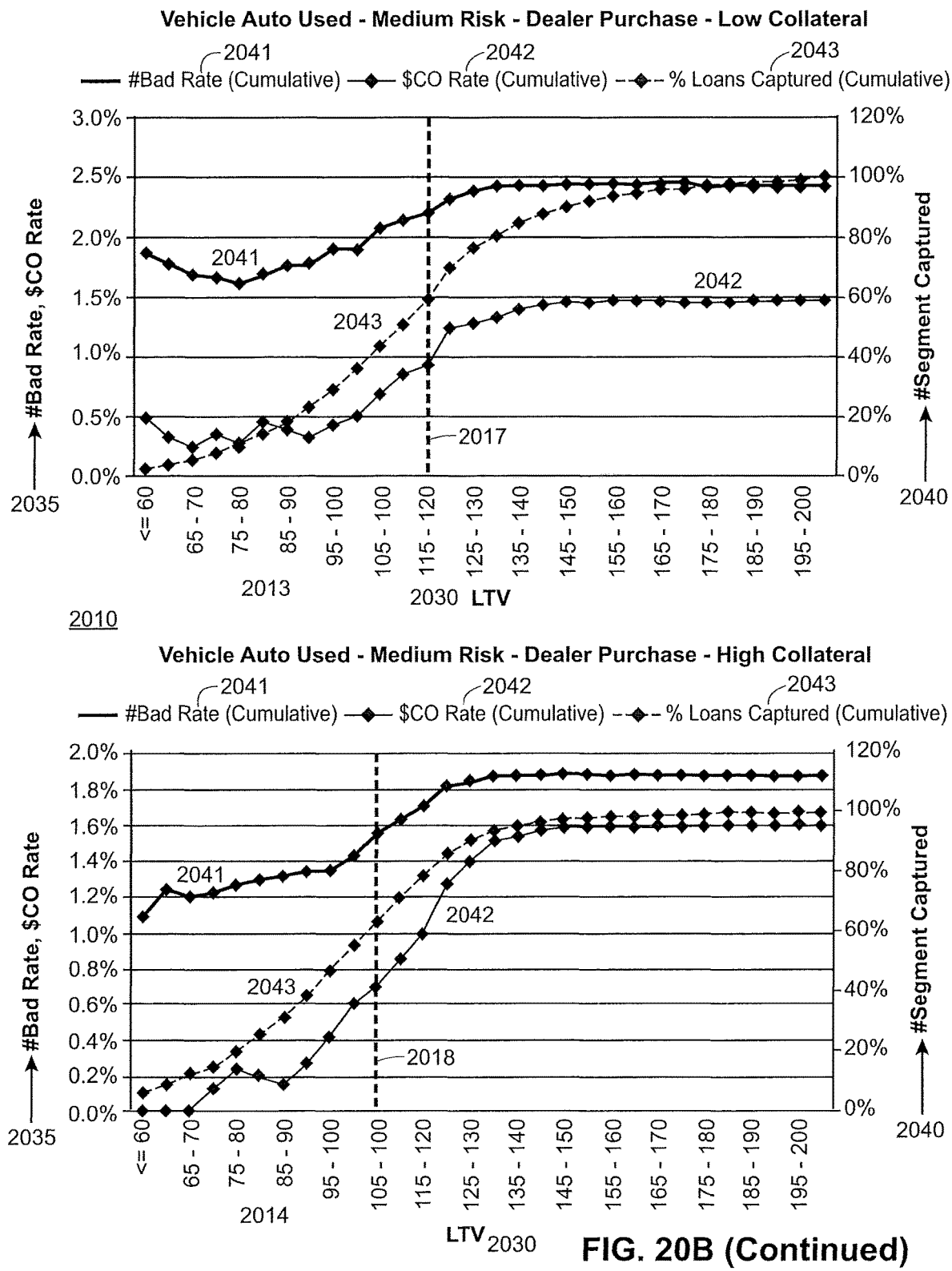
Figure 20C:
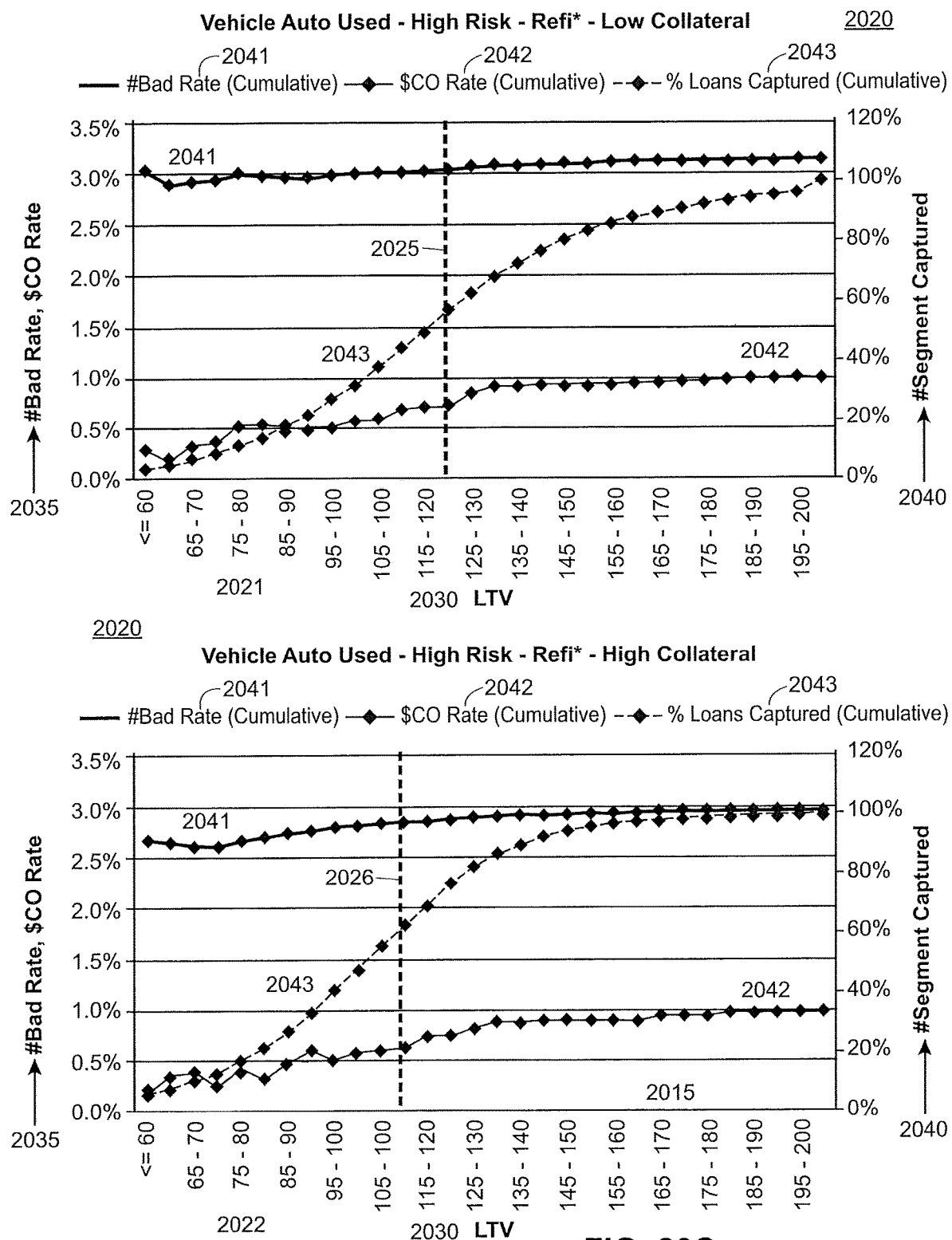
FIG. 20C is a diagram of an example of a used car, high risk segment graph environment for the LTV cut off model, according to one embodiment.
Figure 20C:
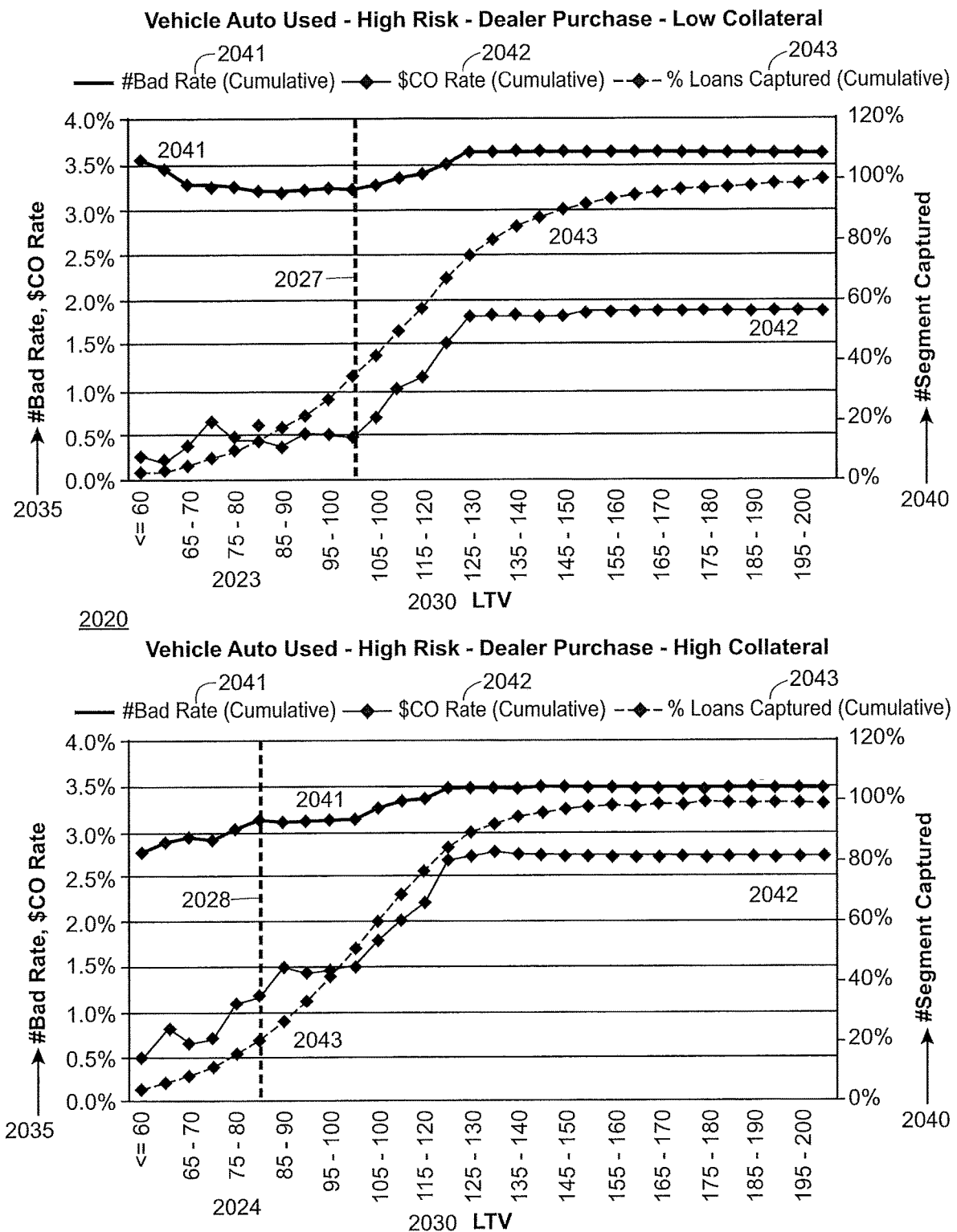

FIG. 20A displays used car, low risk segment graph environment 2000. Environment 2000 includes low collateral, refinance graph 2001, high collateral, refinance graph 2002, low collateral, dealer purchase graph 2003, and high collateral, dealer purchase graph 2004. FIG. 20B shows used car, medium risk segment graph environment 2010. Environment 2010 includes low collateral, refinance graph 2011, high collateral, refinance graph 2012, low collateral dealer purchase graph 2013, and high collateral dealer purchase graph 2014. FIG. 20C provides used car, high risk segment graph environment 2020. Environment 2020 includes low collateral, refinance graph 2021, high collateral, refinance graph 2022, low collateral, dealer purchase graph 2023, and high collateral, dealer purchase graph 2024. Each graph (2001-2004, 2011-2014, and 2021-2024) includes an LTV cut off line associated with that graph (2005-2008, 20015-2018, and 2025-2028). The cut off lines (2005-2008, 2015-2018, and 2025-2028) specify the LTV cut off for the risk segment for a type of loan.

The graphs 2001-2004, 2011-2014, and 2021-2024 include an LTV cut off horizontal axis 2030, a negative outcome (# Bad Rate) and charge off rate ($CO Rate) vertical axis 2035, and a capture rate vertical axis 2040 (% Segment Captured). Also, graphs 2001-2004, 2011-2014, and 2021-2024 plot a cumulative percentage of loans captured line 2043 (% Loans Captured), a cumulative negative outcome rate line 2041 (# Bad Rate), and a cumulative charge-off rate line 2042 ($CO Rate).

In some embodiments, the graphs 2001-2004, 2011-2014, and 2021-2024 include more, less, and/or different axes and lines than those displayed. In some embodiments, the axes displayed contain groupings and/or divisions more, less, and/or different than those displayed. For example, axis 2030 may be grouped for 10, 15, or 20 percentage points, as opposed to the displayed five percentage points. Additionally, axis 2035 may have divisions of every 0.25%, instead of the displayed 0.1% or 0.2% in FIG. 20A. Further, axis 2040 may show divisions of 10%, as opposed to the displayed divisions of 20%. Also, the axes may be displayed in different units than those shown.

When determining appropriate LTV cut offs for each risk segment, the organization 101 may set values to generate additional vehicle loan business while reducing risk. As a result, the organization 101 may adopt a general strategy to set larger LTV cut offs for lower risk segments and smaller LTV cut offs for higher risk segments. By setting a large maximum LTV cut offs for a low risk segment, the organization 101 improves its chances to secure vehicle loan business from the lowest risk applicants by providing them flexibility with the loan amount. As the risk of the applicant increases, the organization 101 may reduce the LTV cut off. By doing so, the loan amount options available to the riskier applicant are reduced. As a result, the riskier applicant is less likely to take a vehicle loan with the organization 101. This helps limit the risk absorbed by the organization 101. FIGS. 20A-20C provide examples of how this strategy is pursued by an organization 101 via the LTV cut off model 1245. In other embodiments, other strategies may be adopted by an organization to improve vehicle loan generation while reducing risk.

In FIGS. 20A-20C, the organization 101 focuses on setting LTV cut offs to limit charge-off rates for each risk segment. Also, the organization 101 attempts to set an LTV cut off that attracts as many potential vehicle loan customers as possible for that risk segment while balancing the charge-off rate. With this in mind, several general strategies can be seen in FIGS. 20A-C to minimize the charge-off rate.

First, LTV cut offs tend to be reduced when moving from a low collateral to a high collateral loan within the same risk segment, purchase type, vehicle condition, and product. Because the negative outcome rate tends to be similar for loans of a particular segment, purchase type, product, and vehicle condition, the value of the collateral has a major effect on the charge-off rate. Thus, high collateral loans tend to have a higher charge-off rate than the low collateral loan. As a result, the LTV cut off is reduced for high collateral loans.

Also, new car loans tend to receive higher LTV cut offs than used car loans. For example, for dealer purchased, new vehicles, the LTV cut off ratios for all risk segments and collateral values were higher than the corresponding risk segments and collateral values for used, dealer purchased vehicles. Additionally, refinanced vehicle loans generally receive higher LTV cut offs than dealer purchased loans. For example, for used, refinanced car loans, all risk segments and collateral values had LTV cut offs larger than the LTV cut offs for their corresponding risk segments and collateral values for used, dealer purchased car loans. Additionally, the LTV cut offs decrease for riskier applicants for the same type of vehicle loan. For example, low collateral vehicle loans for RVs and boats have LTV cut offs that reduce from a lower risk segment to a higher risk segment. Specifically, the low risk segment for this loan has an LTV cut off (180%) that is lower than the medium risk segment value (130%), which is lower than the high risk segment value (100%).

FIG. 20A shows low risk segment graph environment 2000, which includes graphs 2001-2004. By looking at the graphs and their associated LTV cut off lines (2005, 2006, 2007, and 2008), the general strategy applied for these LTV cut offs is to maximize the potential number of applicants because the charge-off rates for the low risk segments are low. For example, every LTV cut off line (2005-2008) intersects a loan captured line 2043 above 90%, with nearly 100% of loans being captured for all loans in the low risk segment. Additionally, charge-off rates (see line 2043) for the low risk segment range from 0.15% to 0.63%. Thus, even the highest charge-off rate in the low risk segment, 0.63%, is a relatively low charge-off rate when compared to all applications. Thus, the general strategy applied to the low risk segment is to maximize the number of applicants.

FIG. 20B presents medium risk segment graph environment 2010, which includes graphs 2011-2014. For these graphs and associated LTV cut off lines (2015, 2016, 2017, and 2018), refinanced vehicles apply the general strategy of maximizing the number of loan applicants while dealer purchased vehicles set LTV cut offs to limit escalating charge-off rates. Refinanced, used vehicles in the medium risk segment tend to have a relatively low charge-off rate (less than 0.6% at all collateral values, see FIG. 19A). Thus, the LTV cut off lines 2015 and 2016 are set to maximize the loans captured. Specifically, both lines 2015 and 2016 intersect the loan captured line 2043 at well above 85% of loans captured. However, for dealer purchased used vehicles in the medium risk segment, the charge-off rate, as seen in FIG. 19A, is substantially higher at roughly 1.5%. Thus, LTV cut off lines 2017 and 2018 are set at roughly 120% and 110%, respectively, to limit the charge-off rates to approximately 0.9% and 0.7%, respectively. However, by doing so, the loans captured are significantly reduced to roughly 60% for both lines 2017 and 2018. Thus, for dealer purchased, used car loans for medium risk segment applicants, LTV cut offs are set to reduce the risk absorbed by the organization at the expense of reducing the potential vehicle loan applicants.

FIG. 20C displays high risk segment graph environment 2020, which has graphs 2021-2024. The LTV cut off lines (2025-2028) set for these graphs are meant to limit escalating charge-off rates (see line 2042) and reduce the number of high risk segment applicants receiving loans. For example, the loans captured percentage for the LTV cut off lines 2025-2028 ranges from roughly 20%-65%. This is in stark contrast to the low risk segment, which had LTV cut off lines 2005-2008 with loans captured percentages above 90%. The number of applicants is limited because of the large charge-off rates associated with the high risk segment (0.97%-2.73%, according to FIG. 19A). Also, in addition to reducing the number of high-risk applicants, setting LTV cut off lines 2025-2028 to lower LTV values (80-125%, see FIGS. 18A, 20C) reduces the charge-off rates incurred by organization 101 for the high risk segment. In FIG. 20C, the charge-off rates at LTV cut off lines 2025-2028 range from 0.50% (line 2027 intersecting with line 2042 for graph 2023) to 1.25% (line 2028 intersecting with line 2042 for graph 2024). Thus, lower LTV cut offs for the high risk segment reduces risk for organization 101 by lowering the number of high risk vehicle loan applicants and limiting charge-off rates.

While FIGS. 20A-20C demonstrate for used car vehicle loans how a strategy to generate additional loan business while reducing risk can affect the LTV cut offs for different risk segments, similar results and strategic decisions can also be seen when analyzing collected data for other products. This includes used cars, recreational vehicles, boats, and/or other products. This may also include dealer purchased vehicles, refinanced vehicles, high collateral and/or low collateral loans, and/or other vehicles.

Also, results similar to those displayed in FIGS. 20A-20C may be seen for risk segments different than those displayed. For example, a very high risk segment 1359, and/or a very low risk segment, may also have associated vehicle loan data that can be charted into a graph. The graph data may also provide insight as to the effects of different LTV cut offs on the amount of business generated (via loans captured) and/or the amount of risk absorbed by the organization (via negative outcome rates and charge-off rates).

Furthermore, as discussed earlier, the risk segmentation and data analysis displayed in FIGS. 19A-20C are based on data collected regarding vehicle loans that were funded over an 18 month period. In some embodiments, new data may be collected and analyzed to update the risk segmentation and LTV cut off determination from model 1245. As a result, the LTV cut off determination model 1245 can be adjusted in response to updated data requiring new risk segmentation and LTV cut off determination, altered tolerance for risk by an organization 101, modified requirements for vehicle loan generation by an organization 101, and/or other events or changes.

LTV Cut Off Examples

Similar to the term determination model examples mentioned above, in one example, John Doe (applicant 150) submits an application to obtain a vehicle loan to refinance his used automobile, which has a collateral value of $20,000. John Doe's FICO score is determined to be 810. John Doe's application is approved for underwriting and the credit limit assignment model 230 is called. The model 230 calls LTV cut off determination model 1245 to determine the maximum LTV ratio 1275. The model 1245 determines the LTV cut off in accordance with table 1800. According to FIG. 19A, the collateral value ($20,000) is in line with a high collateral application, while John Doe's FICO score (810) corresponds with the low risk segment. Thus, FIG. 18A shows that John Doe's low risk, high collateral vehicle loan application to refinance his used car has an LTV cut off of 180%.

In another example, John Doe has a FICO score of 750 and seeks a vehicle loan for a boat with a collateral value of $15,000. Based on FIG. 19C, John Doe has a low collateral application and falls in the medium risk segment, due to his FICO score. As a result, table 1800 dictates that John Doe's medium risk, low collateral, boat purchase loan application has an LTV cut off of 130%.

In yet another example, John Doe has a FICO score of 700 and needs a loan for a motorcycle (Other product type) with a collateral value of $7000. Based on FIG. 19D, John Doe has a low collateral application that falls into the high risk segment due to his FICO score. Consequently, table 1800 dictates that John Doe's low collateral, high risk motorcycle purchase loan application has an LTV cut off of 140%.

In another example, John Doe has a FICO score of 810 and wants a loan for purchasing a new car with a collateral value of $30,000. Based on FIG. 19B, John Doe's FICO score of 810 places him in the low risk segment for a vehicle loan application for a new car purchase. In turn, table 1800 shows that John Doe's loan for a new car purchase should have an LTV cut off of 180%. In the case of a new car, the value of the collateral is not considered when determining the LTV cut off.

Payment Capacity Model

Figure 21:
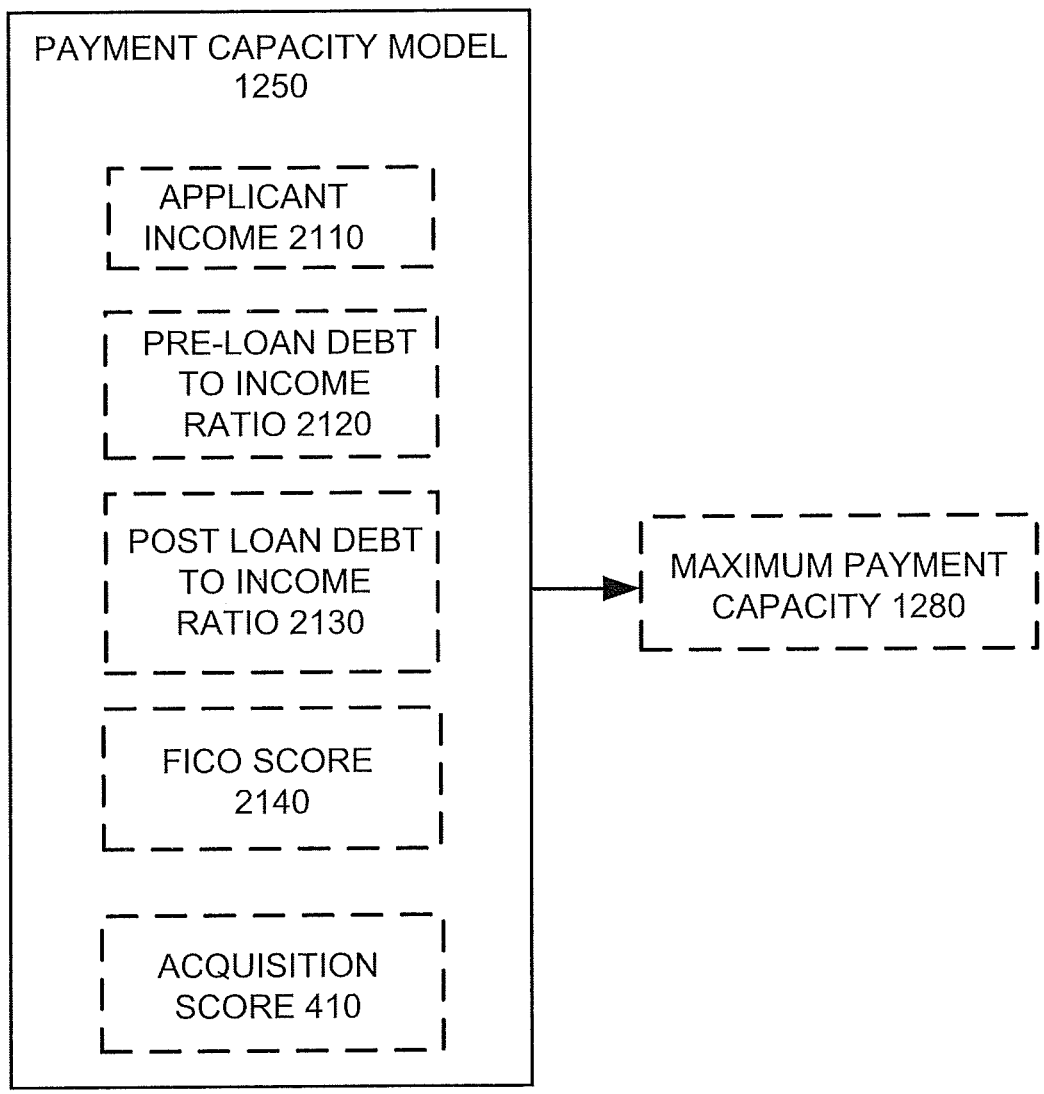
FIG. 21 is a block diagram of an example of a payment capacity model environment for the LTV cut off model, according to one embodiment.

FIG. 21 is a block diagram of the payment capacity model environment 2100. The environment includes payment capacity model 1250. The model 1250 generates the maximum payment capacity 1280. When generating this output, the model 1250 considers several factors. These factors include applicant income 2110, pre-loan debt to income (DTI) ratio 2120, post loan DTI ratio 2130, FICO score 2140, and acquisition score 410. Although the displayed embodiment only shows the factors mentioned above, in other embodiments, the model 1250 may consider more, less, and/or different factors than those displayed. Also, the model 1250 may output different and/or more outputs than those displayed.

Figure 22:
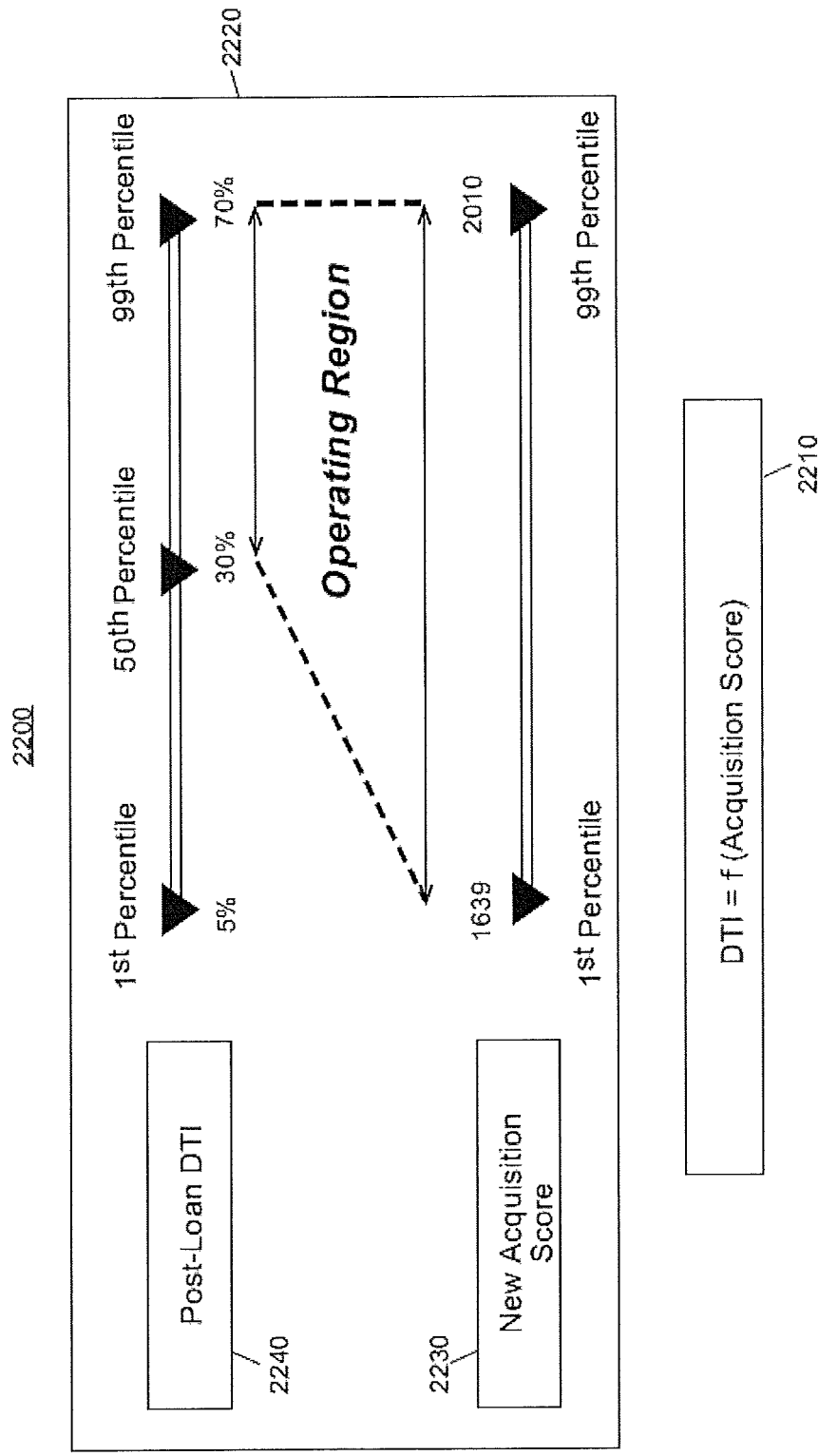
FIG. 22 is a diagram of an example of a maximum payment capacity calculation environment, according to one embodiment.

FIG. 22 displays one embodiment of a maximum payment capacity calculation environment 2200. The environment 2200 includes equation 2210 and chart 2220. The chart 2220 includes a lower axis 2230 and an upper axis 2240. The equation 2210 indicates that the post loan DTI ratio 2130 is a function of the acquisition score 410. In other words, the post loan DTI ratio is determined for an applicant based on the applicant's acquisition score 410.

Chart 2220 shows one example of a function for determining the post loan DTI ratio based on the acquisition score. The bottom axis 2230 indicates the applicant's acquisition score while the top axis 2240 indicates the applicant's post loan DTI ratio. In the displayed embodiment, the applicant's acquisition score ranges from 1639 ($1^{st}$ percentile) to 2010 ($99^{th}$ percentile). Although not displayed, the acquisition scores corresponding to the $25^{th}$, $50^{th}$, and $75^{th}$ percentiles would be 1757, 1875, and 1992, respectively.

The top axis 2240 shows that the $1^{st}$ percentile of applicants reported a ratio of 5%, the $50^{th}$ percentile of applicants reported a ratio of 30%, and the $99^{th}$ percentile of applicants reported a 70% ratio. Although not shown, applicants in the $25^{th}$ percentile reported the corresponding post loan DTI ratio 17.5% while applicants and $75^{th}$ percentile reported a post loan DTI ratio of 50%. As can be seen in chart 2220, the linear relationship between the acquisition score in the post loan DTI ratio across applicants in the bottom 50% of acquisition scores is different from the linear relationship exhibited for applicants in the top 50% of acquisition scores. Thus, using chart 2220, the post loan DTI ratio for an applicant can be assigned based on the applicant's acquisition score. For example, an applicant with an acquisition score of 1757 ($25^{th}$ percentile) would have reported a post loan DTI ratio of 17.5%. Additionally, an applicant with an acquisition score of 1875 ($50^{th}$ percentile) would have reported a post loan DTI ratio 30%. Furthermore, an applicant with the acquisition score of 1992 would have reported a post loan DTI ratio of 50% (75th percentile).

Although Chart 2220 demonstrates one possible function to determine a post loan DTI ratio based off an acquisition score, in other embodiments, other equations are possible. These equations can include linear, exponential, step, mapping, and/or other types of functions relating an acquisition score to a post loan DTI ratio. In some embodiments, more, less, and/or different variables from the acquisition score are used to determine the post loan DTI ratio.

Figure 23:
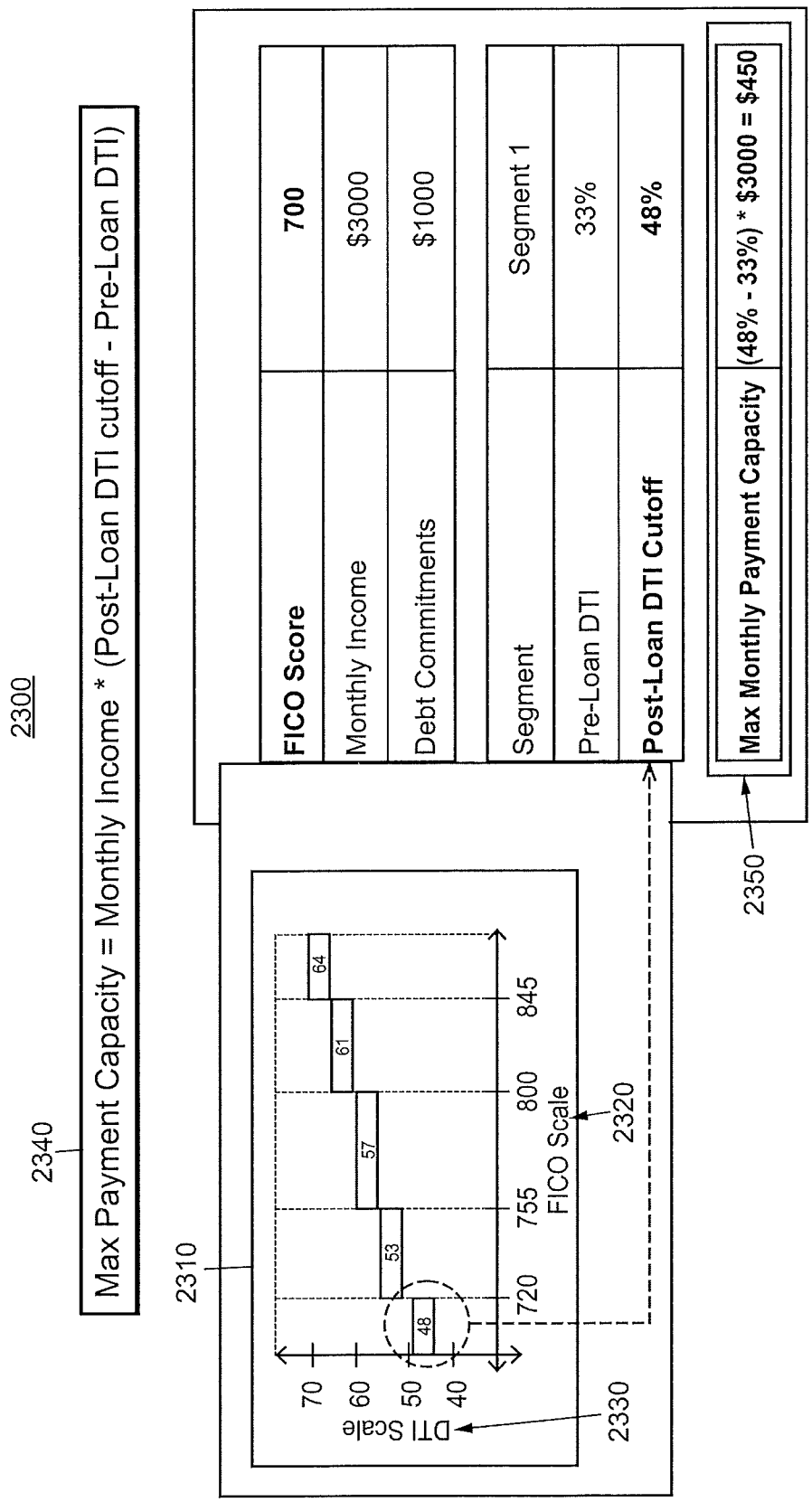
FIG. 23 is a diagram of an example of a maximum payment capacity calculation environment, according to another embodiment.

FIG. 23 shows another embodiment of a maximum payment capacity calculation environment 2300. In this embodiment, an applicant's FICO score is used to determine what post loan DTI ratio cut off the applicant should receive. Environment 2300 includes chart 2310, equation 2340, and example calculation 2350. Chart 2310 shows how an applicant's post loan DTI ratio cut off can be determined based on the applicant's FICO score. The chart 2310 includes horizontal axis FICO scale 2320 and vertical axis DTI scale 2330. The chart plots appropriate post loan DTI cut offs for an applicant's FICO score as a step function. For example, if the applicant has a FICO score below 720, the applicant's post loan DTI ratio cut off is 48%. Alternatively, if the applicant's FICO score is between 755 and 800, chart 2310 shows that the applicant's post loan DTI ratio cut off is 57%. In other embodiments, other equations, such as linear, exponential, and/or other types of functions are possible to relate an applicant's FICO score to an appropriate post loan DTI ratio cut off for the applicant.

Environment 2300 also includes equation 2340. Equation 2340 explains how to determine an applicant's maximum payment capacity based on the determined post loan DTI ratio cut off. As described in FIGS. 22 and 23, multiple ways are possible for determining the applicant's post loan DTI ratio cut off. Either of these embodiments, or another embodiment, can be used to determine the post loan DTI ratio cut off for an applicant. Once the cut off is determined, the cut off can be entered into equation 2340 to determine the applicant's maximum payment capacity.

Example calculation 2350 shows how financial information about the applicant is used to calculate the applicant's maximum monthly payment capacity. In the example calculation 2350, the applicant has a FICO score of 700, a monthly income of $3000, and pre-loan debt commitments of $1000. First, the applicant's pre-loan DTI ratio is calculated by dividing the applicant's pre-loan debt commitments of $1000 by the applicant's monthly income of $3000, resulting in a pre-loan DTI ratio of 33%. Next, using chart 2310, the applicant's FICO score of 700 results in a post loan DTI ratio cut off of 48%. From this, a maximum monthly payment capacity for the applicant can be determined by taking the difference between the post loan and pre-loan DTI ratios (48%-33% equals 15%) and multiplying this by the monthly income ($3000 multiplied by 15% equals $450) which results in a maximum monthly payment capacity of $450 for the applicant. In other embodiments, the payment capacity can be determined for a different, applicable period of time, such as a yearly, semi-annually, and/or weekly payment capacity.

Prequalification Model

The vehicle loan generation system 200 also includes the prequalification model 240. The model 240 determines if an applicant 150 is qualified to receive a vehicle loan offer. If so, the model 240 generates a prequalified offer for the applicant 150. The goal of the prequalified offer is to generate additional vehicle loan business by meeting the needs of the applicant 150 and reducing the risk taken by organization 101. However, these goals are often in tension. Nonetheless, by providing personalized, prequalification offers in line with limits determined by models 220 and 230, the model 240 attempts to generate additional vehicle loan business without having the organization absorb too much risk.

Figure 24:
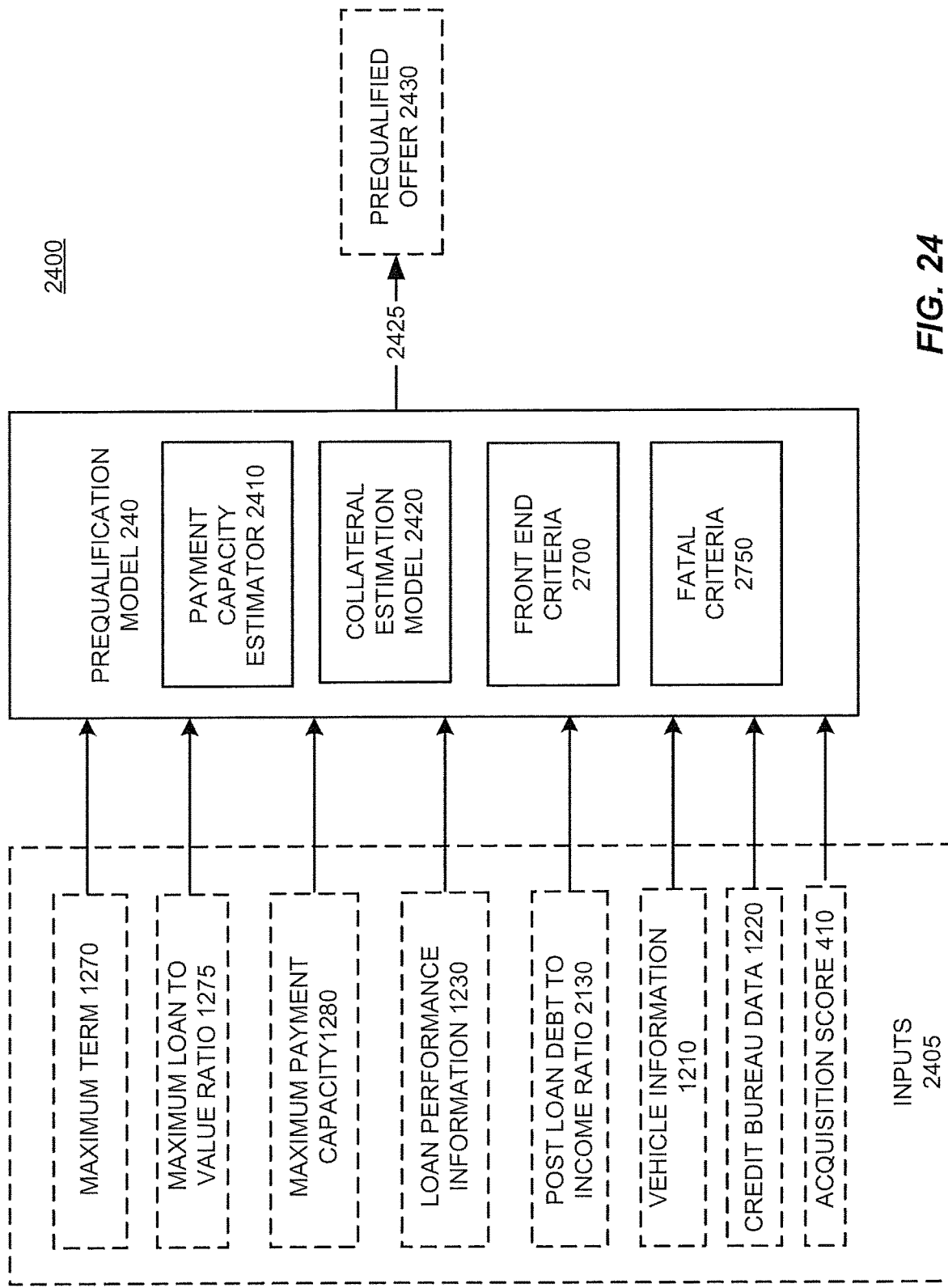
FIG. 24 is a block diagram of a prequalification model environment for the prequalification model, according to one embodiment.

FIG. 24 is a block diagram of a prequalification model environment 2400. In environment 2400, the prequalification model 240 receives inputs 2405 and generates outputs 2425. Model 240 includes the payment capacity estimator 2410, collateral estimation model 2420, front end criteria 2700, and fatal criteria 2750. These models and criteria are used to process inputs 2405 to generate outputs 2425. The inputs 2405 received by model 240 include vehicle information 1210, credit bureau data 1220, loan information 1230, an acquisition score 410, maximum term 1270, maximum LTV ratio 1275 (also called LTV cut off), maximum payment capacity 1280, and post loan debt to income (DTI) ratio 2130. The outputs 2425 generated by the model 240 include a prequalified offer 2430.

The vehicle information 1210, credit bureau data 1220, and loan information 1230 may be more, less, and/or different than the information and data received as inputs by model 230. Alternatively, the information and data 1210, 1220, and 1230 may be the same as that received by model 230. While the displayed embodiment shows acquisition score 410 as an input, other custom scores indicating credit worthiness of an applicant may be used. The maximum term 1270, maximum LTV ratio 1275, and maximum payment capacity 1280 are outputs 1260 from model 230 received as inputs 2405 by model 240. The post loan DTI ratio 2130 may also be received by model 240 from model 230. In some embodiments, model 240 receives more, less, and/or different inputs from model 230. The inputs 2405 may include more, less, and/or different inputs than those displayed in FIG. 24.

The prequalification model 240 processes inputs 2405 to determine outputs 2425, which include a prequalified offer 2430. The prequalified offer 2430 is an initial offer that indicates to an applicant 150 how much financing the applicant is approved for based on the estimated value of the applicant's collateral. The offer 2430 is meant to encourage the applicant 150 to respond to and seek a vehicle loan from organization 101. This allows organization 101 to achieve its goal of generating more vehicle loan business. In some embodiments, model 240 generates different and/or more outputs than those displayed in FIG. 24.

The model 240 relies on the payment capacity estimator 2410, collateral estimation model 2420, front end criteria 2700, and fatal criteria 2750 to process inputs 2405 to generate outputs 2425, which include the prequalified offer 2430. In some embodiments, the model 240 includes more, less, and/or different models, estimators, and/or criteria for processing inputs 2405 to generate outputs 2425.

Figure 25:
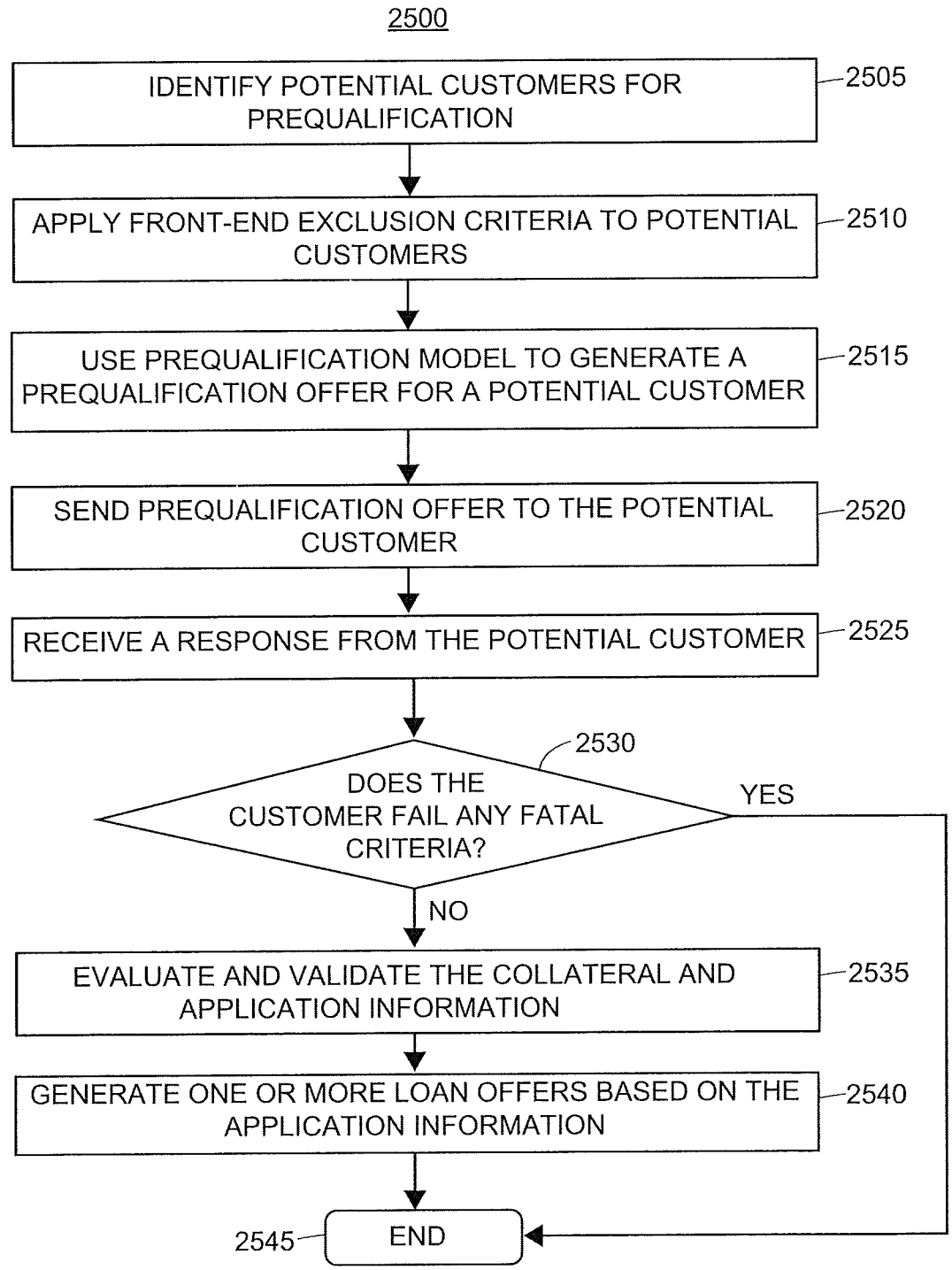
FIG. 25 is a flow diagram of an example method for generating a prequalification offer for an applicant and processing the subsequent response, according to one embodiment.

FIG. 25 is a diagram of an example method 2500 for how model 240 processes inputs 2405 to generate outputs 2425. First, the model identifies potential customers for prequalification (block 2505). In one embodiment, model 240 does this by retrieving from database 103 applicants who were approved during the underwriting process. These applicants may include applicants that were automatically approved by model 220, and applicants who were manually approved during the underwriting process by model 260. In another embodiment, model 240 only retrieves applicants that were automatically approved during the underwriting process.

Next, model 240 applies front end exclusion criteria to the potential customers (block 2510). After that, model 240 generates a prequalification offer for a potential customer (block 2515). In one embodiment, model 240 processes inputs 2405 to generate the prequalified offer 2430. The model 240 may rely on the collateral estimation model 2410 and the payment capacity estimator 2420 to generate the prequalified offer 2430.

Following this, the model 240 sends the prequalification offer to the potential customer (block 2520). After that, the model 240 receives a response from the potential customer (block 2525). Next, the model 240 answers the question of whether the customer fails any of the fatal criteria (block 2530). If the answer is "yes," then method 2500 ends (block 2545). Otherwise, if the answer is "no," then the model 240 evaluates and validates the collateral and application information (block 2535). Following this, one or more loan offers are generated for the applicant 150 based on the application information received (block 2540). After that, the method 2500 ends (block 2545). In some embodiments, the method 2500 includes more, less, and/or different steps than those displayed in FIG. 25. In other embodiments, the method 2500 includes the displayed steps arranged in an order that is different from the order shown.

Figure 26:
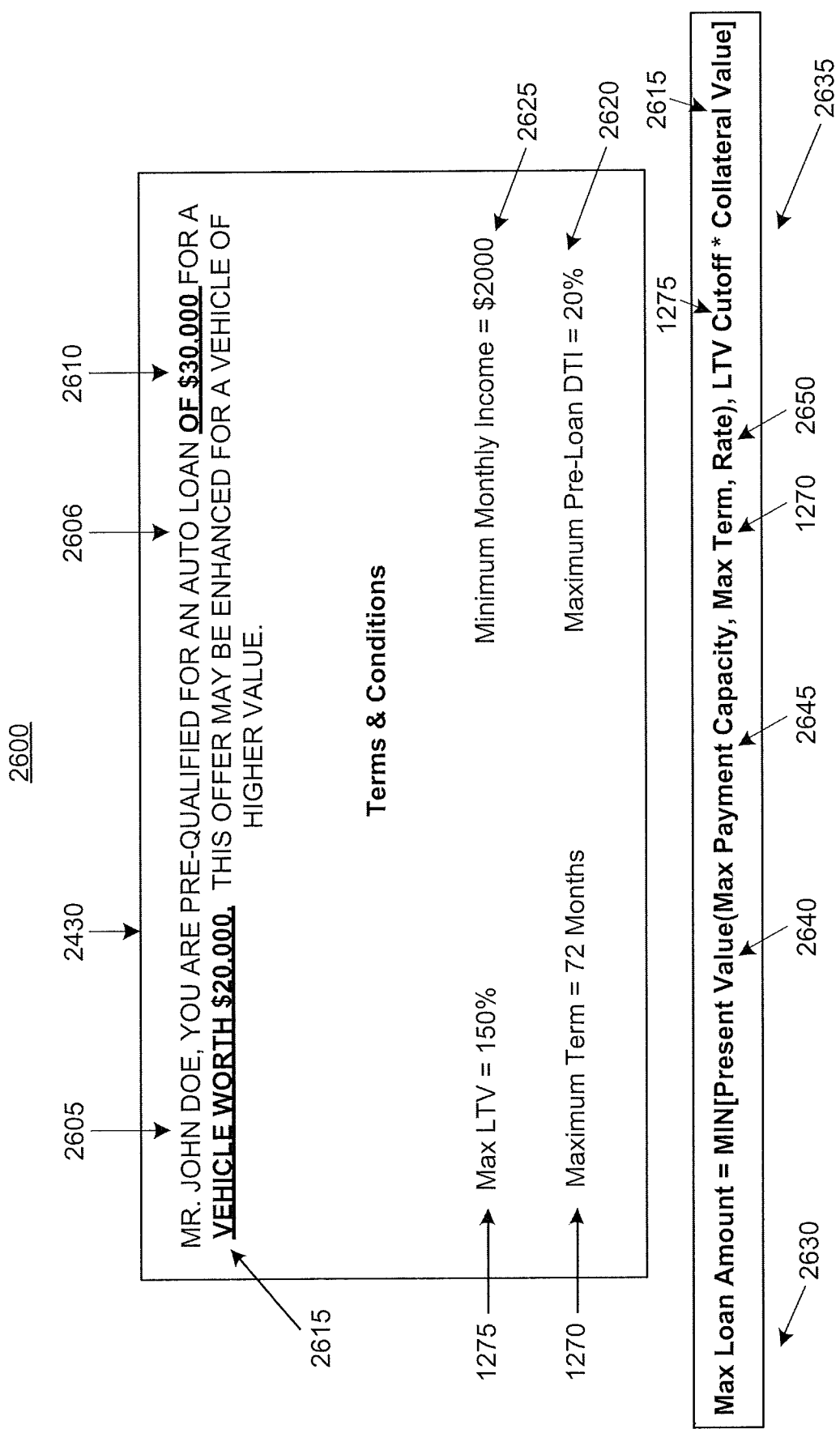
FIG. 26 is an example diagram of a prequalification offer, according to one embodiment.

FIG. 26 is a diagram of a prequalification offer environment 2600. Environment 2600 includes prequalification offer 2430. The prequalification offer 2430 includes an applicant name 2605, an applicant loan type 2606, a prequalified vehicle loan amount 2610, and a collateral value 2615. The offer 2430 also includes terms and conditions including a maximum term 1270, a maximum LTV ratio 1275, a maximum pre-loan DTI ratio 2620, and a minimum monthly income 2625. Also, environment 2600 includes equation 2630 for determining the maximum loan amount to provide for a prequalified vehicle loan amount 2610 for a prequalification offer 2430. The maximum pre-loan DTI ratio 2620 indicates the maximum ratio an applicant is allowed for the prequalified vehicle loan offer to remain valid. The minimum monthly income 2625 indicates the minimum income the applicant must maintain for the prequalified vehicle loan offer to remain valid.

In the displayed embodiment, applicant John Doe receives a prequalification offer 2430 addressed to "Mr. John Doe" 2605 for an "Auto Loan" vehicle loan type 2606. The prequalified vehicle loan amount 2610 of $30,000 is based on a collateral value 2615 of $20,000. The offer 2430 also includes terms and conditions, such as a maximum term 1270 of 72 months, a maximum LTV ratio 1275 of 150%, a maximum pre-loan DTI ratio 2620 of 20%, and a minimum monthly income 2625 of $2000 for the applicant 150.

The various components of the offer 2430 may be received as inputs, determined by other vehicle loan generation system models, and/or determined by the prequalification model 240. For example, the applicant name 2605 and vehicle loan type 2606 may be determined from inputs 2405 received by the prequalification model 240, including vehicle information 1210, credit bureau data 1220, and/or loan performance information 1230. Alternatively, the maximum term 1270 and maximum LTV ratio 1275 are received from the credit limit assignment model 230.

The model 240 determines the maximum pre-loan DTI ratio 2620, the minimum monthly income 2625, the collateral value 2615, and the prequalified vehicle loan amount 2610. The maximum pre-loan DTI ratio 2620 may be determined by the payment capacity estimator 2410, which is described later with FIG. 28. The minimum monthly income 2625 may be determined based off credit bureau data 1220 received for an applicant 150. This is described in further detail with FIG. 28 for the payment capacity estimator 2410. The collateral value 2615 is calculated by the collateral estimation model 2420, which is described in further detail in FIGS. 29-31D.

The prequalified vehicle loan amount 2610 is calculated based on equation 2630. The amount 2610 is the minimum value between vehicle loan amounts 2635 and 2640.

Amount 2635 is the product of the collateral value 2615 and maximum LTV ratio 1275 (LTV Cutoff). As mentioned earlier, the collateral value 2615 is determined by the collateral estimation model 2420 while the maximum LTV ratio 1275 is received as an input from the credit limit assignment model 230.

The amount 2640 equals the present value of monthly payments occurring for a maximum term 1270 (Max Term) at a specified interest rate 2650 ("Rate") with each payment equaling the maximum payment capacity 2645. The maximum payment capacity 2645 is determined by the payment capacity estimator 2410, as described later with FIG. 28. The maximum term 1270 is an input received from the credit limit assignment model 230 while interest rate 2650 is specified by the model 240.

The interest rate 2650 specified by model 240 may depend on various factors, including the vehicle loan term, the collateral value, purchase type, product type, loan type, geographic location of the applicant, credit worthiness of the applicant, credit data of the applicant, an acquisition score, FICO score of the applicant, economic data, the organization's tolerance for risk, the organization's need for generating business, risk segmentation, and/or other factors. The interest rate may be a monthly or annual interest rate. Alternatively, the interest rate could apply for a different, appropriate time period.

In the displayed example of FIG. 26 for applicant John Doe, the prequalification vehicle loan amount 2610 is equal to the amount 2635 from equation 2630. Specifically the amount 2635 is calculated by multiplying the collateral value 2615 of $20,000 by the maximum LTV ratio 1275 of 150%, resulting in a value of $30,000 for amount 2635. Further, John Doe's prequalification vehicle loan amount 2610 is $30,000 because amount 2635 is less than term 2645.

For example, in FIG. 26, if the maximum payment capacity 2645 for John Doe is $1000 per month, and the interest rate 2650 is 0%, then 72 monthly payments (maximum term 1270) of $1000 at 0% interest would have a present value of $72,000. Thus, the amount 2640 would be $72,000. Because the amount 2640 of $72,000 is larger than the amount 2635 of $30,000, the equation 2630 requires a prequalification vehicle loan amount 2610 of no more than $30,000 for John Doe. Alternatively, if the interest rate 2650 was larger than 0%, the term 2645 would be less than $72,000, and set as the amount 2610 for values below $30,000 (amount 2635). In some embodiments, the equation 2630 includes more, fewer, and/or different variables than those displayed and/or discussed above.

The prequalification offer 2430 may indicate other information about the loan, such as vehicle condition (new or used), purchase type (dealer purchase or refinance), and/or other loan information. The offer 2430 may include more, less, and/or different terms and conditions than those displayed. Alternatively, the offer 2430 may not include terms and conditions. The prequalification offer 2430 may be sent to the applicant 150 via email, mail, text message, phone call, fax, social network site post, forwarded message, social network site microblog, conversation, and/or other methods for an organization 101 to communicate with an applicant 150. Alternatively, a third-party entity may communicate the prequalified offer on behalf of organization 101 to the applicant 150.

Front End and Fatal Criteria

FIG. 27A displays an embodiment of the front-end criteria 2700 that may be used by the prequalification model 240. Specifically, as discussed in FIG. 25, model 240 may apply front-end exclusion criteria 2700 (block 2510) to potential customers for generating a prequalification offer 2430. In general, if any of the displayed front-end criteria 2700 are true with regards to an applicant 150, the applicant 150 is rejected from receiving a vehicle loan prequalification offer. In some embodiments, more, less, and/or different front-end criteria may be used to exclude applicants.

FIG. 27B shows an embodiment of fatal criteria 2750 that model 240 may use to exclude applicants. Specifically, as discussed in FIG. 25, after receiving a response from a potential customer (block 2525), the model 240 applies the fatal criteria 2750 (block 2530) and excludes applicants if any one of the fatal criteria 2750 is true. In some embodiments, more, less, and/or different fatal criteria 2750 may be used to exclude applicants.

For example, if applicant John Doe is deceased, then John Doe would not be prequalified for a loan because his application satisfied front-end exclusion criteria 2700 SI. No. 1 (see FIG. 27A). Thus, model 240 would not generate a prequalification offer for John Doe. Alternatively, if John Doe had a FICO score of 670, John Doe would not be prequalified for a vehicle loan because his application satisfied front-end exclusion criteria 2700 SI. No. 22 (see FIG. 27A). Accordingly, model 240 would not generate a prequalification offer for John Doe.

For another example, if John Doe has a collection account of $1900, then John Doe would no longer be pre-qualified for a loan because his application satisfied fatal criteria 2750 SI. No. 1 (see FIG. 27B). Therefore, model 240 would rescind the prequalification offer for John Doe. In yet another example, if John Doe had an outstanding judgment against him for $1900, John Doe would no longer be pre-qualified for a vehicle loan because his application met fatal criteria 2750 SI. No. 4 (see FIG. 27B). Accordingly, model 240 would rescind the prequalification offer for John Doe.

Payment Capacity Estimator

Figure 28:
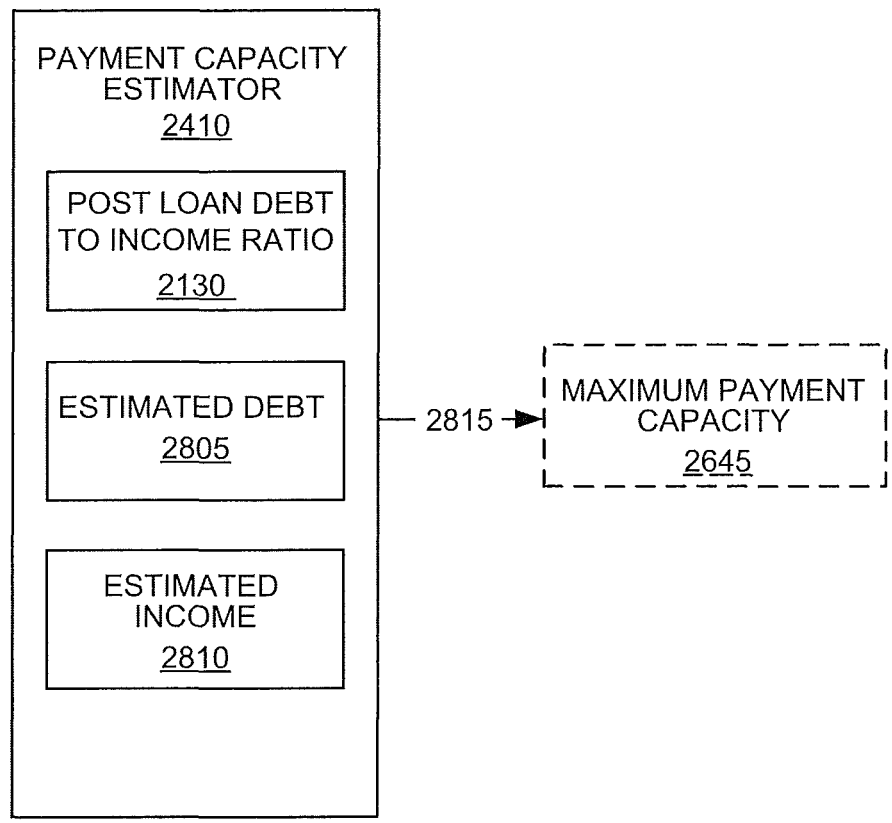
FIG. 28 is a block diagram of a payment capacity estimator environment, according to one embodiment.

The payment capacity estimator 2410 is called by prequalification model 240 to determine the maximum payment capacity 2645 of the applicant 150. FIG. 28 displays the payment capacity estimator environment 2800. Environment 2800 includes the payment capacity estimator 2410 and outputs 2815. In the displayed embodiment, the estimator 2410 uses several factors to generate outputs 2815, including the post loan DTI ratio 2130, the estimated debt 2805, and an estimated income 2810. In the displayed embodiment, the outputs 2815 include the maximum payment capacity 2645. However, the outputs 2815 could include more and/or different outputs than those shown. Also, in some embodiments, the estimator 2410 relies on more, less, and/or different factors than those displayed.

The estimator 2410 relies on equation 2820 to determine the maximum payment capacity 2645. The pre-loan DTI ratio (Pre-Loan DTI) is calculated by dividing the estimated debt 2805 with the estimated income 2810. In some cases, the pre-loan DTI ratio is set to the maximum pre-loan DTI ratio 2620 for the prequalification offer 2430. Also, the "Monthly Income" of equation 2820 is determined based off estimated income 2810 while Post-Loan DTI cutoff is given by post loan DTI ratio 2130.

For example, if an applicant John Doe has a post loan DTI ratio 2130 of 55%, an estimated debt 2805 requiring a $500 per month payment, and an estimated income 2810 of $1000 per month, equation 2820 can be used to determine the maximum payment capacity 2645 for John Doe. Specifically, the pre-loan DTI is determined by dividing the estimated debt 2805 monthly payment of $500 by the estimated income 2810 monthly collection of $1000, resulting in a pre-loan DTI ratio of 50%. Next, the difference of the post loan DTI cut off 55% (post loan DTI ratio 2130) and pre-loan DTI ratio of 50% equals 5% (55%–50% equals 5%). This difference (5%) multiplied by the monthly income of $1000 per month (estimated income 2810) results in a maximum payment capacity 2645 of $50 per month [$50=$1000*(55%–50%)].

In the displayed embodiment of FIG. 28, the post loan DTI ratio 2130 is an input received by the prequalification model 240 from the credit limit assignment model 230. However, in other embodiments, the model 240 calculates the post loan DTI ratio 2130. In the displayed embodiment of FIG. 28, the estimated debt 2805 and estimated income 2810 are determined from credit bureau data 1220 received by the model 240. In some embodiments, the estimated debt 2805 is derived from the variable "Aggregate Monthly Payment for Open Trades" while the estimated income 2810 is derived from the variable "Income Insight W2." In other embodiments, different methods, variables, and/or data may be used to determine the estimated debt 2805 and estimated income 2810.

In some embodiments, the estimator 2410 may rely on one or more different equations and/or criteria to generate outputs 2815. For example, the estimator 2410 may rely on similar methods disclosed for the payment capacity model 1250 (see FIGS. 21, 22, and 23 and the accompanying descriptions).

Collateral Estimation Model

Figure 29:
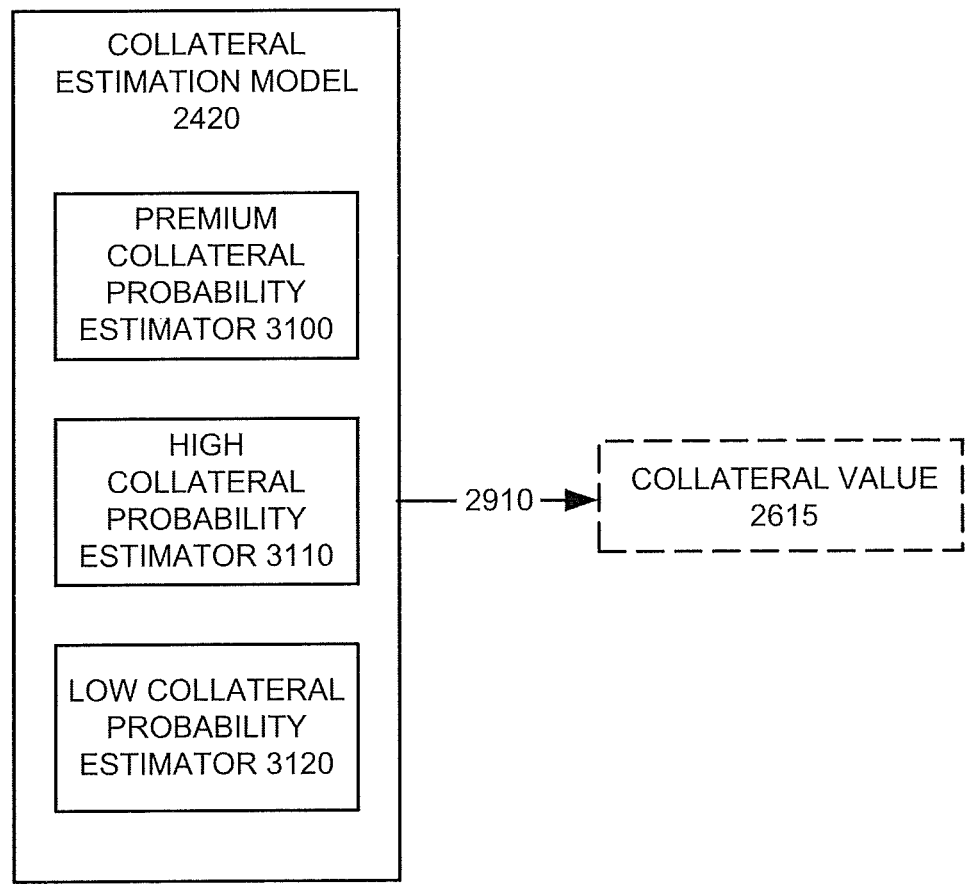
FIG. 29 is a block diagram of a collateral estimation environment, according to one embodiment.

The collateral estimation model 2420 is called by prequalification model 240 to determine the value of the collateral of the applicant 150. FIG. 29 displays the collateral estimation environment 2900. Environment 2900 includes collateral estimation model 2420 and outputs 2910. In the displayed embodiment, collateral estimation model 2420 includes a premium collateral probability estimator 3100, a high collateral probability estimator 3110, and a low collateral probability estimator 3120. The collateral estimation model 2420 uses these estimators to generate outputs 2910. In the displayed embodiment, the outputs 2910 include the collateral value 2615. In some embodiments, model 2420 includes more, less, and/or different models, estimators, and/or criteria than those displayed. In some embodiments, the outputs 2910 include more, and/or different outputs than those shown.

FIG. 30A shows one embodiment of collateral segmentation table 3010. In the displayed embodiment, table 3010 includes three collateral segments: low collateral, high collateral, and premium collateral. Premium collateral is for collateral values above $50,000. High collateral is for collateral values above $25,000 and less than or equal to $50,000. Meanwhile, low collateral is for collateral values less than or equal to $25,000. As shown in the table, nearly 55% of all applications have low collateral, while roughly 44% of applications have high collateral. The remaining applications fall into the premium collateral segment.

While the displayed embodiment shows three different collateral segments, more, less, and/or different collateral segments are possible. Additionally, different collateral value ranges could be assigned to collateral segments than those shown. Furthermore, the number of applications that fall within these segments may be different than what is shown in FIG. 30A. For example, the collateral segments could have collateral value ranges selected to encourage a particular distribution of applications across the three segments. Specifically, collateral segments could be defined by collateral value ranges to ensure that roughly 33% of applications fall within each different collateral segment, thus causing an equal distribution of the applications across the three collateral segments. Alternatively, different distributions, such as an unequal distribution of applications across the collateral segments, could be achieved with different collateral value ranges.

In the displayed embodiment, the collateral segments, values of the collateral segments, and number of applications within those segments is based on data collected by an organization 101, as discussed earlier for risk segmentation for FIGS. 14A-15C and 19A-20D. Similarly, if the collected data changes or is modified, different collateral segments may be generated.

Model 2420 may achieve different objectives by assigning a value to collateral. In the displayed embodiments of FIGS. 25 and 30B, when model 2420 attempts to assign a value to collateral, the model 2420 is focused on determining the probability of receiving a response from the applicant 150 to the prequalification offer (see block 2525 from FIG. 25). The probability of this response varies based on the collateral value assigned. Thus, model 2420 attempts to assign an appropriate collateral value to encourage the applicant 150 to respond to the prequalification offer (block 2525 from FIG. 25). However, in some instances, the collateral estimation model 2420 may be designed to estimate collateral to achieve a different purpose. For example, the model 2420 may estimate collateral to approximate fair market value for the collateral, regardless of the effect on the response rate of a prequalification offer.

Figure 30B:
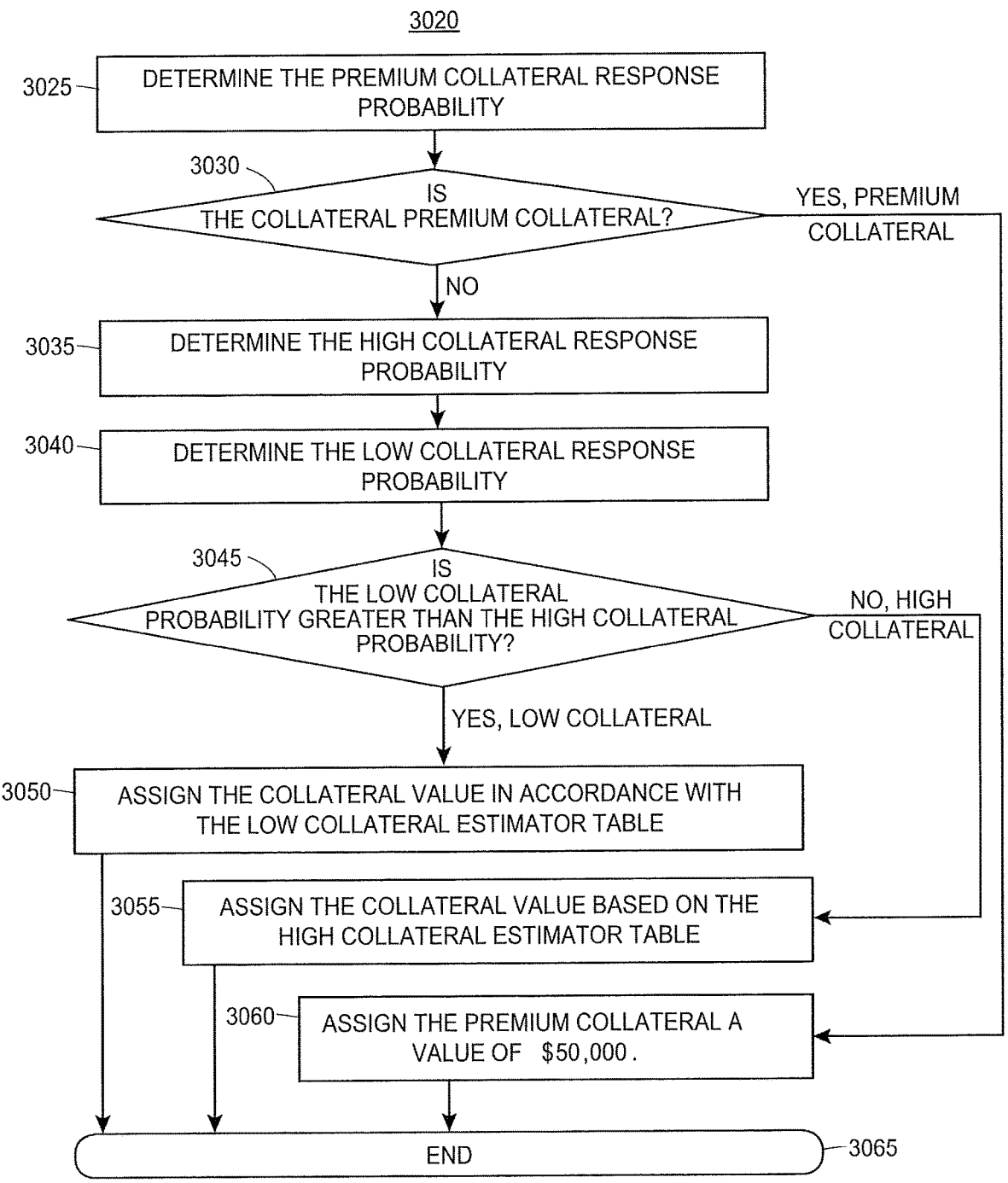
FIG. 30B is a flow diagram of a method for assigning a value to collateral, according to one embodiment.

FIG. 30B displays an example of collateral value assignment method 3020. The method 3020 may be executed by collateral estimation model 2420. First, model 2420 determines premium collateral response probability (block 3025). In this case, model 2420 may call premium collateral probability estimator 3100 (see FIGS. 29A, 31A) to execute blocks 3025. Next, model 2420 then answers the question of whether the collateral is premium collateral (block 3030). In this embodiment, the model 2420 answers the question "yes" when the determined premium collateral response probability is greater than or equal to a premium collateral response probability threshold, which in this case, is 7.9% (not displayed). In some embodiments, a higher (or lower) threshold percentage may be used than 7.9%. If the answer to the premium collateral question (block 3030) is yes, then the method 3020 proceeds to step 3060. Here, model 2420 assigns the premium collateral a value of $50,000 (block 3060). After that, the method 3020 ends (block 3065).

If the answer to the question (block 3030) is "no," the method 3020 then proceeds to block 3035. Next, the method 3020 determines the high collateral response probability (block 3035). Specifically, collateral estimation model 2420 calls high collateral probability estimator 3110. Afterwards, method 3020 determines the low collateral response probability (block 3040). Specifically, model 2420 calls the low collateral probability estimator 3120. Once determined, method 3020 then answers the question of whether the low collateral response probability is greater than the high collateral response probability (block 3045). If the answer is "no," the collateral is high collateral, and method 3020 proceeds to block 3055. Here, the method 3020 assigns the collateral a value based on a high collateral estimator table (see FIG. 30D) (block 3055). After that, the method ends (block 3065).

Alternatively, if the answer is "yes," the collateral is low collateral, and the method 3020 assigns the collateral a value in accordance with the low collateral estimator table (see FIG. 30C) (block 3050). Next, the method 3020 ends (block 3065).

While the described method 3020 determines a collateral segment (premium, high, or low) by comparing response probabilities, other factors may be considered for determining collateral segments. For example, a collateral value could be analyzed, with certain values corresponding to a premium, high, low, or other collateral segment. In some embodiments, the method 3020 includes more, less, and/or different steps than those displayed in FIG. 30B. In other embodiments, the method 3020 includes the displayed steps arranged in a different order from the order shown.

FIG. 30C shows the low collateral estimator table 3051 (see block 3050 from FIG. 30B). Also, FIG. 30D shows the high collateral estimator table 3056 (see block 3055 FIG. 30B). For low collateral, table 3051 assigns a collateral value equal to the average collateral value based on the low collateral probability response determined (see block 3040). For example, if the low collateral had a low collateral probability response of 61%, the low collateral receives a value of $24,900, according to table 3051. Alternatively, if the low collateral had a low collateral probability response of 89%, the low collateral is assigned a value of $21,400. Once the low collateral receives a value, the collateral estimation model 2420 can generate a collateral value output 2615 equal to the assigned value.

For high collateral, table 3056 sets a collateral value equal to the average collateral value that corresponds with a high collateral probability response determined (see block 3035). For example, if the high collateral had a high collateral probability of 88%, the assigned value for high collateral would be $33,100, according to table 3056. Alternatively, if the high collateral a high collateral probability response of 47%, the high collateral would receive a value of $26,800, according to table 3056. After the high collateral receives a value, the collateral estimation model 2420 can create a collateral value output 2615 equal to the assigned value. For premium collateral, in the displayed embodiment, the model 2420 automatically assigns a value of $50,000 and generates an equivalent collateral value output 2615.

Although the displayed embodiments of FIGS. 30C and 30D assign the average collateral value for applications with a corresponding probability, in some embodiments, a larger, smaller, and/or different collateral value may be assigned than those displayed. For example, assigned collateral values could be the average collateral value plus or minus an offset (for example, $500). Additionally, in some embodiments, the probability ranges may be smaller, larger, and/or different than those displayed in FIGS. 30C and 30D. Also, while FIGS. 30C and 30D display 10 groups of probability ranges, it's possible that more or less probability ranges could be used. Furthermore, while the displayed embodiment for FIGS. 30A-30D assign one value to premium collateral ($50,000), in other embodiments, premium collateral could be assigned multiple values. For example, similar to what is shown in FIGS. 30C and 30D, multiple collateral values could be assigned based on the premium collateral probability response.

FIG. 31A displays an embodiment of the premium collateral probability estimator 3100. The estimator 3100 analyzes the data associated with an applicant 150 to determine the probability of the applicant responding to a prequalification offer that categorizes the collateral as premium collateral (premium collateral probability response). FIG. 31B shows an embodiment of the high collateral probability estimator 3110. Estimator 3110 processes the data associated with an applicant 150 to calculate the probability of the applicants responding to a prequalification offer that categorizes his collateral as high collateral (high collateral probability response). FIG. 31C provides an embodiment of the low collateral probability estimator 3120. The estimator 3120 uses the data associated with an applicant 150 to figure out the probability of the applicant responding to a prequalification offer that categorizes the collateral of the applicant as low collateral (low collateral probability response).

Each estimator displayed in FIGS. 31A-C includes multiple variables, a description for each variable, and a contribution percentage for each variable towards the probability response calculated by the corresponding probability estimator. The contribution percentage represents the numerical weight to assign to the variable when calculating the premium collateral probability response using the estimator 3100. Similar to FIG. 6, while the displayed embodiments of FIGS. 31A-C show different contribution values for each variable (e.g., "A %", "B %", etc.), in some embodiments, two or more variables may have the same contribution value (e.g., multiple variables in FIG. 31A having a contribution value of "A %").

Each estimator (3100, 3110, and 3120) also includes a variable called intercept. The intercept variable allows an offset to be included in the probability response calculation, if necessary. The intercept variables are independent for each estimator. That is, the intercept variable for the estimator 3100 may be different from the intercept variable for the estimator 3110, which may be different from the intercept variable for the estimator 3120. While FIGS. 31A-C display an embodiment of each estimator, in other embodiments, each estimator may have more, less, and/or different variables than those displayed. Additionally, each estimator may have higher, lower, and/or different contributions assigned to each variable than those displayed.

FIG. 31D shows key coded estimator variable table 3130 for the key coded monthly payment for the oldest open auto trade variable. This variable is used by estimators 3100, 3110, and 3120. While the displayed embodiment 3130 shows 12 different key codes, in other embodiments, more, less, and/or different key codes than those displayed are possible. Additionally, the monthly payment amount ranges may be larger, smaller, and/or different than those displayed in FIG. 31D. Also, in other embodiments, the variable monthly payment for oldest open auto trade may not be key coded. For FIGS. 31A-31D, estimators 3100, 3110, and 3120 may include more, less, and/or different key coded variables than those displayed.

In the displayed embodiment of FIGS. 29-31D, the collateral segments (premium collateral, high collateral, and low collateral) were determined by analyzing vehicle loans for new cars over a determined time period. In the displayed embodiment, the time period is 18 months. However a different time period, such as one year, two years, or three years, could be used. The applications were analyzed to determine various statistics about the performance of the loans, including vehicle collaterals, response to prequalification offer probabilities, financial data about the applicant, and/or other data and statistics relevant to the vehicle loan and the applicant. Although the estimators 3100, 3110, and 3120 (see FIGS. 31A-31D) were developed using logistic regression analysis, other statistical methods could be used to develop models to predict probability responses for different collateral segments based on various financial, loan performance, credit, and/or other data.

Collateral Estimation Model Example

In one example, the prequalification model 240 receives inputs and data about the auto loan application from applicant John Doe. The model 240 calls collateral estimation model 2420 to determine the value of the collateral associated with John Doe's application. The collateral estimation model 2420 executes method 3020 (see FIG. 30B) to determine the value of the collateral.

The model 2420 calls the premium collateral probability estimator 3100 to determine the premium collateral response probability 3025. In this example, the premium collateral response probability is determined to be 10%. Next, model 2420 determines if the collateral is premium collateral 3030 by comparing the premium collateral response probability (10%) with the premium collateral response probability threshold (7.9%). Because the response probability of 10% is larger than the threshold of 7.9%, the collateral is considered premium collateral. As a result, model 2420 assigns the collateral a value of $50,000 (see block 3060 in the FIG. 30B). Once the collateral value is assigned, the model 2420 generates outputs 2910 reflecting the collateral value output 2615 as $50,000.

In another example, once the prequalification model 240 calls the collateral estimation model 2420 to assign a collateral value, the model 2420 executes method 3020. The model 2420 calls the premium collateral probability estimator 3100 to determine the premium collateral response probability 3025. In this example, the premium collateral response probability is determined to be 5%. Afterwards, model 2420 determines if the collateral is premium collateral 3030 by comparing the premium collateral response probability 3025 (5%) with the premium collateral response probability threshold (7.9%). Because the response probability of 5% is lower than the threshold of 7.9%, the collateral is not classified as premium collateral.

Next, the model 2420 calls the high collateral probability estimator 3110 to determine the high collateral response probability 3035. Model 2420 also calls the low collateral probability estimator 3120 to determine the low collateral response probability 3040. In this example, the high collateral response probability is 55% while the low collateral response probability is only 45%. Because the low collateral response probability is less than the high collateral response probability (45%<55%), the collateral is assigned to the high collateral segment. Next, the model 2420 relies on the high collateral estimator table 3056 to assign a collateral value 3055. In this case, the high collateral response probability of 55% translates to an average collateral value $28,300. Thus, the collateral estimation model 2420 generates outputs 2910 with a collateral value output 2615 of $28,300.

In yet another example, the collateral estimation model 2420 executes method 3020 after being called upon by prequalification model 240. The model 2420 calls the premium collateral probability estimator 3100 to determine the premium collateral response probability 3025. In this example, the premium collateral response probability is determined to be 5%. Next, model 2420 determines if the collateral is premium collateral 3030 by comparing the premium collateral response probability (5%) with the premium collateral response probability threshold (7.9%). Because the response probability of 5% is lower than the threshold of 7.9%, the collateral is not considered premium collateral.

Next, the model 2420 calls the high collateral probability estimator 3110 to determine the high collateral response probability 3035. Model 2420 also calls the low collateral probability estimator 3120 to determine the low collateral response probability 3040. In this example, the high collateral response probability 3035 is 45% while the low collateral response probability 3040 is 55%. Because the low collateral response probability 3040 is greater than the high collateral response probability 3035 (55%>45%), the collateral is assigned to the low collateral segment. Next, the model 2420 relies on the low collateral estimator table 3051 to assign a collateral value 3050. In this case, the low collateral response probability 3040 of 55% translates to an average collateral value of $25,000. Thus, the collateral estimation model 2420 generates outputs 2910 with a collateral value output 2920 of $25,000.

In some embodiments, the high collateral response probability and low collateral response probability are dependent variables, meaning the sum of the variables must be less than or equal to 100%. In other embodiments, the high collateral response probability and low collateral response probability are independent variables. In these scenarios, the sum of the high collateral response probability and low collateral response probability may be less than, greater than, or equal to 100%.

Multiple Offers Model

The vehicle loan generation system 200 also includes the multiple offers model 250. The multiple offers model 250 generates multiple offers for an applicant 150. Additionally, the multiple offers model 250 customizes offers for an applicant 150. When generating multiple offers, the model 250 relies on previously calculated metrics, such as maximum terms, amounts, and LTV ratios. Based on these previously calculated values, additional credit data, vehicle information, applicant information, and various business rules, the multiple offers model 250 generates multiple offers for an applicant 150. The vehicle loan offers will differ with regards to the term, the monthly payments, the loan amount, and the interest rate. By generating multiple offers for the vehicle loan generation system 200, an applicant 150 is able to choose the vehicle loan offer that best suits him. Further, the model 250 may allow the applicant 150 to enter his own chosen parameters to generate a customized vehicle loan offer.

Figure 32:
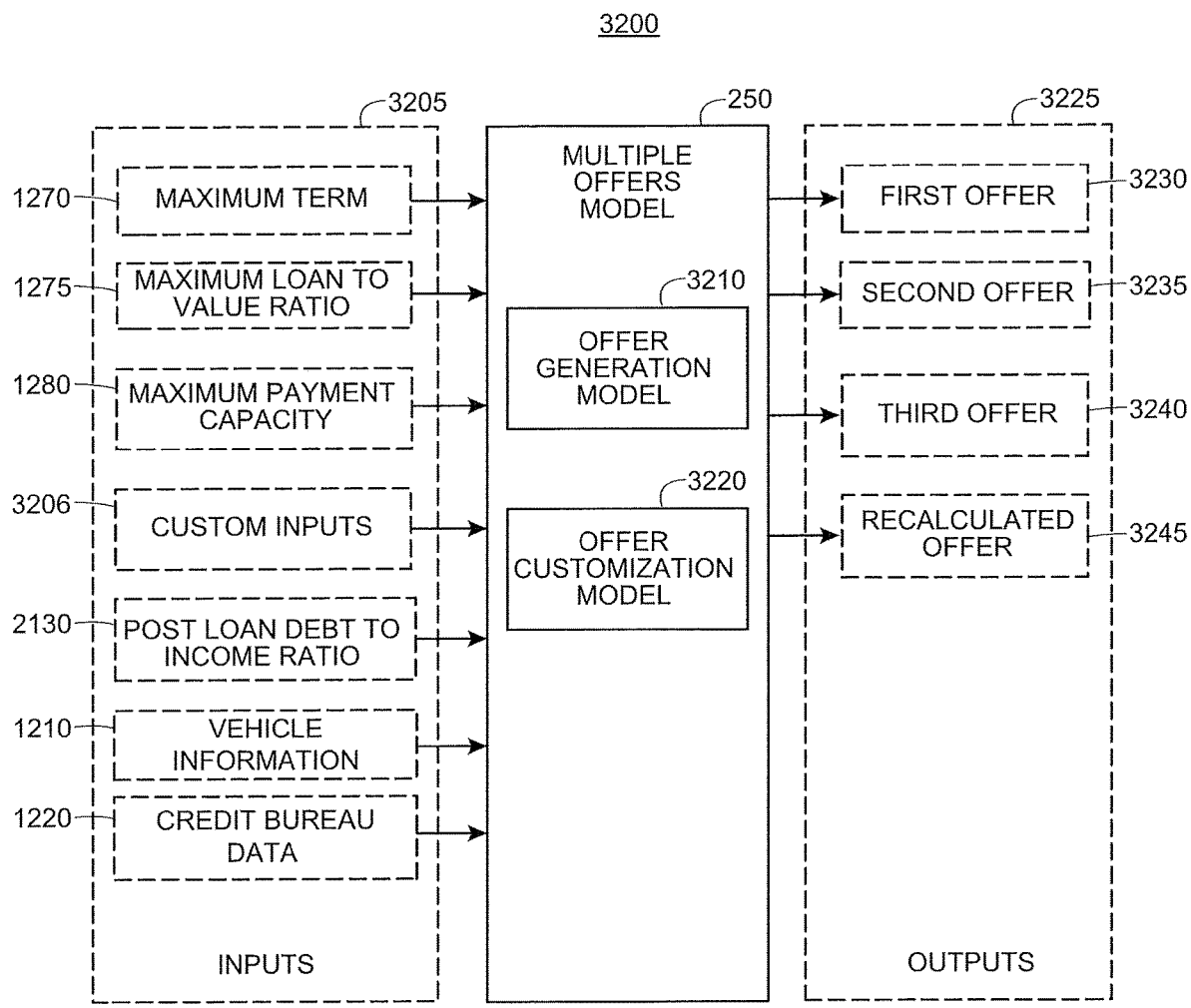
FIG. 32 is a block diagram of a multiple offers model environment 3200, according to one embodiment.

FIG. 32 is a block diagram of a multiple offers model environment 3200. Model 250 receives inputs 3205 and generates outputs 3225. Model 250 includes the offer generation model 3210 and the offer customization model 3220. Models 3210 and 3220 are used by model 250 to process inputs 3205 to generate outputs 3225. The inputs 3205 received by model 250 include vehicle information 1210, credit bureau data 1220, maximum term 1270, maximum LTV ratio 1275 (also called LTV cutoff), maximum payment capacity 1280, post loan debt to income (DTI) ratio 2130, and custom inputs 3206. The outputs 3225 generated by the model 250 include a first offer 3230, a second offer 3235, a third offer 3240, and a recalculated offer 3245. In some embodiments, the model 250 includes more, less, and/or different models or criteria for processing inputs 3205 to generate outputs 3225.

The vehicle information 1210 and credit bureau data 1220 may be more, less, and/or different than the information and data received as inputs by models 230 and 240. Alternatively, the information and data 1210 and 1220 may be the same as that received by models 230 and 240. The maximum term 1270 and maximum LTV ratio 1275 are outputs 1260 from model 230 received as inputs 3205 by model 250. The post loan DTI ratio 2130 may also be received by model 250 from model 230. In some embodiments, model 250 receives more, less, and/or different inputs from model 230. The inputs 3206 are custom inputs received from an applicant

150. The custom inputs 3206 may be used by offer customization model 3220. The inputs 3205 may include more, less, and/or different inputs than those displayed in FIG. 32.

The multiple offers model 250 generates outputs 3225, which include a first vehicle loan offer 3230, a second vehicle loan offer 3235, a third vehicle loan offer 3240, and a recalculated vehicle loan offer 3245. The first offer 3230 is a vehicle loan offer generated by offer generation model 3210 for applicant 150 based on inputs 3205. The offer 3230 is for the maximum term. The second offer 3235 is a vehicle loan offer for applicant 150 with a term that is 12 months less than the maximum term. The third offer 3240 is a vehicle loan offer generated for applicant 150 with a term that is 24 months less than the maximum term. The recalculated offer 3245 is a vehicle loan offer for applicant 150 generated by offer customization model 3220 based on inputs 3205, including custom inputs 3206. In some embodiments, the model 250 generates more, less, and/or different outputs than those shown in FIG. 32.

The first, second, and third offers 3230, 3235, and 3240, respectively, are meant to provide the applicant 150 different options for a vehicle loan offer. Additionally, the recalculated offer 3245 provides the applicant 150 an opportunity to customize an offer based on the applicant's preferences. By providing the applicant multiple choices and customization opportunities, the organization 101 is able to achieve its goal of generating more vehicle loan business.

Model Inputs

Figure 33:
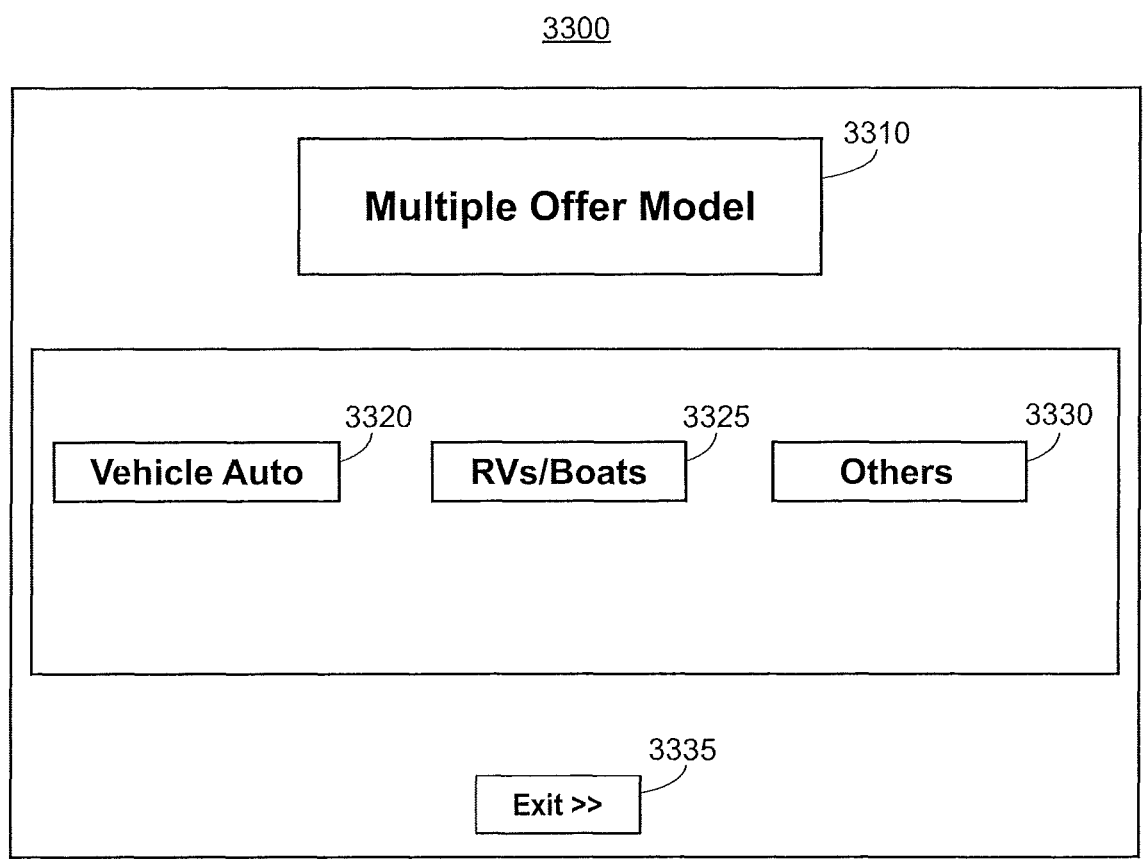
FIG. 33 is a diagram of a snapshot of a product type inputs interface, according to one embodiment.

FIG. 33 is a snapshot of a product type inputs interface 3300. The interface 3300 includes a title 3310, an automobile selection button 3320, an RVs/Boats selection button 3325, and an other products selection button 3330. Selection of any one of the buttons 3320, 3325, and/or 3330 provides the multiple offers model 250 with the product type input. For example, selecting the RVs/Boats button 3325 designates the product type as a vehicle loan for either a recreational vehicle or a boat. Alternatively, selecting the button 3320 would set the product type as a vehicle loan offer for a car. For another example, the button 3330 may be selected for a vehicle loan for a motorcycle. The interface 3300 also includes an exit selection button 3335. Selection of button 3335 allows the user to exit the interface 3300. In some embodiments, the interface 3300 includes more, less, and/or different buttons and/or components than those shown in FIG. 33.

FIG. 34 displays a snapshot of a multiple offers model inputs interface 3400. The interface 3400 includes input titles 3410, input entry boxes 3420, a clear selection button 3430, a submit information selection button 3435, and a close selection button 3440. Selection of the clear selection button 3430 causes the input entry boxes 3420 to be cleared and/or reset to a default value. Selection of the submitted information button 3435 causes the information entered in the boxes 3420 to be submitted to the multiple offers model 250 for processing. Selection of the button 3440 causes the interface 3400 to close.

In the displayed embodiment of FIG. 34, the interface 3400 includes several inputs 3410. These inputs include the applicant's social security number, resident state, occupation, monthly net income, debt payments (monthly), purchase type, collateral value, vehicle make/manufacturer, vehicle model year, and vehicle mileage. In some embodiments, the applicant's social security number is used to obtain the applicant's FICO score from a credit bureau. Applicant's resident state may affect the terms of the pricing model used by the offer generation model 3210, as will be discussed later. The applicant's monthly income and debt payments may be used to determine the applicant's monthly vehicle loan payment capacity. The applicant's occupation status may be relevant with respect to different policy guidelines followed by the offer generation model 3210.

As for the vehicle information, the product type and purchase type may affect the maximum term, LTV, and the pricing determined by the offer generation model 3210. The vehicle mileage and/or model year may indicate whether the vehicle is new or used, which may then affect pricing determined by the offer generation model 3210. Collateral value may be used for determining LTV and the appropriate loan amount to offer the applicant while the vehicle make/manufacturer may be relevant with respect to different policy guidelines that are followed by the offer generation model 3210. The offer generation model 3210 is explained later in further detail.

The input entry boxes 3410 may be blank, display the previous value, or display a default value when the interface 3400 is first generated. For example, the default value for the input "purchase type" may be dealer purchase while the default value for the vehicle mileage input maybe 0 miles. In this case, the default values would reflect a new vehicle purchase from a dealer. However, other default values are possible. Additionally, the interface 3400 includes input entry boxes 3420 with drop-down menus 3425. For menus 3425, multiple options may be provided.

In some embodiments, the interface 3400 includes more, less, and/or different buttons and/or components than those shown in FIG. 34. Additionally, the interface 3400 may request more, less, and/or different inputs than those shown in FIG. 34.

Offer Generation Model

Figure 35:
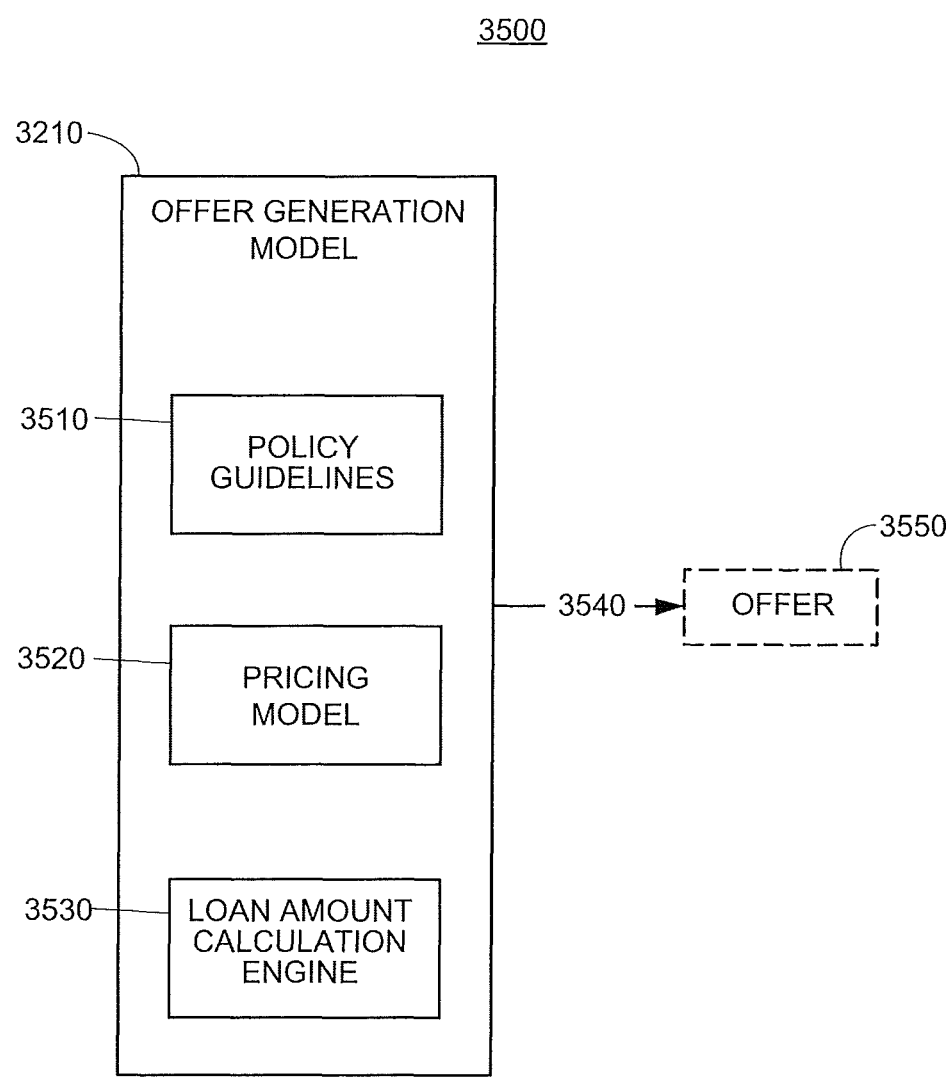
FIG. 35 is a block diagram of an offer generation model environment, according to one embodiment.

FIG. 35 is a block diagram of the offer generation model environment 3500. The environment 3500 includes the offer generation model 3210 from the multiple offers model 250. The offer generation model 3210 generates outputs 3540 which includes a vehicle loan offer 3550 for an applicant. The offer generation model 3210 relies on the inputs 3205 (not shown in FIG. 35, see FIG. 32) received by the multiple offers model 250 to generate the outputs 3540, including offer 3550. When the model 3210 processes the inputs 3205, the model relies on policy guidelines 3510, pricing model 3520, and loan amount calculation engine 3530.

The outputted offer 3550 from the offer generation model 3210 may be used by the multiple offers model 250 for providing outputs 3225. For example, the offer 3550 may correspond with any of the outputs 3225, such as the first offer 3230, the second offer 3235, the third offer 3240, or the recalculated offered 3245. In one embodiment, the offer generation model 3210 is run multiple times to generate all of the outputs 3225 for the model 250. For example, for a vehicle loan application from an applicant, the model 250 may call the offer generation model 3210 a first time to generate the first offer 3230, a second time to generate the second offer 3235, and a third time to generate the offer 3240. In the example, the first offer 3230 may correspond to a vehicle loan offer with a maximum term. The second offer 3235 may correspond to a vehicle loan offer with a term 12 months shorter than the maximum term. The third offer 3240 may correspond to a vehicle loan offer with a term 24 months shorter than the maximum term. Also, the model 250 may call the offer generation model 3210 a fourth time in response to custom inputs 3206 to generate the recalculated offer 3245. For the recalculated offer 3245, the custom inputs 3206 may alter the vehicle loan term, the vehicle loan amount, and/or other conditions of the vehicle loan.

In other embodiments, the offer generation model 3210 has outputs 3540 which includes more offers than just the single offer 3550 displayed. As a result, in this embodiment, the offer generation model 3210 may not be required to run multiple times to generate all of the offers shown in outputs 3225 (i.e., offers 3230, 3235, 3240, and 3245). For example, in response to a vehicle loan application, the offer generation model 3210 may output three vehicle loan offers, including a first vehicle loan offer with a maximum term corresponding to offer 3230, a second vehicle loan offer corresponding to offer 3235 with a term 12 months shorter than the first offer, and a third vehicle loan offer corresponding to offer 3240 with a term 24 months shorter than the first offer. Additionally, the outputs may include a fourth vehicle loan offer corresponding to recalculated offer 3245 in response to custom inputs 3206. In some embodiments, the offer generation model 3210 includes more, less, and/or different outputs than those displayed in FIG. 35.

The offer generation model 3210 relies on policy guidelines 3510, pricing model 3520, and loan amount calculation engine 3530 to process inputs 3205 to generate outputs 3540. In some embodiments, the model 3210 includes more, less, and/or different guidelines, models, engines, and/or components to process inputs to generate outputs.

Offer Generation Model: Policy Guidelines

Figure 36:
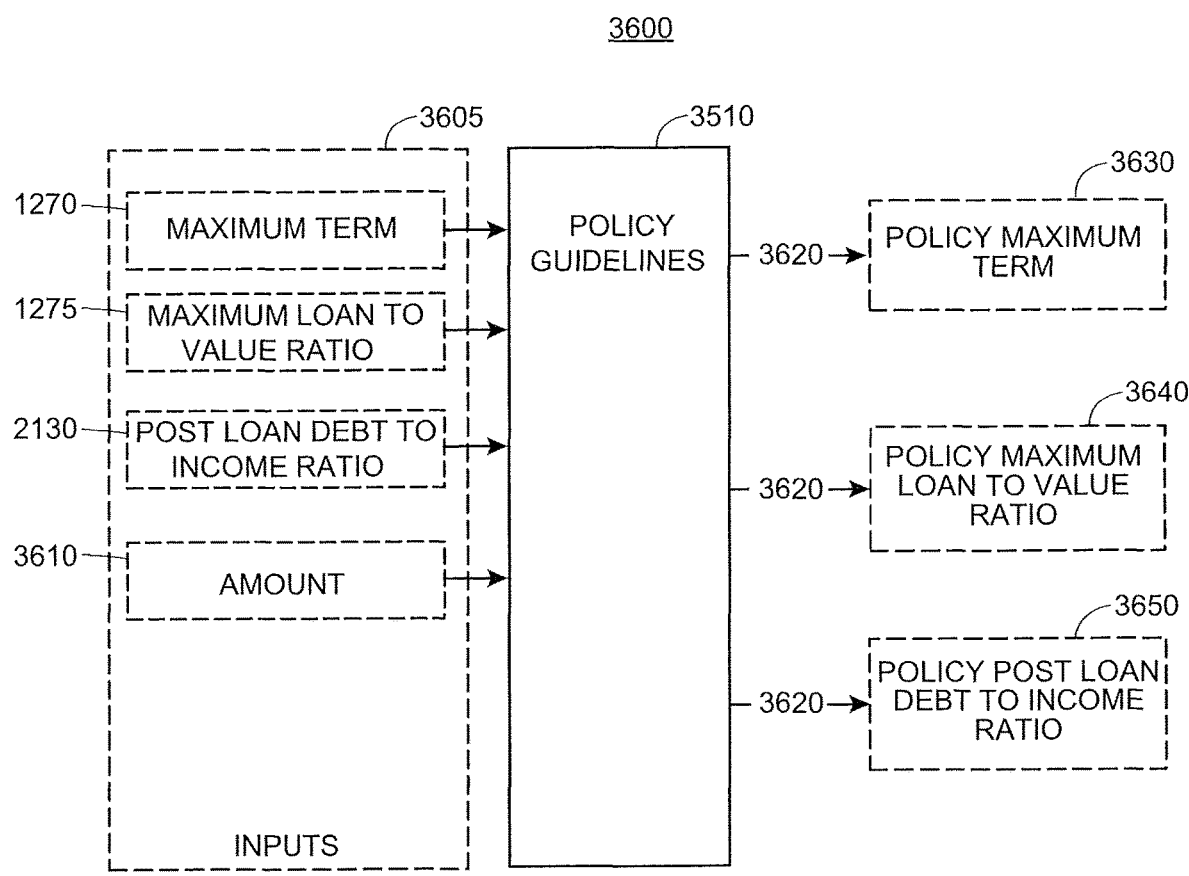
FIG. 36 is a block diagram of a policy guidelines environment, according to one embodiment.

FIG. 36 displays a block diagram of the policy guidelines environment 3600. Environment 3600 includes policy guidelines 3510, inputs 3605, and outputs 3620. Policy guidelines 3510 are used by the offer generation model 3210 to further process specific inputs 3205 received by the multiple offers model 250. The specific inputs that are processed are shown as inputs 3605. These inputs are processed by the model 3210 in accordance with policy guidelines 3510 to generate outputs 3620. The outputs 3620 include policy maximum term 3630, policy maximum loan-to-value ratio 3640, and policy post loan debt to income ratio 3650. These outputs 3620 may be affected by the received inputs 3605, including maximum term 1270, maximum loan-to-value ratio 1275, post loan debt to income ratio 2130, and amount 3610. Amount 3610 is a value calculated by the loan amount calculation engine 3530, which is described in a later section.

FIG. 37 displays a loan to value policy guidelines table 3700 and post loan debt to income policy guidelines table 3710. The policy guidelines outlined in table 3700 allow the offer generation model 3210 to set a policy maximum loan-to-value ratio 3640 based on the maximum loan-to-value ratio 1275 to comply with the policy guidelines displayed in the table 3700. Although the policy maximum loan-to-value ratio 3640 can equal the loan-to-value ratio 1275, in some cases, the policy maximum loan-to-value ratio 3640 will be different from the maximum loan-to-value ratio 1275 to ensure compliance with the policy guidelines. For example, table 3700 requires all vehicle loans for recreational vehicles or boats to have a maximum loan-to-value ratio of 115%. Thus, if the multiple offers model 250 receives inputs including a maximum loan-to-value ratio 1275 of 120% for a recreational vehicle loan for an applicant, the offer generation model 3210 will generate a policy maximum loan-to-value ratio 3640 equal to 115% to ensure compliance with policy guidelines 3510. As a result, the ratio 3640 would be different from the inputted ratio 1275. The offer generation model 3210 would then rely on the policy maximum loan-to-value ratio 3640 when determining potential vehicle loan offers to ensure compliance with policy guidelines 3510.

Similarly, the offer generation model 3210 can set a policy post loan debt to income ratio 3650 based on the maximum post loan debt to income ratio 2130 to comply with the policy guidelines displayed in table 3710. Although the policy post loan debt to income ratio 3650 could equal the post loan debt to income ratio 2130, in some cases, the policy post loan debt to income ratio 3650 will be different from the post loan debt to income ratio 2130 to ensure compliance with the policy guidelines. For example, table 3710 requires the post loan debt to income ratio for all products to be no larger than 50%. Consequently, if the multiple offers model 250 receives inputs including a post loan debt to income ratio 2130 equal to 75% for a vehicle loan, the offer generation model 3210 will generate a policy post loan debt to income ratio 3650 of 50% to comply with the policy guidelines. The policy post loan debt to income ratio 3650 would then be relied upon by the offer generation model 3210 when generating subsequent vehicle loan offers.

FIG. 38 displays a maximum term policy guidelines table 3800. The policy guidelines outlined in table 3800 allow the offer generation model 3210 to set the policy maximum term 3630 based on the maximum term 1270 to comply with the policy guidelines displayed in the table 3800. Although the policy maximum term 3630 could equal the maximum term 1270, in some cases, the policy maximum term 3630 will be different from the maximum term 1270 to ensure compliance with the policy guidelines. In the displayed embodiment of FIG. 38, the policy guidelines of table 3800 constrain the maximum term based on a vehicle loan amount 3610. Thus, the offer generation model verifies that the generated vehicle loan offer amount and term comply with the policy guidelines of table 3800.

For example, if offer generation model 3210 generates a vehicle loan offer of $10,000 (amount 3610) for 84 months (maximum term 1270) for a car, the offer generation model will generate a policy maximum term 3630 of 72 months or less for a loan amount of $10,000 to comply with the policy guidelines of table 3800. The policy maximum term 3630 of 72 months or less would then be used by offer generation model 3210 for generating subsequent vehicle loan offers to ensure compliance with policy guidelines 3510.

In some embodiments, policy guidelines 3510 may include more, less, and/or different policy guidelines than those displayed or discussed in accordance with FIGS. 36-38. Further, the guidelines 3510 may be based on more, less, and/or different criteria (e.g., product type, vehicle manufacturer, purchase type, vehicle condition, FICO score, etc.) than those displayed or discussed in accordance with FIGS. 36-38. For example, a policy guideline regarding maximum permissible loan to value ratios could be based on a vehicle manufacturer. Specifically, different vehicle manufacturers may warrant a higher or lower permissible maximum loan to value ratio. As a result, policies could exist which modify the maximum permissible loan to value ratio based on the vehicle manufacturer. In some embodiments, the policy guidelines environment 3600 relies on more, less, and/or different inputs 3605 than those displayed in FIG. 36. In some embodiments, the environment 3600 displayed in FIG. 36 generates and/or affects more, less, and/or different outputs 3620 than those displayed.

Offer Generation Model: Pricing Model

Figure 39:
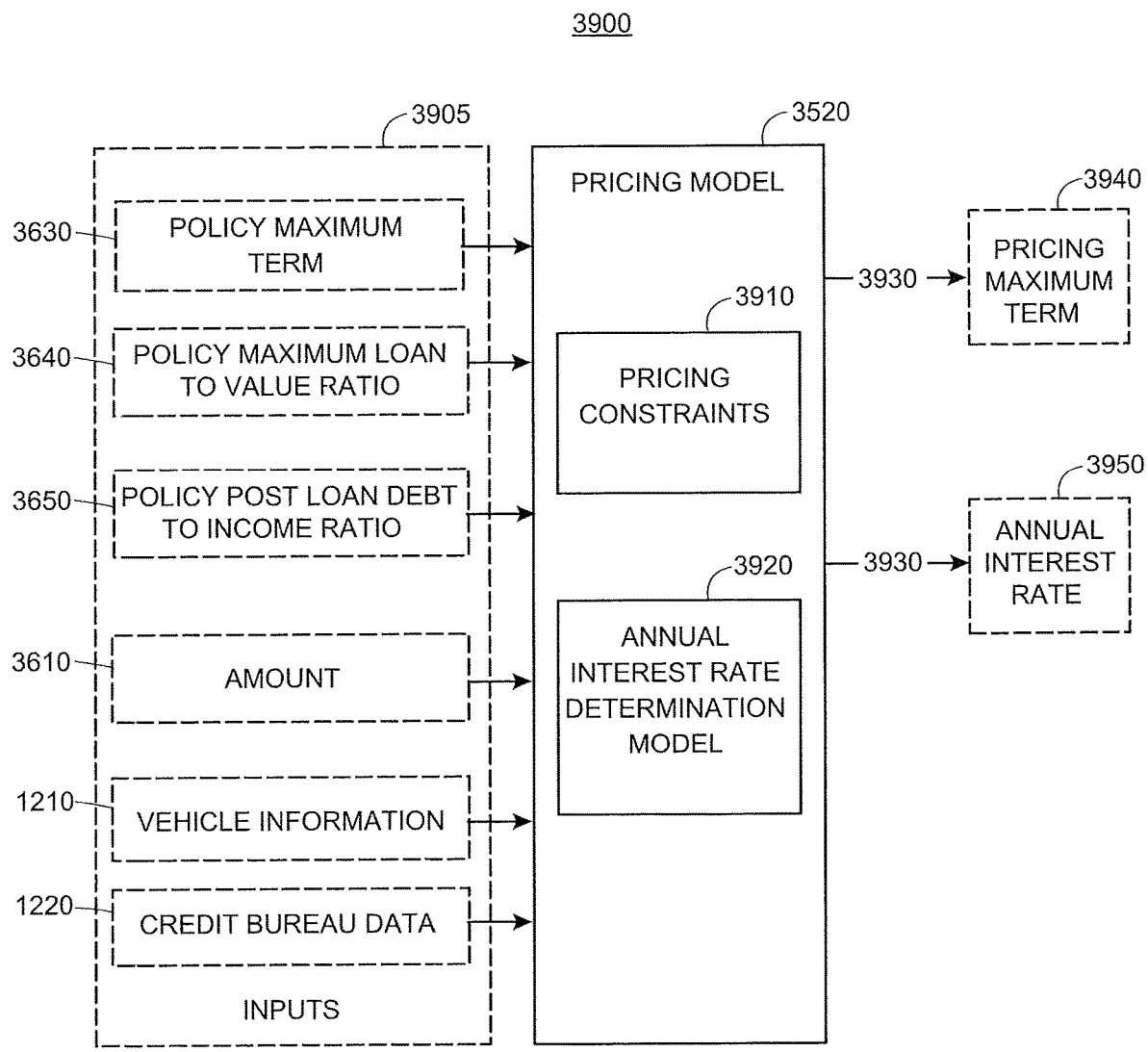
FIG. 39 is a block diagram of a pricing model environment, according to one embodiment.

FIG. 39 displays a block diagram of the pricing model environment 3900. Environment 3900 includes pricing model 3520, inputs 3905, and outputs 3930. The inputs 3905 are based on the inputs 3205 received by the multiple offers model 250 and the outputs of policy guidelines 3510. The inputs 3905 include vehicle information 1210, credit bureau data 1220, policy maximum term 3630, policy maximum loan-to-value ratio 3640, policy post loan debt to income ratio 3650, and amount 3610. The inputs are processed by model 3520 to generate outputs 3930. Although not displayed, in some embodiments, the maximum term 1270, the maximum loan-to-value ratio 1275, and the post loan debt to income ratio 2130 may be used instead of their corresponding policy values (i.e., policy maximum term 3630, policy maximum loan-to-value ratio 3640, and policy post loan debt to income ratio 3650).

The outputs 3930 include a pricing maximum term 3940 and a vehicle loan annual interest rate 3950. The pricing maximum term 3940 may update the maximum term 1270 and/or the policy maximum term 3630. The pricing model 3520 relies on pricing constraints 3910 to generate, in this case, the pricing maximum term 3940. Additionally, the model 3520 uses the annual interest rate determination model 3920 to generate the vehicle loan annual interest rate 3950. The generated rate 3950 is then reflected in the offer 3550 generated by the offer generation model 3210. In some embodiments, the pricing model 3520 may include more, less, and/or different inputs, outputs, models, guidelines, and/or other components.

FIG. 40 displays a pricing constraints term table 4000. The table 4000 allows the pricing model 3520 to modify the policy maximum term 3630 to comply with the pricing constraints displayed in table 4000. Specifically, the pricing model 3520 can only change the policy maximum term 3630 by reducing it to ensure compliance with both policy guidelines 3510 and pricing constraints. Although the pricing maximum term 3940 may be the same as policy maximum term 3630 and/or maximum term 1270, in some cases, the pricing maximum term 3940 is different from the policy maximum term 3630 and/or the maximum term 1270. The pricing maximum term 3940 may be different from the other terms to ensure compliance with pricing constraints 3910. In the displayed embodiment of FIG. 40, the table 4000 includes price constraints based on vehicle information 1210, such as product type and model year, along with credit bureau data 1220 for the applicant, such as the FICO score of the applicant. Thus, the pricing model 3520 verifies that the vehicle loan offer term complies with pricing constraints based on the vehicle product type, model year, and applicant FICO score.

For example, the pricing model 3520 may receive inputs 3905 for a vehicle loan including a policy maximum term 3630 of 72 months, vehicle information 1210 specifying a car from 2002 (product type and model year), and credit bureau data 1220 indicating an applicant FICO score of 600. For this example, the pricing model 3520 would generate a pricing maximum term 3940 of 36 months to comply with the pricing constraints of table 4000. However, if the vehicle model year were 2010, instead of 2002, the pricing model 3520 would instead generate a pricing maximum term 3940 of 60 months to comply with the pricing constraints of table 4000.

In yet another example, if the FICO score of the applicant for the car loan was 700, as opposed to 600, the pricing model 3520 would generate a pricing maximum term 3940 of 72 months, which equals the received policy maximum term 3630. In this case, the policy maximum term 3630 of 72 months not only complies with policy guidelines 3510, but it also complies with the pricing constraints of table 4000. Thus, the pricing model 3520 does not have to select a time period different from the policy maximum term 3630 when setting the pricing maximum term 3940 at 72 months. The pricing maximum term 3940 is then used by the offer generation model 3210 for generating subsequent vehicle loan offers to ensure compliance with pricing constraints 3910.

In some embodiments, pricing constraints 3910 may include more, less, and/or different constraints than those displayed in FIG. 40. Further, the constraints may be based on more, less, and/or different criteria (e.g., product, purchase type, vehicle condition, FICO score, etc.) than the criteria displayed. Additionally, the pricing constraints 3910 may affect more, less, and/or different outputs than just the pricing maximum term 3940.

Pricing Model: Annual Interest Rate Determination Model

Figure 41:
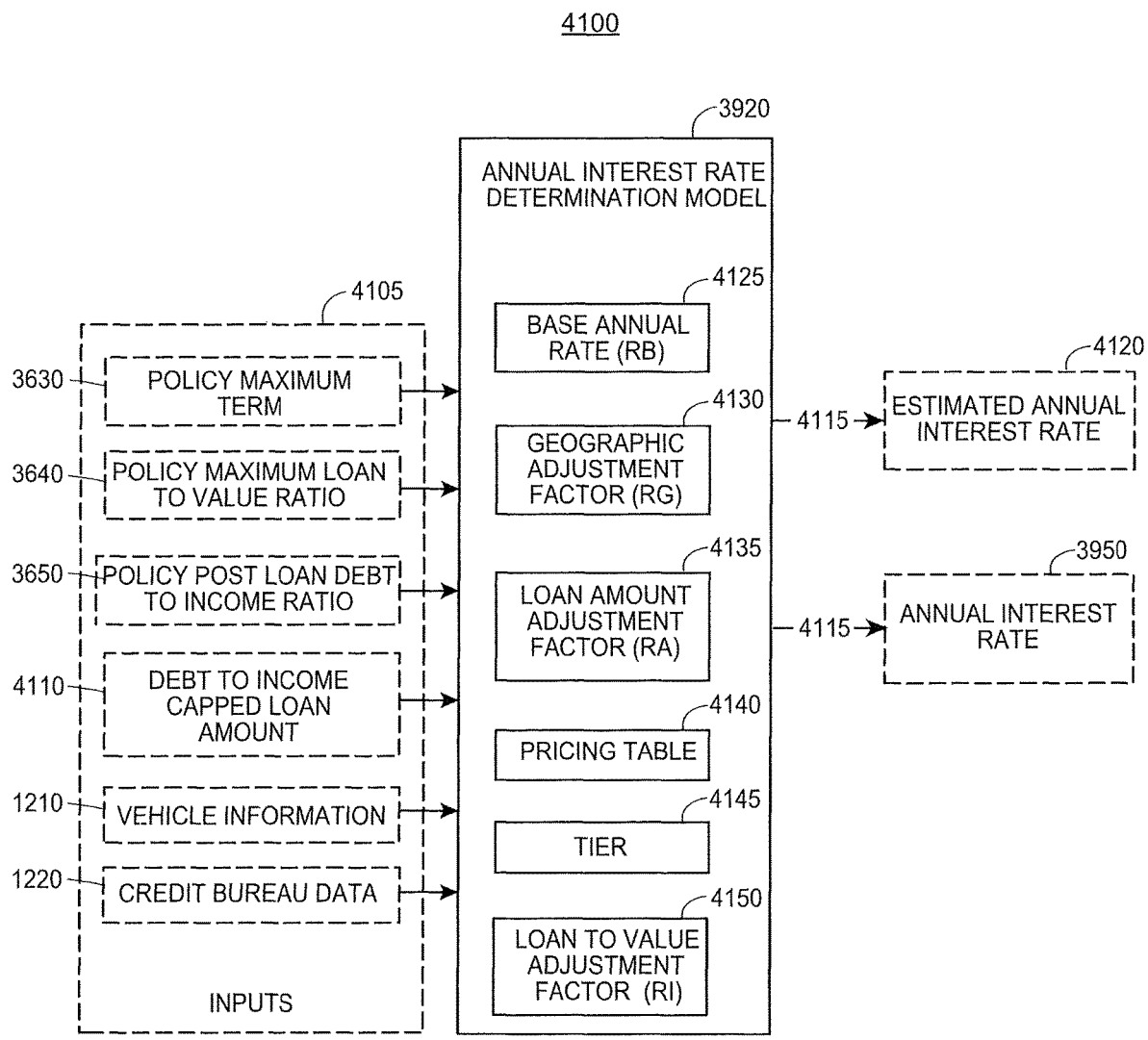
FIG. 41 is a block diagram of an annual interest rate determination environment 4100, according to one embodiment.

FIG. 41 displays a block diagram of the annual interest rate determination environment 4100. Environment 4100 includes the annual interest rate determination model 3920, inputs 4105, and outputs 4115. The purpose of model 3920 is to provide information regarding appropriate annual interest rates for possible vehicle loans. The inputs 3905 include policy maximum term 3630, policy maximum loan-to-value ratio 3640, policy post loan debt to income ratio 3650, debt to income capped loan amount 4110, vehicle information 1210, and credit bureau data 1220. The debt to income capped loan amount 4110 is received from the loan amount calculation engine 3530, which is explained in further detail later. Vehicle information 1210 includes a purchase type, a vehicle type, a collateral value, a vehicle condition, a vehicle model year, and/or other information about the vehicle. Credit bureau data 1220 may include information such as the FICO score of the applicant, state of residence of the applicant, monthly income of the applicant, pre-loan monthly debt payments of the applicant, and/or other information. In some embodiments, the inputs 4105 include more, less, and/or different inputs than those displayed and/or described above.

Received inputs 4105 may be used to determine other inputs and factors. For example, credit bureau data 1220 and policy post loan debt to income ratio 3650 may be used to calculate a maximum loan payment for an applicant using methods similar to those described for payment capacity estimator 2410. Specifically, the maximum payment for an applicant may be calculated by first multiplying the policy post loan debt to income ratio 3650 by the applicant's monthly income, and subtracting that product by the applicant's pre-loan monthly debt payments to determine the maximum loan payment the applicant can afford. In other embodiments, other factors and/or inputs may be calculated based on inputs 4105.

The model 3920 processes inputs 4105 to determine outputs 4115, which include an estimated annual interest rate 4120 and an annual interest rate 3950. The estimated annual interest rate 4120 may be used by the loan amount calculation engine 3530, which is described in further detail later. The annual interest rate 3950 and/or the estimated annual interest rate 4120 may be used by the offer generation model 3210 to generate the offer 3550. Additionally, the interest rates 3950 and/or 4120 may be provided with the offer 3550. In some embodiments, the annual interest rate determination model 3920 includes more, less, and/or different outputs than those displayed and/or described above.

The model 3920 relies on several factors when processing inputs 4105 to determine outputs 4115. Specifically, the model 3920 relies on a base annual rate (RB) 4125, a geographic adjustment factor (RG) 4130, a loan amount adjustment factor (RA) 4135, a pricing table 4140, a tier 4145, and a maximum loan-to-value adjustment factor (RI)

4150. In some embodiments, the model 3920 relies on more, less, and/or different factors to determine outputs 4115 based on inputs 4105.

Figure 42:
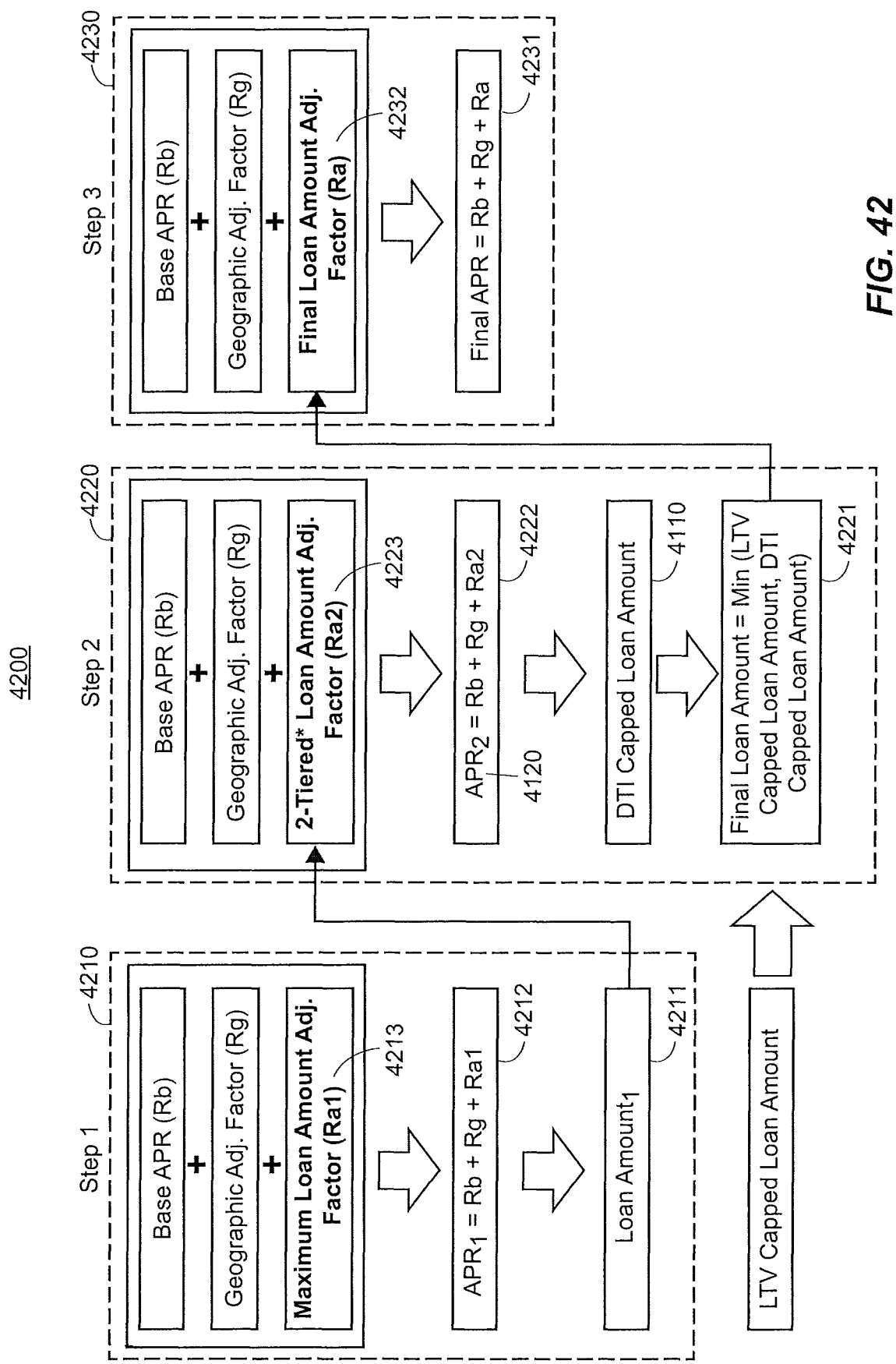
FIG. 42 is an example diagram of an automobile annual interest rate determination environment, according to one embodiment.
Figure 43:
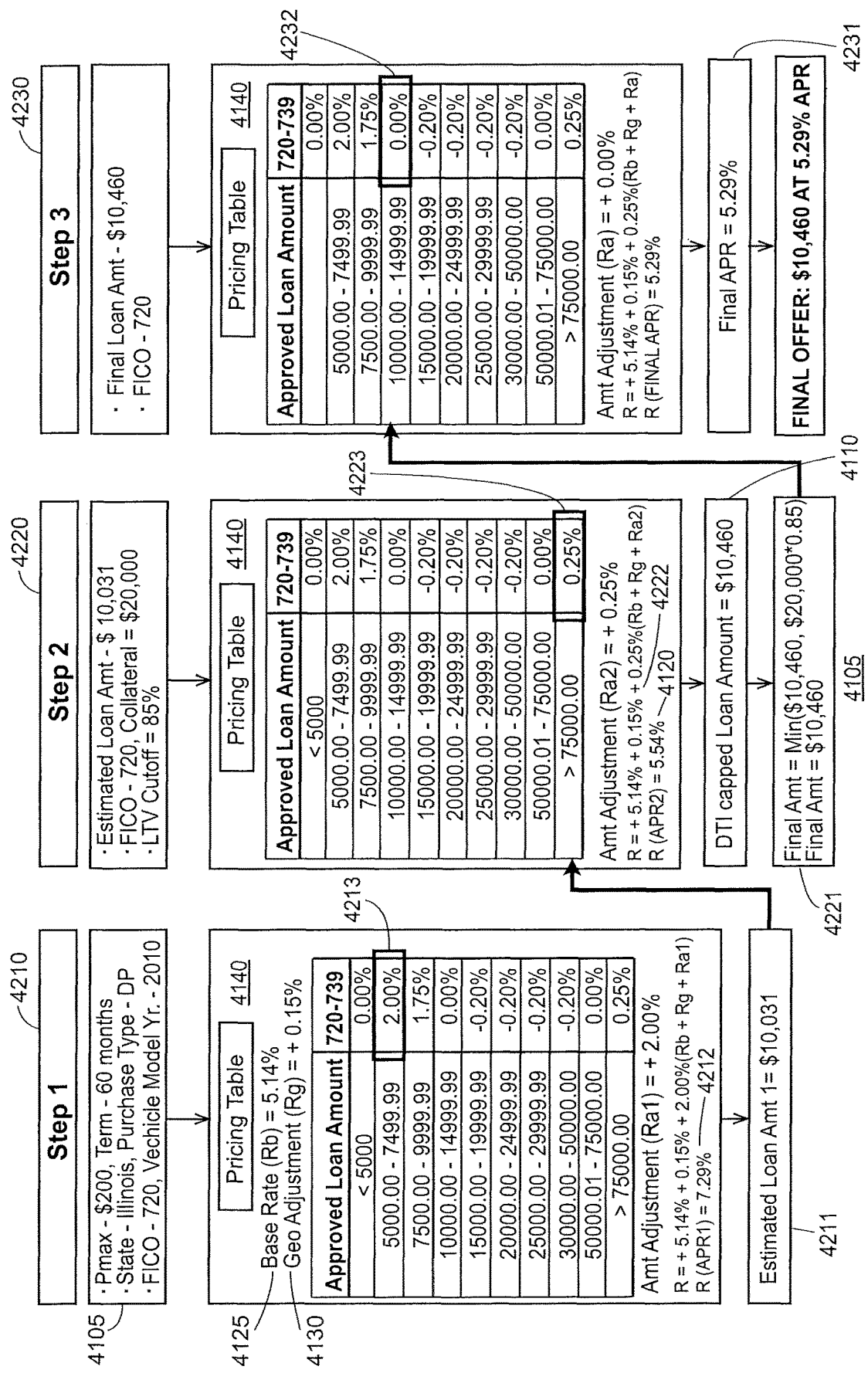
FIG. 43 is an example of an automobile annual interest rate determination, according to one embodiment.
Figure 44:
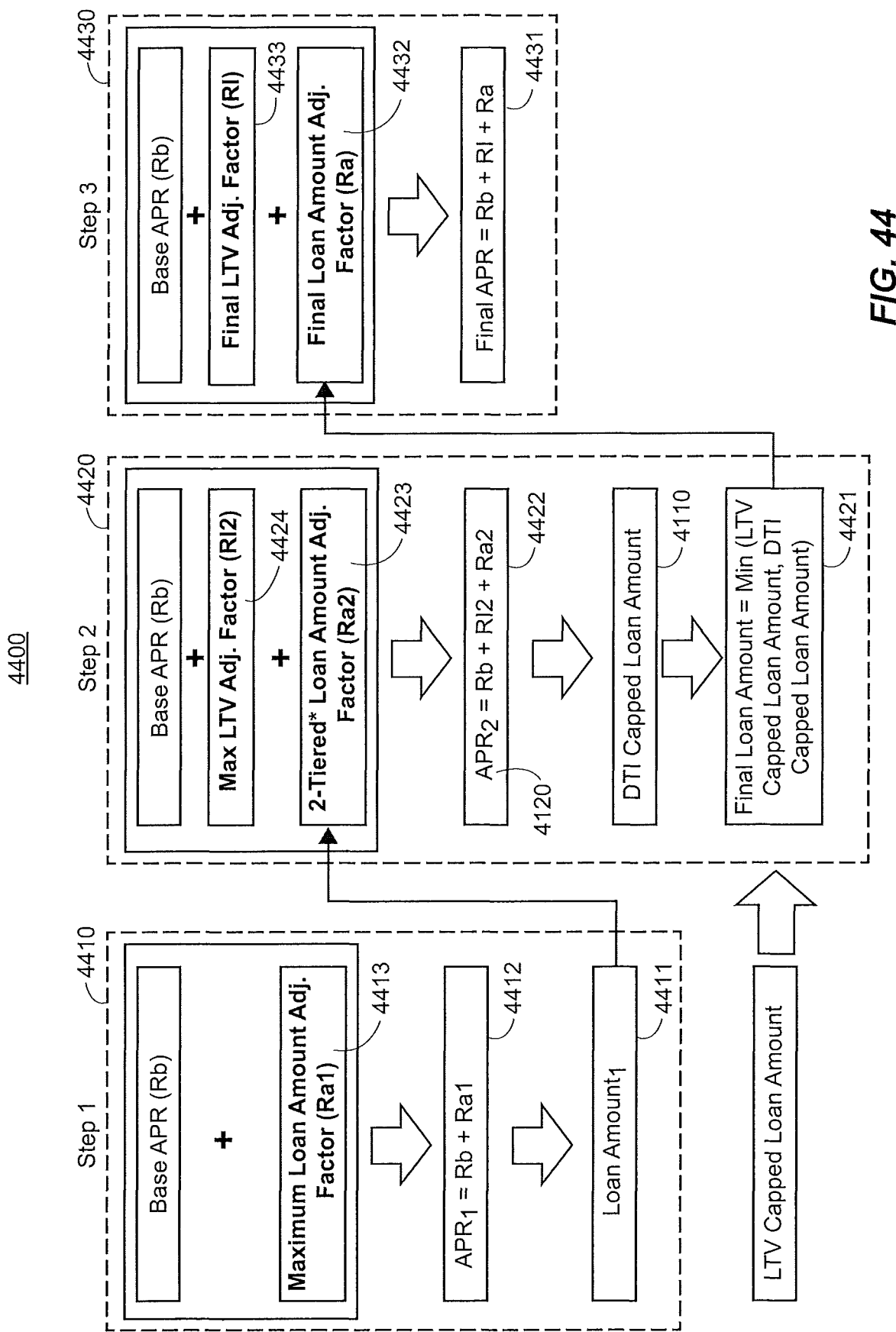
FIG. 44 is an example diagram of a recreational vehicles/boats annual interest rate determination environment, according to one embodiment.
Figure 45:
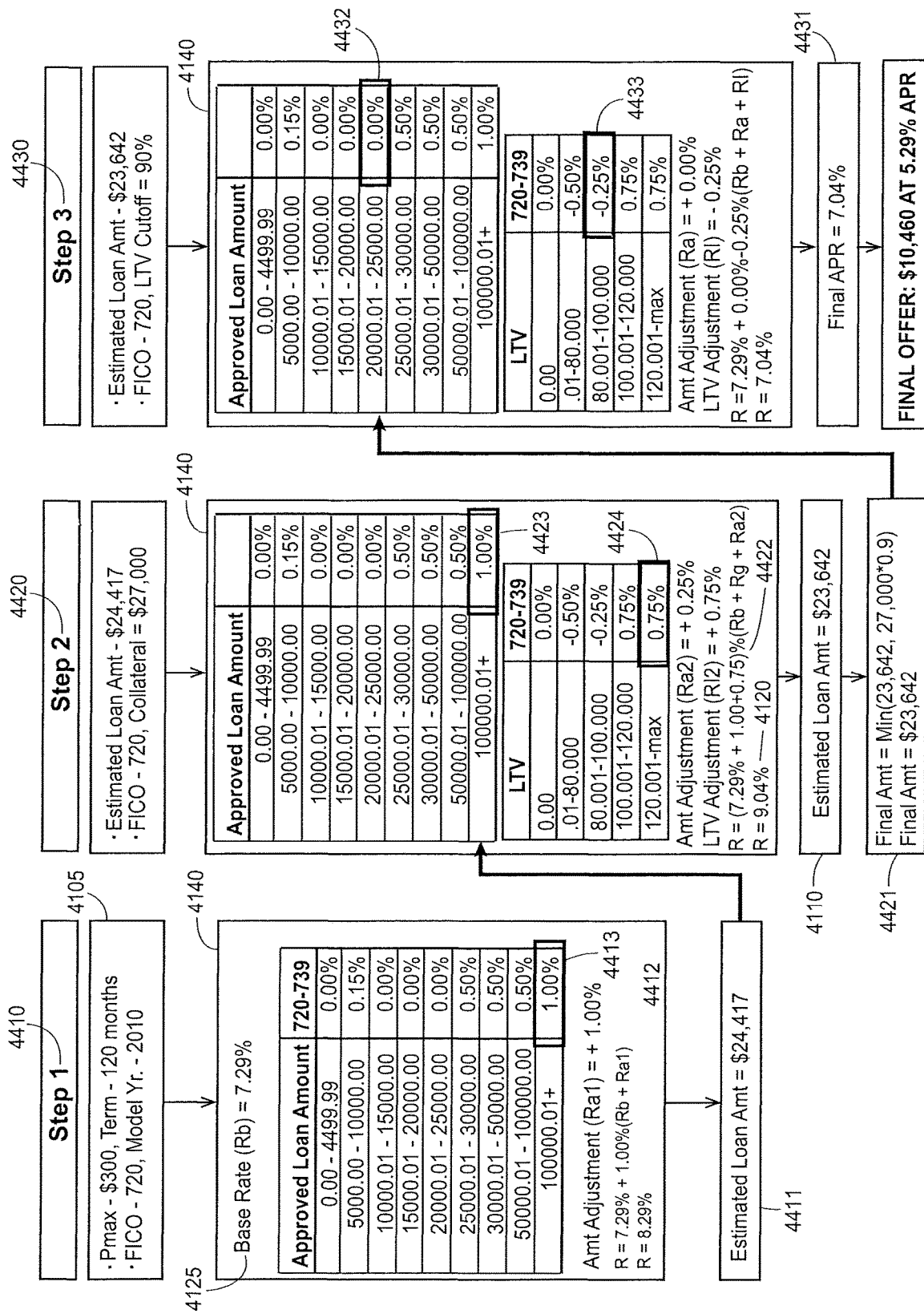
FIG. 45 is an example of a recreational vehicle annual interest rate determination, according to one embodiment.

FIGS. 42 and 43 provides an example of how the model 3920 determines outputs 4115 for a car loan. FIGS. 44 and 45 show an example of how the model 3920 determines outputs 4115 for a vehicle loan for a recreational vehicle or a boat. In FIGS. 42-45, the model 3920 determines outputs 4115 in three steps. Step one relies on several factors to determine an estimated loan amount 4211 to be used in step two. Step two determines the estimated annual interest rate 4120. The interest rate 4120 is used by step two to determine a final loan amount 4221 to be used in step three. Step three relies on the final loan amount 4221, along with other factors, to determine an annual interest rate 3950. In some embodiments, model may include more, less, and/or different steps. In some embodiments, each step may have a different purpose and/or rely on different factors and/or inputs than those displayed in FIGS. 42-45.

Car Loan Annual Interest Rate Determination Example

FIGS. 42 and 43 display the process and corresponding example used for determining the estimated annual interest rate 4120 and annual interest rate 3950 for a vehicle loan for a car. FIG. 42 displays the automobile interest rate determination environment 4200. Environment 4200 includes step one 4210, step two 4220, and step three 4230.

In step one 4210, an estimated loan amount 4211 is calculated based on the present value of a stream of monthly payments for a specific value at a specific interest rate for a specific term. The specific values of the stream of monthly payments can be determined from inputs 4105. Specifically, the specific value of the term may be equal to the policy maximum term 3630, while the monthly payment is calculated based on methods similar to those described for the payment capacity estimator 2410 using inputs 4105. In FIG. 43, the specific value of the monthly payments is $200 while the specific value of the term is 60 months.

The specific value for the interest rate in step one 4210 equals the sum of the base annual rate 4125, the geographic adjustment factor 4130, and the maximum loan amount adjustment factor 4213. In FIG. 43, the base rate 4125 equals 5.14%, the geographic adjustment factor 4130 equals 0.15%, and the maximum loan amount adjustment factor 4213 equals 2.00%. The maximum loan amount adjustment factor 4213 is determined by selecting the maximum interest rate shown within the appropriate pricing table 4140, which is 2.00% in FIG. 43. Thus, the specific value of the interest rate 4212 equals 5.14%+2.00%+0.15%, which is 7.29%. The present value of monthly payments of $200 for 60 months at an annual interest rate of 7.29% equals the estimated loan amount 4211 of $10,031, as seen in FIG. 43.

In step two 4220, a final loan amount 4221 is determined and subsequently used in step three. The final loan amount 4221 is determined by selecting the lowest value between the loan-to-value capped loan amount and the debt to income capped loan amount 4110. The debt to income capped loan amount 4110 is received as an input 4105 by the interest rate determination model 3920. The calculation of the debt to income capped loan amount 4110 is described later. The loan-to-value capped loan amount is determined by multiplying the policy maximum loan-to-value ratio 3640 and vehicle collateral value, which is determined from the vehicle information 1210. In FIG. 43, vehicle collateral value equals $20,000 while the policy maximum loan-to-value ratio 3640 equals 85%. Thus, the loan-to-value capped loan amount is $17,000.

In order to determine the debt to income capped loan amount 4110, step two 4220 must first determine an estimated annual interest rate 4120 to send to the loan amount calculation engine 3530 for determining amount 4110. The rate 4120 equals the sum of the base annual rate 4125, the geographic adjustment factor 4130, and the two-tiered loan amount adjustment factor 4223. The two-tiered loan amount adjustment factor 4223 varies depending on the tier 4145.

In FIG. 43, tier 4145 is determined based on the estimated loan amount 4211 in step one 4210. Specifically, the tier 4145 is determined based on whether the estimated loan 4211 amount is greater than $10,000. Because the estimated loan amount 4211 equals $10,031, the tier 4145 is set to a tier for vehicle loan amounts greater than $10,000. The two-tiered loan amount adjustment factor is determined by selecting the maximum interest rate from a pricing table for the applicable tier, which in this case is for vehicle amounts greater than $10,000. In the displayed embodiment of FIG. 43, the two-tiered loan amount adjustment factor 4223 equals 0.25%. In other embodiments, if the vehicle loan amount 4211 is less than $10,000, the tier 4145 would be for vehicle amounts below $10,000, which would result in the two-tiered loan amount adjustment factor 4223 equaling 2.00%, which is the maximum interest rate available for the tier for vehicle loan amounts below $10,000.

The estimated annual interest rate 4120 equals the sum of the base rate 4125, the geographic adjustment factor 4130, and the two-tiered loan amount adjustment factor 4223. The calculation of this rate 4222 (5.14%+0.15%+0.25%) results in an estimated annual interest rate 4120 of 5.54%. The estimated annual interest rate 4120 is then used by loan amount calculation engine 3530 to determine the debt to income capped loan amount 4110. In FIG. 43, the amount 4110 is $10,460. As a result, the final vehicle loan amount 4221 also equals $10,460 because the debt to income capped loan amount 4110 ($10,460) is less than the loan-to-value capped loan amount ($17,000). The amount 4221 is then used by step three 4230 to calculate the final interest rate 4231, which may be set as the annual interest rate 3950 outputted by the interest rate determination model 3920.

For step three 4230, the final interest rate 4231 equals the sum of the base rate 4125, the geographic adjustment factor 4130, and the final loan amount adjustment factor 4232. The final loan amount adjustment factor 4232 is determined by using the final loan amount 4221 to select the corresponding adjustment factor from the pricing table 4140. In FIG. 43, the final vehicle loan amount 4221 of $10,460 corresponds to an adjustment factor of 0.00%. Additionally, the base rate 4125 equals 5.14% and the geographic adjustment factor 4130 equals 0.15%. Thus, the final interest rate 4231 equals 5.29% (the result of 5.14%+0.15%+0.00%). As a result, the annual interest rate 3950 that is sent as an output 4115 by annual interest rate determination model 3920 may be set to the final interest rate 4231 of 5.29%. In other embodiments, the annual interest rate 3950 may be modified from the final interest rate 4231 based on pricing and/or policy guidelines. In some embodiments, the offer generation model 3210 will generate a vehicle loan offer 3550 with an amount of $10,460, a term of 60 months, a maximum monthly payment of $200, and an interest rate of 5.29% for the applicant of FIGS. 42 and 43.

Recreational Vehicle Annual Interest Rate Determination Example

FIGS. 44 and 45 display the process and corresponding example used for determining the estimated annual interest rate 4120 and annual interest rate 3950 for a vehicle loan for a recreational vehicle or a boat. FIG. 44 displays the recreational vehicle rate determination environment 4400, which includes step one 4410, step two 4420, and step three 4430. Annual interest rate determination for a recreational vehicle is similar to that of a car. However, a couple of differences exist. First, no geographic factor 4130 is used when calculating annual interest rate 3950 or the estimated annual interest rate 4120. Second, in step two 4420 and step three 4430, the loan-to-value adjustment factor 4150 is relied upon for determining interest rates 4120 and 3950.

In step one 4410, an estimated loan amount 4411 is determined for use by step two 4420. Estimated loan amount 4411 is calculated based on the present value of a stream of monthly payments for a specific value at a specific interest rate for a specific term. Similar to FIGS. 42 and 43, the specific values of the term and the monthly payment are calculated based on inputs 4105. Specifically, the term is determined from the policy maximum term 3630 while the maximum monthly payment is calculated based on the policy post loan debt to income ratio 3650, and credit bureau data 1220, which includes the applicant's monthly income and pre-loan monthly debt payments. The maximum payment is determined using methods similar to those described for the payment capacity estimator 2410 using inputs 4105. In FIG. 45, the term equals 120 months while the maximum monthly payment equals $300.

The specific value for the interest rate 4412 equals the sum of the base rate 4125 and the maximum loan amount adjustment factor 4413. In the displayed embodiment of FIG. 45, the maximum loan amount adjustment factor 4413 is determined by selecting the maximum interest rate available in the appropriate pricing table 4140, which in this case is 1.00%. The base rate 4125 equals 7.29%. Thus, the specific value of the interest rate 4412 equals 8.29% (the result of 7.29%+1.00%). In FIG. 45, the estimated loan amount is calculated to be $24,417 based on the present value of monthly payments of $300 for 120 months at an annual interest rate of 8.29%.

Step two 4420 determines the final loan amount to send to step three 4430. Final loan amount 4421 is determined by selecting the minimum of the loan-to-value capped loan amount and the debt to income capped loan amount 4110. The debt to income capped loan amount 4110 is received as an input 4105 from the loan amount calculation engine 3530. The loan-to-value capped amount is calculated by multiplying the policy maximum loan-to-value ratio 3640 by the vehicle collateral value, which is determined from vehicle information 1210. In FIG. 45, the policy maximum loan-to-value ratio 3640 equals 90% while the vehicle loan amount collateral value equals $27,000. Thus, the loan-to-value capped loan amount equals $24,300.

To determine the debt to income capped loan amount 4110, an estimated annual interest rate 4120 must first be determined at step 4420. The rate 4120 is then used by the loan amount calculation engine 3530 to determine the loan amount 4110. The rate 4120 equals the sum of the base rate 4125, the maximum loan-to-value adjustment factor 4424, and the two-tiered loan amount adjustment factor 4423. The two-tiered loan amount adjustment factor 4423 varies depending on the tier 4145. The tier 4145 is set based on whether or not the estimated loan amount value 4411 is greater than or less than $10,000.

In FIG. 45, tier 4145 is set to the tier representing vehicle loan amounts greater than $10,000 because the estimated loan amount 4411 of $24,417 is greater than $10,000. Thus, the two-tiered loan amount adjustment factor 4423 equals the maximum rate available in pricing table 4140 for the tier 4145 representing vehicle loan amounts that are greater than $10,000. In this case, the corresponding adjustment factor 4423 equals 1.00%. In other embodiments, if the vehicle loan amount 4411 is less than $10,000, the tier 4145 would be set at a tier representing vehicle loan amounts below $10,000. In this case, the two-tiered loan amount adjustment factor 4423 would equal 0.15%, which is the maximum interest rate available in pricing table 4140 for vehicle loan amounts below $10,000.

For step two 4420, the maximum loan-to-value adjustment factor 4424 is calculated by selecting the maximum interest rate available in the pricing table 4140. Thus, in FIG. 45, the maximum loan-to-value adjustment factor 4424 equals 0.75%. As a result, the estimated annual interest rate 4120, which equals the sum of the base rate 4125, the two-tiered loan amount adjustment factor 4423, and the maximum loan-to-value adjustment factor 4424 (7.29%+1.00%+0.75%), is 9.04%.

The estimated annual interest rate 4120 of 9.04% is then sent as an output 4115 to the loan amount calculation engine 3530. The loan amount calculation engine 3530 uses the interest rate 4120 to determine the debt to income capped loan amount 4110. In FIG. 45, the debt to income capped amount 4110 is calculated to be $23,642. Consequently, step two 4420 determines the final amount 4421 to equal the amount 4110 of $23,642 because the amount 4110 is less than the loan-to-value capped amount of $24,300.

Step three 4430 then calculates a final interest rate 4431 by using the final amount 4421 to determine a final loan amount adjustment factor 4432 and a final loan-to-value adjustment factor 4433. The final interest rate 4431 is calculated based on the sum of the base rate 4125, the final loan-to-value adjustment factor 4433 and the final loan amount adjustment factor 4432. Final interest rate 4431 may then be outputted as the annual interest rate 3950 of the annual interest rate determination model 3920. Alternatively, the rate 4431 may be modified and then set as interest rate 3950 to ensure that interest rate complies with policy and/or pricing guidelines.

In FIG. 45, the final loan amount adjustment factor 4432 is determined by selecting from pricing table 4140 the interest rate corresponding to the final loan amount 4421 of $23,642. In this case, the corresponding final loan amount adjustment factor 4432 equals 0.00%. The final loan-to-value adjustment factor 4433 is also determined by selecting from pricing table 4140 the interest rate corresponding to the maximum loan-to-value ratio, which in this case is 0.9. Thus, the final loan-to-value adjustment factor 4433 equals −0.25%. As a result, the final interest rate 4431 equals the sum of the base rate 4125, the final loan amount adjustment factor 4432, and the final loan-to-value adjustment factor 4433 (7.29%+0.00%−0.25%), which is 7.04%. Thus, the annual interest rate determination model 3920 may output an annual interest rate 3950 of 7.04%. In some embodiments, the offer generation model 3210 will generate a vehicle loan offer 3550 with an amount of $23,642, a term of 120 months, a maximum monthly payment of $300, and an interest rate of 7.04% for the applicant of FIGS. 44 and 45.

In the displayed embodiments of FIGS. 42-45, the processes and examples may include more, less, and/or different steps, purposes, factors, inputs, outputs, and/or other components than those displayed in the figures and/or described above.

Offer Generation Model: Loan Amount Calculation Engine

Figure 46:
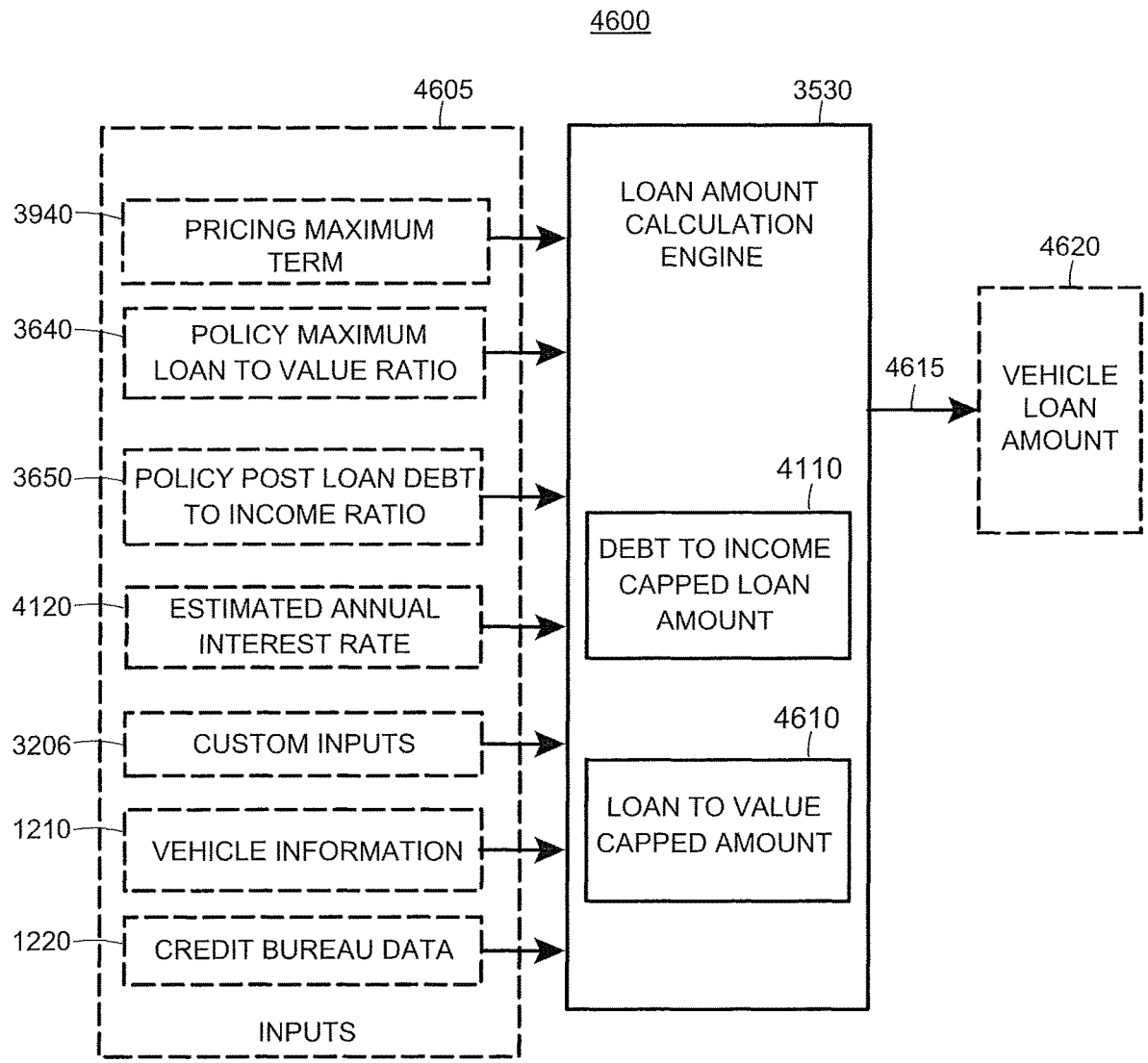
FIG. 46 is a block diagram of a loan amount calculation engine environment, according to one embodiment.

FIG. 46 displays a block diagram of the loan amount calculation environment 4600. Environment 4600 includes the loan amount calculation engine 3530, inputs 4605, and outputs 4615. The purpose of engine 3530 is to determine the appropriate vehicle loan amount based on the received inputs and other factors. The inputs 4605 include pricing maximum term 3940, policy maximum loan-to-value ratio 3640, policy post loan debt to income ratio 3650, estimated annual interest rate 4120, vehicle information 1210, credit bureau data 1220, and custom inputs 3206. The estimated annual interest rate 4120 is received from the annual interest rate determination model 3920, which is explained above in FIG. 41. Vehicle information 1210 may include the vehicle collateral value. Credit bureau data 1220 may include the monthly income and the monthly pre-loan debt payments of the applicant. Custom inputs 3206 may be provided by the offer customization model 3220, which is described later. In some embodiments, the inputs 4605 include more, less, and/or different inputs than those displayed and/or described above.

Similar to the annual interest rate determination model 3920 displayed in FIG. 41, received inputs 4605 may be used to calculate other inputs and factors. For example, credit bureau data 1220 and policy post loan debt to income ratio 3650 may be used to calculate a maximum monthly loan payment for an applicant using methods similar to those described for payment capacity estimator 2410. Specifically, the maximum payment for an applicant may be calculated by first multiplying the policy post loan debt to income ratio 3650 by the applicant's monthly income, and then subtracting that product by the applicant's pre-loan monthly debt payments to determine the maximum loan payment the applicant can afford. In other embodiments, other factors and/or inputs may be calculated based on inputs 4605.

The engine 3930 processes inputs 4605 to determine outputs 4615, which include the vehicle loan amount 4620. The vehicle loan amount may represent the principal leant and owed by the applicant for the vehicle loan. Alternatively, the vehicle loan amount may represent the principal and interest payments owed by the applicant during the loan. The vehicle loan amount 4620 corresponds to the vehicle loan amount for a vehicle loan offer to an applicant. Thus, the amount 4620 is used by the offer generation model 3210 to generate the vehicle loan offer 3550. Additionally, the amount 4620 may be provided with offer 3550. In some embodiments, the loan amount calculation engine 3530 includes more, less, and/or different outputs than those displayed and/or described above.

The vehicle loan amount 4620 is determined by engine 3530 by selecting the minimum amount of two other calculated amounts. Specifically, the engine 3530 calculates a loan to value capped amount 4610 and a debt to income capped amount of 4110. The loan to value capped amount 4610 is determined by multiplying the policy maximum loan-to-value ratio 3640 by the vehicle collateral value (which is received as part of vehicle information 1210).

The debt to income capped amount 4110 equals the present value of a stream of monthly payments of a specified amount occurring for a specified term at a specified interest rate. The specified amount equals the maximum monthly loan payment, which can be calculated based on similar methods used for the payment capacity estimator 2410. Specified term equals the pricing maximum term 3940. Specified monthly interest rate equals the estimated annual interest rate 4120 divided by 12.

Once the engine 3530 determines the loan-to-value capped amount 4610 and the debt to income capped amount 4110, the engine selects the lesser of the two amounts (4110 or 4610) to output as amount 4620. In some embodiments, the engine 3530 may use more, less, and/or different methods to determine an amount 4620 than those displayed in FIG. 46 and/or described above.

The loan amount calculation engine 3530 may be called by the offer generation model 3210 to generate an amount for offer 3550. In some embodiments, the offer generation model 3210 may call the engine 3530 for three different vehicle loans. The three different vehicle loans may only differ based on the term. Specifically, the three vehicle loans include a first vehicle loan at a maximum term, a second vehicle loan with a term that is 12 months shorter than the maximum term, and a third vehicle loan with a term that is 24 months shorter than the maximum term. All other information for the vehicle loans, such as the applicant, applicant information, vehicle, vehicle information, etc. may be the same. The interest rate provided for the three vehicle loan offers may or may not be the same for the three vehicle loans. The vehicle loan amounts for each of the three vehicle loans may or may not differ. In some embodiments, the first, second, and third vehicle loans described above correspond to the first offer 3230, second offer 3235, and third offer 3240 generated by multiple offers model 250. In other embodiments, the engine 3530 is called for more than or less than three vehicle loans.

Also, the loan amount calculation engine 3530 may be called by the offer customization model 3220 to determine the amount for a customized vehicle loan offer. In this embodiment, the model 3220 may provide custom inputs 3206 to the engine 3530. The custom inputs 3206 may alter the term or the amount of the vehicle loan. The loan amount 4620 generated by engine 3530 may be part of a customized offer 3550 outputted by the offer generation model 3210. Further, the loan amount 4620 may be part of a recalculated offer 3245 generated by the multiple offers model 250 in response to a user inputting custom inputs 3206. In other embodiments, the engine 3530 may be called by other models for different purposes than those described above.

Offer Generation Model: Screenshot

Figure 47:
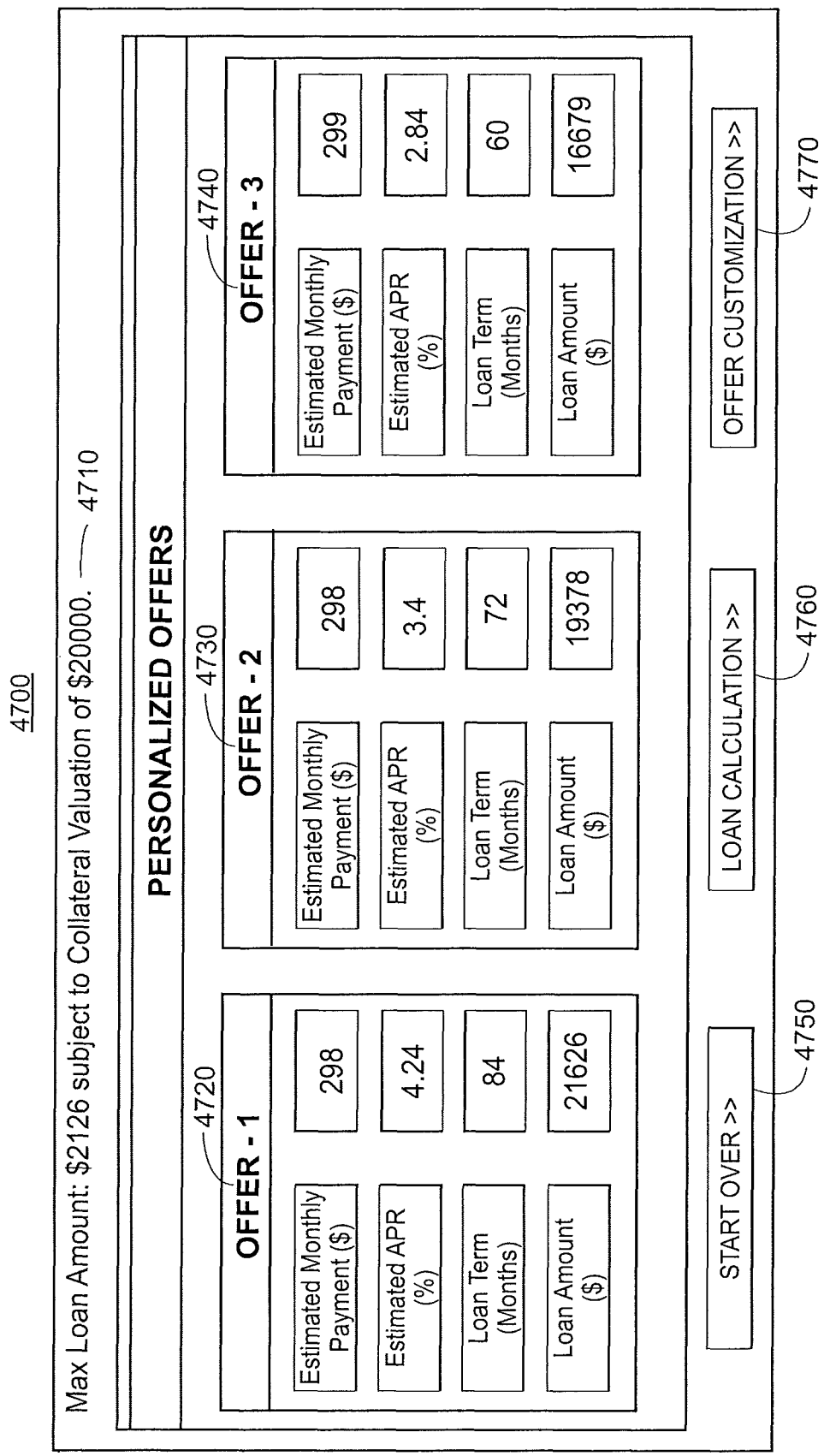
FIG. 47 is a screenshot of multiple personalized vehicle loan offers generated for an applicant, according to one embodiment.

FIG. 47 displays a screenshot of three personalized vehicle loan offers generated for an applicant. The screenshot 4700 includes vehicle loan calculation information 4710, a first vehicle loan offer 4720, a second vehicle loan offer 4730, and a third vehicle loan offer 4740. The screenshot also includes start over button 4750, loan calculation button 4760, and offer customization button 4770. In some embodiments, the first, second, and third vehicle loan offers 4720, 4730, and 4740 correspond to the first offer 3230, second offer 3235, and third offer 3240, respectively, generated by multiple offers model 250. The three personalized offers may be generated in response to one received vehicle loan application for an applicant. In some embodiments, the screenshot 4700 includes more, less, and/or different items than those displayed in FIG. 47.

In the displayed screenshot, the start over button 4750 allows the user to restart the multiple offer generation process. In some embodiments, the user re-enters inputs used for generating multiple offers. The inputs may include applicant information and/or vehicle information. The loan calculation button 4760 allows the user to recalculate multiple vehicle loan offers for an applicant. In some embodiments, the user may be able to change some of the data provided as inputs for calculating the vehicle loan offers. In some embodiments, the system displays the inputs provided by the user in response to a selection of the loan calculation button 4760. The user can then modify the inputs and recalculate the multiple vehicle loan offers. The offer customization button 4770 allows the user to generate customized offers. In some embodiments, the user can customize an offer based on the vehicle loan term and/or the vehicle loan amount. Additional details regarding offer customization are described later with respect to offer customization model 3220. In some embodiments, buttons 4750, 4760, and 4770 can do more, less, and/or different functions than those described above.

Each of the three offers 4720, 4730, and 4740 displays an estimated monthly payment, an estimated annual interest rate (APR), a loan term in months, and a loan amount. The vehicle loan calculation information 4710 explains that the maximum vehicle loan amount, shown in offer one 4720, is calculated based on a specified collateral valuation. In other embodiments, the information 4710 may display more, less, and/or different information than the information shown in FIG. 47. In some embodiments, each offer may display more, less, and/or different information than the information shown in FIG. 47.

In the displayed embodiment, the monthly payment is approximately the same payment for all three offers (approximately $300). However, each offer has a different term. Specifically, the first offer 4720 is a maximum term of 84 months, while the second offer 4730 has a term that is 12 months shorter (72 months) and the third offer has a term that is 24 months shorter (60 months). In some embodiments, the displayed offers may be incremented by more or less months than the 12 month increments shown in FIG. 47.

As the term is reduced for each vehicle loan offer (offers 4730 and 4740), the loan amounts are also reduced. Additionally, in the displayed embodiment, the vehicle loan interest rates are also reduced as the term is reduced. While the displayed embodiment shows the monthly payment being fixed, the term being decremented, and the loan amount and interest rate being determined accordingly, in other embodiments, any one of the monthly payment, interest rate, vehicle loan term, and/or vehicle loan amount can be fixed, decremented, incremented, or accordingly calculated when determining three personalized offers for an applicant.

For example, in one embodiment, the vehicle loan amount is fixed while the term is decremented. In this embodiment, the interest rate and the monthly payment would be calculated accordingly for the three different offers. In another embodiment, the vehicle loan amount and vehicle loan term may be fixed, while the interest rate is decremented. In this embodiment, the monthly payment would be calculated, accordingly. Thus, the parameters of the personalized vehicle loan offers can be fixed, decremented, incremented, and/or calculated as needed by an organization to meet the needs of a vehicle loan applicant.

Offer Customization Model

Figure 48:
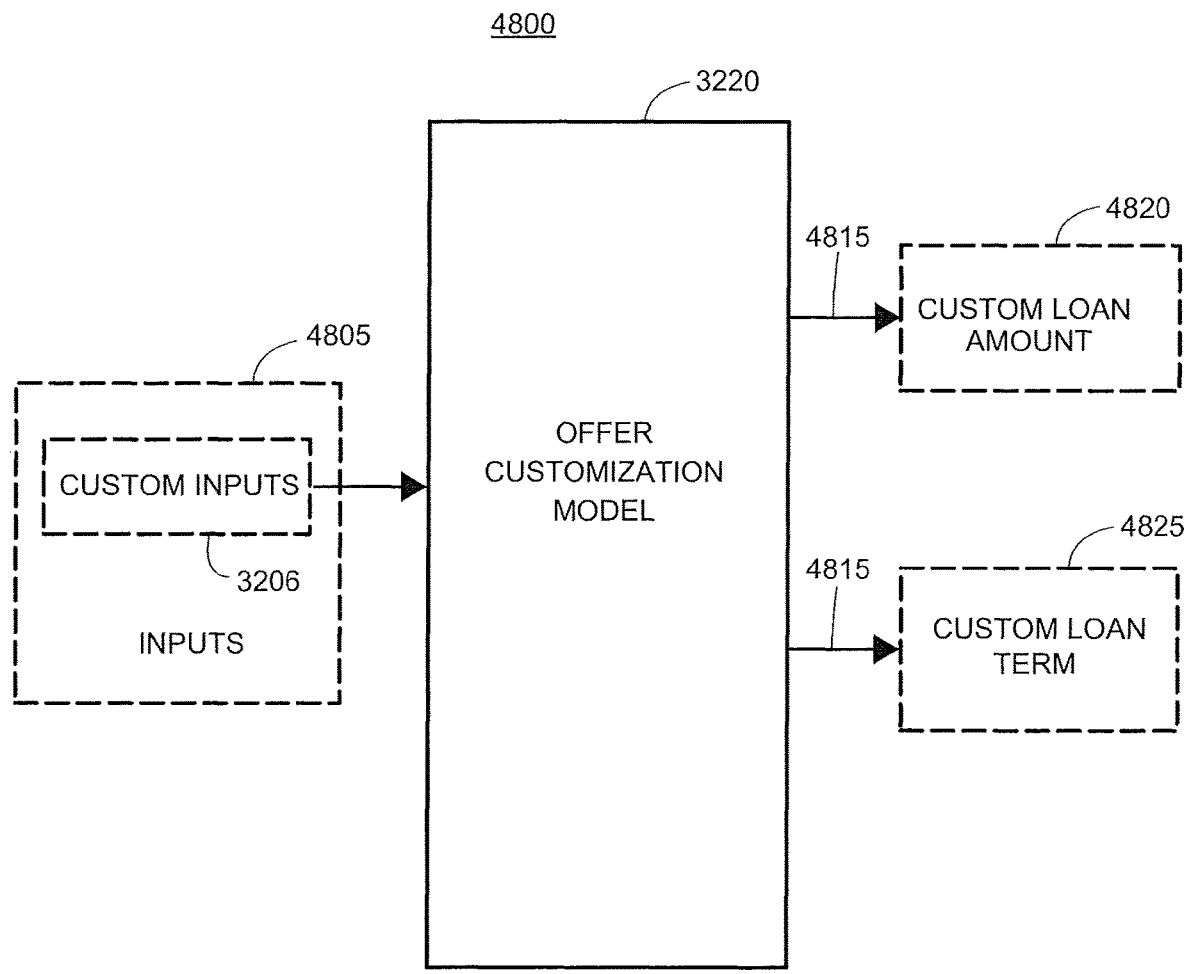
FIG. 48 is a block diagram of the offer customization model environment according to one embodiment.

FIG. 48 displays a block diagram of the offer customization environment 4800. Environment 4800 includes the offer customization model 3220, inputs 4805, and outputs 4815. The purpose of the model 3220 is to allow a user to further customize vehicle loan offers for an applicant. In some embodiments, the user may want to further customize vehicle loan offers for an applicant after receiving multiple vehicle loan offers based on inputs provided by the user. For example, the user may not be satisfied with the vehicle loan conditions specified by the multiple offers, and thus, requires a customized vehicle loan offer with different vehicle loan conditions.

The model 3220 receives inputs 4805, which include custom inputs 3206. The custom inputs may include user designations for a vehicle loan amount and/or vehicle loan term. In other embodiments, other custom inputs are received by model 3220. The model 3220 processes the inputs 4805 to generate outputs 4815, which include a custom loan amount 4820 and a custom loan term 4825. The outputs 4815 may be provided to offer generation model 3210, policy guidelines 3510, pricing model 3520, and/or loan amount calculation engine 3530. Alternatively, the outputs 4815 may be provided to other models or engines that require the outputs for customizing the vehicle loan. The custom inputs may cause a vehicle loan amount, term, interest rate, and/or monthly payment to be changed. The custom inputs may result in a recalculated offer 3245 being generated by the multiple offers model 250.

The model 3220 may process inputs 4805 by modifying the inputs to comply with various policies and constraints. For example, if a user inputs a term above the maximum term allowed, the model 3220 may modify the custom inputs to equal the allowed maximum term. In other embodiments, the model 3220 may reject the noncompliant custom vehicle loan term as an input and require the user to input a compliant custom vehicle loan term. By processing inputs 3206, model 3220 can ensure generating compliant outputs 4815, including a compliant custom loan amount 4820 and a custom loan term 4825. In other embodiments, the model 3220 includes more, less, and/or different inputs, outputs, functions, and/or components than those displayed in FIG. 48 and/or described above.

Figure 49:
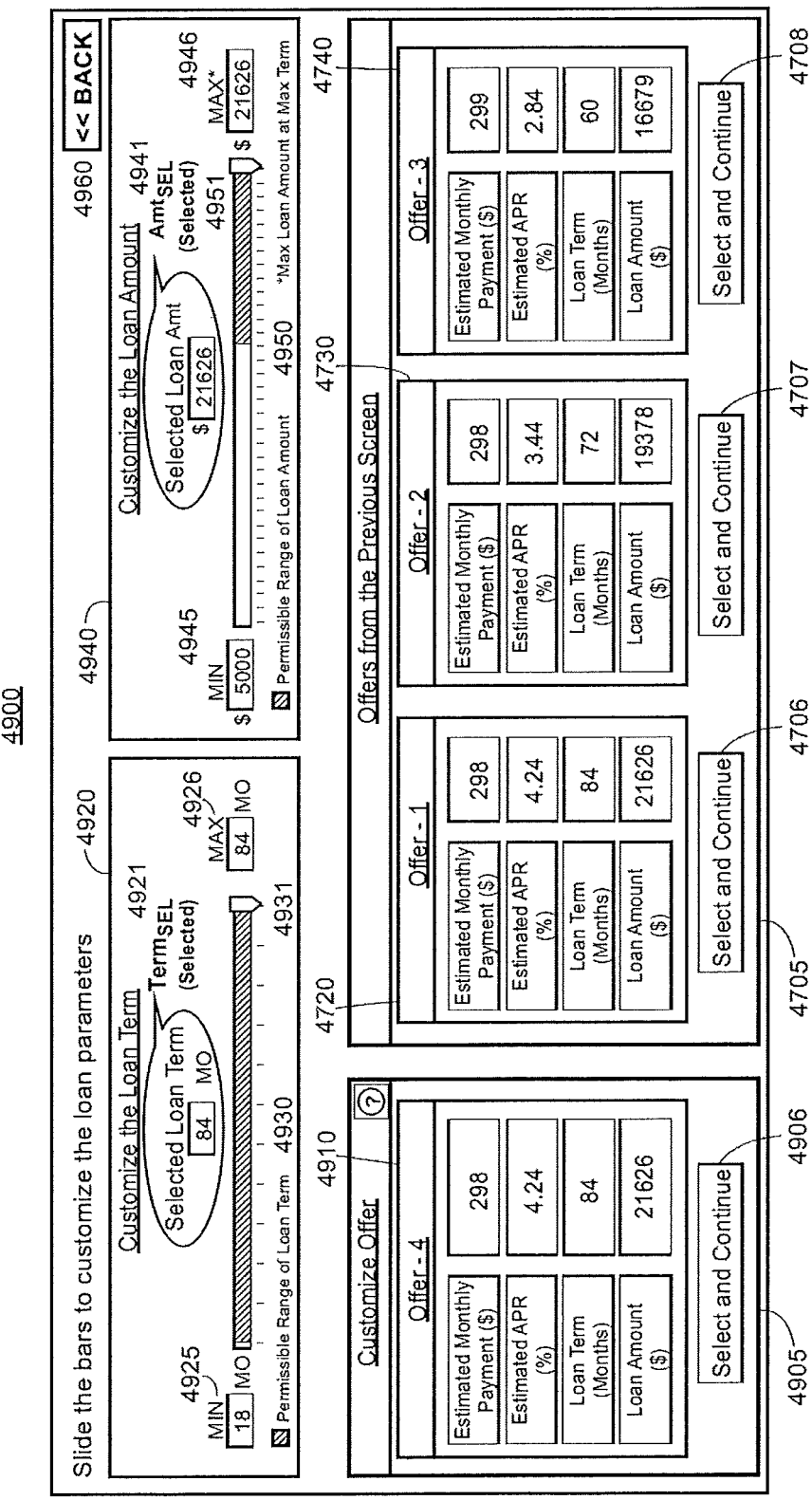
FIG. 49 is a screenshot of an offer customization interface and a generated customized offer for an applicant, according to one embodiment.

FIG. 49 displays a screenshot 4900 of the system generating and providing a customized offer to a user. The screenshot 4900 includes vehicle loan offers block 4705, customized offer block 4905, vehicle loan term customization block 4920, vehicle loan amount customization block 4940, and back button 4960. In some embodiments, the screenshot 4900 may include more, less, and/or different items than those shown.

Similar to FIG. 47, vehicle loan offer block 4705 includes a first vehicle loan 4720, a second vehicle loan 4730, and a third vehicle loan 4740. Customized offer block 4905 includes customized vehicle loan offer 4910. Similar to FIG. 47, in some embodiments, the first, second, and third vehicle loan offers 4720, 4730, and 4740 correspond to the first offer 3230, second offer 3235, and third offer 3240, respectively, generated by multiple offers model 250. Further, the customized vehicle loan offer 4910 may correspond to the recalculated vehicle loan offer 3245 generated by multiple offers model 250, in some embodiments.

For each vehicle loan offer displayed (offers 4720, 4730, 4740, and 4910), the displayed offer includes an estimated monthly payment, estimated annual interest rate (APR) a loan term displayed in months, and a loan amount displayed in dollars. The displayed offer also includes a select and continue button (button 4706 for offer 4720, button 4707 for offer 4730, button 4708 for offer 4740, and button 4906 for offer 4910). A user can select any one of these buttons to select the corresponding vehicle loan offer displayed. For example, a user can select button 4906 to choose the customized vehicle loan offer 4910. Alternatively, user can select button 4708 to select the corresponding vehicle loan offer 4740. Although not displayed, select and continue buttons 4706, 4707, and 4708 may also be displayed for their corresponding offers (4720, 4730, and 4740, respectively) in screenshot 4700 of FIG. 4710. In some embodiments, each displayed offer may include more, less, and/or different parameters than those displayed in FIG. 49. In some embodiments, each offer may include more, less, and/or different buttons to provide more, less, and/or different functions than those displayed in FIG. 49 and/or described above. In some embodiments, the screenshot 4900 may display more, less, and/or different offers than those shown in FIG. 49.

Screenshot 4900 also includes back button 4960. A user can select back button 4960 to navigate to the previous screen. In some embodiments, the previous screen displays the offers shown in the vehicle loan offer block 4705. In some embodiments, selection of the back button 4960 by a user displays the screenshot 4700 displayed in FIG. 47. However in other embodiments, a different screen may be generated in response to a selection of the back button 4960 by a user.

Vehicle loan term customization block 4920 allows a user to customize a vehicle loan by modifying the vehicle loan term. The block 4920 includes a vehicle loan term selection 4921, a vehicle loan term minimum 4925, a vehicle loan term maximum 4926, a vehicle loan term range box 4930, and a vehicle loan term slider 4931. The loan term minimum 4925 and loan term maximum 4926 correspond to the minimum and maximum vehicle loan terms available in the vehicle loan term box 4930. The vehicle loan term box 4930 may have shaded and unshaded portions. The shaded portion of box 4930 corresponds to the range of compliant vehicle loan terms. The unshaded portion of box 4930 represents the range of noncompliant vehicle loan terms. Slider 4931 allows a user to select a vehicle loan term available in box 4930. In some embodiments, the user is only permitted to move the slider 4931 within the shaded portion of the box (compliant vehicle loan terms). In other embodiments, the user can move the slider 4931 to any vehicle loan term available in box 4930. If the user moves the slider 4931 to a noncompliant vehicle loan term, the system provides an indication to the user that the selected term is noncompliant. For example, the system may display a message stating that the selected vehicle loan term is noncompliant. When the user selects a vehicle loan term with the slider 4931, the vehicle loan term selection 4921 is populated with the selected vehicle loan term. In other embodiments, box 4920 includes more, less, and/or different components than those displayed in FIG. 49.

Vehicle loan amount customization block 4940 allows a user to customize a vehicle loan by modifying the vehicle loan amount. The block 4940 includes a vehicle loan amount selection 4941, a vehicle loan amount minimum 4945, a vehicle loan amount maximum 4946, a vehicle loan amount box 4950, and a vehicle loan amount box slider 4951. The operation of the block 4940 and its components are similar to block 4920 and its components. Thus, the box 4950 has a maximum selectable amount 4946, a minimum selectable amount 4945, a shaded portion representing compliant vehicle loan amounts, and an unshaded portion representing noncompliant vehicle loan amounts. The user may select a vehicle loan amount displayed within the box 4950. However, compliant vehicle loan amount selection can only be selected within the shaded portion of box 4950. Once the user makes his selection via the slider 4951, the selected vehicle loan amount is displayed in vehicle loan amount selection 4941. In some embodiments, the block 4940 includes more, less, and/or different components than those described above and displayed in FIG. 49.

FIG. 50 includes a screenshot 5000 of a selected vehicle loan offer. The screenshot 5000 includes vehicle loan details 5010 and vehicle loan calculation information 5020. The vehicle loan details 5010 correspond to the selected vehicle loan offer. In the displayed embodiment, the details 5010 include the monthly payment, the annual interest rate (APR), the vehicle loan term displayed in months, the vehicle loan amount displayed in dollars, and a collateral value displayed in dollars. In other embodiments, details 5010 may include more, less, and/or different items than those displayed. Vehicle loan calculation information 5020 includes information used for calculating the selected vehicle loan. In the displayed embodiment, information 5020 provides information regarding the applicant income and the collateral valuation. However, in other embodiments, the information 5020 may include more, less, and/or different information regarding the calculation of the selected vehicle loan. In some embodiments, screenshot 5000 may include more, less, and/or different items than those displayed in FIG. 50 and/or described above.

Skill Based Routing Model

The skill based routing model 260 is called upon when the automated underwriting model 220 determines that a vehicle loan application requires manual underwriting. The skill based routing model attempts to improve the assignment of referred vehicle loan applications to credit analysts. Skill based routing model 260 uses a loan complexity model and a loan allocation engine to accomplish this goal. The loan complexity model categorizes loans into complexity groups based on the expected loan processing time. Meanwhile, the loan allocation engine assigns applications to credit analysts based on the authority of the analyst, the availability of the analyst, fair allocation limits, and the determined loan complexity. By improving the assignment of referred applications, the skill based routing model 260 empowers the vehicle loan generation system 200 to turn around vehicle loan applications that require manual underwriting faster. In some embodiments, the credit analysts are part of the organization, 101. In some embodiments, the credit analysts are part of a different organization, such as underwriting organization 170.

Figure 51:
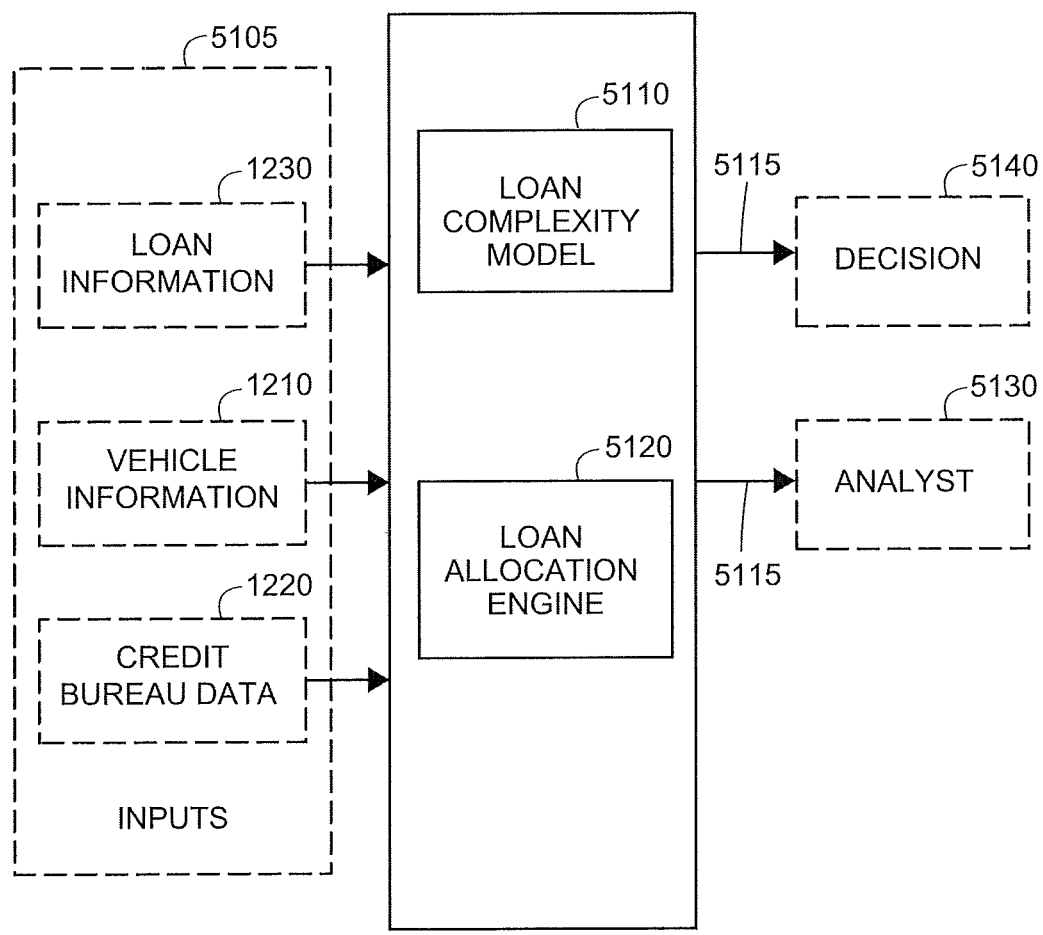
FIG. 51 is a block diagram of the skill based routing model environment, according to one embodiment.

FIG. 51 displays a block diagram of the skill based routing model environment 5100. The environment 5100 includes inputs 5105, skill based routing model 260, and outputs 5115. The inputs 5105 include vehicle information 1210, credit bureau data 1220, and loan information 1230. Vehicle information 1210 may include a product type, a vehicle collateral amount, and/or other information about the vehicle. Credit bureau data 1220 may include the pre-loan monthly debt payment for an applicant, a FICO score for an applicant, monthly income for an applicant, a pre-loan debt to income ratio for an applicant, and/or other information about the applicant. In some embodiments, the credit bureau data may be used to calculate other inputs and factors. For example, the applicant's pre-loan debt to income ratio may be calculated by dividing the applicant's pre-loan monthly debt payments by the applicant's monthly income. Loan information 1230 may include an application type and/or other information about the loan. In some embodiments, inputs 5105 include more, less, and/or different inputs than those displayed in FIG. 51.

The inputs 5105 are processed by model 260 to generate outputs 5115, which include analyst 5130 and decision 5140. Analyst 5130 designates the credit analysts that will process the loan application to determine a decision for underwriting. Decision 5140 is generated by the analyst 5130, in some embodiments. The decision 5140 may be to approve or deny the vehicle loan application for underwriting. In some embodiments, the decision 5140 is to refer the application for further processing. In some embodiments, outputs 5115 include more, less, and/or different outputs than those displayed in FIG. 51.

When model 260 processes inputs 5105 to generate outputs 5115, model 260 relies on loan complexity model 5110 and a loan allocation engine 5120. The loan complexity model 5110 and the loan allocation engine 5120 are discussed in further detail in later figures. In some embodiments, the model 260 includes more, less, and/or different models, engines, and/or components than those displayed in FIG. 51.

Loan Complexity Model

Figure 52:
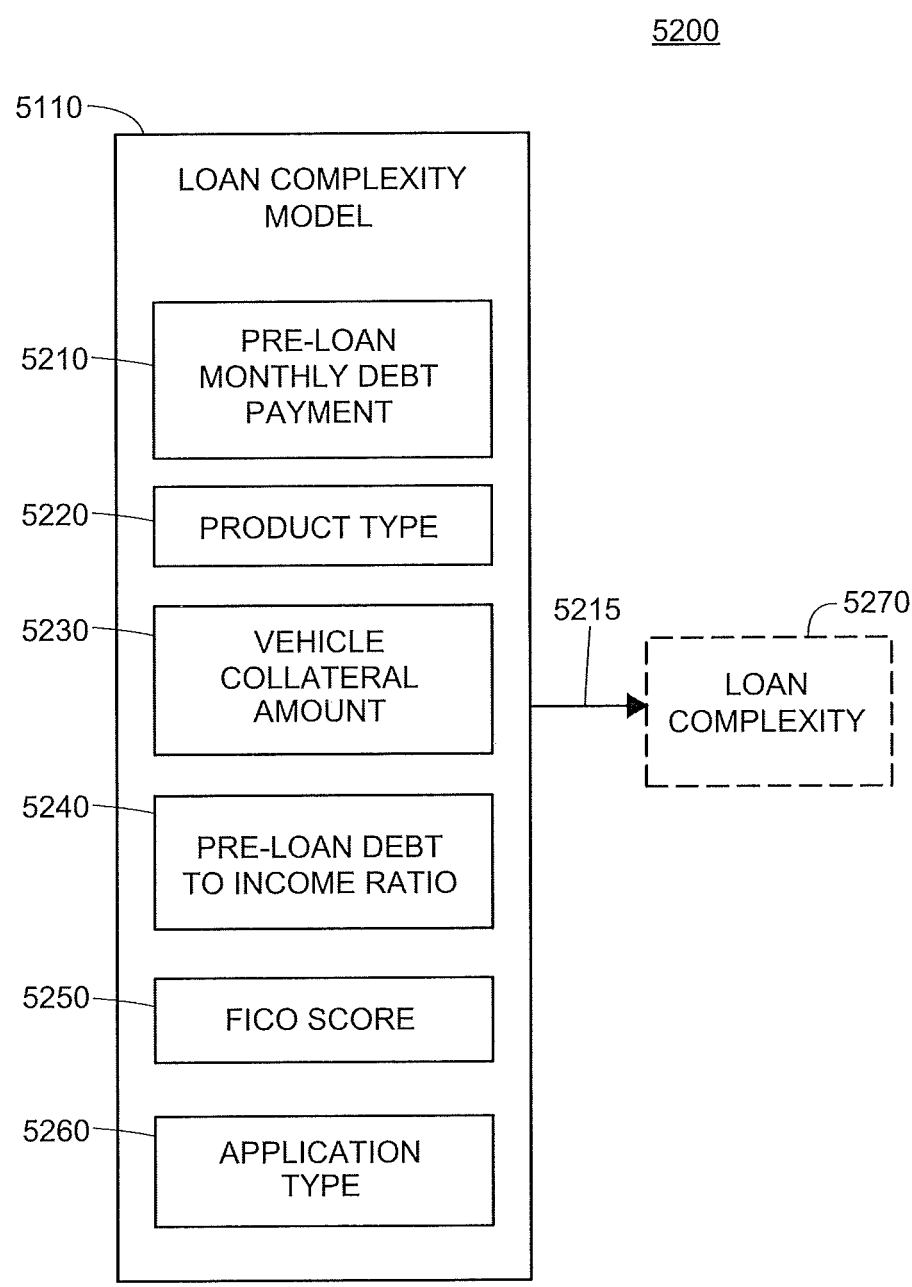
FIG. 52 is a block diagram of a loan complexity model environment, according to one embodiment.

FIG. 52 displays a block diagram of the loan complexity model environment 5200. Environment 5200 includes a loan complexity model 5110 and outputs 5215. The purpose of model 5110 is to analyze, determine, and categorize the complexity of a vehicle loan. By knowing whether or not a vehicle loan is simple, complex, or regular, vehicle loans can be more efficiently assigned to analysts with an appropriate skill level for processing the loan. By efficiently assigning vehicle loans based on complexity, loan processing time is reduced, which allows the organization to generate more vehicle loans and keep customers satisfied by turning loans around faster.

Model 5110 generates outputs 5215, which includes loan complexity 5270. In some embodiments, the loan complexity 5270 may categorize a loan as simple, regular, or complex. However, more, less, and/or different categorizations of loan complexity may exist. In some embodiments, model 5110 includes more, less, and/or different outputs 5215 than those displayed in FIG. 52.

To generate outputs 5215, model 5110 relies on several factors for processing. For a vehicle loan, model 5110 determines loan complexity based on the applicant's pre-loan monthly debt payment 5210, the vehicle loan product type 5220, vehicle collateral amount 5230, the applicant's pre-loan debt to income ratio 5240, the applicant's FICO score 5250, and the vehicle loan application type 5260. In some embodiments, the model 5110 relies on more, less, and/or different factors than those displayed in FIG. 52. The model 5110 uses the displayed factors to generate outputs 5215.

In some embodiments, loan complexity is based on loan processing time. Specifically, for loans requiring a low processing time, model 5110 may categorize the complexity of these loans as "simple." Alternatively, for loans requiring large processing time, on a 5110 may categorize the complexity of these loans as "complex." Further, for loans requiring a medium amount of loan processing time, model 5110 may categorize the complexity of these loans is "regular". In some embodiments, model 5110 may categorize the complexity of vehicle loans based on more, less, and/or different factors than those described above and displayed in FIG. 52. For example, the monetary cost, resources used, manpower used, previous loan processing experience, and/or other factors may be considered while categorizing the complexity of the loan.

Figure 53:
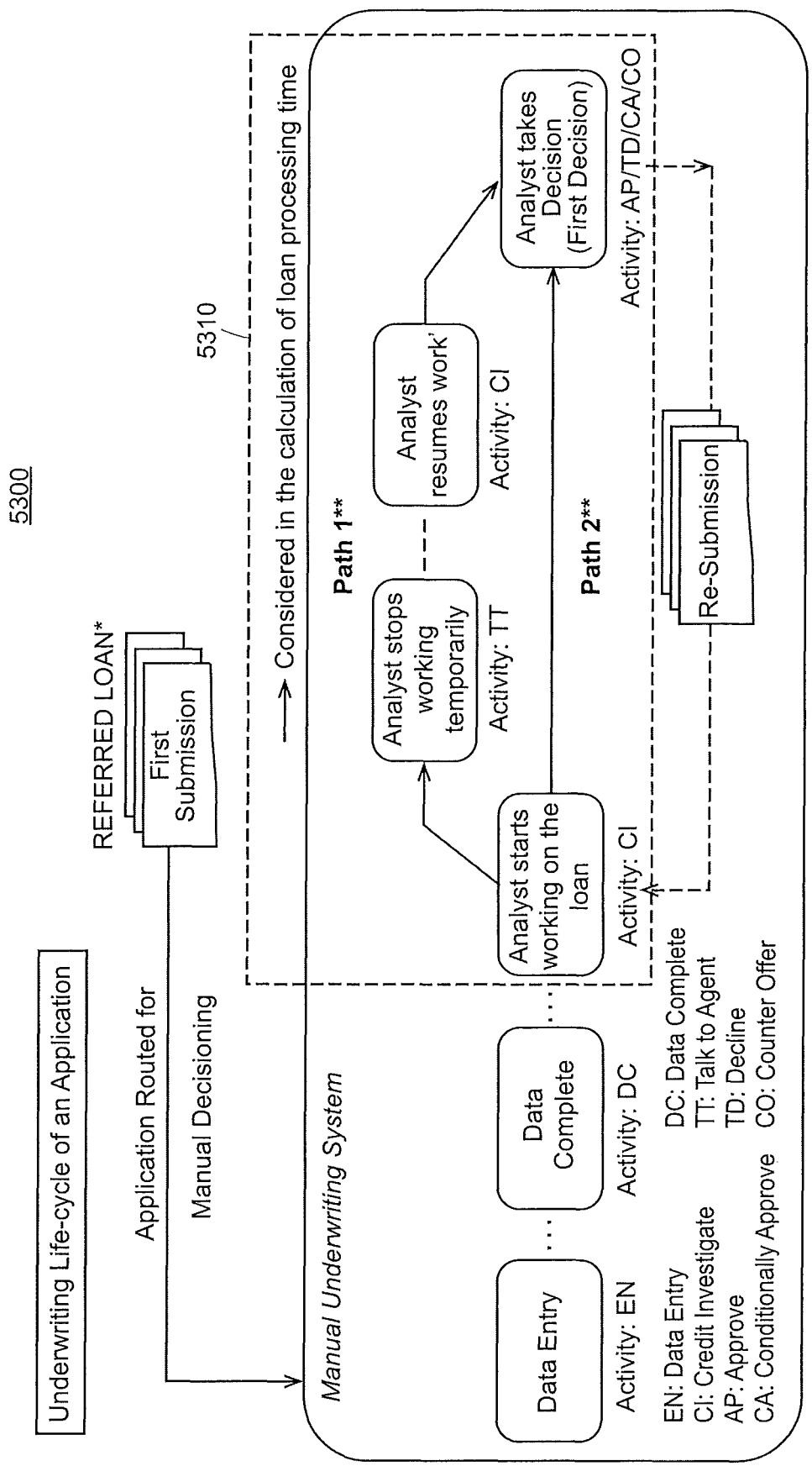
FIG. 53 is a diagram of a loan processing time environment, according to one embodiment.

FIG. 53 displays loan processing time environment 5300. Environment 5300 includes processing time block 5310. Only the steps displayed within block 5310 count towards loan processing time. Thus, loan processing time is equal to the sum of time it takes for an analyst to work on a loan from the time the analyst starts working on the loan until the time the analyst makes a final decision. Thus, tasks such as data entry are not considered part of loan processing time. In the displayed embodiment, an underwriting decision made by the analyst may include approving the loan for underwriting, declining the loan, counteroffering, and/or conditionally approving the loan for underwriting. In some embodiments, block 5310 includes more, less, and/or different items as processing time than those displayed in FIG. 53 and/or discussed above.

Figure 54:
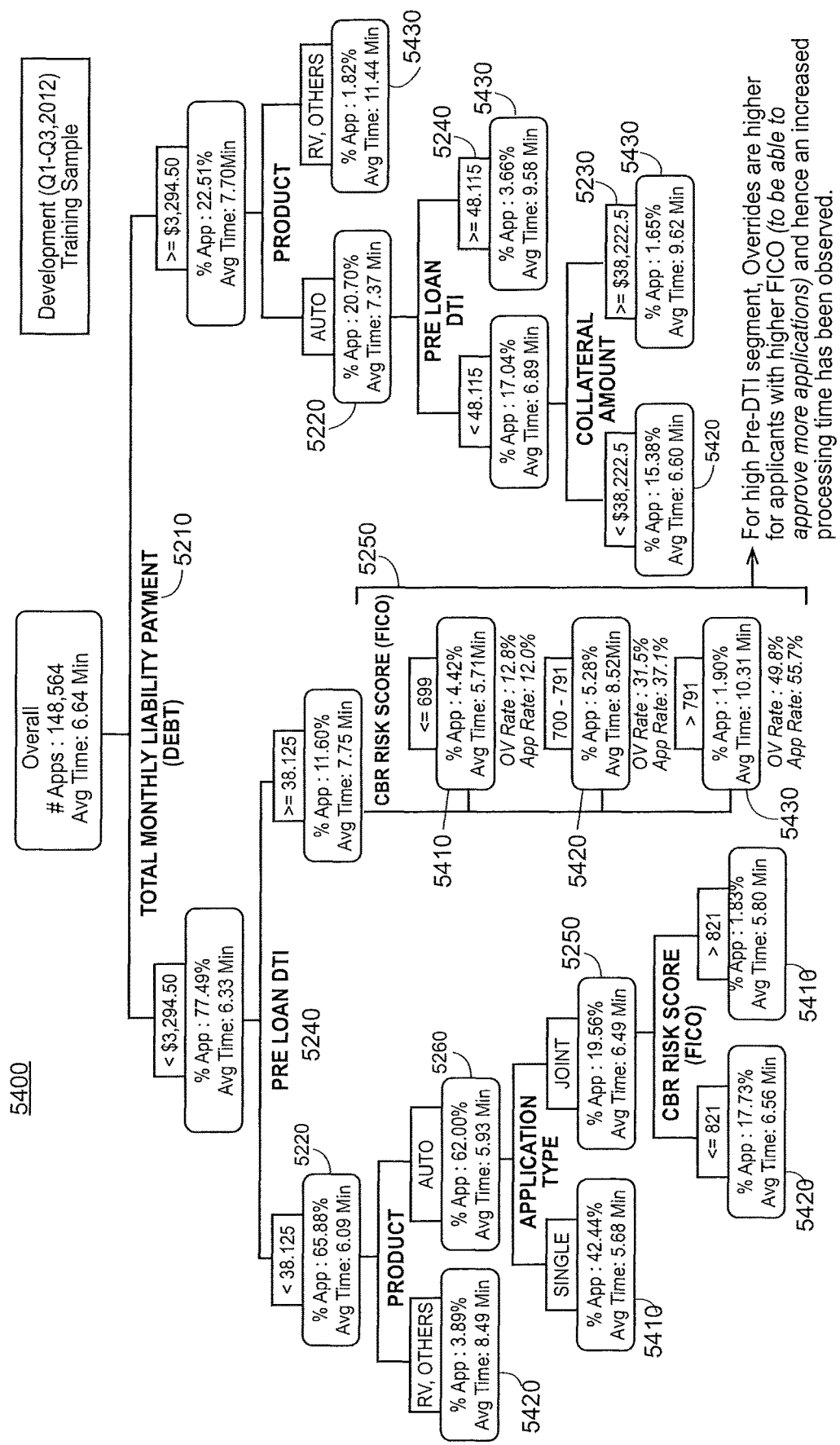
FIG. 54 is a diagram of a loan complexity segmentation environment, according to one embodiment.

FIG. 54 displays a block diagram of the loan complexity segmentation environment 5400. Environment 5400 displays the decision tree used by model 5110 to determine the loan complexity based on several factors. The decision tree includes decisions based on pre-loan monthly debt payments 5210, product type 5220, vehicle collateral amount 5230, the pre-loan debt to income ratio 5240, FICO score 5250, and the application type 5260. In some embodiments, more, less, and/or different factors are included in the decision tree for determining loan complexity. Also, each decision within the decision tree may include more, less, and/or different decisions than those displayed in FIG. 54.

The decision tree displays several different vehicle loan complexity segments. The loan complexity decision tree includes "simple" loan complexity segments 5410, "regular" loan complexity segments 5420, and "complex" loan complexity segments 5430. Generally, vehicle loans falling in the simple vehicle loan complexity segment 5410 have an average loan processing time below six minutes. Vehicle loans falling in the complex vehicle loan complexity segment 5430 generally have an average loan processing time greater than 10 minutes. Vehicle loans with an average loan processing time between 6 minutes and 10 minutes are categorized as part of the "regular" vehicle loan complexity segment 5420. In some embodiments, more, less, and/or different vehicle loan segments may be used for categorizing vehicle loan complexity. In some embodiments, the ranges of average loan processing time may be larger, smaller, and/or different ranges for vehicle loan complexity segments than those described above for FIG. 54.

The purpose of environment 5400 is to help model 5110 determine vehicle loan complexity for a vehicle loan based on several factors. The displayed decision tree in the environment was generated by collecting and analyzing various vehicle loans and their corresponding processing times over a nine month period. Vehicle loan complexity segments were then generated based on the average processing times recorded for the vehicle loans. As a result, the displayed decision tree enables model 5110 to determine vehicle loan complexity for a vehicle loan based on several factors associated with the vehicle loan.

For example, a $50,000 vehicle loan for a car to an applicant, John Doe, with pre-loan monthly debt payments 5210 of $5000 and a pre-loan monthly income of $15,000 (resulting in a pre-loan debt to income ratio of 33%) would be considered a complex vehicle loan that falls in segment 5430. Alternatively, if John Doe had pre-loan monthly debt payments of $2500, a monthly income of $10,000 (resulting in a pre-loan debt to income ratio of 25%), a FICO score of 830, and a joint application type, then John Doe's $50,000 vehicle loan for a car would be categorized as a simple vehicle loan falling under segment 5410. In another alternative, if John Doe had pre-loan monthly debt payments of $2500, pre-loan monthly income of $5000 (resulting in a pre-loan debt to income ratio of 50%), and a FICO score of 750, John Doe's vehicle loan application would likely be considered a "regular" complexity application falling under complexity segment 5420. Thus, the decision tree of environment 5400 enables model 5110 to analyze various factors of a vehicle loan to determine the vehicle loan complexity.

Loan Allocation Engine

Figure 55:
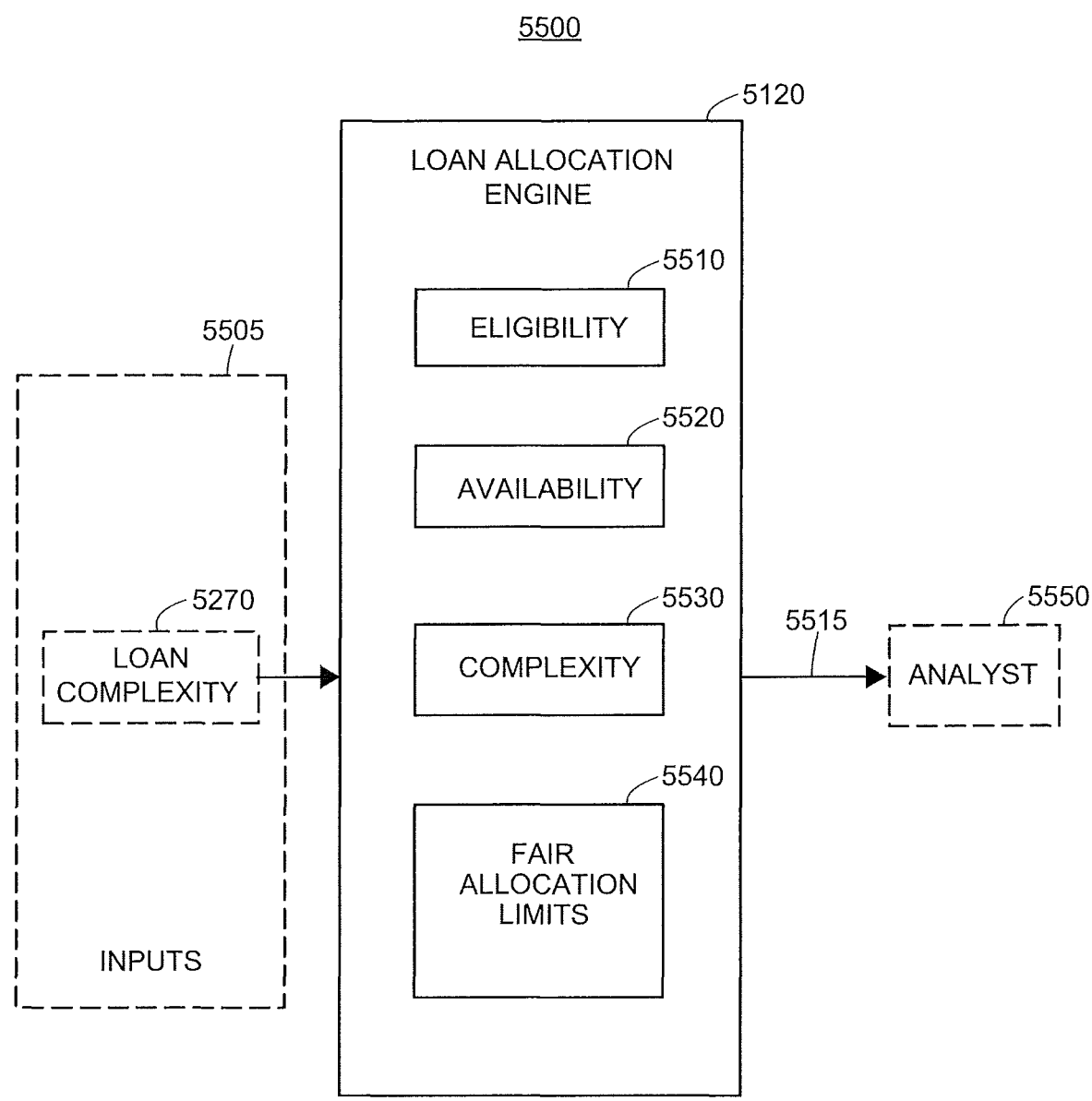
FIG. 55 is a block diagram of a loan allocation engine environment, according to one embodiment.

FIG. 55 displays a block diagram of loan allocation engine environment 5500. The purpose of the loan allocation engine is to efficiently allocate loans for processing to various analysts based on a number of factors. By doing so, engine 5120 can prevent a group of analysts from being overused, underused, or being asked to process loans that are too difficult, or too simple. For example, in some embodiments, the distribution of complexity of the loans may not match the distribution of skill level of the analysts. Specifically, an organization may have the majority of available applications be categorized with a complexity level of "simple," but have a pool of analysts with the majority of the analysts being capable of handling complex loans. By considering various factors, the engine 5120 can ensure that "simple" loans are processed by analysts with an appropriate authority level (i.e., low authority level, analyst authority of $35,000) where possible.

Environment 5500 includes inputs 5505, loan allocation engine 5120, and outputs 5515. In FIG. 55, inputs 5505 include loan complexity 5270. However, in other embodiments, inputs 5505 include more, less, and/or different inputs than those displayed.

Engine 5120 processes inputs 5505, along with other factors, to generate outputs 5515, which include analyst 5550. In some embodiments, the outputted chosen analyst 5550 may be set as the analyst 5130 outputted by the skill based routing model 260. In other embodiments, the outputted analyst 5550 may be processed further before being sent as the analyst 5130 outputted by skill based routing model 260. In some embodiments, the engine 5120 outputs more, less, and/or different outputs 5515 than those displayed in FIG. 55.

Engine 5120 relies on various inputs and factors to generate outputs 5515, including a chosen analyst 5550 for processing the vehicle loan. In the displayed embodiment of FIG. 55, engine 5120 chooses an analyst 5550 from a pool of possible analysts for processing the vehicle loan based on several factors. These factors include analyst eligibility 5510, analyst availability 5520, vehicle loan complexity 5530 (which is determined from the vehicle loan complexity 5270 input), and fair allocation limits 5540. In some embodiments, engine 5120 relies on more, less, and/or different factors than those displayed in FIG. 55.

Figure 56:
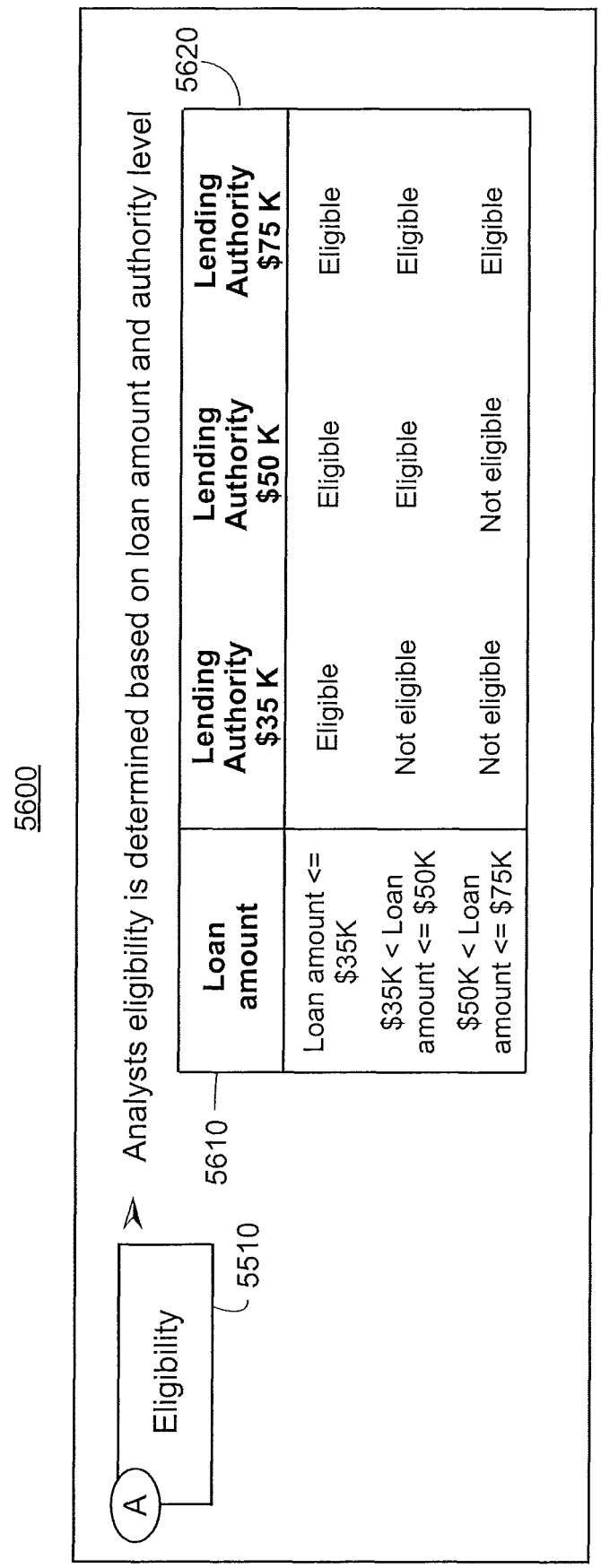
FIG. 56 is a diagram of an analyst eligibility table, according to one embodiment.

FIG. 56 displays the analyst eligibility table 5600. The loan allocation engine 5120 relies on table 5610 to determine analyst eligibility 5510. Table 5600 includes vehicle loan amount 5610 and analyst lending authority 5620. In the displayed embodiment, analysts may be authorized to process vehicle loans up to $35,000, $50,000, or $75,000. In other embodiments, other lending authority limits exist that are different from the limits displayed. In some embodiments, analysts may have a low authority, a medium authority, or a high authority. In this embodiment, higher authority analysts can handle vehicle loans that are more complex and/or for larger amounts than lower authority analysts. Vehicle loan amounts falling within a designated lending authority result in the corresponding analyst being categorized as eligible. Alternatively, vehicle loan amounts that exceed an analyst's lending authority cause the analyst to be categorized as "not eligible" for processing the vehicle loan. Thus, engine 5120 considers analysts to be eligible for processing vehicle loans with loan amounts that are within the analyst's lending authority. Table 5600 displays one embodiment of this concept. In other embodiments, analyst eligibility may be determined based on more, less, and/or different factors than vehicle loan amounts and analyst lending authority.

Engine 5120 also relies on analyst availability 5520 when determining which analysts 5550 to select for processing a vehicle loan. Engine 5120 may exclude and/or disadvantage unavailable analysts from being chosen as analyst 5550 to process the vehicle loan. By excluding and/or disadvantaging unavailable analysts, engine 5120 ensures that vehicle loan processing will be more efficient, since the selected analyst 5550 will be, or is more likely to be, available to process the vehicle loan. Analysts may be considered unavailable if they are on vacation, sick, unavailable for processing the loan, out of the office, or for any other reason that may prevent them from processing the vehicle loan in a timely fashion. Otherwise, the analyst may be considered available.

FIG. 57 displays loan complexity table 5700. Table 5700 provides loan complexity limits for analysts based on several factors, including loan complexity 5720 and analyst authority level 5710. In some embodiments, more, less, and/or different factors may be used for determining loan complexity limits for an analyst. The limits displayed in table 5700 are expressed as percentages. The percentages represent the percent of vehicle loans that can have a selected loan complexity relative to the total number of loans being processed by a particular analyst. Thus, in the displayed embodiment, an analyst with an authority level of $35,000 is limited to having 50% of his loans be simple, 30% of his loans be regular, and 20% of his loans be complex. Alternatively, an analyst with a higher authority level, such as $75,000 can have as many as 50% of his loans be complex, 30% of his loans be regular, and 20% of his loans be simple. By setting loan complexity limits, the engine 5120 ensures that loans are still routed to lower authority level analysts, even when higher authority level analysts are available.

Figure 58:
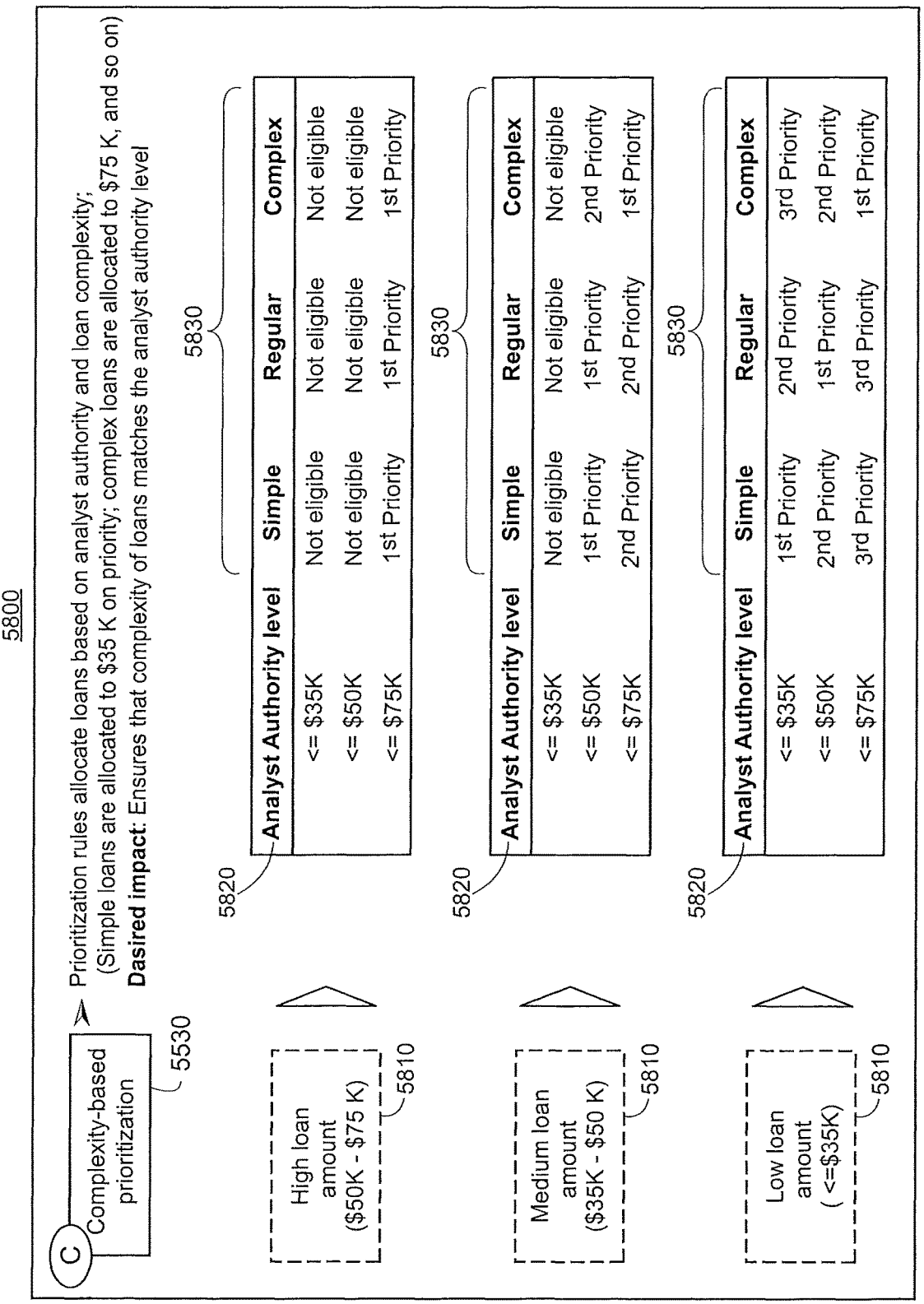
FIG. 58 is a diagram of a vehicle loan analyst prioritization table, according to one embodiment.

FIG. 58 displays a vehicle loan analyst prioritization table 5800. The table 5800 displays a prioritization scheme for vehicle loans based on several factors, including vehicle loan amount 5810, analyst authority level 5820, and vehicle loan complexity 5830. The prioritization scheme displayed in table 5800 ensures that the loan complexity of an assigned loan matches the analyst authority level of an assigned analyst. For example, the first priority of an analyst with the highest authority level is to process any loan that is categorized as complex, regardless of the vehicle loan amount. Alternatively, the first priority of the lowest analyst authority level ($35,000) is to handle simple loans that are less than $35,000. In some embodiments, more, less, and/or different factors than those displayed in table 5800 could be used to generate a vehicle loan prioritization scheme.

FIG. 59 displays an analyst fair allocation limits environment 5900. The environment 5940 allows the loan allocation engine 5120 to consider the fair allocation limits factor 5540 when determining which loans to assign to a particular analyst. In the displayed embodiment, the environment 5900 displays fair allocation limits 5930 for exemplary numbers of applications (e.g., 30 applications, 300 applications, or 900 applications) based on analyst authority 5910. Environment 5900 determines these limits 5930 based on several calculations 5920.

The purpose of fair allocation limits 5540 is to ensure that loan allocation is consistent with the number of analysts available and the skill of the available analysts. One possible benefit of using fair allocation limits is preventing a group of analysts from being overburdened or underutilized with too many or too few vehicle loans to process based on the ability of that group of analysts.

In the displayed embodiment, calculations 5920 consider the average processing time 5921 for each analyst authority 5910, a weighted average processing time 5922, the number of analysts available 5923 for each analyst authority, and a weighted number of analysts available 5924 to determine a weighted analyst distribution 5925 which guides the fair allocation limits 5930. Weighted processing time and/or analyst availability is used because higher authority analysts typically process loans faster than lower authority analysts. As result, an analyst with $75,000 authority can complete more work than an analyst with a lower authority during a fixed amount of time. Thus, lower authority analysts should be assigned fewer and/or simpler loan applications for processing than higher authority analysts. This goal is met by using a weighted average processing time and a weighted number of analysts to calculate analyst distribution and fair allocation limits.

In the displayed embodiment, calculations 5920 reveal that the average processing times 5921 for a $35,000 analyst is 10 minutes, the average processing time for a $50,000 analyst is 3.75 minutes, and the average processing time for a $75,000 analyst is 2.5 minutes. Thus, the weighted average time 5922 shows that a $35,000 analyst takes four times as long (10 minutes divided by 2.5 minutes) and a $50,000 analyst takes 1.5 times (3.75 minutes divided by 2.5 minutes) as long as a $75,000 analyst. Given these weighted average times 5922, the number of analysts available in each pool 5923 is scaled based on these weighted average times 5922 to calculate a weighted number of analysts available 5924. The weighted number of analysts available 5924 is then used to calculate an appropriate weighted analyst distribution 5925 that is used to generate fair allocation limits 5930. Therefore, even though eight analysts are available at the $35,000 authority level (number of analysts 5923), they are scaled down by a factor of four (weighted average time 5922) to two analysts available (weighted number of analysts 5924). Similarly, the twelve $50,000 analysts available (number of analysts 5923) are scaled down to eight analysts available (weighted number of analysts 5924). Lastly, the twenty $75,000 analysts (5923) remain as twenty available analysts (5924) because no weighting is required. The resulting weighted analyst distribution 5925 that is displayed (6.7% for $35,000 analysts, 26.7% for $50,000 analysts, and 66.6% for $75,000 analysts) then dictates the appropriate fair allocation limits 5930 based on the number of applications that need to be processed.

Additionally, some of the values displayed in FIG. 59 can be updated as the data available is updated. For example, fair allocation limits 5930 can be updated in real time any time the organization receives a new loan application. Alternatively, average processing time can be updated quarterly, or more or less frequently, to determine a more accurate weighting system, and thus more effective allocation limits. Furthermore, the number of analysts available in each pool can be updated daily, or more or less frequently, to also better calculate the weighted analyst distribution, and thus the fair allocation limits 5930.

Figure 60:
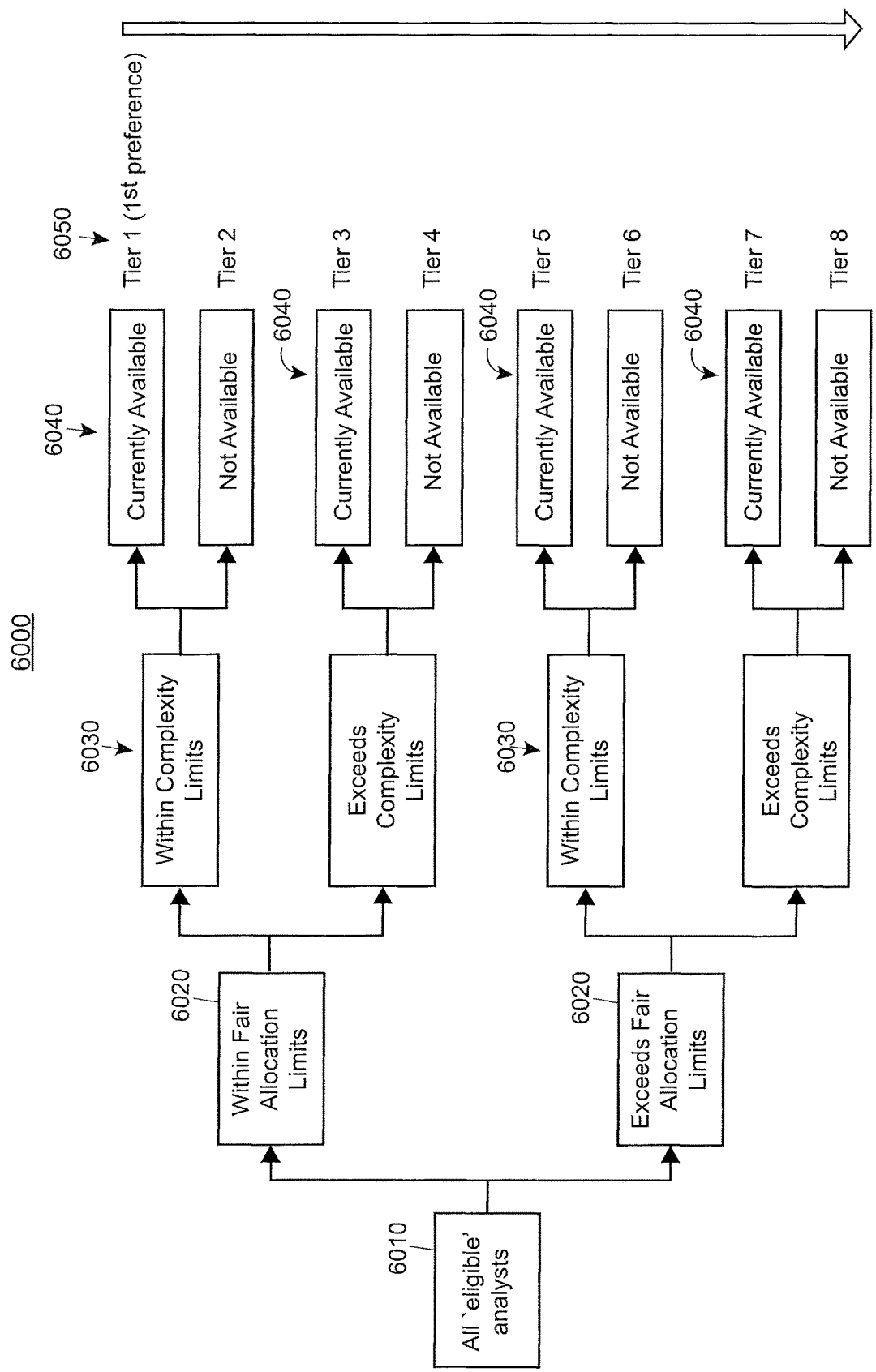
FIG. 60 is a diagram of a vehicle loan analyst tiers environment, according to one embodiment.

FIG. 60 displays a vehicle loan analyst tier environment 6000. Environment 6000 is another embodiment in which the vehicle loans can be efficiently allocated to the appropriate analysts. Higher tiers indicate less preferable analysts. Environment 6000 shows the tiers 6050 are based on analyst eligibility 6010, fair allocation limits 6020, vehicle loan complexity 6030, and analyst availability 6040. Analysts falling in tier 1 are considered the first preference for the vehicle loan to be assigned. Vehicle loans will only be assigned to a higher tiered analyst when the lower tiered analyst is unavailable.

For example, a vehicle loan of $20,000 categorized as "simple" complexity may be allocated to an analyst. At step 6010, a vehicle loan can only be allocated to an analyst within tiers one through eight if the analyst is eligible. If the analysts are ineligible, the vehicle loan cannot be allocated to any of the analysts within tiers 1 through 8. At step 6020, analysts for whom the vehicle loan will exceed the fair allocation limit are designated within tiers 5 through tier 8. Alternatively, analysts for whom the vehicle loan will fit within the fair allocation limit are designated within tiers 1 through 4, and thus are preferred to analysts for whom the vehicle loan will exceed the analyst fair allocation limit.

At step 6030, if the vehicle loan complexity exceeds the complexity limit for the analyst, then the analyst will be considered in a higher tier (e.g., tier 3 as opposed to tier 1, or tier 7 as opposed to tier 5) and less preferable. For example, based on table 5800, the simple, $20,000 vehicle loan would be within the complexity limits for all analysts. However, if the $20,000 vehicle loan was "complex," then it may exceed the complexity limits for an analyst with a $35,000 authority, the lowest authority available. Thus, in this case, a $35,000 authority analyst may be considered to be a higher tier analyst for the complex loan in comparison to a $75,000 analyst.

At step 6040, unavailable analysts are considered a higher tier analyst in comparison to the corresponding available analysts. Thus, if both analysts have an authority of $35,000, but one analyst is available while the other analyst is unavailable, the unavailable analysts will have a higher tier (i.e., tier 2) than the available analyst (i.e., tier 1). Thus, tiered environment 6000 is another embodiment of an efficient manner in which vehicle loans can be allocated to different analysts. In some embodiments, the environment includes more, less, and/or different tiers than those shown. Also, in some embodiments, the environment determines tiers based on more, less, and/or different factors than those shown.

CONCLUSION

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

What is claimed is:

1. A computer implemented method for generating multiple vehicle loan offers for one or more applicants comprising:
   receiving, via a graphical user interface, a vehicle loan application including vehicle loan information from an applicant;
   requesting credit data associated with the applicant from one or more credit bureaus;
   receiving the credit data associated with the applicant from the credit bureaus, the credit data including a set of attributes for the applicant;
   generating, by one or more computer processors, a first vehicle loan offer and a second vehicle loan offer based on the vehicle loan information and the set of attributes for the applicant, the generation occurring without user modification of conditions of the first or second vehicle loan offers,
      each of the first and second vehicle loan offers having a corresponding vehicle loan monthly payment, vehicle loan amount, vehicle loan term, and vehicle loan annual interest rate, wherein the vehicle loan annual interest rate is determined, by the one or more computer processors, based off at least the vehicle loan information and the set of attributes for the applicant,
      the second vehicle loan being generated by reducing, by the one or more computer processors, the vehicle loan term of the first vehicle loan by 12 months, wherein the vehicle loan amount and vehicle loan annual interest rate for the second vehicle loan are updated, by the one or more computer processors, in response to the reduced vehicle loan term; and
   causing, by the one or more processors, the first and second generated vehicle loan offers to be presented to the applicant via the graphical user interface,
   the graphical user interface including:
      a first slider, coupled to an offer customization model, enabling the applicant to customize a first loan parameter of one of the first or second generated vehicle loan offers, wherein a position of the first slider is a first input into the offer customization model;
      a second slider, coupled to the offer customization model, enabling the applicant to customize a second loan parameter of the one of the first or second generated vehicle loan offers, wherein a position of the second slider is a second input into the offer customization model;
      a region in each of the first and second sliders indicating compliant loan parameters, the region being dynamically determined by the offer customization model based on the positions of the first and second sliders;
      a dynamic display of a customized loan offer, the customized loan offer being automatically updated by the offer customization model as the user interacts with the first and second sliders;
      a button that, when selected while the position of the first and second sliders are in the respective regions indicating compliant loan parameters, enables the applicant to accept the customized loan offer.

2. The method of claim 1, wherein the set of attributes for the applicant includes a FICO score.

3. The method of claim 1, wherein the vehicle information received from the applicant included in the vehicle loan application comprises:
   a vehicle type selected from a group including at least an automobile, a recreational vehicle, and a boat.

4. The method of claim 1, wherein the vehicle information received from the applicant included in the vehicle loan application comprises:
   information indicating a purchase type selected from a group including at least a dealer purchase and a refinance.

5. The method of claim 1 further comprising:
   without user modification, generating, by the one or more computer processors, a third vehicle loan offer based on the vehicle loan information and the set of attributes for the applicant,
      wherein the third vehicle loan offer is different from the first and second vehicle loan offers,
      wherein the third vehicle loan offer is generated by reducing, by the one or more computer processors, the vehicle loan term of the second vehicle loan by 12 months, and
      wherein the vehicle loan amount and vehicle loan annual interest rate for the third vehicle loan are updated, by the one or more computer processors, in response to the reduced third vehicle loan term; and
   causing, by the one or more processors, the first, second, and third generated vehicle loan offers to be presented to the applicant via the graphical user interface.

6. The method of claim 1, wherein enabling the applicant to customize the first loan parameter or the second loan parameter comprises:
   enabling the applicant to modify one of a vehicle loan amount, a vehicle loan monthly payment, a vehicle loan term, and/or a annual interest rate of the vehicle loan offer.

7. A computer system for generating multiple vehicle loan offers for an applicant comprising:
   one or more computer processors; and
   a program memory storing executable instructions that when executed by the one or more computer processors cause the computer system to:
      receive, by the one or more computer processor and via a graphical user interface, a vehicle loan application from an applicant,
         the vehicle loan application including vehicle loan information indicating a vehicle type,
      request, by the one or more computer processors, credit data associated with the applicant from a credit bureau;
      receive, by the one or more computer processors, the credit data associated with the applicant from the credit bureau, the credit data including a set of attributes for the applicant;
      generate, by the one or more computer processors, a first and a second vehicle loan offer based on the vehicle loan information and the set of attributes for the applicant, the generation occurring without user modification of conditions of the first or second vehicle loan offers
         each of the first and second vehicle loan offers having a corresponding vehicle loan monthly payment, vehicle loan amount, vehicle loan term, and vehicle loan annual interest rate, wherein the vehicle loan annual interest rate is determined, by the one or more computer processors, based off at least the vehicle loan information and the set of attributes for the applicant,
         the second vehicle loan being generated by reducing, by the one or more computer processors, the vehicle loan term of the first vehicle loan by 12 months, wherein the vehicle loan amount and vehicle loan annual interest rate for the second vehicle loan are updated, by the one or more computer processors, in response to the reduced vehicle loan term; and provide, by the one or more computer processors and via the graphical user interface, the first and second generated vehicle loan offers to the applicant, the graphical user interface including:

a first slider, coupled to an offer customization model, enabling the applicant to customize a first loan parameter of one of the first or second generated vehicle loan offers, wherein a position of the first slider is a first input into the offer customization model;

a second slider, coupled to an offer customization model, enabling the applicant to customize a second loan parameter of the one of the first or second generated vehicle loan offers, wherein a position of the second slider is a second input into the offer customization model;

a region in each of the first and second sliders indicating compliant loan parameters, the region being dynamically determined by the offer customization model based on the positions of the first and second sliders;

a display of a customized loan offer, the customized loan offer being automatically updated by the offer customization model in accordance with the position of the first and second sliders;

a button that, when selected while the position of the first and second sliders are in the respective regions indicating compliant loan parameters, enables the applicant to accept the customized loan offer.

8. The system of claim 7, wherein the set of attributes for the applicant includes a FICO score of the applicant.

9. The system of claim 7, wherein the vehicle information includes a vehicle type selected from a group including at least an automobile, a recreational vehicle, and a boat.

10. The system of claim 7, wherein the vehicle information includes a purchase type selected from a group including at least a dealer purchase and a refinance.

11. The system of claim 7, wherein the instructions further cause the system to:

without user modification, generate, by the one or more computer processors, a third vehicle loan offer based on the vehicle loan information and the set of attributes for the applicant, wherein the third vehicle loan offer is different from the first and second vehicle loan offers, wherein the third vehicle loan offer is generated by reducing, by the one or more computer processors, the vehicle loan term of the second vehicle loan by 12 months, and wherein the vehicle loan amount and vehicle loan annual interest rate for the third vehicle loan are updated, by the one or more computer processors, in response to the reduced third vehicle loan term; and provide, by the one or more computer processors and via the graphical user interface, the first, second, and third generated vehicle loan offers to the applicant.

12. The system of claim 7, wherein:
the first loan parameter is a vehicle loan amount,
the second loan parameter is a vehicle loan term, and
wherein in response to adjusting the first or second slider, the offer customization model modifies at least one of the vehicle loan amount, vehicle loan monthly payment, vehicle loan term, and/or vehicle loan annual interest rate.

13. A non-transitory computer-readable storage medium comprising computer-readable instructions to be executed on one or more processors of a system for generating multiple vehicle loan offers for an applicant, the instructions when executed causing the one or more processors to:

provide, by the one or more processors, a user interface;

receive, via the user interface, applicant vehicle loan information, the vehicle loan information indicating a vehicle type;

request, by the one or more processors, credit data associated with the applicant from a credit bureau;

receive, by the one or more processors, the credit data associated with the applicant from the credit bureau, the credit data including a set of attributes for the applicant;

generate, by the one or more processors, a first vehicle loan offer and a second vehicle loan offer based on the vehicle loan information and the set of attributes for the applicant, the generation occurring without user modification of conditions of the first or second vehicle loan offers, each of the first and second vehicle loan offers having a corresponding vehicle loan monthly payment, vehicle loan amount, vehicle loan term, and vehicle loan annual interest rate, wherein the vehicle loan annual interest rate is determined, by the one or more processors, based off at least the vehicle loan information and the set of attributes for the applicant, and the second vehicle loan being generated by reducing, by the one or more processors, the vehicle loan term of the first vehicle loan by 12 months, wherein the vehicle loan amount and vehicle loan annual interest rate for the second vehicle loan are updated, by the one or more processors, in response to the reduced vehicle loan term; and provide, via the user interface, the first and second generated vehicle loan offers to the applicant, the user interface including:

a first slider, coupled to an offer customization model, enabling the applicant to customize a first loan parameter of one of the first or second generated vehicle loan offers, wherein a position of the first slider is a first input into the offer customization model;

a second slider, coupled to an offer customization model, enabling the applicant to customize a second loan parameter of the one of the first or second generated vehicle loan offers, wherein a position of the second slider is a second input into the offer customization model;

a region in each of the first and second sliders indicating compliant loan parameters, the region being dynamically determined by the offer customization model based on the positions of the first and second sliders;

a display of a customized loan offer, the customized loan offer being automatically updated by the offer customization model in accordance with the position of the first and second sliders;

a button that, when selected while the position of the first and second sliders are in the respective regions indicating compliant loan parameters, enables the applicant to accept the customized loan offer.

14. The non-transitory computer-readable storage medium of claim 13, wherein the set of attributes for the applicant includes a FICO score of the applicant.

15. The non-transitory computer-readable storage medium of claim 13, wherein the vehicle information includes a vehicle type selected from a group including at least an automobile, a recreational vehicle, and a boat.

16. The non-transitory computer-readable storage medium of claim 13, wherein the instructions further cause the one or more processors to:
   without user modification, generate, by the one or more processors, a third vehicle loan offer based on the vehicle loan information and the set of attributes for the applicant,
      wherein the third vehicle loan offer is different from the first and second vehicle loan offers,
      wherein the third vehicle loan offer is generated, by the one or more processors, by reducing the vehicle loan term of the second vehicle loan by 12 months,
      wherein the vehicle loan amount and vehicle loan annual interest rate for the third vehicle loan are updated, by the one or more processors, in response to the reduced third vehicle loan term; and
   provide, via the user interface, the first, second, and third generated vehicle loan offers to the applicant.

17. The non-transitory computer-readable storage medium of claim 13, wherein:
   the first loan parameter is a vehicle loan amount,
   the second loan parameter is a vehicle loan term, and
   wherein in response to adjusting the first or second slider, the offer customization model modifies at least one of the vehicle loan amount, vehicle loan monthly payment, vehicle loan term, and/or vehicle loan annual interest rate.

18. A computing device configured to present a graphical user interface for dynamically customizing a loan offer, the graphical user interface being presented subsequent to generating a first vehicle loan offer and a second vehicle loan offer, the graphical user interface comprising:
   a first slider coupled to an offer customization model and corresponding to a first custom input value, wherein the offer customization model dynamically utilizes the first custom input value as an input to customize one of the first or second vehicle loan offers;
   a second slider coupled to the offer customization model and corresponding to a second custom input value, wherein the offer customization model dynamically utilizes the second custom input value as an input to customize the one of the first or second vehicle loan offers;
   a region on the first slider corresponding to compliant first custom input values as dynamically determined by the offer customization model based on the first and second custom input values;
   a region on the second slider corresponding to compliant second custom input values as dynamically determined by the offer customization model based on the first and second custom input values;
   an indication of a customized loan offer dynamically determined by the offer customization model based upon at least the first custom input value, the second custom input value, and at least one other loan parameter of the one of the first or second vehicle loan offers; and
   a button that, when selected while the first and second custom input values are compliant, enables the user to accept the customized loan offer.

* * * * *